(12) United States Patent
Rao et al.

(10) Patent No.: US 12,114,032 B2
(45) Date of Patent: Oct. 8, 2024

(54) DEVICE COMMUNICATION METHOD AND SYSTEM, AND APPARATUS

(71) Applicant: Huawei Technologies Co., Ltd., Shenzhen (CN)

(72) Inventors: Kaihao Rao, Shanghai (CN); Wanjun Wei, Shanghai (CN); Sheng Bi, Shanghai (CN); Hui Xu, Shanghai (CN); Zhenzong Zhu, Shenzhen (CN); Siyuan Bao, Shanghai (CN); Gang Chen, Shanghai (CN); Yunfan Yang, Shanghai (CN); Shuang Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/251,127

(22) PCT Filed: Oct. 19, 2021

(86) PCT No.: PCT/CN2021/124800
§ 371 (c)(1),
(2) Date: Apr. 28, 2023

(87) PCT Pub. No.: WO2022/089259
PCT Pub. Date: May 5, 2022

(65) Prior Publication Data
US 2023/0403421 A1      Dec. 14, 2023

(30) Foreign Application Priority Data

Oct. 31, 2020 (CN) .......................... 202011197030.8
Oct. 31, 2020 (CN) .......................... 202011197035.0

(Continued)

(51) Int. Cl.
H04N 21/422       (2011.01)
H04N 21/41        (2011.01)
(Continued)

(52) U.S. Cl.
CPC . H04N 21/41265 (2020.08); H04N 21/42214 (2013.01); H04N 21/43637 (2013.01); H04N 21/4583 (2013.01)

(58) Field of Classification Search
None
See application file for complete search history.

(56) References Cited

U.S. PATENT DOCUMENTS 9,141,250 B2 *  9/2015  Choi ................... H04N 21/8173
10,313,731 B1 * 6/2019  Krishnan ........... H04N 21/4532
(Continued)

FOREIGN PATENT DOCUMENTS

CN    102638716 A  *  8/2012  ......... H04N 21/4126
CN    104683877 A  *  6/2015
(Continued)

*Primary Examiner* — William J Kim
(74) *Attorney, Agent, or Firm* — Conley Rose, P.C.

(57) ABSTRACT

A device communication method applied to a field of communication technologies includes, in a process in which a user uses a mobile phone to assist a large-screen device with input, that another auxiliary device in a same distributed network as the large-screen device and the mobile phone preempts auxiliary input of the mobile phone and further assists, based on input content on the mobile phone, the large-screen device with input.

20 Claims, 106 Drawing Sheets

(30) Foreign Application Priority Data

| Oct. 31, 2020 | (CN) | .......................... 202011197048.8 |
| Oct. 31, 2020 | (CN) | .......................... 202011198861.7 |
| Oct. 31, 2020 | (CN) | .......................... 202011198863.6 |
| Mar. 11, 2021 | (CN) | .......................... 202110267000.8 |

(51) Int. Cl.
  *H04N 21/4363* (2011.01)
  *H04N 21/458* (2011.01)

(56) References Cited

U.S. PATENT DOCUMENTS

| 2003/0177489 | A1* | 9/2003 | Watanabe | H04N 21/4627 |
| | | | | 348/734 |
| 2005/0166240 | A1* | 7/2005 | Kim | H04N 21/4753 |
| | | | | 725/78 |
| 2006/0215752 | A1* | 9/2006 | Lee | H04N 7/147 |
| | | | | 375/240.08 |
| 2006/0215753 | A1* | 9/2006 | Lee | H04N 21/4621 |
| | | | | 375/E7.182 |
| 2009/0099912 | A1* | 4/2009 | Jeffs | H04L 67/02 |
| | | | | 705/14.1 |
| 2010/0229194 | A1* | 9/2010 | Blanchard | H04N 21/47 |
| | | | | 725/39 |
| 2011/0084919 | A1* | 4/2011 | Lee | H04N 21/42204 |
| | | | | 345/173 |
| 2011/0107220 | A1* | 5/2011 | Perlman | H04N 21/2381 |
| | | | | 715/720 |
| 2011/0313775 | A1* | 12/2011 | Laligand | H04N 21/234336 |
| | | | | 704/E11.001 |
| 2013/0143651 | A1* | 6/2013 | Harrison | H04W 12/50 |
| | | | | 463/31 |
| 2013/0232437 | A1* | 9/2013 | Kim | G06F 3/048 |
| | | | | 715/780 |
| 2014/0184910 | A1* | 7/2014 | Bailey | H04N 21/42208 |
| | | | | 348/554 |
| 2015/0046526 | A1* | 2/2015 | Bush | H04N 21/4586 |
| | | | | 709/204 |
| 2015/0138444 | A1* | 5/2015 | Hirabayashi | H04N 21/482 |
| | | | | 348/734 |
| 2016/0164731 | A1* | 6/2016 | Jou | G06F 1/1632 |
| | | | | 726/4 |
| 2016/0266747 | A1* | 9/2016 | Leatham | H04N 21/47202 |
| 2017/0026714 | A1* | 1/2017 | Conan | H04N 21/6587 |
| 2017/0289602 | A1* | 10/2017 | Hwang | H04N 21/42222 |
| 2018/0176357 | A1 | 6/2018 | Kim et al. | |

FOREIGN PATENT DOCUMENTS

| CN | 106550258 | A | | 3/2017 | |
| CN | 107948696 | A | * | 4/2018 | .......... G06F 3/0233 |
| CN | 111586042 | A | | 8/2020 | |
| CN | 111866571 | A | | 10/2020 | |
| CN | 113949911 | A | * | 1/2022 | |
| CN | 111787410 | B | * | 3/2022 | .......... G06F 3/04886 |
| EP | 3176679 | A1 | * | 6/2017 | .............. G06F 3/023 |
| WO | WO-2015017274 | A1 | * | 2/2015 | ........ H02J 13/00017 |
| WO | WO-2022095820 | A1 | * | 5/2022 | |

* cited by examiner

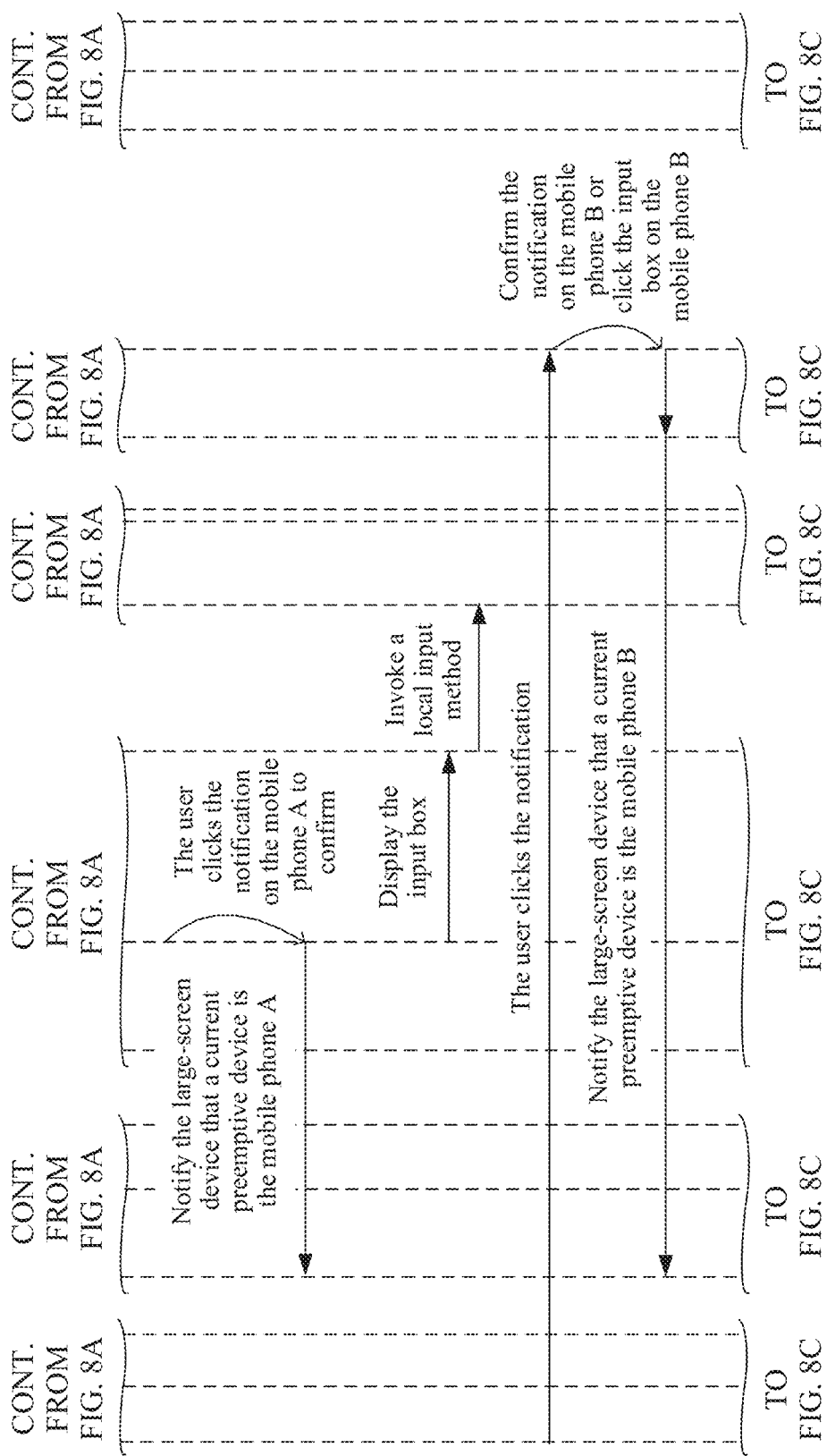

Mobile phone A

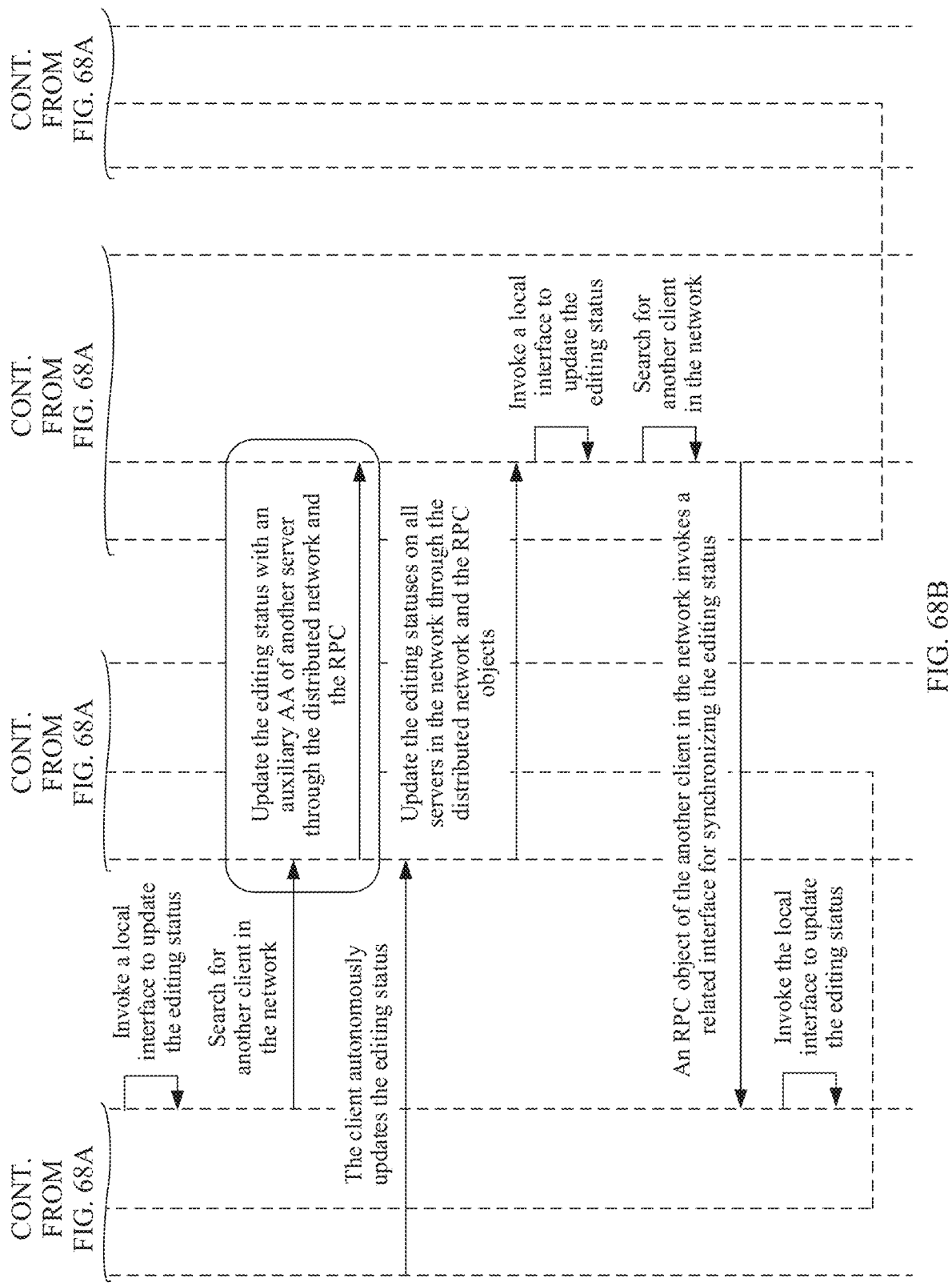

DEVICE COMMUNICATION METHOD AND SYSTEM, AND APPARATUS

CROSS-REFERENCE TO RELATED APPLICATIONS

This is a U.S. National Stage of International Patent Application No. PCT/CN2021/124800 filed on Oct. 19, 2021, which claims priority to Chinese Patent Application No. 202011197035.0 filed on Oct. 31, 2020, Chinese Patent Application No. 202011197048.8 filed on Oct. 31, 2020, Chinese Patent Application No. 202011197030.8 filed on Oct. 31, 2020, Chinese Patent Application No. 202011198861.7 filed on Oct. 31, 2020, Chinese Patent Application No. 202011198863.6 filed on Oct. 31, 2020, and Chinese Patent Application No. 202110267000.8 filed on Mar. 11, 2021, all of which are hereby incorporated by reference in their entireties.

TECHNICAL FIELD

This application relates to the field of communication technologies, and in particular, to a device communication method and system, and an apparatus.

BACKGROUND

With continuous development of technologies of intelligent terminals, more electronic devices are developed. However, different electronic devices usually have different advantages and disadvantages, and the electronic devices usually cannot provide a satisfactory service for a user.

Taking a television and a mobile phone as an example, the television may provide a better video feed based on a large screen, but during searching for a program on the television, a remote control needs to be used to select pinyin letters and the like one by one for textual input, and consequently, efficiency is low, and it is inconvenient to perform an input operation; and the mobile phone can achieve convenient and efficient textual input based on an input method framework or the like, but a screen of the mobile phone is usually small, and is not favorable for a user to watch a video or an image.

SUMMARY

Embodiments of this application provide a device communication method and system, and an apparatus, so that different electronic devices can collaborate with each other to give full play to their advantages and to provide a convenient and easeful service for a user.

A first subaspect of a first aspect of embodiments of this application provides a device communication method, applied to a system including a first device, a second device, and a third device. The method includes: The first device displays a first interface including a first edit box; the first device sends an indication message to the second device and the third device; the second device displays a second interface based on the indication message, where the second interface includes a second edit box; if there is an editing status in the second edit box, the first device synchronizes the editing status to the first edit box; the third device sends a preemption message to the first device; and the third device displays a third interface including a third edit box, where the editing status in the first edit box is synchronized to the third edit box.

In this way, in a process in which the second device assists the first device with input, the third device may perform preemption, so that a manner of assisting the first device with input is more flexible.

In a possible implementation, the second device includes an interface service, and the interface service is used for synchronization of the editing status between the first device and the second device. In this way, based on the interface service, any editing status on the second device may be synchronized to the first device.

In a possible implementation, the editing status includes one or more of the following: textual content, a cursor, or highlighting of the textual content.

In a possible implementation, that the second device displays the second interface based on the indication message includes: The second device displays a first notification interface in response to the indication message, where the first notification interface includes an option for confirming auxiliary input; and the second device displays the second interface in response to an operation of triggering the option.

In a possible implementation, the second interface further includes all or some of content in the first interface. In this way, a user may view a condition on the first device on the second device, helping the user learn about a real-time status on the auxiliary first device.

In a possible implementation, the second edit box and all or some of the content in the first interface are displayed in layers, and the second edit box is displayed in a layer above all or some of the content in the first interface.

In a possible implementation, after the second device displays the second interface based on the indication message, the method further includes: The second device displays a virtual keyboard in response to triggering the second edit box; and the second device displays the editing status in the second edit box based on an input operation received on the virtual keyboard and/or in the second edit box.

In a possible implementation, the first device includes any one of the following: a television, a large-screen device, or a wearable device; and the second device or the third device includes any one of the following: a mobile phone, a tablet, or a wearable device.

In a possible implementation, the method further includes: When input content is received in the third edit box, the first device synchronizes the input content to the first edit box.

In a possible implementation, that the third device sends the preemption message to the first device includes: The third device receives a preemption request from the second device; and the third device sends the preemption message to the first device according to the preemption request.

In a possible implementation, that the third device sends the preemption message to the first device includes: The third device displays a second notification interface based on a user operation, where the second notification interface includes an option for confirming preemption; and the third device sends the preemption message to the first device in response to an operation of triggering the option for confirming preemption.

A second subaspect of the first aspect of embodiments of this application provides a device communication method, applied to a system including a first device, a second device, and a third device. The method includes: The second device displays a fourth interface including an option of the first device; the second device sends an indication message to the first device in response to an operation of selecting the option of the first device; the first device displays a first interface including a first edit box; the second device displays a second interface, where the second interface includes a second edit box; if there is an editing status in the second edit box, the first device synchronizes the editing status to the first edit box; the third device sends a preemption message to the first device; and the third device displays a third interface including a third edit box, where the editing status in the first edit box is synchronized to the third edit box.

It should be noted that any possible implementation of the first subaspect of the first aspect may be used to limit the method according to the second subaspect of the first aspect when the implementation does not conflict with the method according to the second subaspect of the first aspect. Details are not described herein.

A third subaspect of the first aspect of embodiments of this application provides a device communication method, applied to a first device. The method includes: The first device displays a first interface including a first edit box; the first device sends an indication message to a second device and a third device, where the indication message is used to indicate the second device to display a second interface, and the second interface includes a second edit box; if there is an editing status in the second edit box, the first device synchronizes the editing status to the first edit box; and the first device receives a preemption message from the third device.

It should be noted that any possible implementation of the first subaspect of the first aspect may be used to limit the method according to the third subaspect of the first aspect when the implementation does not conflict with the method according to the third subaspect of the first aspect. Details are not described herein.

A fourth subaspect of the first aspect of embodiments of this application provides a device communication method, applied to a second device. The method includes: The second device displays a fourth interface including an option of a first device; the second device sends an indication message to the first device in response to an operation of selecting the option of the first device; the first device displays a first interface including a first edit box; the second device displays a second interface, where the second interface includes a second edit box; if there is an editing status in the second edit box, the second device synchronizes the editing status to the first edit box; and the second device receives a preemption message from a third device.

It should be noted that any possible implementation of the first subaspect of the first aspect may be used to limit the method according to the fourth subaspect of the first aspect when the implementation does not conflict with the method according to the fourth subaspect of the first aspect. Details are not described herein.

A fifth subaspect of the first aspect of embodiments of this application provides a device communication system, including a first device, a second device, and a third device. The first device is configured to perform steps performed by the first device according to any one of the first subaspect of the first aspect to the fourth subaspect of the first aspect. The second device is configured to perform steps performed by the second device according to any one of the first subaspect of the first aspect to the fourth subaspect of the first aspect. The third device is configured to perform steps performed by the third device according to any one of the first subaspect of the first aspect to the fourth subaspect of the first aspect.

A sixth subaspect of the first aspect of embodiments of this application provides a first device, including at least one memory and at least one processor. The memory is configured to store program instructions; and the processor is configured to invoke the program instructions in the memory, to enable the first device to perform steps performed by the first device according to any one of the first subaspect of the first aspect to the fourth subaspect of the first aspect.

A seventh subaspect of the first aspect of embodiments of this application provides a second device, including at least one memory and at least one processor. The memory is configured to store program instructions; and the processor is configured to invoke the program instructions in the memory, to enable the second device to perform steps performed by the second device according to any one of the first subaspect of the first aspect to the fourth subaspect of the first aspect.

An eighth subaspect of the first aspect of embodiments of this application provides a third device, including at least one memory and at least one processor. The memory is configured to store program instructions; and the processor is configured to invoke the program instructions in the memory, to enable the third device to perform steps performed by the third device according to any one of the first subaspect of the first aspect to the fourth subaspect of the first aspect.

A ninth subaspect of the first aspect of embodiments of this application provides a computer-readable storage medium. The computer-readable storage medium stores a computer program, and when the computer program is executed by a processor of a first device, steps performed by the first device according to any one of the first subaspect of the first aspect to the fourth subaspect of the first aspect are implemented; when the computer program is executed by a processor of a second device, steps performed by the second device according to any one of the first subaspect of the first aspect to the fourth subaspect of the first aspect are implemented; or when the computer program is executed by a processor of a third device, steps performed by the third device according to any one of the first subaspect of the first aspect to the fourth subaspect of the first aspect are implemented.

It should be noted that in embodiments of this application, the specific device communication method is described using an example of interaction between the first device, the second device, and the third device. When one of the first device, the second device, or the third device is used to perform the method, each of the devices may select a step performed by the device in any one of the foregoing embodiments to obtain a single-side implementation of the first device, the second device, or the third device. Details are not described herein again. A function of the second device is similar to that of the third device. Any step performed by the second device may be applied to the third device when the step does not conflict the steps performed by the third device.

It should be noted that, in the foregoing embodiments, a display screen of each of the devices may be used to implement the step for display. Descriptions of the first interface, the second interface, the third interface, the fourth interface, or the like in the foregoing embodiments are descriptions for distinguishing different display interfaces on each of the devices. In a specific following embodiment, the first interface, the second interface, the third interface, or the fourth interface may correspond to a specific interface provided in the specific embodiment based on textual descriptions with reference to specific content of the embodiment. Details are not described herein.

It should be understood that, the technical solutions according to the second subaspect of the first aspect to the ninth subaspect of the first aspect of embodiments of this application correspond to that according to the first subaspect of the first aspect of embodiments of this application, and beneficial effects achieved in the subaspects and corresponding feasible implementations are similar. Details are not described again.

A first subaspect of a second aspect of embodiments of this application provides a device communication method, applied to a system including a first device, a second device, and a third device. The method includes: The first device displays a first interface including a first edit box; the first device determines, in response to an operation of selecting the first edit box, that the second device and the third device join a distributed network; the first device displays a second interface, where the second interface includes a first option corresponding to the second device and a second option corresponding to the third device; the first device sends an indication message to the second device in response to an operation of triggering the first option; and the second device displays a third interface based on the indication message, where the third interface includes a second edit box; and if there is an editing status in the second edit box, synchronizes the editing status to the first edit box.

In this embodiment of this application, the first device may provide a selection interface for selecting the second device or the third device, and may send the indication message to the second device when receiving selection of the second device, to indicate the second device to assist the first device. In this way, no indication message may be sent to the third device, thereby avoiding disturbance to the third device.

In a possible implementation, the second device includes an interface service, and the interface service is used for synchronization of the editing status between the first device and the second device. In this way, based on the interface service, any editing status on the second device may be synchronized to the first device.

In a possible implementation, the editing status includes one or more of the following: textual content, a cursor, or highlighting of the textual content.

In a possible implementation, that the second device displays a third interface based on the indication message includes: The second device displays a notification interface in response to the indication message, where the notification interface includes a third option for confirming auxiliary input; and the second device displays the third interface in response to an operation of triggering the third option.

In a possible implementation, the third interface further includes all or some of content in the first interface. In this way, a user may view a condition on the first device on the second device, helping the user learn about a real-time status on the auxiliary first device.

In a possible implementation, the second edit box and all or some of the content in the first interface are displayed in layers, and the second edit box is displayed in a layer above all or some of the content in the first interface.

In a possible implementation, after the second device displays the third interface based on the indication message, the method further includes: The second device displays a virtual keyboard in response to triggering the second edit box; and the second device displays the editing status in the second edit box based on an input operation received on the virtual keyboard and/or in the second edit box.

In a possible implementation, the first device includes any one of the following: a television, a large-screen device, or a wearable device; and the second device or the third device includes any one of the following: a mobile phone, a tablet, or a wearable device.

A second subaspect of the second aspect of embodiments of this application provides a device communication method, applied to a system including a first device, a second device, and a third device. The method includes: The first device displays a first interface including a first edit box; the first device determines, in response to an operation of selecting the first edit box, that the second device and the third device join a distributed network; the first device determines that the second device is a device for auxiliary input; the first device sends an indication message to the second device; and the second device displays a third interface based on the indication message, where the third interface includes a second edit box; and if there is an editing status in the second edit box, synchronizes the editing status to the first edit box.

It should be noted that any possible implementation of the first subaspect of the second aspect may be used to limit the method according to the second subaspect of the second aspect when the implementation does not conflict with the method according to the second subaspect of the second aspect. Details are not described herein.

A third subaspect of the second aspect of embodiments of this application provides a device communication method, applied to a system including a first device, a second device, and a third device. The method includes: The second device displays a fourth interface including an option of the first device; the second device sends an indication message to the first device in response to an operation of selecting the option of the first device; the first device displays a first interface including a first edit box; and the second device displays a third interface, where the third interface includes a second edit box; and if there is an editing status in the second edit box, synchronizes the editing status to the first edit box.

It should be noted that any possible implementation of the first subaspect of the second aspect may be used to limit the method according to the third subaspect of the second aspect when the implementation does not conflict with the method according to the third subaspect of the second aspect. Details are not described herein.

A fourth subaspect of the second aspect of embodiments of this application provides a device communication method, applied to a first device. The method includes: The first device displays a first interface including a first edit box; the first device determines, in response to an operation of selecting the first edit box, that a second device and a third device join a distributed network; the first device displays a second interface, where the second interface includes a first option corresponding to the second device and a second option corresponding to the third device; and the first device sends an indication message to the second device in response to an operation of triggering the first option, where the indication message is used to indicate the second device to display a third interface, and the third interface includes a second edit box; and if there is an editing status in the second edit box, synchronizes the editing status to the first edit box.

It should be noted that any possible implementation of the first subaspect of the second aspect may be used to limit the method according to the fourth subaspect of the second aspect when the implementation does not conflict with the method according to the fourth subaspect of the second aspect. Details are not described herein.

A fifth subaspect of the second aspect of embodiments of this application provides a device communication method, applied to a second device. The method includes: The second device displays a fourth interface including an option of a first device; the second device sends an indication message to the first device in response to an operation of selecting the option of the first device, where the indication message is used to indicate the first device to display a first interface including a first edit box; and the second device displays a third interface, where the third interface includes a second edit box, and if there is an editing status in the second edit box, synchronizes the editing status to the first edit box.

It should be noted that any possible implementation of the first subaspect of the second aspect may be used to limit the method according to the fifth subaspect of the second aspect when the implementation does not conflict with the method according to the fifth subaspect of the second aspect. Details are not described herein.

A sixth subaspect of the second aspect of embodiments of this application provides a device communication system, including a first device, a second device, and a third device. The first device is configured to perform steps performed by the first device according to any one of the first subaspect of the second aspect to the fifth subaspect of the second aspect, the second device is configured to perform steps performed by the second device according to any one of the first subaspect of the second aspect to the fifth subaspect of the second aspect, and the third device is configured to perform steps performed by the third device according to any one of the first subaspect of the second aspect to the fifth subaspect of the second aspect.

A seventh subaspect of the second aspect of embodiments of this application provides a first device, including at least one memory and at least one processor. The memory is configured to store program instructions; and the processor is configured to invoke the program instructions in the memory, to enable the first device to perform steps performed by the first device according to any one of the first subaspect of the second aspect to the fifth subaspect of the second aspect.

An eighth subaspect of the second aspect of embodiments of this application provides a second device, including at least one memory and at least one processor. The memory is configured to store program instructions, and the processor is configured to invoke the program instructions in the memory, to enable the second device to perform steps performed by the second device according to any one of the first subaspect of the second aspect to the fifth subaspect of the second aspect.

A ninth subaspect of the second aspect of embodiments of this application provides a computer-readable storage medium. The computer-readable storage medium stores a computer program, and when the computer program is executed by a processor of a first device, steps performed by the first device according to any one of the first subaspect of the second aspect to the fifth subaspect of the second aspect are implemented; when the computer program is executed by a processor of a second device, steps performed by the second device according to any one of the first subaspect of the second aspect to the fifth subaspect of the second aspect are implemented; or when the computer program is executed by a processor of a third device, steps performed by the third device according to any one of the first subaspect of the second aspect to the fifth subaspect of the second aspect are implemented.

It should be noted that in embodiments of this application, the specific device communication method is described using an example of interaction between the first device, the second device, and the third device. When one of the first device, the second device, or the third device is used to perform the method, each of the devices may select a step performed by the device in any one of the foregoing embodiments to obtain a single-side implementation of the first device, the second device, or the third device. Details are not described herein again. A function of the second device is similar to that of the third device. Any step performed by the second device may be applied to the third device when the step does not conflict the steps performed by the third device.

It should be noted that, in the foregoing embodiments, a display screen of each of the devices may be used to implement the step for display. Descriptions of the first interface, the second interface, the third interface, the fourth interface, or the like in the foregoing embodiments are descriptions for distinguishing different display interfaces on each of the devices. In a specific following embodiment, the first interface, the second interface, the third interface, or the fourth interface may correspond to a specific interface provided in the specific embodiment based on textual descriptions with reference to specific content of the embodiment. Details are not described herein.

It should be understood that, the technical solutions according to the second subaspect of the second aspect to the ninth subaspect of the second aspect of embodiments of this application correspond to that according to the first subaspect of the second aspect of embodiments of this application, and beneficial effects achieved in the subaspects and corresponding feasible implementations are similar. Details are not described again.

A first subaspect of a third aspect of embodiments of this application provides a device communication method, applied to a system including a first device and a second device. The method includes: The first device displays a first interface including a first edit box; the first device sends an indication message to the second device; the second device displays a second interface based on the indication message, where the second interface includes a second edit box; if there is a keyword in the second edit box, the first device synchronizes the keyword to the first edit box; the first device determines a candidate term corresponding to the keyword; and the second device obtains the candidate term, and displays a third interface, where the third interface includes the candidate term.

In this embodiment of this application, the keyword input on the second device may be synchronized to the first device, and the candidate term on the first device associated based on the keyword may be synchronized to the second device, so that the second device can conveniently and efficiently assist, based on an operation of selecting the candidate term on the first device, the first device with input.

In a possible implementation, the second device includes an interface service, and the interface service is used for synchronization of the editing status between the first device and the second device. In this way, based on the interface service, any editing status on the second device may be synchronized to the first device.

In a possible implementation, the editing status includes one or more of the following: textual content, a cursor, or highlighting of the textual content.

In a possible implementation, that the second device displays the second interface based on the indication message includes: The second device displays a notification interface in response to the indication message, where the notification interface includes an option for confirming auxiliary input; and the second device displays the second interface in response to an operation of triggering the option.

In a possible implementation, the third interface further includes all or some of content in the first interface. In this way, a user may view a condition on the first device on the second device, helping the user learn about a real-time status on the auxiliary first device.

In a possible implementation, the second edit box and all or some of the content in the first interface are displayed in layers, and the second edit box is displayed in a layer above all or some of the content in the first interface.

In a possible implementation, after the second device displays the second interface based on the indication message, the method further includes: The second device displays a virtual keyboard in response to triggering the second edit box; and the second device displays the editing status in the second edit box based on an input operation received on the virtual keyboard and/or in the second edit box.

In a possible implementation, the first device includes any one of the following: a television, a large-screen device, or a wearable device; and the second device includes any one of the following: a mobile phone, a tablet, or a wearable device.

In a possible implementation, the third interface further includes a local candidate term on the second device associated based on the keyword, and a manner of displaying the candidate term and the local candidate term in the third interface includes any one of the following: The candidate term and the local candidate term are displayed in the third interface in columns; the candidate term is displayed before the local candidate term in the third interface; the candidate term is displayed after the local candidate term in the third interface; the candidate term and the local candidate term are displayed in a mixed manner in the third interface; and the candidate term and the local candidate term are distinguished by using different identifiers in the third interface.

In a possible implementation, an order of candidate terms is related to historical user behavior on the first device.

In a possible implementation, the method further includes: The second device displays any candidate term in the second edit box in response to a user triggering the candidate term.

A second subaspect of the third aspect of embodiments of this application provides a device communication method, applied to a system including a first device and a second device. The method includes: The second device displays a fourth interface including an option of the first device; the second device sends an indication message to the first device in response to an operation of selecting the option of the first device; the first device displays a first interface including a first edit box; the second device displays a second interface, where the second interface includes a second edit box; and if there is a keyword in the second edit box, the first device synchronizes the keyword to the first edit box; the first device determines a candidate term corresponding to the keyword; and the second device obtains the candidate term, and displays a third interface, where the third interface includes the candidate term.

It should be noted that any possible implementation of the first subaspect of the third aspect may be used to limit the method according to the second subaspect of the third aspect when the implementation does not conflict with the method according to the second subaspect of the third aspect. Details are not described herein.

A third subaspect of the third aspect of embodiments of this application provides a device communication method, applied to a first device. The method includes: The first device displays a first interface including a first edit box; the first device sends an indication message to a second device, where the indication message is used to indicate the second device to display a second interface, and the second interface includes a second edit box; if there is a keyword in the second edit box, the first device synchronizes the keyword to the first edit box; the first device determines a candidate term corresponding to the keyword; and the first device synchronizes the candidate term to the second device.

It should be noted that any possible implementation of the first subaspect of the third aspect may be used to limit the method according to the third subaspect of the third aspect when the implementation does not conflict with the method according to the third subaspect of the third aspect. Details are not described herein.

A fourth subaspect of the third aspect of embodiments of this application provides a device communication method. The method includes: A second device receives an indication message from a first device; the first device displays a first interface including a first edit box; the second device displays a second interface based on the indication message, where the second interface includes a second edit box; if there is a keyword in the second edit box, the second device synchronizes the keyword to the first edit box, so that the first device determines a candidate term corresponding to the keyword; and the second device obtains the candidate term, and displays a third interface, where the third interface includes the candidate term.

It should be noted that any possible implementation of the first subaspect of the third aspect may be used to limit the method according to the fourth subaspect of the third aspect when the implementation does not conflict with the method according to the fourth subaspect of the third aspect. Details are not described herein.

A fifth subaspect of the third aspect of embodiments of this application provides a device communication method, applied to a second device. The method includes: The second device displays a fourth interface including an option of a first device; the second device sends an indication message to the first device in response to an operation of selecting the option of the first device, where the indication message is used to indicate the first device to display a first interface including a first edit box; the second device displays a second interface, where the third interface includes a second edit box; if there is a keyword in the second edit box, the second device synchronizes the keyword to the first edit box, so that the first device determines a candidate term corresponding to the keyword; and the second device obtains the candidate term, and displays a third interface, where the third interface includes the candidate term.

It should be noted that any possible implementation of the first subaspect of the third aspect may be used to limit the method according to the fifth subaspect of the third aspect when the implementation does not conflict with the method according to the fifth subaspect of the third aspect. Details are not described herein.

A sixth subaspect of the third aspect of embodiments of this application provides a device communication system, including a first device and a second device. The first device is configured to perform steps performed by the first device according to any one of the first subaspect of the third aspect to the fifth subaspect of the third aspect, and the second device is configured to perform steps performed by the second device according to any one of the first subaspect of the third aspect to the fifth subaspect of the third aspect.

A seventh subaspect of the third aspect of embodiments of this application provides a first device, including at least one memory and at least one processor. The memory is configured to store program instructions; and the processor is configured to invoke the program instructions in the memory, to enable the first device to perform steps performed by the first device according to any one of the first subaspect of the third aspect to the fifth subaspect of the third aspect.

An eighth subaspect of the third aspect of embodiments of this application provides a second device, including at least one memory and at least one processor. The memory is configured to store program instructions, and the processor is configured to invoke the program instructions in the memory, to enable the second device to perform steps performed by the second device according to any one of the first subaspect of the third aspect to the fifth subaspect of the third aspect.

A ninth subaspect of the third aspect of embodiments of this application provides a computer-readable storage medium. The computer-readable storage medium stores a computer program, and when the computer program is executed by a processor of a first device, steps performed by the first device according to any one of the first subaspect of the third aspect to the fifth subaspect of the third aspect are implemented; when the computer program is executed by a processor of a second device, steps performed by the second device according to any one of the first subaspect of the third aspect to the fifth subaspect of the third aspect are implemented; or when the computer program is executed by a processor of a third device, steps performed by the third device according to any one of the first subaspect of the third aspect to the fifth subaspect of the third aspect are implemented.

It should be noted that in embodiments of this application, the specific device communication method is described using an example of interaction between the first device and the second device. When one of the first device or the second device is used to perform the method, each of the devices may select a step performed by the device in any one of the foregoing embodiments to obtain a single-side implementation of the first device or the second device. Details are not described herein again.

It should be noted that, in the foregoing embodiments, a display screen of each of the devices may be used to implement the step for display. Descriptions of the first interface, the second interface, the third interface, the fourth interface, or the like in the foregoing embodiments are descriptions for distinguishing different display interfaces on each of the devices. In a specific following embodiment, the first interface, the second interface, the third interface, or the fourth interface may correspond to a specific interface provided in the specific embodiment based on textual descriptions with reference to specific content of the embodiment. Details are not described herein.

It should be understood that, the technical solutions according to the second subaspect of the third aspect to the ninth subaspect of the third aspect of embodiments of this application correspond to that according to the first subaspect of the third aspect of embodiments of this application, and beneficial effects achieved in the subaspects and corresponding feasible implementations are similar. Details are not described again.

A first subaspect of a fourth aspect of embodiments of this application provides a device communication method, applied to a system including a first device, a second device, and a third device. The method includes; The first device, the second device, and the third device are connected to a distributed network; the second device obtains a target candidate term, where the target candidate term does not belong to a candidate term thesaurus on the first device, and the target candidate term does not belong to a candidate term thesaurus on the third device; the first device receives a keyword entered by a user related to the target candidate term, and the first device displays the target candidate term; and/or the third device receives a keyword entered by a user related to the target candidate term, and the third device displays the target candidate term.

In embodiments of this application, the first device, the second device, and the third device may be connected to the distributed network, and synchronize a candidate term thesaurus on each of the devices with each other, to achieve efficient and convenient input based on the synchronized candidate term thesauruses.

In a possible implementation, the method further includes: The first device, the second device, and the third device synchronize the candidate term thesaurus on each of the devices with each other.

In a possible implementation, the method further includes: When the first device, the second device, or the third device exits the distributed network, the first device, the second device, or the third device displays a prompt interface showing whether to delete a synchronized candidate term thesaurus, where the prompt interface includes an option used to represent deletion and an option used to represent no deletion; and the first device, the second device, or the third device deletes, in response to an operation of triggering the option representing deletion, the candidate term thesaurus synchronized by another device; or the first device, the second device, or the third device retains, in response to an operation of triggering the option representing no deletion, the candidate term thesaurus synchronized through the distributed network.

In a possible implementation, the method further includes: The first device, the second device, or the third device separately determines an access type of each of the devices; and when the first device, the second device, or the third device exits the distributed network, the first device, the second device, or the third device determines, based on the access type of each of the devices, whether to delete the candidate term thesaurus synchronized through the distributed network.

In a possible implementation, the method further includes: The first device displays a first interface including a first edit box; the first device sends an indication message to a second device; and the second device displays a second interface based on the indication message, where the second interface includes a second edit box; and if there is an editing status in the second edit box, synchronizes the editing status to the first edit box.

In a possible implementation, the second device includes an interface service, and the interface service is used for synchronization of the editing status between the first device and the second device. In this way, based on the interface service, any editing status on the second device may be synchronized to the first device.

In a possible implementation, the editing status includes one or more of the following: textual content, a cursor, or highlighting of the textual content.

In a possible implementation, that the second device displays the second interface based on the indication message includes: The second device displays a notification interface in response to the indication message, where the notification interface includes a third option for confirming auxiliary input; and the second device displays the second interface in response to an operation of triggering the third option.

In a possible implementation, the second interface further includes all or some of content in the first interface.

In a possible implementation, the second edit box and all or some of the content in the first interface are displayed in layers, and the second edit box is displayed in a layer above all or some of the content in the first interface.

In a possible implementation, after the second device displays the second interface based on the indication message, the method further includes: The second device displays a virtual keyboard in response to triggering the second edit box; and the second device displays the editing status in the second edit box based on an input operation received on the virtual keyboard and/or in the second edit box.

In a possible implementation, the first device includes any one of the following: a television, a large-screen device, or a wearable device; and the second device or the third device includes any one of the following: a mobile phone, a tablet, or a wearable device.

In a possible implementation, the method further includes: The second device displays a fourth interface including an option of the first device; the second device sends an indication message to the first device in response to an operation of selecting the option of the first device; the first device displays the first interface including the first edit box; and the second device displays the second interface, where the second interface includes the second edit box; and if there is the editing status in the second edit box, synchronizes the editing status to the first edit box.

A second subaspect of the fourth aspect of embodiments of this application provides a device communication method, applied to a system including a first device, a second device, and a third device. The method includes: The first device, the second device, and the third device are connected to a distributed network; the first device, the second device, and the third device synchronize a candidate term thesaurus on each of the devices with each other to obtain a candidate term thesaurus set; and when text editing is performed on the first device, the second device, or the third device, the first device, the second device, or the third device displays a candidate term based on the candidate term thesaurus set.

It should be noted that any possible implementation of the first subaspect of the fourth aspect may be used to limit the method according to the second subaspect of the fourth aspect when the implementation does not conflict with the method according to the second subaspect of the fourth aspect. Details are not described herein.

A third subaspect of the fourth aspect of embodiments of this application provides a device communication method, applied to a first device, and including: The first device is connected to a distributed network; another device is further connected to the distributed network; the first device synchronizes a candidate term thesaurus on the another device based on the distributed network, to obtain a candidate term thesaurus set; and when text editing is performed on the first device, the first device displays a candidate term based on the candidate term thesaurus set.

It should be noted that any possible implementation of the first subaspect of the fourth aspect may be used to limit the method according to the third subaspect of the fourth aspect when the implementation does not conflict with the method according to the third subaspect of the fourth aspect. Details are not described herein.

A fourth subaspect of the fourth aspect of embodiments of this application provides a device communication system including a first device, a second device, and a third device. The first device is configured to perform steps performed by the first device according to any one of the first subaspect of the fourth aspect to the third subaspect of the fourth aspect, the second device is configured to perform steps performed by the second device according to any one of the first subaspect of the fourth aspect to the third subaspect of the fourth aspect, and the third device is configured to perform steps performed by the third device according to any one of the first subaspect of the fourth aspect to the third subaspect of the fourth aspect.

A fifth subaspect of the fourth aspect of embodiments of this application provides a first device, including at least one memory and at least one processor. The memory is configured to store program instructions, and the processor is configured to invoke the program instructions in the memory, to enable the first device to perform steps performed by the first device according to any one of the first subaspect of the fourth aspect to the third subaspect of the fourth aspect.

A sixth subaspect of the fourth aspect of embodiments of this application provides a second device, including at least one memory and at least one processor. The memory is configured to store program instructions. The processor is configured to invoke the program instructions in the memory, to enable the second device performs steps performed by the second device according to any one of the first subaspect of the fourth aspect to the third subaspect of the fourth aspect.

A seventh subaspect of the fourth aspect of embodiments of this application provides a computer-readable storage medium. The computer-readable storage medium stores a computer program, and when the computer program is executed by a processor of a first device, steps performed by the first device according to any one of the first subaspect of the fourth aspect to the third subaspect of the fourth aspect are implemented; when the computer program is executed by a processor of a second device, steps performed by the second device according to any one of the first subaspect of the fourth aspect to the third subaspect of the fourth aspect are implemented; or when the computer program is executed by a processor of a third device, steps performed by the third device according to any one of the first subaspect of the fourth aspect to the third subaspect of the fourth aspect are implemented.

It should be noted that in embodiments of this application, the specific device communication method is described using an example of interaction between the first device, the second device, and the third device. When one of the first device, the second device, or the third device is used to perform the method, each of the devices may select a step performed by the device in any one of the foregoing embodiments to obtain a single-side implementation of the first device, the second device, or the third device. Details are not described herein again. A function of the second device is similar to that of the third device. Any step performed by the second device may be applied to the third device when the step does not conflict the steps performed by the third device.

It should be noted that, in the foregoing embodiments, a display screen of each of the devices may be used to implement the step for display. Descriptions of the first interface, the second interface, the third interface, the fourth interface, or the like in the foregoing embodiments are descriptions for distinguishing different display interfaces on each of the devices. In a specific following embodiment, the first interface, the second interface, the third interface, or the fourth interface may correspond to a specific interface provided in the specific embodiment based on textual descriptions with reference to specific content of the embodiment. Details are not described herein.

It should be understood that, the technical solutions according to the second subaspect of the fourth aspect to the seventh subaspect of the fourth aspect of embodiments of this application correspond to that according to the first subaspect of the fourth aspect of embodiments of this application, and beneficial effects achieved in the subaspects and corresponding feasible implementations are similar. Details are not described again.

A first subaspect of a fifth aspect of embodiments of this application provides a device communication method, applied to a system including a first device, a second device, and a third device. The method includes: The first device displays a first interface including a first edit box; the first device sends an indication message to the second device and the third device; the second device displays a second interface based on the indication message, where the second interface includes a second edit box; the third device displays a third interface based on the indication message, where the third interface includes a third edit box; and if there is an editing status in the second edit box, the first device synchronizes the editing status to the first edit box, and the third device synchronizes the editing status to the third edit box; if there is an editing status in the third edit box, the first device synchronizes the editing status to the first edit box, and the second device synchronizes the editing status to the second edit box; or if there is an editing status in the first edit box, the second device synchronizes the editing status to the second edit box, and the third device synchronizes the editing status to the third edit box.

In embodiments of this application, the second device and the third device may jointly assist the first device with input, to achieve convenient and efficient input.

In a possible implementation, the second device includes an interface service, and the interface service is used for synchronization of the editing status between the first device and the second device. In this way, based on the interface service, any editing status on the second device may be synchronized to the first device.

In a possible implementation, the editing status includes one or more of the following: textual content, a cursor, or highlighting of the textual content.

In a possible implementation, that the second device displays the second interface based on the indication message includes: The second device displays a notification interface in response to the indication message, where the notification interface includes an option for confirming auxiliary input; and the second device displays the second interface in response to an operation of triggering the option.

In a possible implementation, the second interface further includes all or some of content in the first interface. In this way, a user may view a condition on the first device on the second device, helping the user learn about a real-time status on the auxiliary first device.

In a possible implementation, the second edit box and all or some of the content in the first interface are displayed in layers, and the second edit box is displayed in a laver above all or some of the content in the first interface.

In a possible implementation, after the second device displays the second interface based on the indication message, the method further includes: The second device displays a virtual keyboard in response to triggering the second edit box; and the second device displays the editing status in the second edit box based on an input operation received on the virtual keyboard and/or in the second edit box.

In a possible implementation, the first device includes any one of the following: a television, a large-screen device, or a wearable device; and the second device or the third device includes any one of the following: a mobile phone, a tablet, or a wearable device.

In a possible implementation, the editing status in the first edit box includes an identifier of the first device, the editing status in the second edit box includes an identifier of the second device, and/or the editing status in the third edit box includes an identifier of the first device.

In a possible implementation, when input content is received simultaneously in the second edit box and the third edit box, the first device decides upon input content in the second edit box and a manner of displaying the third edit box.

A second subaspect of the fifth aspect of embodiments of this application provides a device communication method, applied to a system including a first device, a second device, and a third device. The method includes: The first device displays a first interface including a first edit box; the first device sends an indication message to the second device; and the second device displays a second interface based on the indication message, where the second interface includes a second edit box; the second device sends an auxiliary input request to the third device; and the third device displays a third interface according to the auxiliary input request, where the third interface includes a third edit box; and if there is an editing status in the second edit box, the first device synchronizes the editing status to the first edit box, and the third device synchronizes the editing status to the third edit box; if there is an editing status in the third edit box, the first device synchronizes the editing status to the first edit box, and the second device synchronizes the editing status to the second edit box; or if there is an editing status in the first edit box, the second device synchronizes the editing status to the second edit box, and the third device synchronizes the editing status to the third edit box.

It should be noted that any possible implementation of the first subaspect of the fifth aspect may be used to limit the method according to the second subaspect of the fifth aspect when the implementation does not conflict with the method according to the second subaspect of the fifth aspect. Details are not described herein.

A third subaspect of the fifth aspect of embodiments of this application provides a device communication method, applied to a system including a first device, a second device, and a third device. The method includes: The second device displays a fourth interface including an option of the first device; the second device sends an indication message to the first device in response to an operation of selecting the option of the first device; the first device displays the first interface including the first edit box; and the second device displays the second interface, where the second interface includes the second edit box; the second device sends an auxiliary input request to the third device; and the third device displays a third interface according to the auxiliary input request, where the third interface includes a third edit box; and if there is an editing status in the second edit box, the first device synchronizes the editing status to the first edit box, and the third device synchronizes the editing status to the third edit box; if there is an editing status in the third edit box, the first device synchronizes the editing status to the first edit box, and the second device synchronizes the editing status to the second edit box; or if there is an editing status in the first edit box, the second device synchronizes the editing status to the second edit box, and the third device synchronizes the editing status to the third edit box.

It should be noted that any possible implementation of the first subaspect of the fifth aspect may be used to limit the method according to the third subaspect of the fifth aspect when the implementation does not conflict with the method according to the third subaspect of the fifth aspect. Details are not described herein.

A fourth subaspect of the fifth aspect of embodiments of this application provides a device communication method, applied to a first device. The method includes: The first device displays a first interface including a first edit box; the first device sends an indication message to a second device and a third device; the second device displays a second interface based on the indication message, where the second interface includes a second edit box, and the third device displays a third interface based on the indication message, where the third interface includes a third edit box; and if there is an editing status in the second edit box, the first device synchronizes the editing status to the first edit box; or if there is an editing status in the third edit box, the first device synchronizes the editing status to the first edit box.

It should be noted that any possible implementation of the first subaspect of the fifth aspect may be used to limit the method according to the fourth subaspect of the fifth aspect when the implementation does not conflict with the method according to the fourth subaspect of the fifth aspect. Details are not described herein.

A fifth subaspect of the fifth aspect of embodiments of this application provides a device communication method, applied to a second device. The method includes: The second device displays a fourth interface including an option of a first device; the second device sends an indication message to the first device in response to an operation of selecting the option of the first device, so that the first device displays a first interface including a first edit box; the second device displays a second interface, where the second interface includes a second edit box; the second device sends an auxiliary input request to a third device; the third device displays a third interface according to the auxiliary input request, and the third interface includes a third edit box; and if there is an editing status in the third edit box, the second device synchronizes the editing status to the second edit box; or if there is an editing status in the first edit box, the second device synchronizes the editing status to the second edit box.

It should be noted that any possible implementation of the first subaspect of the fifth aspect may be used to limit the method according to the fifth subaspect of the fifth aspect when the implementation does not conflict with the method according to the fifth subaspect of the fifth aspect. Details are not described herein.

A sixth subaspect of the fifth aspect of embodiments of this application provides a device communication system, including a first device, a second device, and a third device. The first device is configured to perform steps performed by the first device according to any one of the first subaspect of the fifth aspect to the fifth subaspect of the fifth aspect, the second device is configured to perform steps performed by the second device according to any one of the first subaspect of the fifth aspect to the fifth subaspect of the fifth aspect, and the third device is configured to perform steps performed by the third device according to any one of the first subaspect of the fifth aspect to the fifth subaspect of the fifth aspect.

A seventh subaspect of the fifth aspect of embodiments of this application provides a first device, including at least one memory and at least one processor. The memory is configured to store program instructions, and the processor is configured to invoke the program instructions in the memory, to enable the first device to perform steps performed by the first device according to any one of the first subaspect of the fifth aspect to the fifth subaspect of the fifth aspect.

An eighth subaspect of the fifth aspect of embodiments of this application provides a second device, including at least one memory and at least one processor. The memory is configured to store program instructions, and the processor is configured to invoke the program instructions in the memory, to enable the second device to perform steps performed by the second device according to any one of the first subaspect of the fifth aspect to the fifth subaspect of the fifth aspect.

A ninth subaspect of the fifth aspect of embodiments of this application provides a computer-readable storage medium. The computer-readable storage medium stores a computer program, and when the computer program is executed by a processor of a first device, steps performed by the first device according to any one of the first subaspect of the fifth aspect to the fifth subaspect of the fifth aspect are implemented; when the computer program is executed by a processor of a second device, steps performed by the second device according to any one of the first subaspect of the fifth aspect to the fifth subaspect of the fifth aspect are implemented; or when the computer program is executed by a processor of a third device, steps performed by the third device according to any one of the first subaspect of the fifth aspect to the fifth subaspect of the fifth aspect are implemented.

It should be noted that in embodiments of this application, the specific device communication method is described using an example of interaction between the first device, the second device, and the third device. When one of the first device, the second device, or the third device is used to perform the method, each of the devices may select a step performed by the device in any one of the foregoing embodiments to obtain a single-side implementation of the first device, the second device, or the third device. Details are not described herein again. A function of the second device is similar to that of the third device. Any step performed by the second device may be applied to the third device when the step does not conflict the steps performed by the third device.

It should be noted that, in the foregoing embodiments, a display screen of each of the devices may be used to implement the step for display. Descriptions of the first interface, the second interface, the third interface, the fourth interface, or the like in the foregoing embodiments are descriptions for distinguishing different display interfaces on each of the devices. In a specific following embodiment, the first interface, the second interface, the third interface, or the fourth interface may correspond to a specific interface provided in the specific embodiment based on textual descriptions with reference to specific content of the embodiment. Details are not described herein.

It should be understood that, the technical solutions according to the second subaspect of the fifth aspect to the ninth subaspect of the fifth aspect of embodiments of this application correspond to that according to the first subaspect of the fifth aspect of embodiments of this application, and beneficial effects achieved in the subaspects and corresponding feasible implementations are similar. Details are not described again.

BRIEF DESCRIPTION OF DRAWINGS

FIG. 8A to FIG. 8C are a schematic diagram of a specific system architecture for a device communication method according to an embodiment of this application;

FIG. 68A and FIG. 68B are a schematic diagram of a system architecture for another device communication method according to an embodiment of this application;

DESCRIPTION OF EMBODIMENTS

To clearly describe the technical solutions in embodiments of this application, terms such as "first" and "second" are used in embodiments of this application to distinguish between same items or similar items that provide basically same functions or purposes. For example, a first device and a second device are merely intended to distinguish between different devices, and do not limit a sequence thereof. A person skilled in the art may understand that the terms such as "first" and "second" do not limit a quantity or an execution sequence, and the terms such as "first" and "second" do not indicate a definite difference.

It should be noted that in this application, a term such as "example" or "for example" is used to represent giving an example, an illustration, or a description. Any embodiment or design scheme described as an "example" or with "for example" in this application should not be explained as being more preferred or having more advantages than another embodiment or design scheme. Exactly, usage of the wording "example", "for example", and the like is intended to present a related concept in a specific manner.

In this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" generally indicates an "or" relationship between associated objects. "At least one of the following items (pieces)" or a similar expression thereof indicates any combination of these items, including a single item (piece) or any combination of a plurality of items (pieces). For example, at least one of a, b, or c may indicate: a, b, c, a and b, a and c, b and c, or a, b, and c, where a, b, and c may be singular or plural.

Figure 1:
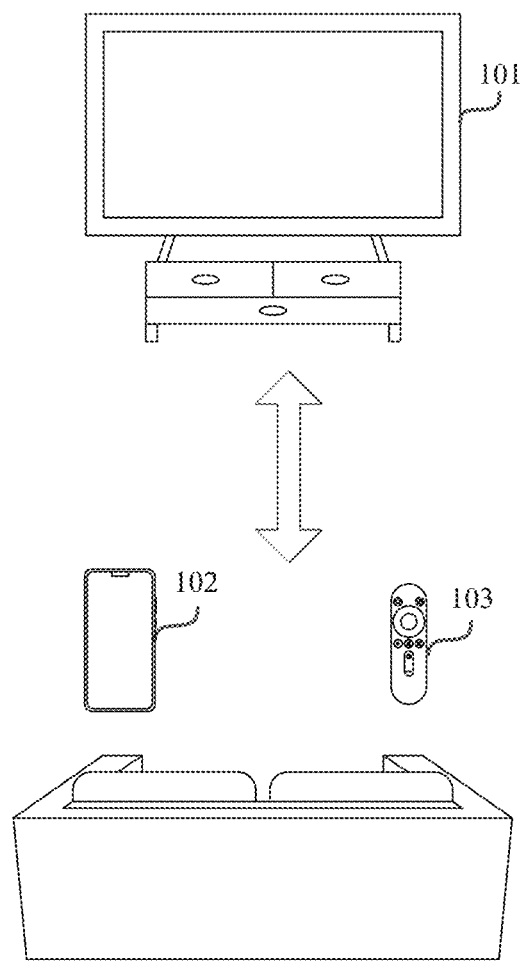
FIG. 1 is a schematic diagram of an architecture of a communication system according to an embodiment of this application.

FIG. 1 is a schematic diagram of an architecture of a communication system according to an embodiment of this application. As shown in FIG. 1, the communication system may include a first device 101 and a second device 102.

The first device 101 may be a device that provides less convenience for a user to edit content, for example, text, or may be understood as an assisted device having a weaker input capability that may include, for example, a television, a smart screen (also referred to as a large-screen device), and a smart watch. In a possible implementation, the first device 101 may further include a camera (not shown in the figure) and the like. The first device 101 is not specifically limited in this embodiment of this application. Generally, when content, for example, text is input on the first device 101, a user needs to use a remote control 103 to select pinyin one by one and press a confirmation button, and the input is complicated and inefficient.

The second device 102 may be a device that provides more convenience for a user to edit content, for example, text, or may be understood as an auxiliary device having a stronger input capability that may include, for example, a mobile phone, a tablet, or a computer. Specific types of the first device 101 and the second device 102 are not limited in this embodiment of this application. For ease of description, in this embodiment of this application, an example in which the first device 101 is a large-screen device and the second device 102 is a mobile phone is used for illustration.

In a possible implementation, the mobile phone and the large-screen device may be connected to each other in a wired or wireless manner. For example, the wireless connection may include a wireless fidelity (wireless fidelity, Wi-Fi) connection, a Bluetooth connection, a ZigBee connection, and the like. This is not limited in this embodiment of this application. Further, according to a method in the following embodiments of this application, a user may use the mobile phone for auxiliary input for the large-screen device.

For example, the user moves between options on the large-screen device by using the remote control to select an edit box on the large-screen device, and a dialog box for auxiliary input may be displayed on the mobile phone that communicates with the large-screen device. The user uses an input method soft keyboard on the mobile phone to input content, for example, text in an edit box in the dialog box on the mobile phone. The content may be displayed on the large-screen device. After the user confirms that the input is completed on the mobile phone, functions such as searching for a program on the large-screen device according to the content entered by the user on the mobile phone can be implemented.

Figure 2:
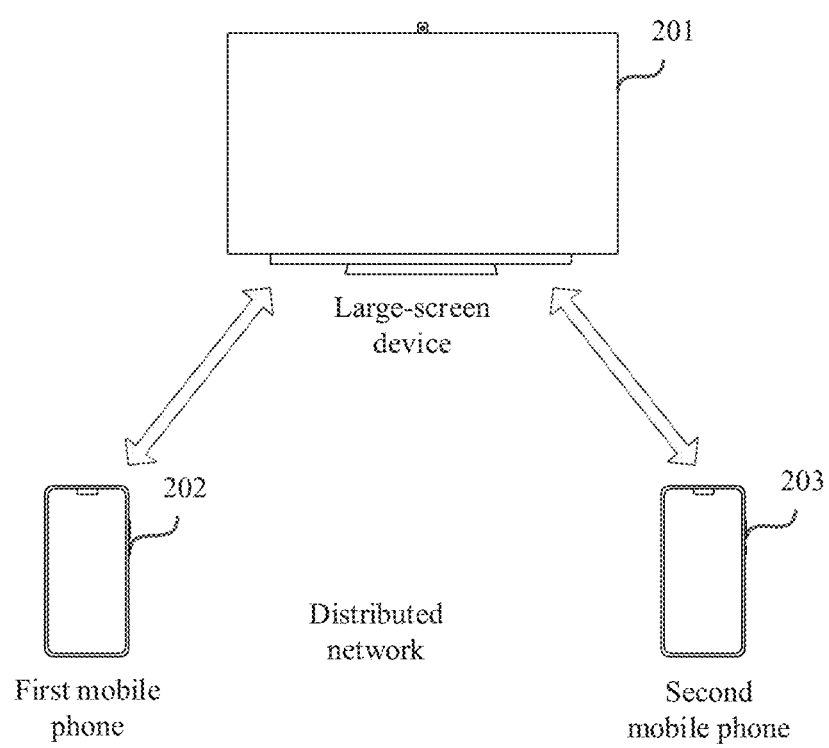
FIG. 2 is a schematic diagram of an architecture of another communication system according to an embodiment of this application.

In some embodiments, there may be a plurality of mobile phones. For example, FIG. 2 is a schematic diagram of an architecture of another communication system according to an embodiment of this application. As shown in FIG. 2, the communication system may include a large-screen device 201, a first mobile phone 202, and a second mobile phone 203.

In a possible embodiment, the large-screen device 201, the first mobile phone 202, and the second mobile phone 203 are in one distributed network, and the distributed network may support communication connections between the large-screen device 201, the first mobile phone 202, and the second mobile phone 203. In a same distributed network, a client can be connected to a plurality of servers for distributed input, and one server can be connected to a plurality of clients. For example, in the same distributed network, the large-screen device 201 having a weaker input capability may be used as a client for distributed input, and a mobile phone 101 and a mobile phone 102 having stronger input capability may be used as servers for distributed input.

Based on an architecture of distributed networking, the large-screen device 201, the first mobile phone 202, and the second mobile phone 203 may implement one or more functions, for example, device discovery, device connection, or data transmission between each other.

For example, after the large-screen device 201, the first mobile phone 202, and the second mobile phone 203 join the distributed network, device discovery and device connection between each other may be implemented. Further, the first mobile phone 202 and the second mobile phone 203 may simultaneously assist the large-screen device 201 to input content, for example, text. Alternatively, the first mobile phone 202 and the second mobile phone 203 may separately assist the large-screen device 201 to input content, for example, text. Alternatively, for the first mobile phone 202 or the second mobile phone 203, when one mobile phone assists the large-screen device 201 with input, the other mobile phone may preempt input. Alternatively, the large-screen device 201 may select the first mobile phone 202 or the second mobile phone 203 to perform auxiliary input for the device, or the like. A specific process of auxiliary input, preemptive input, or the like is described in detail in the following embodiments, and details are not described herein again.

Figure 3:
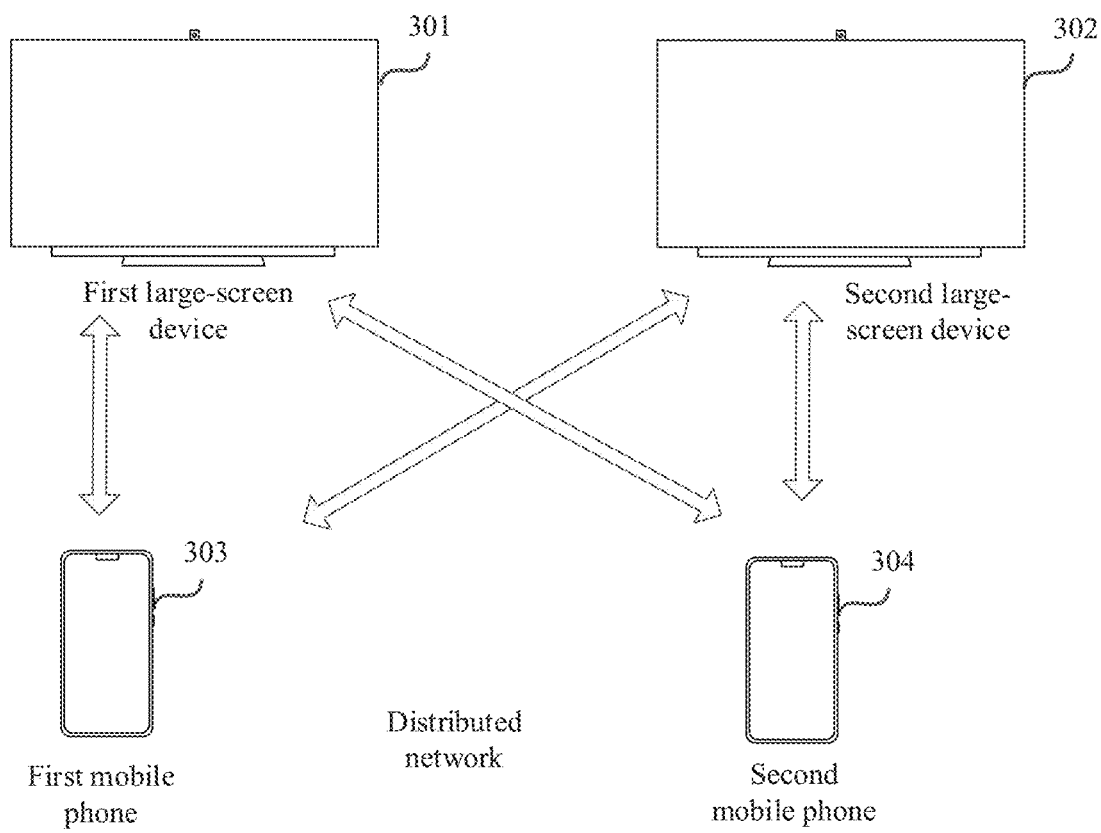
FIG. 3 is a schematic diagram of an architecture of still another communication system according to an embodiment of this application.

In some embodiments, there may be a plurality of mobile phones, and there may also be a plurality of large-screen devices. For example, FIG. 3 is a schematic diagram of an architecture of another communication system according to an embodiment of this application. As shown in FIG. 3, the communication system may include a first large-screen device 301, a second large-screen device 302, a first mobile phone 303, and a second mobile phone 304.

In a possible embodiment, the first large-screen device 301, the second large-screen device 302, the first mobile phone 303, and the second mobile phone 304 are in one distributed network. Based on an architecture of distributed networking, the first large-screen device 301, the second large-screen device 302, the first mobile phone 303, and the second mobile phone 304 may implement functions, for example, device discovery, device connection, or data transmission between each other.

For example, after the first large-screen device 301, the second large-screen device 302, the first mobile phone 303, and the second mobile phone 304 join the distributed network, device discovery and device connection between each other may be implemented. Further, the first mobile phone 303 and the second mobile phone 304 may simultaneously assist the first large-screen device 301 and/or the second large-screen device 302 to input content, for example, text. Alternatively, the first mobile phone 303 and the second mobile phone 304 may separately assist the first large-screen device 301 and/or the second large-screen device 302 to input content, for example, text. Alternatively, for the first mobile phone 303 or the second mobile phone 304, when one assists the first large-screen device 301 and/or the second large-screen device 302 with input, the other may preempt input. Alternatively, the first large-screen device 301 and/or the second large-screen device 302 may select the first mobile phone 303 or the second mobile phone 304 to perform auxiliary input for the device/devices, or the like. A specific process of auxiliary input, preemptive input, or the like is described in detail in the following embodiments, and details are not described herein.

Figure 4:
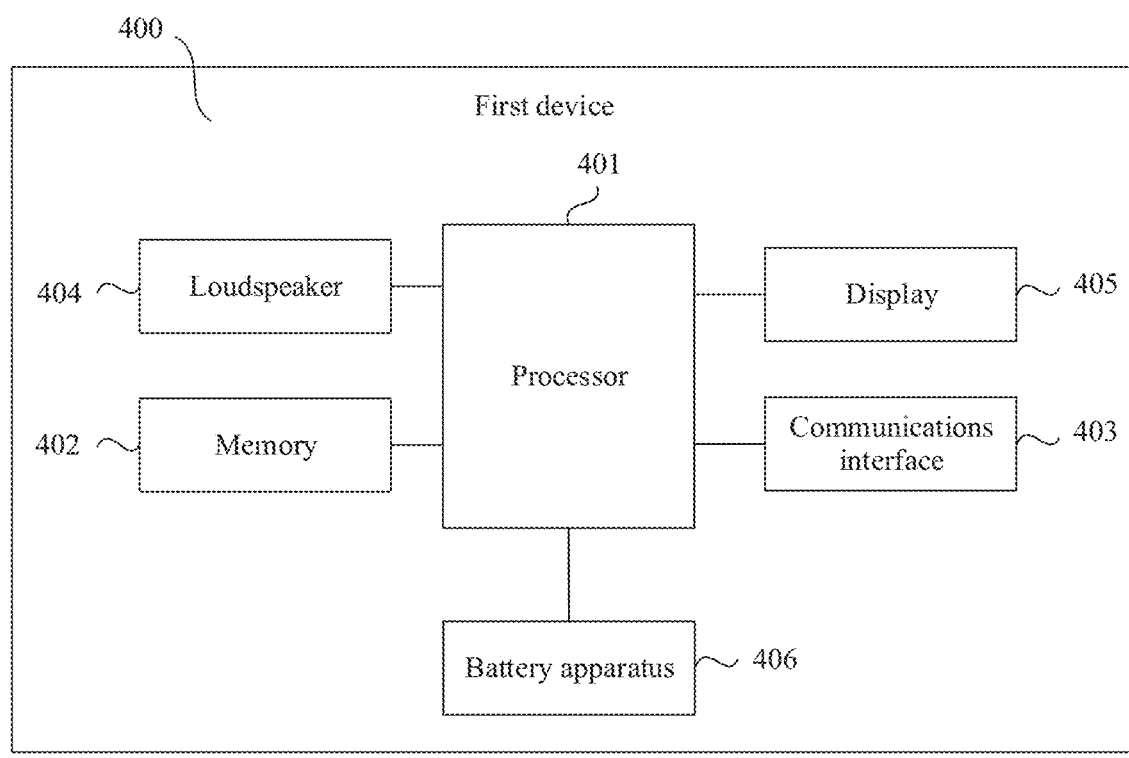
FIG. 4 is a schematic block diagram of a function of a first device according to an embodiment of this application.

FIG. 4 is a block diagram of a function of a first device according to an embodiment of this application. In a possible implementation, as shown in FIG. 4, the first device 400 may include a processor 401, a memory 402, a communications interface 403, a loudspeaker 404, a display 405, and the like. These components may communicate with each other through one or more communications buses or signal lines (not shown in the figure).

The components of the first device 400 are described in detail below with reference to FIG. 4.

The processor 401 is a control center of the first device 400, is connected to each part of the first device 400 through various interfaces and lines, and performs various functions of the first device 400 and data processing by running or executing an application stored in the memory 402 and invoking data stored in the memory 402.

In some embodiments, the processor 401 may include one or more processing units. For example, the processor 401 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors. The controller may be a nerve center and a command center of the first device 400. The controller may generate an operation control signal based on an instruction operation code and a time sequence signal, to complete control of instruction reading and instruction execution. In some other embodiments, a memory may be further disposed in the processor 401, and is configured to store instructions and data. In some embodiments, the memory in the processor 401 is a cache memory. The memory may store instructions or data that have/has just been used or are/is cyclically used by the processor 401. If the processor 401 needs to use the instructions or the data again, the processor may directly invoke the instructions or the data from the memory, to avoid repeated access and reduce waiting time of the processor 401, thereby improving system efficiency. The processor 401 may run software code/modules in the device communication method according to some embodiments of this application, to implement a function of controlling the first device 400.

The memory 402 is configured to store an application and data. The processor 401 performs various functions of the first device 400 and process data by running the application and the data that are stored in the memory 402. The memory 402 mainly includes a program storage area and a data storage area. The program storage area may store an operating system (operating system, OS) and an application required for at least one function (for example, a device discovery function, a video search function, or a video play function). The data storage area may store data (for example, audio and video data) created during use of the first device. In addition, the memory 402 may include a high-speed random access memory (random access memory, RAM), or may include a non-volatile memory, for example, a magnetic disk storage device, a flash storage device, or another volatile solid-state storage device. In some embodiments, the memory 402 may store various operating systems. The memory 402 may be independent, and is connected to the processor 401 through the communications bus; or the memory 402 may be integrated with the processor 401.

The communications interface 403 may be a wired interface (for example, an Ethernet interface) or a wireless interface (for example, a cellular network interface or a wireless local area network interface). For example, the communications interface 403 may be specifically used for communication with one or more second devices.

The loudspeaker 404, also referred to as a "speaker", is configured to convert an electrical audio signal into a sound signal. The first device 400 may play the sound signal by using the loudspeaker 404.

The display 405 (also referred to as a display screen or a screen) may be configured to display a display interface of an application, for example, an interface for searching for a video or a currently played video feed. The display 405 may include a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini-LED, a micro-LED, a micro-OLED, a quantum dot light-emitting diode (quantum dot light-emitting diode, QLED), or the like. In some embodiments, a touch sensor may be disposed in the display 405 to form a touchscreen. This is not limited in this application. The touch sensor is configured to detect a touch operation performed on or near the touch sensor. The touch sensor may transfer a detected touch operation to the processor 401 to determine a type of the touch event. A visual output related to the touch operation may be provided by the processor 401 by using the display 405.

In addition, the first device 400 may further include a power supply apparatus 406 (for example, a battery or a power management integrated circuit) that supplies power to each component. The battery may be logically connected to the processor 401 by using the power management integrated circuit, so that functions such as charging, discharging, and power consumption management are implemented by using the power supply apparatus 406.

In addition, the first device 400 may further include a sensor module (not shown in the figure). The sensor module may include a barometric pressure sensor, a temperature sensor, and the like. In an actual application, the first device 400 may further include more or fewer sensors, or replace the sensors listed above with other sensors having same or similar functions. This is not limited in this application.

It can be understood that a device structure shown in FIG. 4 does not constitute a specific limitation on the first device. In some other embodiments, the first device may include more or fewer components than those shown in the figure, or some components may be combined, or some components may be split, or different component arrangements may be used. The components shown in the figure may be implemented by hardware, software, or a combination of software and hardware.

Figure 5:
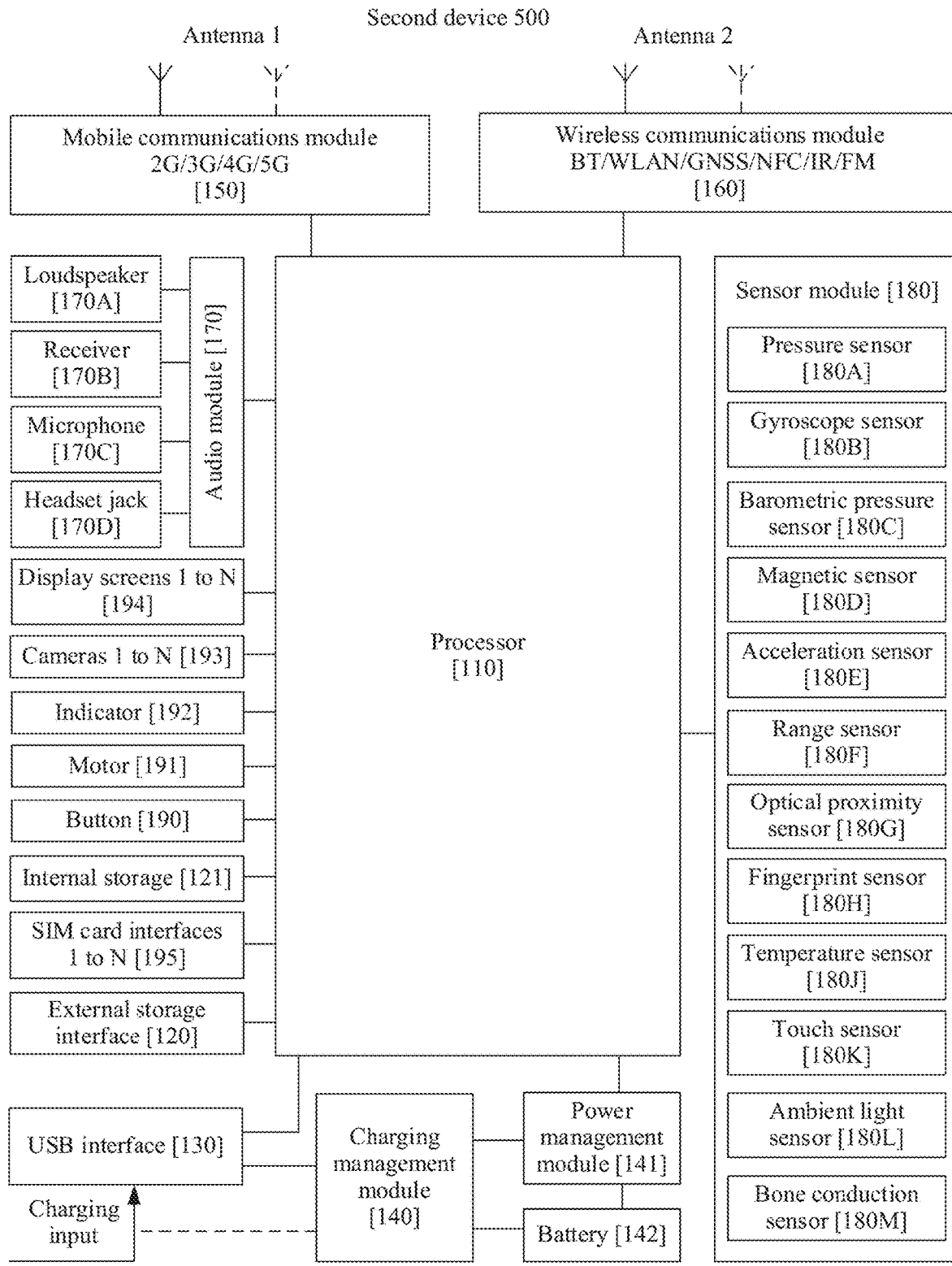
FIG. 5 is a schematic block diagram of a function of a second device according to an embodiment of this application.

FIG. 5 is a block diagram of a function of a second device 500 according to an embodiment of this application. As shown in FIG. 5, the second device 500 may include a processor 110, an external storage interface 120, an internal storage 121, a universal serial bus (universal serial bus, USB) interface 130, a charging management module 140, a power management module 141, a battery 142, an antenna 1, an antenna 2, a mobile communications module 150, a wireless communications module 160, an audio module 170, a loudspeaker 170A, a receiver 170B, a microphone 170C, a headset jack 170D, a sensor module 180, a button 190, a motor 191, an indicator 192, a camera 193, a display screen 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure as shown in this embodiment of this application does not constitute a specific limitation on the second device 500. In some other embodiments of this application, the second device 500 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that have/has just been used or are/is cyclically used by the processor 110. If the processor 110 needs to use the instructions or the data again, the processor may invoke the instructions or the data from the memory. This avoids repeated access and reduces waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the second device 500.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be used for audio communication, with analog signal sampling, quantization, and coding. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call by using a Bluetooth headset. Both the I2S interface and the PCM interface may be used for audio communication.

The UART interface is a universal serial data bus, and is used for asynchronous communication. The bus may be a two-way communications bus. The bus converts between serial communication and parallel communication for data to be transmitted. In some embodiments, the UART interface is usually used for connecting the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be used for connecting the processor 110 to a peripheral component, for example, the display screen 194 or the camera 193. The MIPI interface includes a camera serial interface (camera serial interface, CSI), a display serial interface (display serial interface, DSI), and the like. In some embodiments, the processor 110 communicates with the camera 193 through the CSI, to implement a photographing function of the second device 500. The processor 110 communicates with the display screen 194 through the DSI, to implement a display function of the second device 500.

The GPIO interface may be configured by software. The GPIO interface may be configured with a control signal, or may be configured with a data signal. In some embodiments, the GPIO interface may be used for connecting the processor 110 to the camera 193, the display screen 194, the wireless communications module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB type-C interface, or the like. The USB interface 130 may be used for connecting a charger to charge the second device 500, or may be used for transmitting data between the second device 500 and a peripheral device, or may be used for connecting a headset for playing audio through the headset. The interface may be further used for connecting another electronic device, for example, an AR device.

It can be understood that an interface connection relationship between the modules that is shown in this embodiment of this application is an example for description, and does not constitute a limitation on a structure of the second device 500. In some other embodiments of this application, the second device 500 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the second device 500. When charging the battery 142, the charging management module 140 may further supply power to the terminal device by using the power management module 141.

The power management module 141 is configured to connect the battery 142, the charging management module 140, and the processor 110. The power management module 141 receives an input from the battery 142 and/or the charging management module 140, and supplies power to the processor 110, the internal storage 121, the display screen 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may be alternatively disposed in the same device.

A wireless communication function of the second device 500 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. The antennas in the second device 500 may be used to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution including 2G/3G/4G/5G that is applied to the second device 500. The mobile communications module 150 may include at least one filter, a switch, a power amplifier, a low noise amplifier (low noise amplifier, LNA), and the like. The mobile communications module 150 may receive an electromagnetic wave through the antenna 1, perform processing, for example, filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least a part of functional modules of the mobile communications module 150 may be disposed in the processor 110. In some embodiments, at least a part of functional modules of the mobile communications module 150 and at least a part of modules of the processor 110 may be disposed in the same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal that is then transferred to the application processor. The application processor outputs a sound signal by using an audio device (which is not limited to the loudspeaker 170A, the receiver 170B, and the like), or displays an image or a video by using the display screen 194. In some embodiments, the modem processor may be an independent component. In some other embodiments, the modem processor may be independent of the processor 110, and is disposed with the mobile communications module 150 or another functional module in the same device.

The wireless communications module 160 may provide a wireless communication solution that is applied to the second device 500 and that includes a wireless local area network (wireless local area networks, WLAN) (for example, a wireless fidelity (wireless fidelity, Wi-Fi) network). Bluetooth (Bluetooth, BT), a global navigation satellite system (global navigation satellite system, GNSS), frequency modulation (frequency modulation, FM), a near field communication (near field communication. NFC) technology, an infrared (infrared, IR) technology, and the like. The wireless communications module 160 may be one or more components integrating at least one communication processor module. The wireless communications module 160 receives an electromagnetic wave through the antenna 2, performs frequency modulation and filtering on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the second device 500, the antenna 1 and the mobile communications module 150 are coupled, and the antenna 2 and the wireless communications module 160 are coupled, so that the second device 500 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), the BT, the GNSS, the WLAN, the NFC, the FM, the IR technology, and/or the like. The GNSS may include a global positioning system (global positioning system. GPS), a global navigation satellite system (global navigation satellite system, GLONASS), a BeiDou navigation satellite system (BeiDou navigation satellite system. BDS), a quasi-zenith satellite system (quasi-zenith satellite system, QZSS), and/or a satellite based augmentation system (satellite based augmentation system. SBAS).

The second device 500 may implement a display function by using the GPU, the display screen 194, the application processor, and the like. The GPU is a microprocessor for image processing, and is connected to the display screen 194 and the application processor. The GPU is configured to: perform mathematical and geometric computation, and render an image. The processor 110 may include one or more GPUs that execute program instructions to generate or change display information.

The display screen 194 is configured to display an image, a video, or the like. The display screen 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini-LED, a micro-LED, a micro-OLED, a quantum dot light-emitting diode (quantum dot light-emitting diode, QLED), and the like. In some embodiments, the second device 500 may include one or N display screens 194, where N is a positive integer greater than 1.

The second device 500 may implement a photographing function by using the ISP, the camera 193, the video codec, the GPU, the display screen 194, the application processor, and the like.

The ISP may be configured to process data fed back by the camera 193. For example, during photographing, a shutter is opened, and light goes into a photosensitive element of the camera through a lens. An optical signal is converted into an electrical signal, and the photosensitive element of the camera transmits the electrical signal to the ISP for processing, to convert the electrical signal into a visual image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) photoelectric transistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the second device 500 may include one or N cameras 193, where N is a positive Integer greater than 1.

The digital signal processor is configured to process a digital signal, and may process another digital signal in addition to the digital image signal. For example, when the second device 500 selects a frequency point, the digital signal processor is configured to perform Fourier transform on frequency point energy.

The video codec is configured to compress or decompress a digital video. The second device 500 may support one or more types of video codecs. Therefore, the second device 500 may play or record videos in a plurality of coding formats, for example, moving picture experts group (moving picture experts group, MPEG)-1, MPEG-2, MPEG-3, and MPEG-4.

The NPU is a neural network (neural-network, NN) computing processor. The NPU quickly processes input information with reference to a structure of a biological neural network, for example, a transfer mode between human brain neurons, and may further perform self-learning continuously. Applications such as intelligent cognition of the second device 500, for example, image recognition, facial recognition, speech recognition, and text understanding, may be implemented by using the NPU.

The external storage interface 120 may be used for connecting an external storage card, for example, a micro SD card, to extend a storage capability of the second device 500. The external storage card communicates with the processor 110 through the external storage interface 120, to implement a data storage function. For example, files such as music and a video are stored in the external storage card.

The internal storage 121 may be configured to store computer-executable program code. The executable program code includes instructions. The internal storage 121 may include a program storage area and a data storage area. The program storage area may store an operating system, an application required for at least one function (for example, a sound playback function or an image play function), and the like. The data storage area may store data (for example, audio data and an address book) and the like that are created during use of the second device 500. In addition, the internal storage 121 may include a high-speed random access memory, and may further include a non-volatile memory, for example, at least one magnetic disk storage device, a flash storage device, or a universal flash storage (universal flash storage, UFS). The processor 110 runs the instructions stored in the internal storage 121 and/or instructions stored in the memory disposed in the processor, to implement various function applications and data processing of the second device 500.

The second device 500 may implement an audio function, for example, music play or recording, by using the audio module 170, the loudspeaker 170A, the receiver 170B, the microphone 170C, the headset jack 170D, the application processor, and the like.

The audio module 170 is configured to convert digital audio information into an analog audio signal for output, and is further configured to convert analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The loudspeaker 170A, also referred to as a "speaker", is configured to convert an electrical audio signal into a sound signal. The second device 500 may receive music or receive a hands-free call by using the loudspeaker 170A.

The receiver 170B, also referred to as an "earpiece", is configured to convert an electrical audio signal into a sound signal. When a call or audio information is received by the second device 500, the receiver 170B may be put close to a human ear to listen to a voice.

The microphone 170C, also referred to as a "mike" or a "mic", is configured to convert a sound signal into an electrical signal. When making a call or sending a voice message, a user may move the mouth close to the microphone 170C and make a sound, to input a sound signal to the microphone 170C. At least one microphone 170C may be disposed in the second device 500. In some other embodiments, two microphones 170C may be disposed in the second device 500, to collect a sound signal and further reduce noises. In some other embodiments, three, four, or more microphones 170C may alternatively be disposed in the second device 500, to collect a sound signal, reduce noises, and identify a sound source, to implement a directional sound recording function and the like.

The headset jack 170D is used for connecting a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association, CTIA of the USA) standard interface.

The pressure sensor 180A is configured to sense a pressure signal, and can convert the pressure signal into an electrical signal. In some embodiments, the pressure sensor 180A may be disposed in the display screen 194. There are a plurality of types of pressure sensors 180A, for example, a resistive pressure sensor, an inductive pressure sensor, and a capacitive pressure sensor. The capacitive pressure sensor may include at least two parallel plates made of conductive materials. When a pressure is applied to the pressure sensor 180A, capacitance between electrodes changes. The second device 500 determines pressure intensity based on a capacitance change. When a touch operation is performed on the display screen 194, the second device 500 detects intensity of the touch operation by using the pressure sensor 180A. The second device 500 may calculate a touch position based on a detection signal from the pressure sensor 180A. In some embodiments, touch operations that are performed at a same touch position but have different touch operation intensity may correspond to different operation instructions.

The gyroscope sensor 180B may be configured to determine a motion posture of the second device 500. In some embodiments, an angular velocity of the second device 50) about three axes (that is, axes x, y, and z) may be determined by using the gyroscope sensor 180B. The gyroscope sensor 180B may be configured to implement image stabilization during photographing. For example, when the shutter is clicked, the gyroscope sensor 180B detects an angle at which the second device 500 jitters, calculates, based on the angle, a distance for which a lens module needs to compensate, and allows the lens to cancel the jitter of the second device 500 through reverse motion, to implement image stabilization. The gyroscope sensor 180B may be further used in a navigation scenario and a somatic game scenario.

The barometric pressure sensor 180C is configured to measure barometric pressure. In some embodiments, the second device 500 calculates an altitude based on a value of a barometric pressure measured by the barometric pressure sensor 180C, to help with positioning and navigation.

The magnetic sensor 180D includes a Hall sensor. The second device 500 may detect opening and closing of a flip cover by using the magnetic sensor 180D. In some embodiments, when the second device 500 is a clamshell phone, the second device 500 may detect opening and closing of a flip cover by using the magnetic sensor 180D. Further, a feature, for example, automatic unlocking, upon opening of the flip cover is set based on a detected opening or closing state of the flip cover.

The acceleration sensor 180E may detect accelerations in various directions (usually on three axes) of the second device 500. When the second device 500 is still, a magnitude and a direction of gravity may be detected. The acceleration sensor 180E may be further configured to identify a posture of the terminal device, and is used in, for example, switching between a landscape mode and a portrait mode, or an application, for example, a pedometer.

The range sensor 180F is configured to measure a distance. The second device 500 may measure a distance using infrared or laser. In some embodiments, in a photographing scenario, the second device 500 may measure a distance by using the range sensor 180F, to implement quick focusing.

The optical proximity sensor 180G may include, for example, a light-emitting diode (LED), and an optical detector, for example, a photodiode. The light-emitting diode may be an infrared light-emitting diode. The second device 500 emits infrared light through the light-emitting diode. The second device 500 detects infrared reflected light from a nearby object by using the photodiode. When sufficient reflected light is detected, the second device 500 may determine that there is an object near the second device. When insufficient reflected light is detected, the second device 500 may determine that there is no object near the second device 500. The second device 500 may detect, by using the optical proximity sensor 180G, that a user is holding the second device 500 close to the ear when making a call, and automatically perform screen-off for power saving. The optical proximity sensor 180G may be further used in a smart cover mode or a pocket mode to automatically perform screen unlocking or locking.

The ambient light sensor 180L is configured to sense ambient light brightness. The second device 500 may adaptively adjust luminance of the display screen 194 based on the sensed ambient light brightness. The ambient light sensor 180L may be further configured to automatically adjust white balance during photographing. The ambient light sensor 180L may further cooperate with the optical proximity sensor 180G to detect whether the second device 500 is in a pocket, to avoid an accidental touch.

The fingerprint sensor 180H is configured to collect a fingerprint. The second device 500 may use a feature of the collected fingerprint to implement fingerprint-based unlocking, application lock access, fingerprint-based photographing, fingerprint-based call answering, and the like.

The temperature sensor 1803 is configured to detect a temperature. In some embodiments, the second device 500 executes a temperature processing policy based on the temperature detected by the temperature sensor 180J. For example, when a temperature reported by the temperature sensor 180J exceeds a threshold, the second device 500 lowers performance of a processor near the temperature sensor 180J, to reduce power consumption and provide thermal protection. In some other embodiments, when the temperature is less than another threshold, the second device 500 heats up the battery 142 to prevent the second device 500 from being shut down anomalously due to a low temperature. In some other embodiments, when the temperature is less than still another threshold, the second device 500 boosts an output voltage of the battery 142 to avoid anomalous shutdown due to a low temperature.

The touch sensor 180K is also referred to as a "touch component". The touch sensor 180K may be disposed in the display screen 194, and the touch sensor 180K and the display screen 194 constitute a touchscreen, which is also referred to as a "touch screen". The touch sensor 180K is configured to detect a touch operation performed on or near the touch sensor. The touch sensor may transfer a detected touch operation to the application processor to determine a type of the touch event. A visual output related to the touch operation may be provided through the display screen 194. In some other embodiments, the touch sensor 180K may be alternatively disposed on a surface of the second device 500, and is located at a position different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may be further in contact with a human pulse, and receive a blood pressure beating signal. In some embodiments, the bone conduction sensor 180M may alternatively be disposed in the headset, to constitute a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The second device 500 may receive a button input, and generate a button signal input related to user settings and function control of the second device 500.

The motor 191 may generate a vibration prompt. The motor 191 may be configured to produce an incoming call vibration prompt, and may be configured to provide touch vibration feedback. For example, touch operations performed for different applications (for example, photographing and audio playback) may correspond to different vibration feedback effects. For touch operations performed on different areas of the display screen 194, the motor 191 may also correspond to different vibration feedback effects. Different application scenarios (for example, a time reminder, information receiving, an alarm clock, and a game) may also correspond to different vibration feedback effects. A touch vibration feedback effect may be further customized.

The indicator 192 may be an indicator light, may be configured to indicate a charging status and a power change, and may be configured to indicate a message, a missed call, a notification, and the like.

The SIM card interface 195 is used for connecting a SIM card. The SIM card may be inserted into the SIM card interface 195 or removed from the SIM card interface 195, to implement contact with or separation from the second device 500. The second device 500 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is further compatible with an external storage card. The second device 500 interacts with a network through the SIM card, to implement functions such as calling and data communication. In some embodiments, the second device 500 uses an eSIM, that is, an embedded SIM card. The eSIM card may be embedded into the second device 500, and cannot be separated from the second device 500.

Both software systems on the first device 400 and the second device 500 may use a layered architecture, an event-driven architecture, a microkernel architecture, a micro service architecture, a cloud architecture, or the like. In embodiments of this application, an Android system of the layered architecture is used as an example to describe software structures of the first device 400 and the second device 500.

Figure 6A:
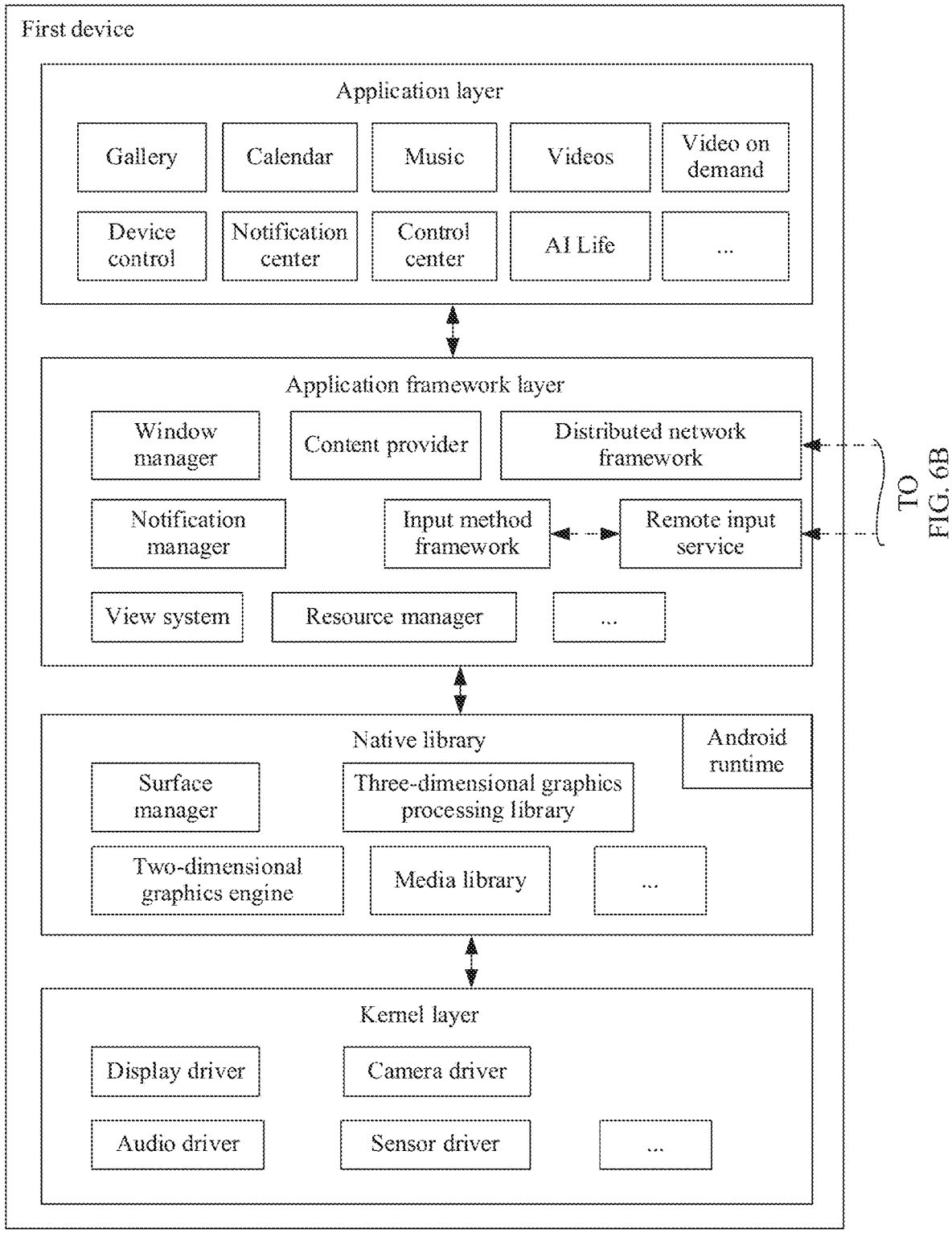
FIG. 6A and FIG. 6B are a schematic diagram of software architectures of a first device and a second device according to an embodiment of this application.

FIG. 6A is a block diagram of a software architecture of a first device according to an embodiment of this application. A software system on the first device may use a layered architecture, an event-driven architecture, a microkernel architecture, a micro service architecture, a cloud architecture, or the like. In this embodiment of this application, an example in which the operating system on the first device is an Android system is used for description. As shown in FIG. 6A, the Android system is divided into four layers: an application layer, an application framework layer, Android runtime (Android runtime) and a native library, and a kernel layer, from top to bottom.

The application layer may include a series of application packages.

As shown in FIG. 6A, the application layer may include one or more applications such as Gallery, Calendar, Music, Videos, Video on demand, AI Life, or Device control.

Any one of the applications may provide an input box, so that a user can input a keyword or the like in the input box to implement an operation, for example, searching in the application.

The AI Life application may be used to control or manage a home device having a network connection function. For example, the home device may include an electric light, an air conditioner, a safe-guard door lock, a speaker, a sweeper robot, a socket, a body fat scale, a desk lamp, an air purifier, a refrigerator, a washing machine, a water heater, a microwave oven, an electric cooker, a curtain, a fan, a television, a set-top box, a door, and a window.

The device control application is used to control or manage a single device (for example, the first device).

In addition, the application layer may further include a system application, for example, a control center and/or a notification center.

The control center is a pull-down message notification bar on the first device, for example, a user interface displayed on the first device when a user performs a pull-down operation on the first device. The notification center is a pop-up message notification bar on the first device, that is, a user interface displayed on the first device when a user performs a pull-up operation on the first device.

The application framework (framework) layer provides an application programming interface (application programming interface, API) and a programming framework for an application in the application layer. The application framework layer includes some predefined functions.

As shown in FIG. 6A, the application framework layer may include one or more of a window manager, a content provider, a resource manager, a view system, a notification manager, a distributed network framework, a remote input service, an input method framework, and the like.

The window manager is configured to manage a window program. The window manager may obtain a size of a display screen, determine whether there is a status bar, lock a screen, touch a screen, drag a screen, take a screenshot, and the like.

The content provider is configured to: store and obtain data, and enable the data to be accessed by an application. The data may include a video, an image, audio, a browsing history and bookmarks, and the like.

The view system includes visual controls such as a control for displaying text and a control for displaying an image. The view system may be used to construct an application. A display interface may include one or more views. For example, a display interface including a notification icon of Messages may include a text display view and a picture display view.

The resource manager provides an application with various resources such as a localized character string, an icon, a picture, a layout file, and a video file.

The notification manager enables an application to display notification information in the status bar, and may be used to transmit a notification-type message. The displayed information may automatically disappear after a short pause without user interaction. For example, the notification manager is used to notify download completion, provide a message notification, and the like. The notification manager may alternatively be a notification that appears in a status bar atop the system in a form of a graph or a scroll bar text, for example, a notification of an application running on the background, or may be a notification that appears on the screen in a form of a dialog window. For example, a prompt of textual information is given in the status bar, a prompt tone is played, or an indicator light blinks.

The distributed network framework enables the first device to discover another device in a same distributed network and establish a communication connection to the another device.

The remote input service (also referred to as a remote input atomic ability (atomic ability, AA)) enables the first device to receive remote input from another device.

The input method framework may support content input in an input box on the first device.

Android runtime includes a core library and a virtual machine. Android runtime is responsible for scheduling and management of the Android system.

The core library includes two parts. One part is a functionality function that needs to be called in Java language, and the other part is a core library of Android.

The application layer and the application framework layer run on the virtual machine. The virtual machine executes Java files in the application layer and the application framework layer as binary files. The virtual machine is used to implement functions such as object lifecycle management, stack management, thread management, security and exception management, and garbage collection.

The native library may include a plurality of functional modules, for example, a surface manager (surface manager), a media library (Media Libraries), a three-dimensional graphics processing library (for example, OpenGL ES), and a 2D graphics engine (for example, SGL).

The surface manager is used to manage a display subsystem and provide fusion of 2D and 3D layers for a plurality of applications.

The media library supports playback and recording of a plurality of commonly used audio and video formats, static image files, and the like. The media library may support a plurality of audio and video coding formats, for example, MPEG-4, H.264, MP3, AAC, AMR, JPG, and PNG.

The three-dimensional graphics processing library is used to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Figure 6B:
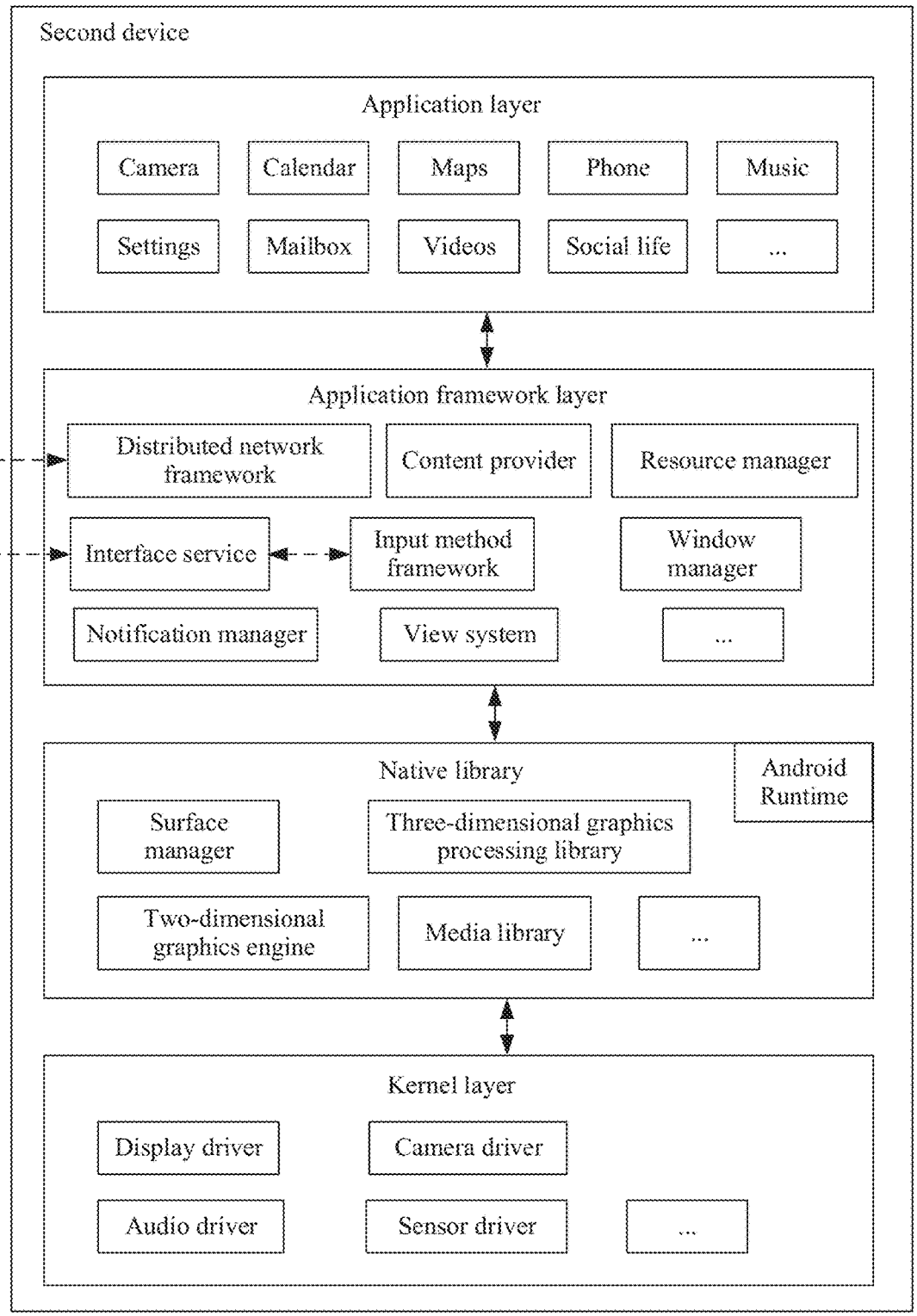

FIG. 6B is a block diagram of a software architecture of a second device according to an embodiment of this application. For example, as shown in FIG. 6B, the Android system is divided into four layers: an application layer, an application framework layer, Android runtime (Android runtime) and a native library, and a kernel layer, from top to bottom.

The application layer may include a series of application packages.

As shown in FIG. 6B, the application packages may include applications such as Camera, Calendar, Phone, Maps, Phone, Music, Settings. Email, Videos, and Social life.

The application framework layer provides an application programming interface (application programming interface, API) and a programming framework for an application at the application layer. The application framework layer includes some predefined functions.

As shown in FIG. 6B, the application framework layer may include one or more of a window manager, a content provider, a resource manager, a view system, a notification manager, a distributed network framework, an input method framework, an interface service, and the like.

The window manager is configured to manage a window program. The window manager may obtain a size of a display screen, determine whether there is a status bar, lock a screen, touch a screen, drag a screen, take a screenshot, and the like.

The content provider is configured to: store and obtain data, and enable the data to be accessed by an application. The data may include a video, an image, audio, outgoing and incoming calls, a browsing history and bookmarks, contacts, and like.

The view system includes a visual control, for example, a control for displaying text and a control for displaying an image. The view system may be used to construct an application. A display interface may include one or more views. For example, a display interface including a notification icon of Messages may include a text display view and a picture display view.

The resource manager provides an application with various resources such as a localized character string, an icon, a picture, a layout file, and a video file.

The notification manager enables an application to display notification information in the status bar, and may be used to transmit a notification-type message. The displayed information may automatically disappear after a short pause without user interaction. For example, the notification manager is used to notify download completion, provide a message notification, and the like. The notification manager may alternatively be a notification that appears in a status bar atop the system in a form of a graph or a scroll bar text, for example, a notification of an application running on the background, or may be a notification that appears on the screen in a form of a dialog window. For example, textual information is displayed in the status bar, a prompt tone is played, the terminal device vibrates, or an indicator light blinks.

The distributed network framework enables the second device to discover another device in a same distributed network and establish a communication connection to the another device.

The input method framework may support content input in an input box on the second device.

The interface service may define an interface between the second device and another device, so that the second device and the another device transmit data based on the interface defined by the interface service. In a possible implementation, the interface service may include: an auxiliary AA, where the atomic ability (atomic ability, AA) is developed by a developer, is a program entity that implements a single function, and may have no user interface (user interface, UI).

Android runtime includes a core library and a virtual machine. Android runtime is responsible for scheduling and management of the Android system.

The core library includes two parts. One part is a functionality function that needs to be called in Java language, and the other part is a core library of Android.

The application layer and the application framework layer run on the virtual machine. The virtual machine executes Java files in the application layer and the application framework layer as binary files. The virtual machine is used to implement functions such as object lifecycle management, stack management, thread management, security and exception management, and garbage collection.

The native library may include a plurality of functional modules, for example, a surface manager (surface manager), a media library (Media Libraries), a three-dimensional graphics processing library (for example, OpenGL ES), and a 2D graphics engine (for example, SGL).

The surface manager is used to manage a display subsystem and provide fusion of 2D and 3D layers for a plurality of applications.

The media library supports playback and recording of a plurality of commonly used audio and video formats, static image files, and the like. The media library may support a plurality of audio and video coding formats, for example, MPEG-4, H.264, MP3, AAC, AMR, JPG, and PNG.

The three-dimensional graphics processing library is used to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Based on the software architectures of the first device and the second device shown in FIG. 6A and FIG. 6B, in this embodiment of this application, the first device and the second device may use the distributed network framework of each of the devices to implement communication services such as connection to a distributed network, device discovery, or data sending. For example, after the first device and the second device are connected to a distributed network, the first device may invoke the interface service of the second device based on the remote input service, and invoke the input method framework of the second device by using the interface service of the second device, to assist the first device with input by using the input method framework of the second device. The remote input service of the first device may also send, to the second device by using the interface service of the second device, content that is input based on the input method framework of the first device.

In a possible manner of understanding, in the embodiment corresponding to FIG. 6A and FIG. 6B, the interface service (for example, the auxiliary AA) is set up in the framework layer of the second device, and the interface service is similar to a bridge built between the input method frameworks of the first device and the second device, so that the first device can invoke the input method framework of the second device, and content input by using the input method framework of the second device can be displayed as the same in an input box on the first device (for example, a cursor, highlight display, and other content in an input box on the second device can all be displayed in the input box on the first device), to use the second device to assist the first device with input.

It should be understood that, in a possible implementation, the interface service (for example, the auxiliary AA) may alternatively be implemented in a form of an application. For example, an application (application. APP) used to implement the interface service in this embodiment of this application may be developed, and the application is loaded on a mobile phone, to implement a function of the interface service in this embodiment of this application based on the application. In a possible implementation, the application may have an application icon displayed in a user interface (or may be understood as that a user is aware of the application), or the application may not have an application icon displayed in a user interface (or may be understood as that a user is unaware of the application). A specific implementation of the interface service is not limited in this embodiment of this application. For ease of description, an example in which the interface service is the auxiliary AA as is used below for description.

Figure 7:
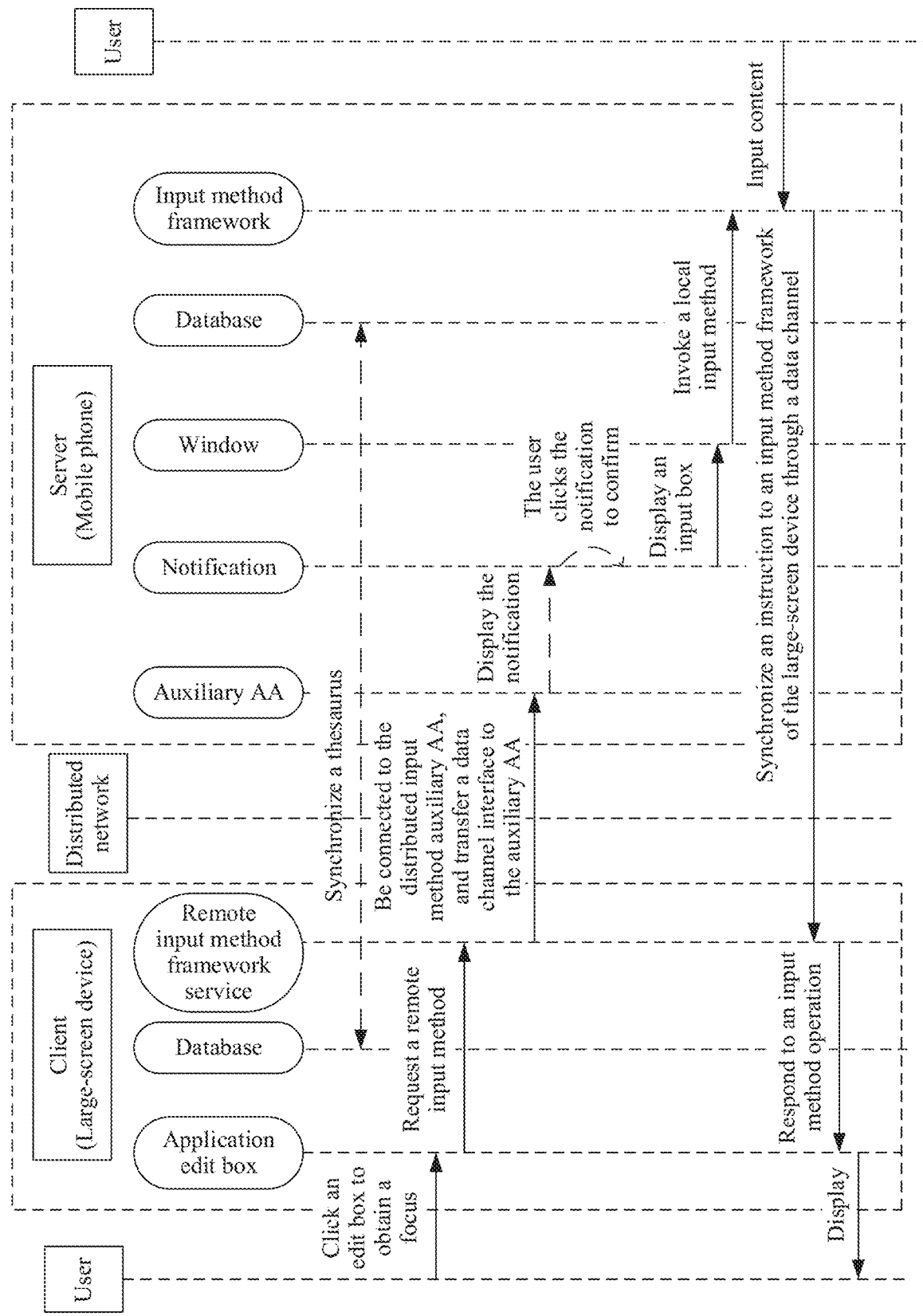
FIG. 7 is a schematic diagram of a system architecture for a device communication method according to an embodiment of this application.

With reference to FIG. 7, a specific implementation process of a mobile phone assisting a large-screen device with input is described below as an example.

FIG. 7 is a diagram of a system architecture for a device communication method according to an embodiment of this application. As shown in FIG. 7, an application edit box (also referred to as a search box), a database, and a remote input method framework service (also referred to as a remote input service) may be set up on a client (a large-screen device). An auxiliary AA, a notification manager (or a notification for short), a window manager (or a window for short), a database, and an input method framework may be set up on a server (a mobile phone).

The application edit box on the large-screen device may be provided by an input method framework of the large-screen device. The application edit box on the large-screen device may receive input from a remote control or the like. When the application edit box is selected by using the remote control, implementation of subsequent auxiliary input may be triggered. Alternatively, when the application edit box is selected and content is selected from a soft keyboard (also referred to as a virtual keyboard) corresponding to the application edit box by using the remote control, implementation of subsequent auxiliary input may be triggered.

The database on the large-screen device may store an association relationship between a keyword and a program. For example, after obtaining a keyword from the application edit box, the large-screen device may search for a program according to the association relationship between a keyword and a program in the database.

The remote input method framework service of the large-screen device enables the large-screen device to receive remote input. For example, the remote input method framework may include a local input method framework of the large-screen device and a remote input service AA. An interface between the large-screen device and an external device may be defined based on the remote input service AA, so that the large-screen device can receive remote input from the external device through the interface. For example, the remote input service AA (or may be referred to as a remote input service AA interface) of the large-screen device may include one or more of the following interfaces: an interface for externally setting text to the large-screen device, an interface for externally applying for a focus change to the large-screen device, an interface for a callback of external registration with the large-screen device or externally providing to a keypad, or the like.

The auxiliary AA of the mobile phone may define an interface between the mobile phone and another device, so that the mobile phone and the another device can transmit data based on the interface defined by the interface service. For example, mutual invoking of a local input method framework of the mobile phone and the remote input method framework of the large-screen device may be established based on the auxiliary AA, so that any content input in the local input method framework of the mobile phone is synchronously displayed in an edit box on the large-screen device.

In a possible implementation, an implementation of establishing mutual invoking of the local input method framework of the mobile phone and the remote input method framework of the large-screen device based on the auxiliary AA includes: The remote input method framework of the large-screen device and the auxiliary AA hold a remote procedure call (remote procedure call, RPC) object of each other. During subsequent data interaction between the large-screen device and the mobile phone, one may invoke a device process of the other based on the RPC object thereof, and notify the device process of the other device to invoke a local interface of the other device to perform an adaptation operation.

The notification manager on the mobile phone may display notification content in an interface on the mobile phone based on an operation of obtaining a focus of an edit box on the large-screen device, to prompt a user using the mobile phone to perform large-screen device auxiliary input.

The window manager on the mobile phone may display a user interface, for example, display a notification interface or an auxiliary input interface.

The database on the mobile phone may store an association relationship between a keyword and candidate content. For example, after the keyword is obtained from an input method edit box on the mobile phone, the candidate content may be displayed according to the association relationship between a keyword and candidate content in the database.

The input method framework of the mobile phone may provide a convenient input method implementation.

Both the large-screen device and the mobile phone may join a distributed network, and implement device discovery, communication connection establishment, data transmission, and the like in the distributed network. Because joining a distributed network is a relatively common technology, details are not described herein.

In the diagram of the system architecture for the device communication method as shown in FIG. 7, when the large-screen device and the mobile phone join the distributed network, the database (for example, a candidate term thesaurus) on the large-screen device and the database (for example, a candidate term thesaurus) on the mobile phone may be synchronized, so that the large-screen device and the mobile phone can share the database with each other, and a user can select a candidate term with more convenience based on the candidate term thesauruses on the large-screen device and the mobile phone.

For example, after a user selects an edit box on the large-screen device by using a device, for example, the remote control, the large-screen device may enable a local input method channel by using the remote input method framework, and transfer the channel to the remote input method framework. The remote input method framework (input method framework, IMF) searches for an auxiliary AA in a current distributed network (it should be understood that the auxiliary AA is used as an example herein, and may be actually any application process in the mobile phone that can support a related capability) with the distributed network framework. The mobile phone returns the RPC object of the auxiliary AA to the large-screen device, and then the mobile phone invokes an interface to transfer an RPC object of the input channel of the large-screen device to the mobile phone. Subsequently, the mobile phone may synchronize editing status information to the large-screen device by using the RPC object of the input channel of the large-screen device, or the large-screen device may synchronize editing status information to the mobile phone by using an RPC object of an input channel of the mobile phone.

The auxiliary AA of the mobile phone may further indicate the notification manager to display a notification. When receiving a click of a user for confirming the notification, the mobile phone may further display an input box in a window on the mobile phone, and invoke a local input method in the local input method framework of the mobile phone, to synchronize content entered by a user on the mobile phone by using the local input method to the remote input method framework service of the large-screen device, so that content in the input box on the mobile phone is synchronously displayed in the edit box on the large-screen device.

In a possible implementation of using the mobile phone to assist the large-screen device with input, after the user enters a keyword in the edit box on the mobile phone, information, for example, the keyword in the edit box on the mobile phone may be synchronized to the edit box on the large-screen device, to improve efficiency of input on the large-screen device.

In a general implementation, in a scenario in which a user uses a mobile phone A to assist the large-screen device with input, if the mobile phone A is interrupted in a process of assisting the large-screen device with input, for example, the mobile phone A receives an incoming call in the process of assisting the large-screen device with input, auxiliary input of the mobile phone A may be interrupted, and the mobile phone A cannot continue to assist the large-screen device with input. Alternatively, a user using the mobile phone A does not want to continue to use the mobile phone A to assist the large-screen device with input. The user may want to switch to another auxiliary device to assist the large-screen device with input, for example, switch to a mobile phone B to assist the large-screen device with input. In this case, the user needs to use the remote control of the large-screen device again, click the edit box on the large-screen device again, and trigger a connection between the large-screen device and the mobile phone B again. This process is relatively complicated.

In view of this, an embodiment of this application provides a device communication method. In a process in which a user uses a mobile phone to assist a large-screen device with input, another auxiliary device that is in a same distributed network as the large-screen device and the mobile phone may preempt auxiliary input of the mobile phone, and further assist, based on input content on the mobile phone, the large-screen device with input, and in this process, the user does not need to use a device, for example, a remote control, to select an edit box on the large-screen device again, thereby achieving convenient and efficient auxiliary input for the large-screen device.

Figure 8A:
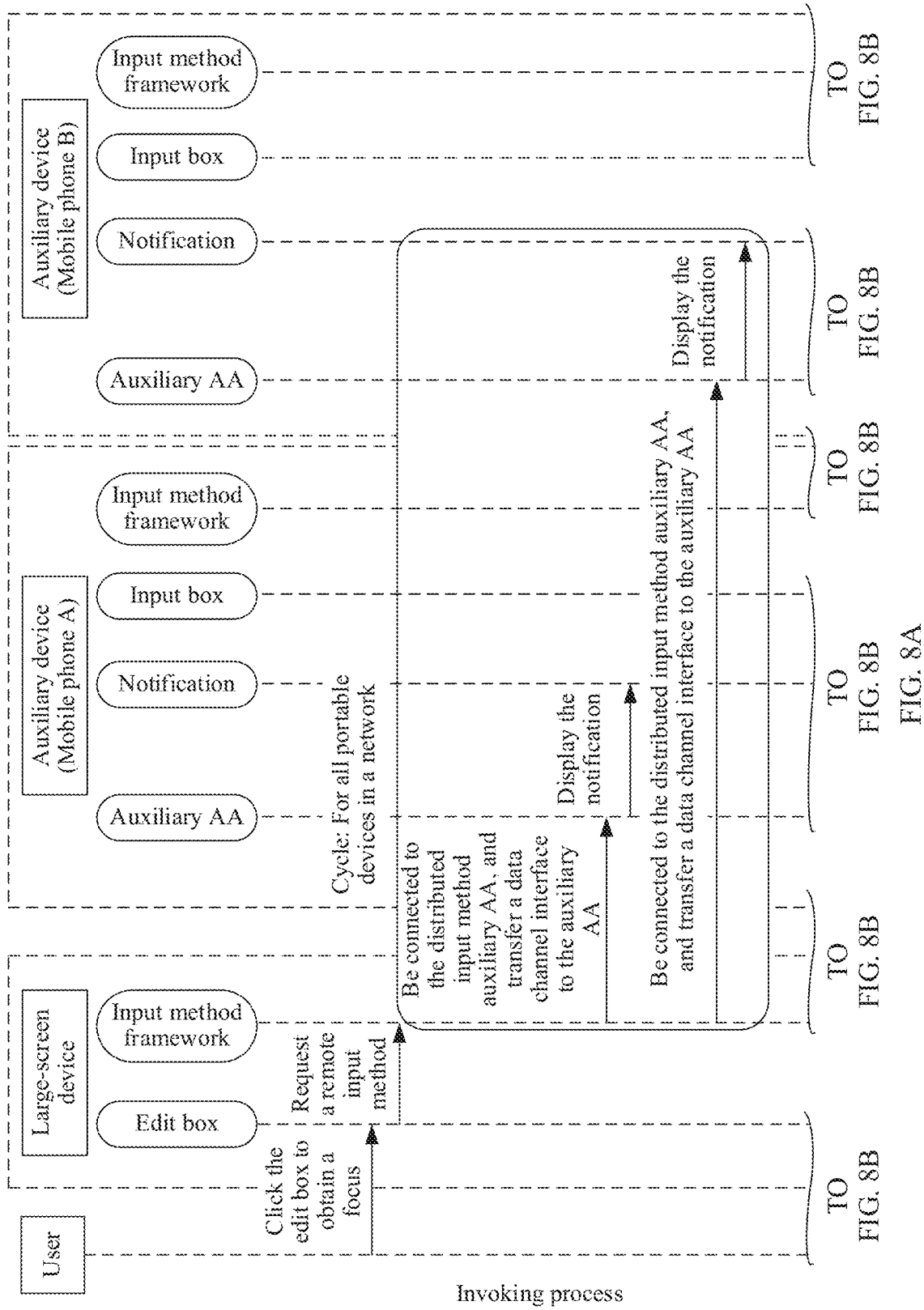
Figure 8C:
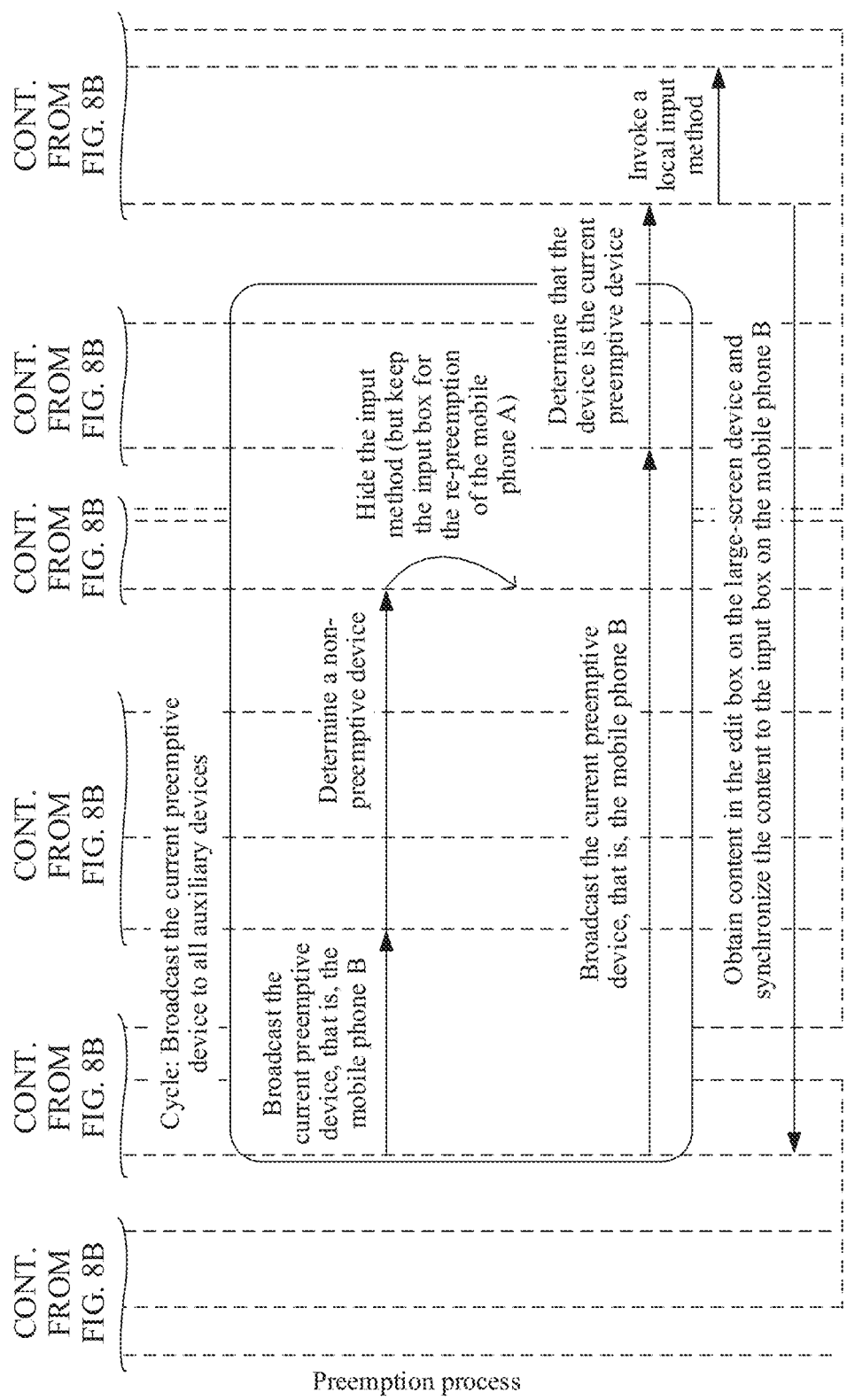

For example, FIG. 8A to FIG. 8C are a schematic diagram of a specific system architecture for a device communication method in which a plurality of devices preempt input according to an embodiment of this application.

As shown in FIG. 8A to FIG. 8C, in this embodiment of this application, an example in which a large-screen device, a mobile phone A, and a mobile phone B are included in a distributed network is used as an example to describe a process in which the mobile phone B preempts auxiliary input during auxiliary input of the mobile phone A. It can be understood that the large-screen device in this embodiment of this application may have a capability of requesting remote input, and both the mobile phone A and the mobile phone B may have a distributed input method auxiliary AA.

As shown in FIG. 8A to FIG. 8C, the device communication method in this embodiment of this application may include an invoking process and a preemption process. In the invoking process, the large-screen device may establish a connection to the mobile phone A and the mobile phone B. and the mobile phone A confirms to assist the large-screen device with input. In the preemption process, the mobile phone B may preempt against the mobile phone A to implement auxiliary input of the mobile phone B for the large-screen device.

For example, in the invoking process, a user may click an edit box on the large-screen device by using a remote control of the large-screen device, and the edit box on the large-screen device requests a remote input method from an input method framework of the large-screen device. The large-screen device discovers the mobile phone A and the mobile phone B in the distributed network. The large-screen device may separately establish a connection to the auxiliary AA of the mobile phone A and the auxiliary AA of the mobile phone B, and separately transfer a data channel interface of the large-screen device to the auxiliary AA of the mobile phone A and the auxiliary AA of the mobile phone B. A notification may be displayed on both the mobile phone A and the mobile phone B, and the notification may be used to indicate that the large-screen device requests auxiliary input. The user may confirm, in the notification on the mobile phone A, to use the mobile phone A to assist the large-screen device with input, and notify the large-screen device that a current preemptive device is the mobile phone A. An edit box used to assist the large-screen device with input may be displayed on the mobile phone A, and the user may invoke a local input method on the mobile phone in the edit box on the mobile phone A to assist the large-screen device with input. For example, the user may enter "Hi," in the edit box on the mobile phone A, and "Hi," may be synchronously displayed on the large-screen device.

For example, in the preemption process, the user may confirm, in the notification on the mobile phone B, to use the mobile phone B to assist the large-screen device with input, and notify the large-screen device that a current preemptive device is the mobile phone B. The large-screen device may broadcast, to the mobile phone A and the mobile phone B in the distributed network, that the current preemptive device is the mobile phone B. If the mobile phone A does not perform a preemption step again, the edit box used for auxiliary input on the mobile phone A may be hidden, and an edit box used to assist the large-screen device with input may be displayed on the mobile phone B, and the user may invoke a local input method on the mobile phone in the edit box on the mobile phone B to assist the large-screen device with input. In a possible implementation, after the mobile phone B implements preemption, content synchronized by the mobile phone A to the large-screen device may be synchronously displayed in the edit box on the mobile phone B. For example, if "Hi," has been synchronized from the edit box on the mobile phone A to the edit box on the large-screen device, "Hi," may be synchronized to the edit box that is displayed on the mobile phone B.

In a possible implementation, in the foregoing invoking process, the notification on the mobile phone B may be first hidden, and in the preemption process, the user may trigger display of the hidden notification on the mobile phone B, and implement preemption in the notification. For example, after the user clicks the notification on the mobile phone A and confirms selection, the notification on the mobile phone B may be hidden in a notification bar. When the user wants to use the mobile phone B to preempt input, the user may pull down the notification bar on the mobile phone B to display the notification on the mobile phone B, and click the notification on the mobile phone B to implement preemption of the mobile phone B.

It can be understood that, in a process in which the mobile phone B successfully preempts auxiliary input for the large-screen device, the mobile phone A may preempt auxiliary input for the large-screen device again based on a process similar to that on the mobile phone B. Details are not described herein again.

It should be noted that, in an implementation in which the mobile phone B preempts auxiliary input of the mobile phone A, the mobile phone A may be in a state of being not able to assist the large-screen device with input, for example, during a call, or the mobile phone A may be in a state of being able to assist the large-screen device with input. Alternatively, it may be understood that the mobile phone B may initiate preemption at any time. The time for the preemption is not limited in this embodiment of this application.

In a possible implementation, the mobile phone A may alternatively request the mobile phone B for preemption. For example, in a home life scenario, an aged person holds the mobile phone A to assist the large-screen device with input, but the aged person may be slow at input and want to request a young person holding the mobile phone B for auxiliary input for the large-screen device. In this case, the mobile phone A may send a request to the mobile phone B, to request the mobile phone B to preempt auxiliary input, and the mobile phone B may implement preemption according to the request from the mobile phone A.

In a possible implementation, in a process in which the mobile phone A assists the large-screen device with input, the large-screen device may also initiate preemption. For example, in a process in which the mobile phone A assists the large-screen device with input, a user clicks the edit box on the large-screen device by using the remote control, and the large-screen device may broadcast, to all auxiliary devices in the distributed network, that an ID of the current preemptive device is an ID of the large-screen device. After receiving the broadcast of the ID of the current preemptive device, a device in the distributed network determines the ID of the preemptive device. The device determines that the large-screen device is the current preemptive device and invokes the local input method on the large-screen device, and the user may use the remote control to continue input in the edit box on the large-screen device; and the device determines that another auxiliary device is not the current preemptive device, and the another auxiliary device may hide an input method on the another auxiliary device.

It should be noted that the embodiment corresponding to FIG. 8A to FIG. 8C is a possible implementation of this embodiment of this application. In another possible implementation, a user may select, by using the remote control, a virtual keyboard in an edit box provided by an application on the large-screen device to trigger a subsequent process of auxiliary input for the large-screen device, or a user may trigger, on a mobile phone, a process of auxiliary input for the large-screen device. This is not specifically limited in this embodiment of this application.

With reference to the descriptions above, a user interface for interaction between a large-screen device and a mobile phone is described below as an example.

Figure 9:
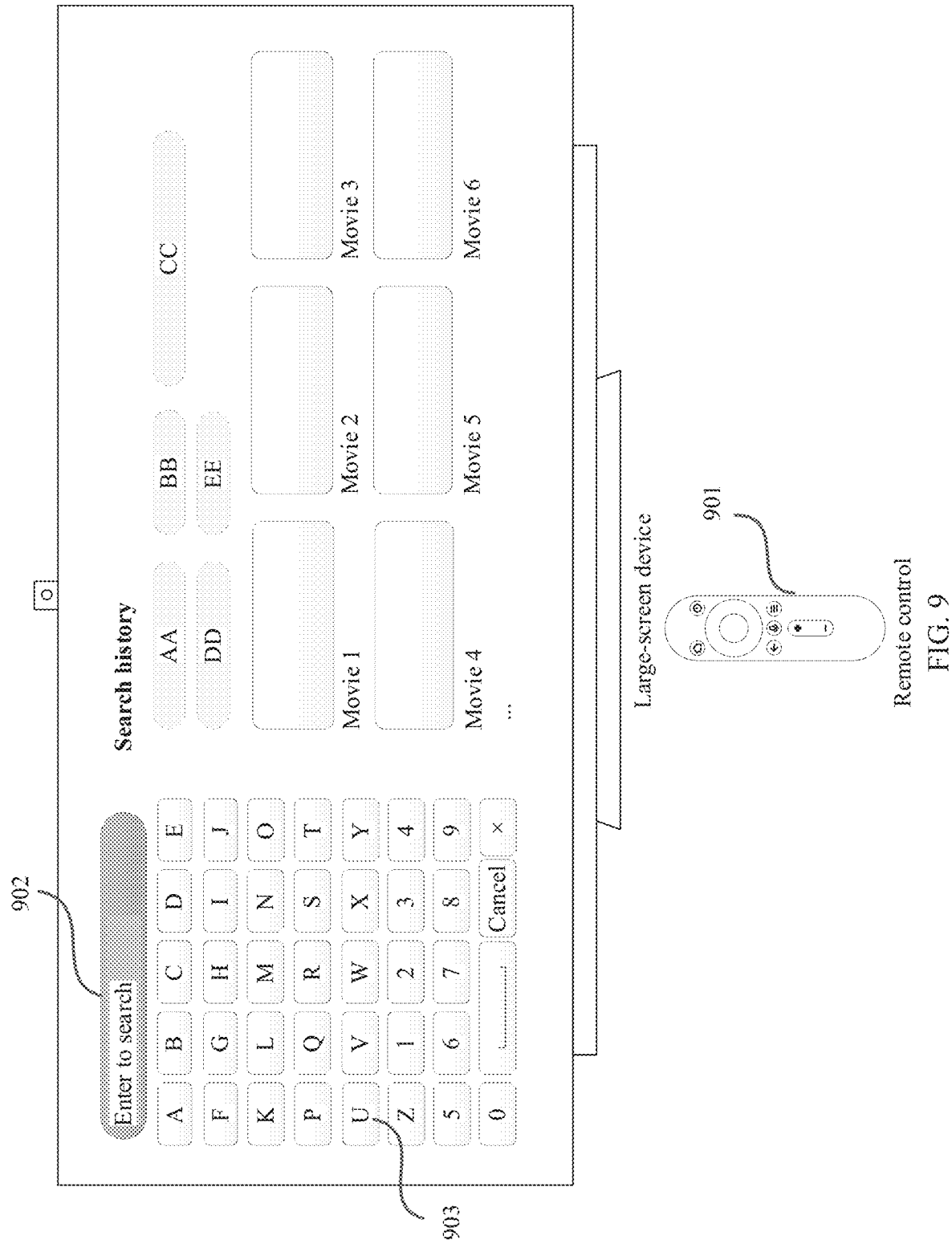
FIG. 9 is a schematic diagram of a user interface on a large-screen device according to an embodiment of this application.
Figure 10:
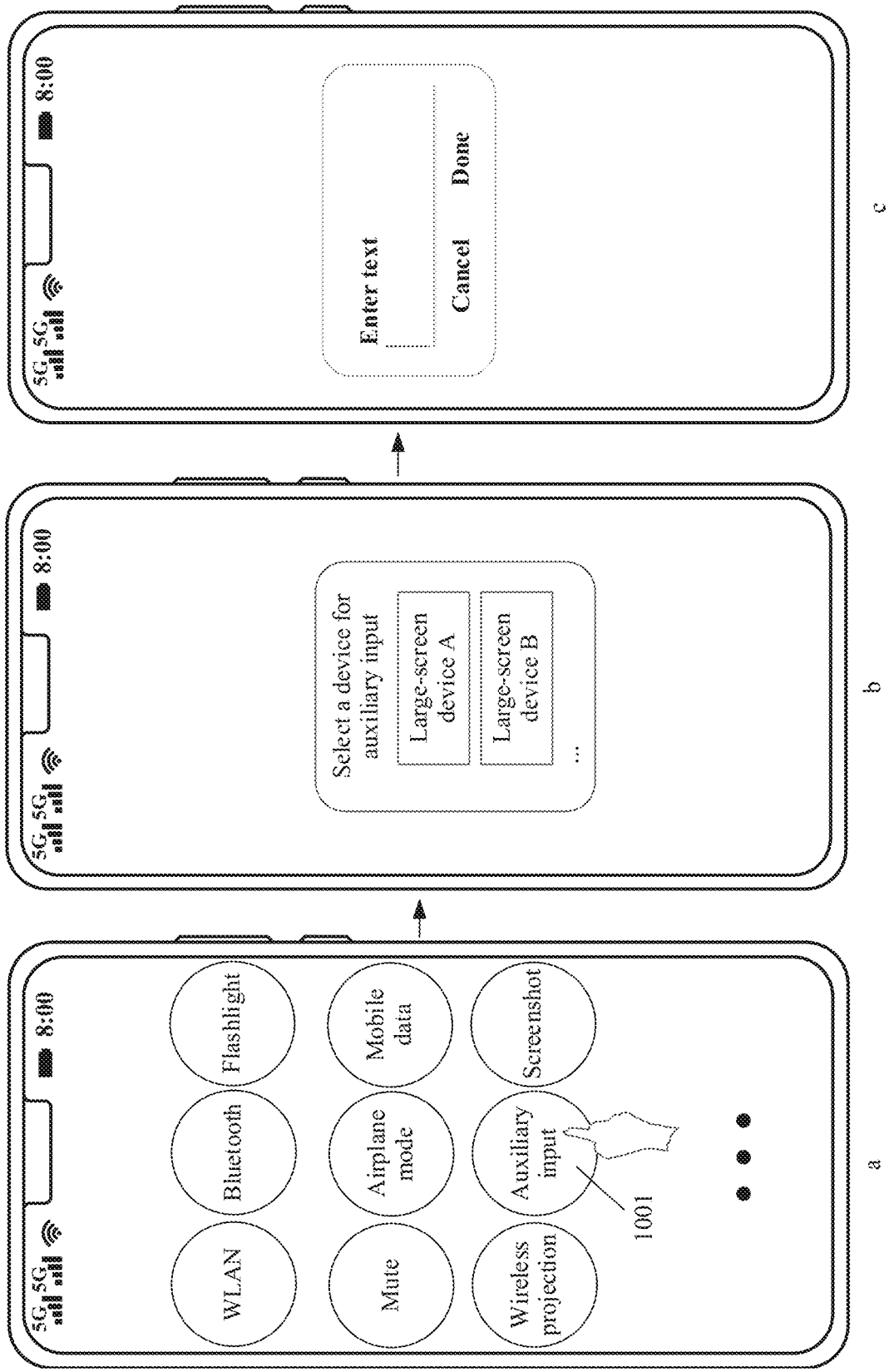
FIG. 10 is a schematic diagram of a user interface on a mobile phone according to an embodiment of this application.

For example, FIG. 9 and FIG. 10 are schematic diagrams of a user interface in which a user triggers auxiliary input.

FIG. 9 is a diagram of a user interface on a large-screen device. As shown in FIG. 9, the user may select an edit box 902 on the large-screen device by using a remote control 901, and may trigger a subsequent process in which a mobile phone assists the large-screen device with input in this embodiment of this application. Alternatively, the user may select any content 902 in a virtual keyboard on the large-screen device by using a remote control 901, and may trigger a subsequent process in which a mobile phone assists the large-screen device with input in this embodiment of this application. A specific manner of the mobile phone to assist the large-screen device with input is described in following embodiments, and details are not described herein.

It should be noted that FIG. 9 is a schematic diagram of setting an edit box in the user interface on the large-screen device. In a possible implementation, the user interface on the large-screen device may include a plurality of edit boxes, and a user may trigger any of the edit boxes to trigger a subsequent process in which the mobile phone assists the large-screen device with input in this embodiment of this application. This is not specifically limited in this embodiment of this application.

FIG. 10 is a diagram of a user interface on a mobile phone. For example, a user may display the user interface as shown in a in FIG. 10 in a manner of for example, pulling down a home screen of the mobile phone. In the user interface as shown in a in FIG. 10, one or more of the following functions of the mobile phone may be included: WLAN, Bluetooth, a flashlight, sound off, an airplane mode, mobile data, wireless projection, taking a screenshot, or auxiliary input 1001. The auxiliary input 1001 may be a function of auxiliary input of the mobile phone for a large-screen device in this embodiment of this application.

In a possible implementation, after the user clicks the auxiliary input 1001, the mobile phone may search for a device, for example, a large-screen device in a same distributed network, obtain a search box on the large-screen device, and establish a communication connection to the large-screen device. The mobile phone may further display a user interface as shown in c in FIG. 10. In the user interface as shown in c in FIG. 10, an edit box used to assist the large-screen device with input may be displayed, and the user may assist the large-screen device with input based on the edit box.

In a possible implementation, if the mobile phone discovers that there are a plurality of devices such as large-screen devices in the same distributed network, the mobile phone may alternatively display a user interface as shown in b in FIG. 10. In the user interface as shown in b in FIG. 10, identifiers of the plurality of large-screen devices may be displayed, and the identifiers of the large-screen devices may be device numbers, user names, nicknames, or the like of the large-screen devices. The user may select, in the user interface as shown in b in FIG. 10, a large-screen device that needs auxiliary input (for example, by clicking a large-screen device A or a large-screen device B), and enter the user interface as shown in c in FIG. 10. This is not specifically limited in this embodiment of this application.

After the user triggers large-screen input in any one of the foregoing manners, for example, the large-screen device may search for an auxiliary device (for example, a mobile phone) having an auxiliary input capability in the distributed network, and automatically determine a mobile phone used for auxiliary input, or send a notification to all mobile phones discovered in the distributed network.

For example, if the large-screen device discovers that there is one mobile phone in the distributed network, the large-screen device may automatically select the mobile phone to be a device for auxiliary input.

For example, if the large-screen device discovers that there are a plurality of mobile phones in the distributed network, and there is a mobile phone that is set by the user to be used for auxiliary input by default in the plurality of mobile phones, the large-screen device may automatically select the mobile phone used for auxiliary input by default as the device for auxiliary input.

For example, if the large-screen device discovers that there are a plurality of mobile phones in the distributed network, and there is a mobile phone that is selected by the user for auxiliary input in the plurality of mobile phones when the user uses auxiliary input last time, the large-screen device may automatically select the mobile phone selected by the user for auxiliary input w % ben the user uses auxiliary input last time as the device for auxiliary input.

For example, if the large-screen device discovers that there are a plurality of mobile phones in the distributed network, the large-screen device obtains, in the plurality of mobile phones, a mobile phone most frequently selected by the user for auxiliary input, and the large-screen device may automatically select the mobile phone most frequently selected by the user for auxiliary input as the device for auxiliary input.

For example, if the large-screen device discovers that there are a plurality of mobile phones in the distributed network, and there is a mobile phone that has a user account the same as a user account used for logging in on the large-screen device in the plurality of mobile phones, the large-screen device may automatically select the mobile phone that has the user account the same as the user account used for logging in on the large-screen device as the device for auxiliary input.

For example, the large-screen device sends a notification to a mobile phone in the distributed network. A user interface in which the mobile phone preempts input for the large-screen device is described below as an example.

One or more mobile phones may be connected to the distributed network. When one mobile phone is connected to the distributed network, the mobile phone may assist the large-screen device with input. If another mobile phone is further connected to the distributed network subsequently, the distributed network may include a plurality of mobile phones, and the plurality of mobile phones may implement the preemption process described in embodiments of this application. When a plurality of mobile phones are connected to the distributed network, the plurality of mobile phones may implement the preemption process described in embodiments of this application.

For example, FIG. 11 to FIG. 23 show a process in which a preemptive device assists a large-screen device with input. For example, a distributed network includes a large-screen device, a mobile phone A, and a mobile phone B.

Figure 11:
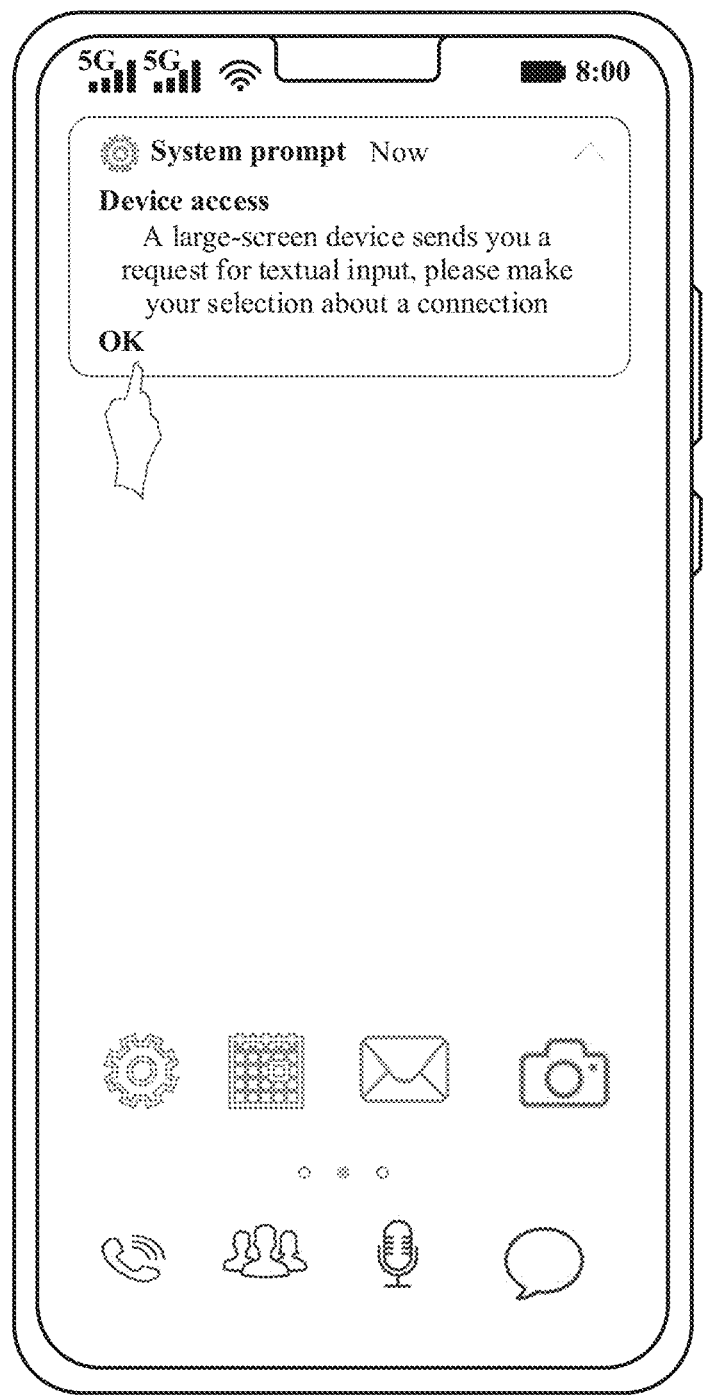
FIG. 11 is a schematic diagram of another user interface on a mobile phone according to an embodiment of this application.

FIG. 11 is a schematic diagram of a user interface on the large-screen device. The large-screen device may be connected to an auxiliary AA of the mobile phone A and an auxiliary AA of the mobile phone B, to request auxiliary input of the mobile phone A and the mobile phone B. A notification may be displayed on both the mobile phone A and the mobile phone B, and the notification is used to prompt the large-screen device to request auxiliary input. For example, FIG. 11 is a diagram of a user interface for receiving the notification on the mobile phone A or the mobile phone B.

Figure 12:
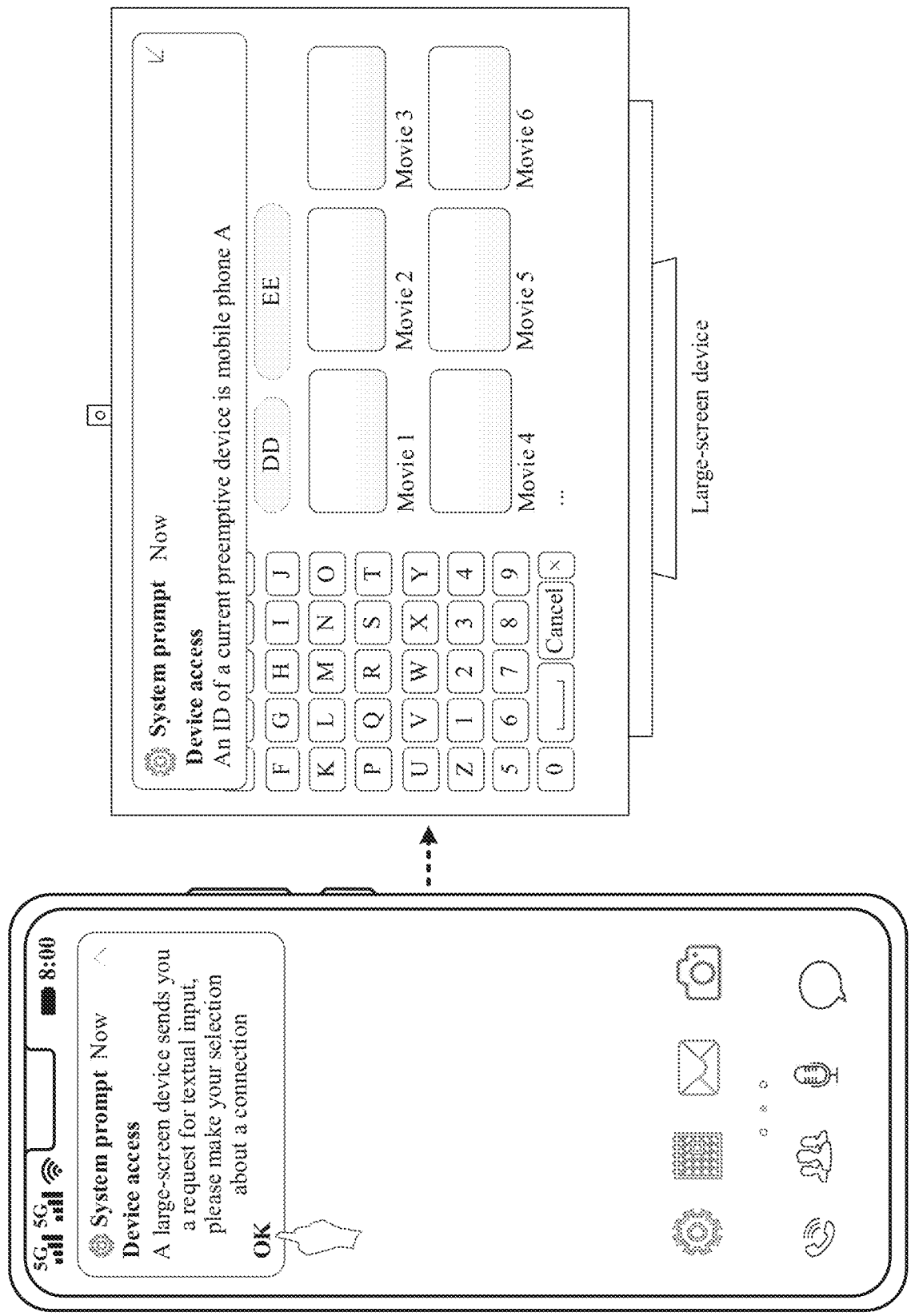
FIG. 12 is a schematic diagram of a user interface according to an embodiment of this application.

FIG. 12 is a schematic diagram of an interface in which the mobile phone A determines to assist the large-screen device with input. As shown in the left diagram of the user interface in FIG. 12, a user selects the mobile phone A for auxiliary input, and the user may click a confirmation button in a notification on the mobile phone A. In a possible implementation, as shown in the right diagram of the user interface on the large-screen device in FIG. 12, a prompt that a current preemptive device is the mobile phone A may be given on the large-screen device. If no other device performs preemption for a period of time, it may be determined that the mobile phone A assists the large-screen device with input. It can be understood that, in another possible implementation, in a process in which the mobile phone A confirms auxiliary input, a prompt about the preemption of the mobile phone A may not be given on the large-screen device, and a user watching the large-screen device may be unaware of a preemption process of the mobile phone B.

In a possible implementation, in the embodiment as shown in FIG. 10, if a user initiates a process of auxiliary input for the large-screen device from the mobile phone A, the user interfaces corresponding to FIG. 11 and FIG. 12 may not be displayed, and the large-screen device may confirm that the mobile phone A assists the large-screen device with input.

Figure 13A:
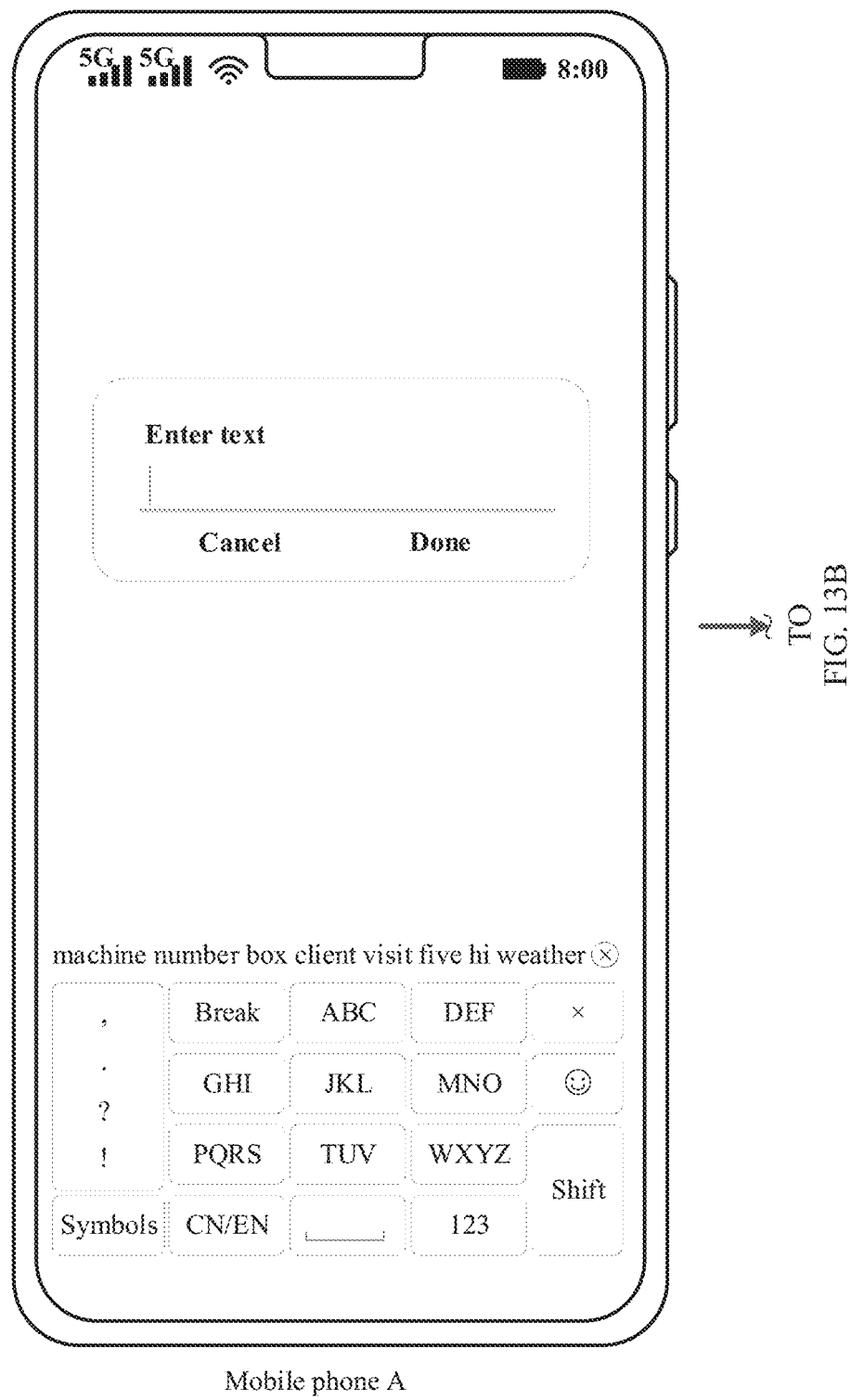
FIG. 13A and FIG. 13B are a schematic diagram of another user interface on a mobile phone according to an embodiment of this application.
Figure 13B:
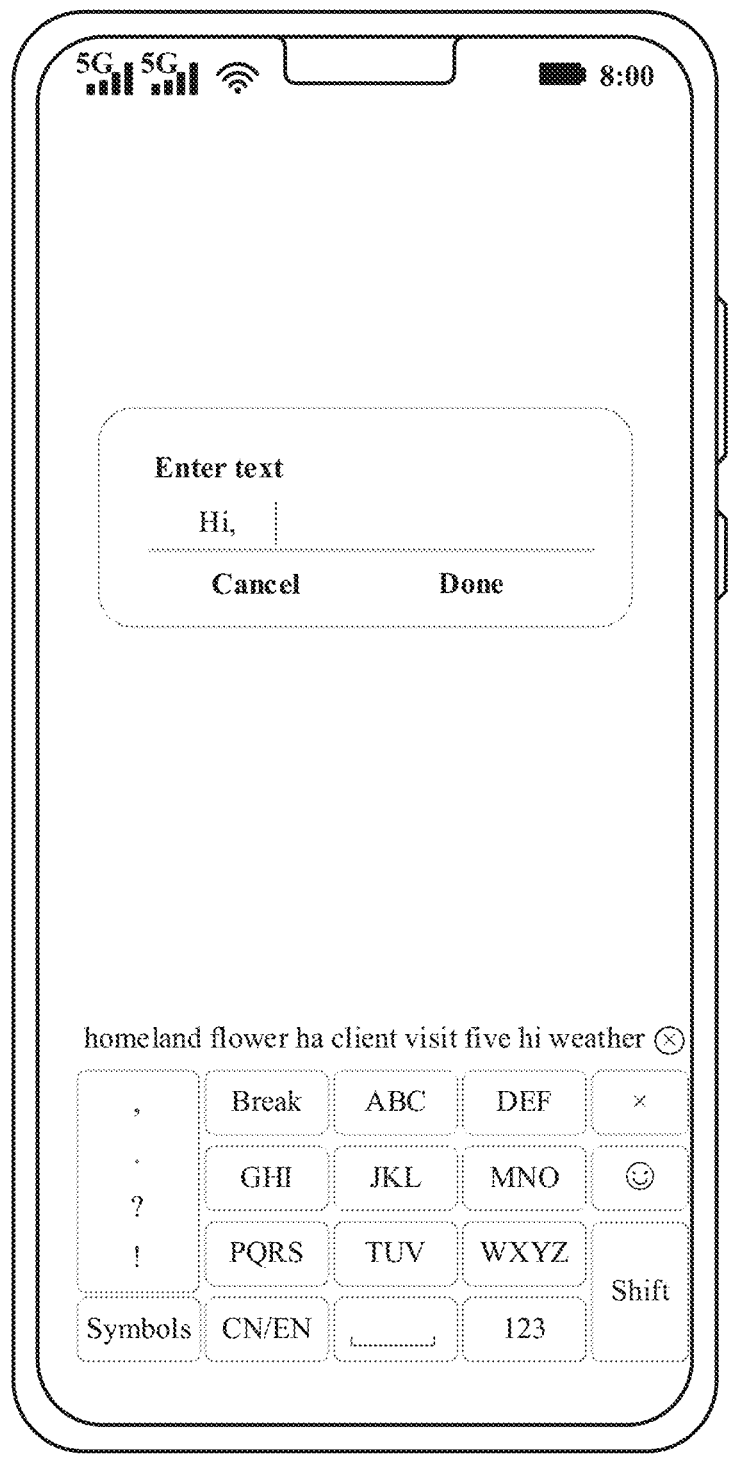

FIG. 13A and FIG. 13B are a schematic diagram of an interface in which the mobile phone A is used to assist the large-screen device with input. As shown in the left diagram of a user interface on the mobile phone A in FIG. 13A, an edit box for auxiliary input is displayed on the mobile phone A, and a user can use auxiliary input for the large-screen device in the edit box. For example, as shown in a user interface in FIG. 13B, the user may input "Hi," in the edit box on the mobile phone A. Adaptively, as shown in FIG. 14, in an edit box on the large-screen device, "Hi," in the edit box on the mobile phone A may be synchronously displayed.

Figure 14:
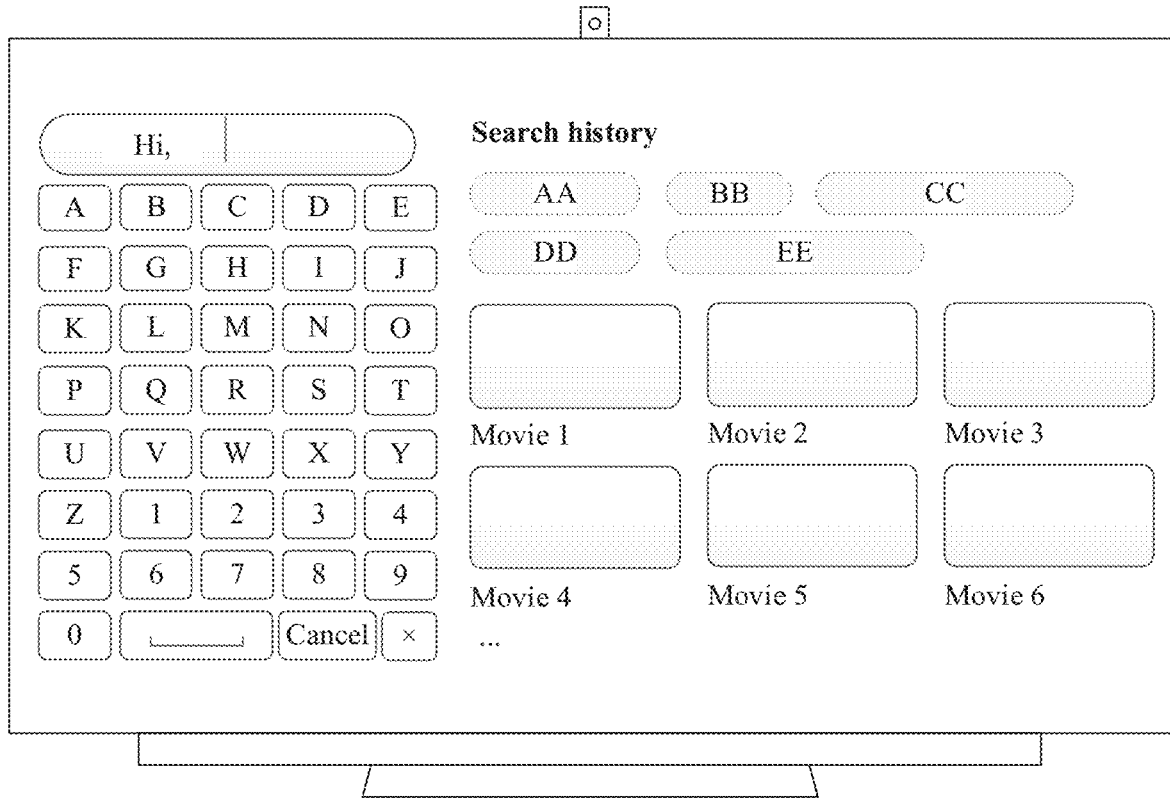
FIG. 14 is a schematic diagram of another user interface on a large-screen device according to an embodiment of this application.

In a possible implementation, when the user performs input in the edit box on the mobile phone A as shown in FIG. 13B, if the user performs an operation of, for example, deletion, highlighting selected content, or moving a cursor in the edit box on the mobile phone A as shown in FIG. 13B, the edit box on the large-screen device as shown in FIG. 14 may synchronously display a state of, for example, deletion, highlighting the selected content, or moving the cursor in the edit box on the mobile phone A.

When the user uses the mobile phone A to assist the large-screen device with input, auxiliary input of the mobile phone A may be interrupted for some reasons. For example, the mobile phone A receives an incoming call from a mobile phone in a process of auxiliary input, or the mobile phone A receives a video or voice call in a process of auxiliary input. Alternatively, if the user wants to switch to a device for input on the large-screen device in a process of auxiliary input, an input preemption process is involved. A preemptive device may be the mobile phone B. or a preemptive device may be the large-screen device.

Figure 15:
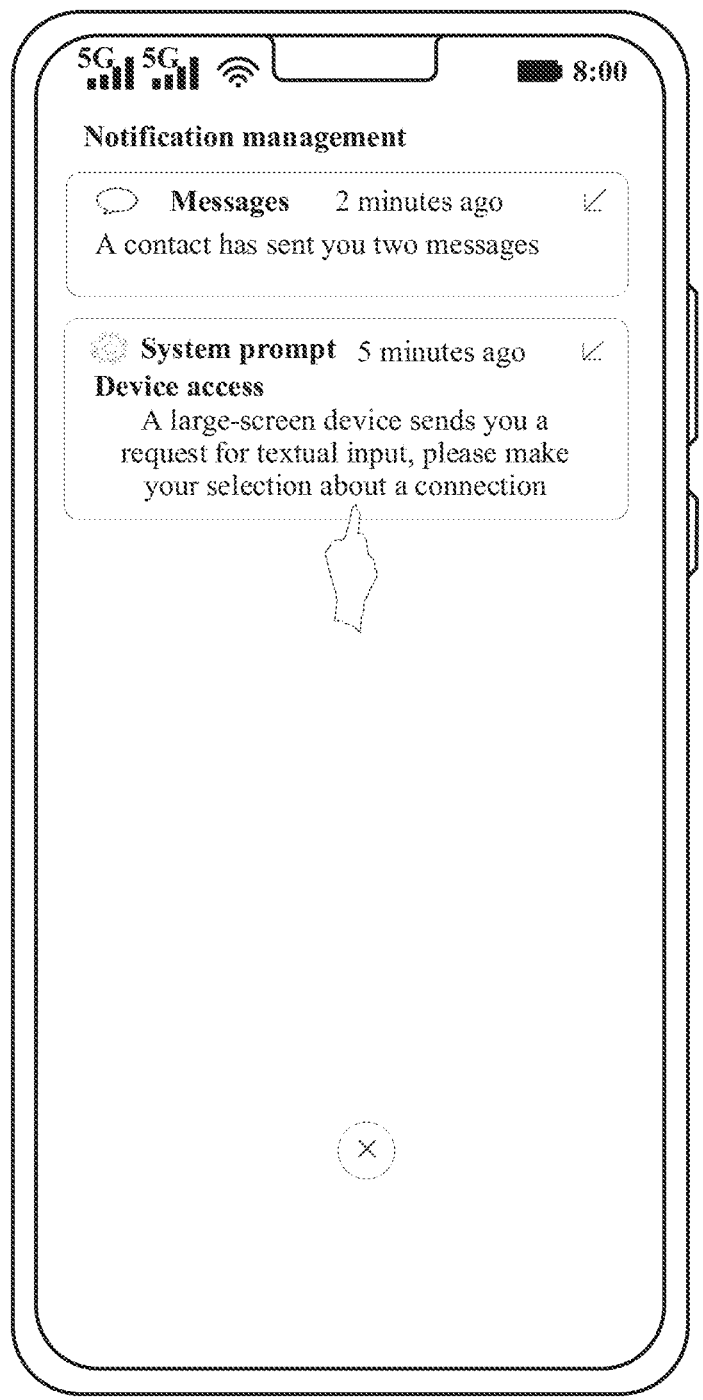
FIG. 15 is a schematic diagram of another user interface on a mobile phone according to an embodiment of this application.
Figure 16:
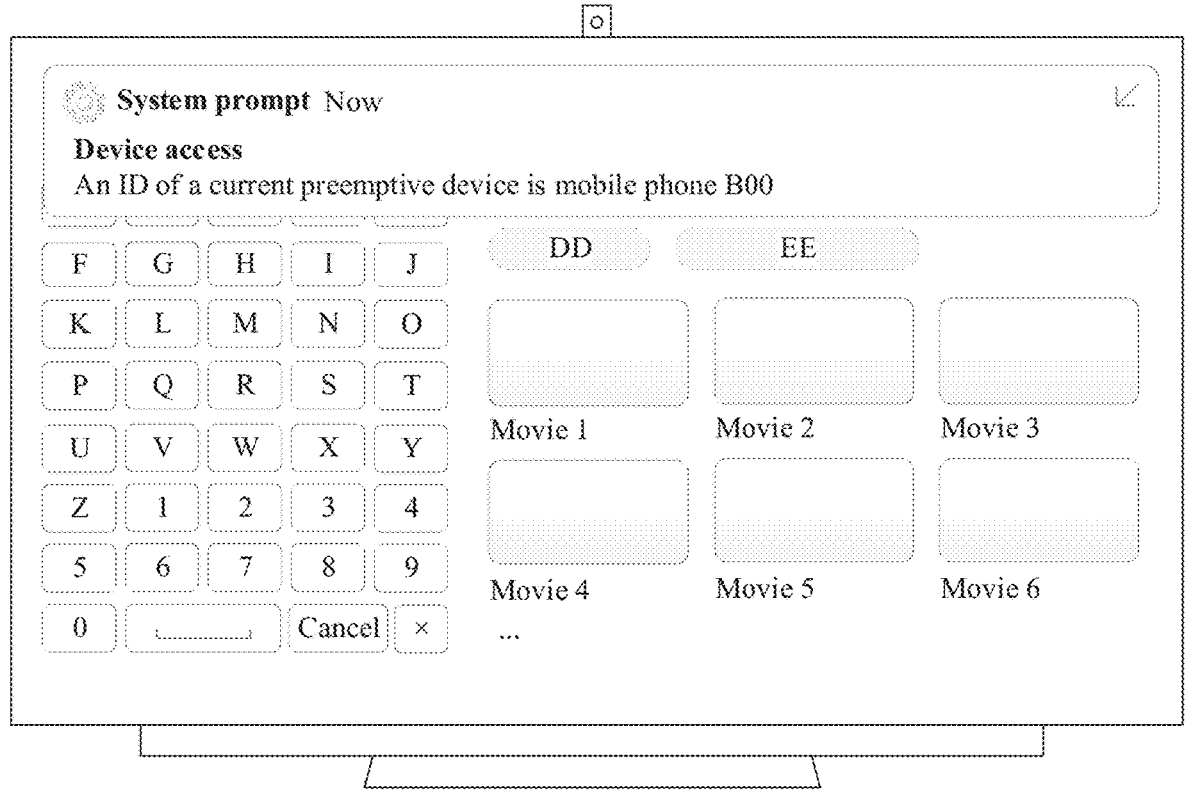
FIG. 16 is a schematic diagram of another user interface on a large-screen device according to an embodiment of this application.
Figure 17:
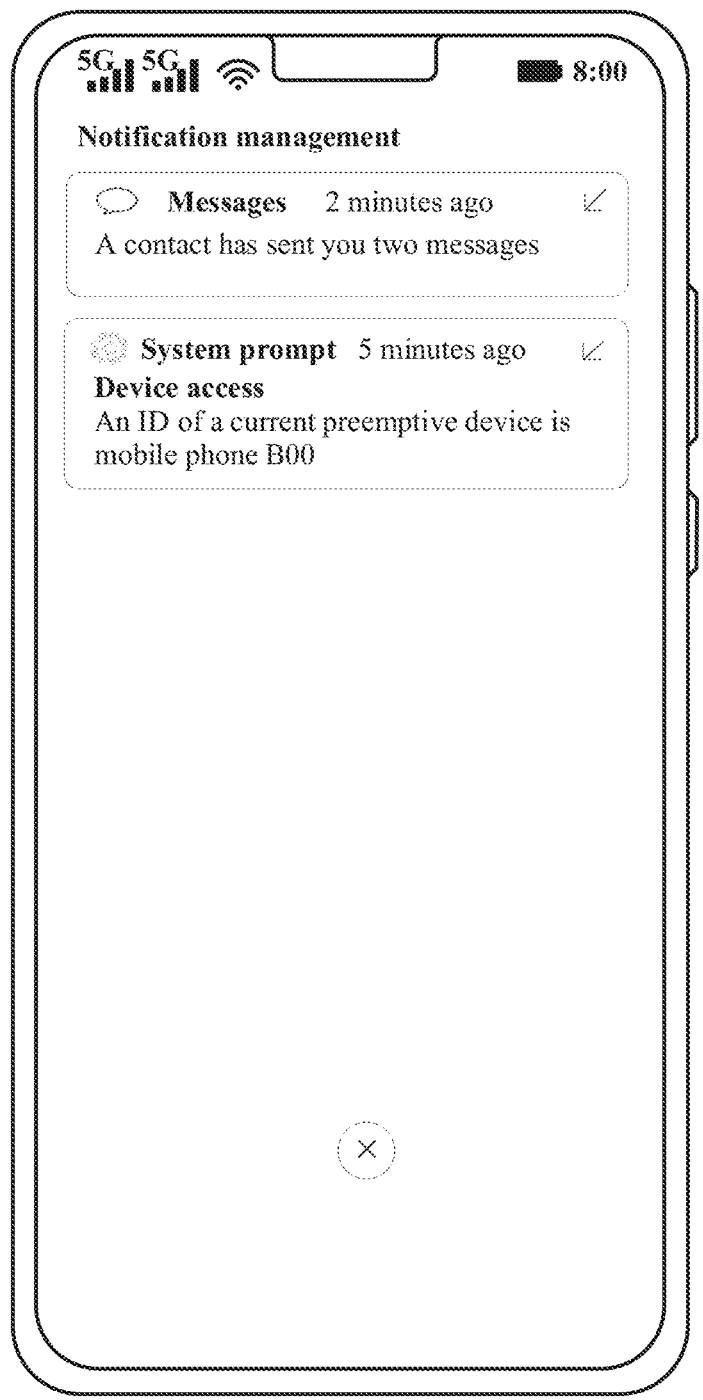
FIG. 17 is a schematic diagram of another user interface on a mobile phone according to an embodiment of this application.

For example, FIG. 15 to FIG. 17 are schematic diagrams of an interface in which the mobile phone B preempts input for the large-screen device.

In a possible implementation, a user using the mobile phone B may perform preemption by triggering a notification bar. For example, FIG. 15 is a schematic diagram of an interface in which a notification bar on the mobile phone B is pulled down for the preemption. As shown in FIG. 15, when the mobile phone B preempts input, the user may pull down the notification bar on the mobile phone B, and a notification, previously received by the mobile phone B from the large-screen device, for requesting auxiliary input may be displayed in the notification bar. The user initiates the preemption by using the notification, previously displayed on the mobile phone B, for prompting the request of the large-screen device for auxiliary input. For example, the user clicks a control in the notification for confirming auxiliary input for the large-screen device, and the mobile phone B may be connected to the large-screen device for preemptive input.

In a possible implementation, FIG. 16 is a schematic diagram of a user interface on the large-screen device. As shown in FIG. 16, after the user confirms the preemption on the mobile phone B, the auxiliary device AA of the mobile phone B notifies the large-screen device of an ID of a preemptive device, the mobile phone B. and a notification showing that the ID of the preemptive device, the mobile phone B, is mobile phone B00 may be displayed in the user interface on the large-screen device.

Optionally, the large-screen device may broadcast the ID of the current preemptive device, the mobile phone B, to the mobile phone A and the mobile phone B. As shown in FIG. 17, the user interface on the mobile phone A may display a notification showing that the ID of the current preemptive device, the mobile phone B, is mobile phone B00. The mobile phone B determines that the current preemptive device is the mobile phone B, and the mobile phone B may invoke a local input method keyboard. The mobile phone A determines that the current preemptive device is not the mobile phone A, and the mobile phone A may hide a local input method keyboard. The large-screen device determines that the current preemptive device is not the large-screen device, and the large-screen device hides a local input method keyboard.

In a possible implementation, after the user confirms the preemption of the mobile phone B, the notification showing that the ID of the preemptive device, the mobile phone B, is mobile phone B00 may not need to be displayed in the user interface on the large-screen device, and the large-screen device broadcasts the ID of the current preemptive device, the mobile phone B, to the mobile phone A and the mobile phone B. The mobile phone B determines that the current preemptive device is the mobile phone B. and the mobile phone B invokes the local input method keyboard. The mobile phone A determines that the current preemptive device is not the mobile phone A, and the mobile phone A hides the local input method keyboard. The large-screen device determines that the current preemptive device is not the large-screen device, and the large-screen device hides the local input method keyboard. Alternatively, it can be understood that, in a process in which the mobile phone B initiates the preemption, a prompt about the preemption of the mobile phone B may not be given on the large-screen device, and a user watching the large-screen device may be unaware of a preemption process of the mobile phone B.

Figure 18:
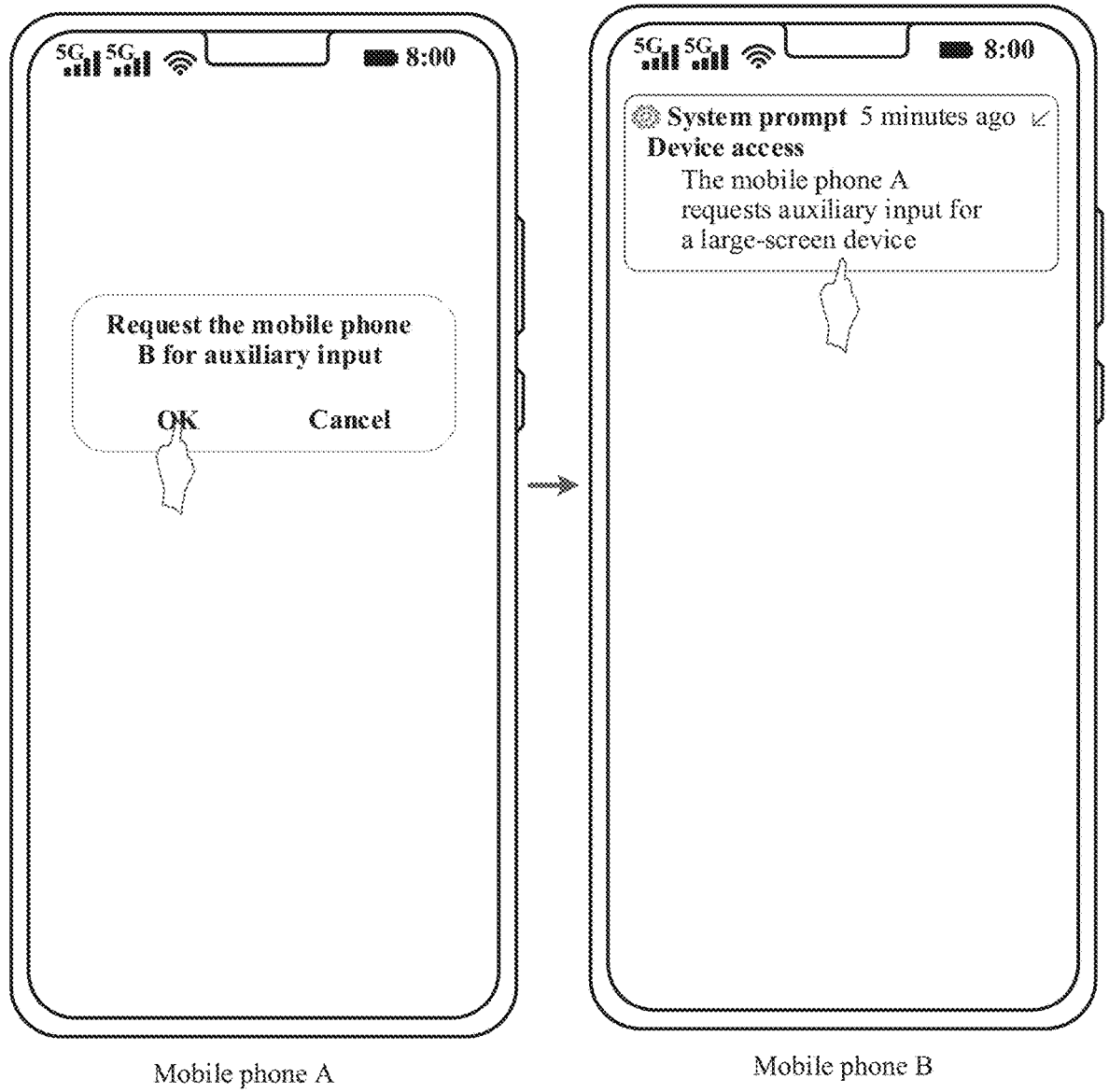
FIG. 18 is a schematic diagram of another user interface on a mobile phone according to an embodiment of this application.

In another possible implementation, the user using the mobile phone B may perform preemption with a request from the mobile phone A. For example, as shown in FIG. 18, the mobile phone A in FIG. 18 may display an interface for requesting auxiliary input of the mobile phone B, and a user may click an option for confirmation on the mobile phone A to request the mobile phone B to assist the large-screen device with input. In FIG. 18, the mobile phone B may be notified of the request from the mobile phone A for auxiliary input for the large-screen device, and a user may accept the request from the mobile phone A on the mobile phone B to implement preemption of auxiliary input for the large-screen device.

Figure 19:
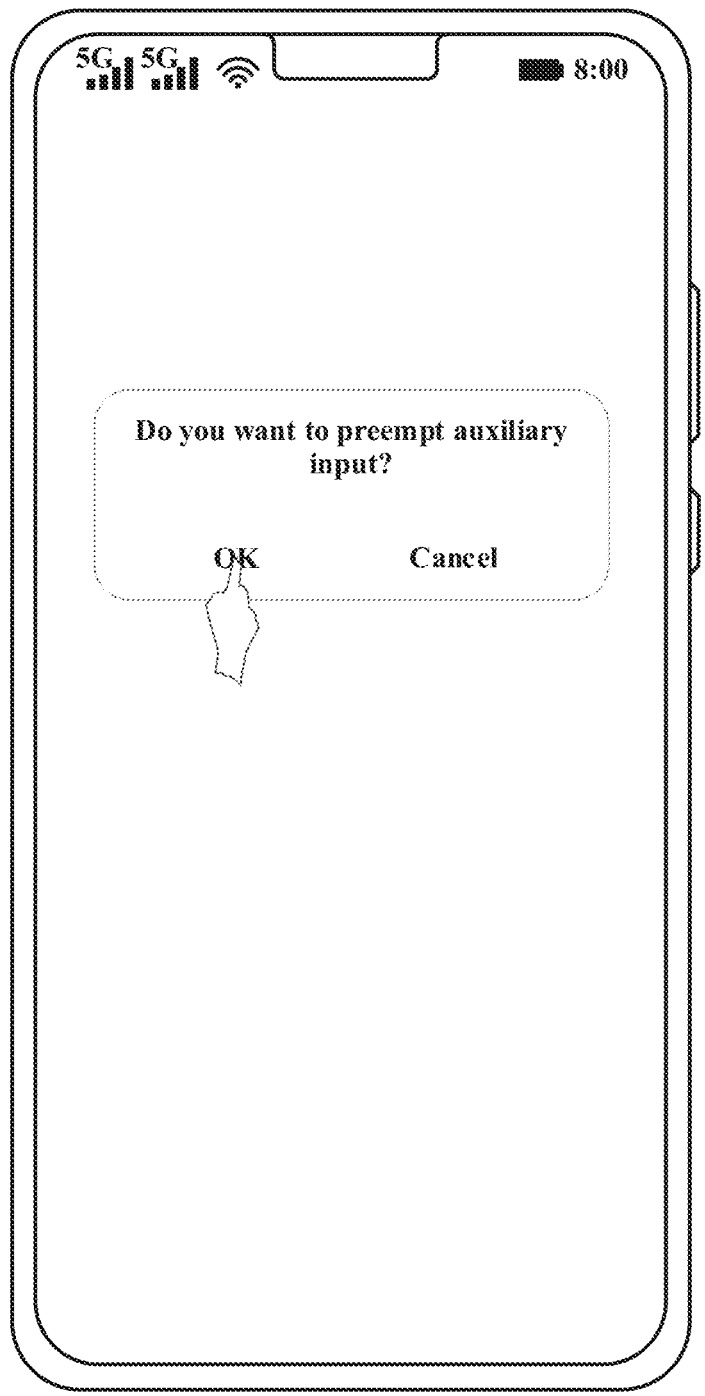
FIG. 19 is a schematic diagram of another user interface on a mobile phone according to an embodiment of this application.

In another possible implementation, initially, the large-screen device and the mobile phone A are connected to the distributed network, and the mobile phone A assists the large-screen device with input. Then, the mobile phone B is connected to the distributed network, and the mobile phone B may display an interface for prompting a user whether to preempt auxiliary input. For example, as shown in FIG. 19, the mobile phone B displays the interface for prompting a user whether to preempt auxiliary input, and the user may click an option for confirmation on the mobile phone B to implement preemption of auxiliary input for the large-screen device.

It can be understood that a manner of preemption of the mobile phone B may be further specified based on an actual application scenario. This is not specifically limited in this embodiment of this application.

Figure 20A:
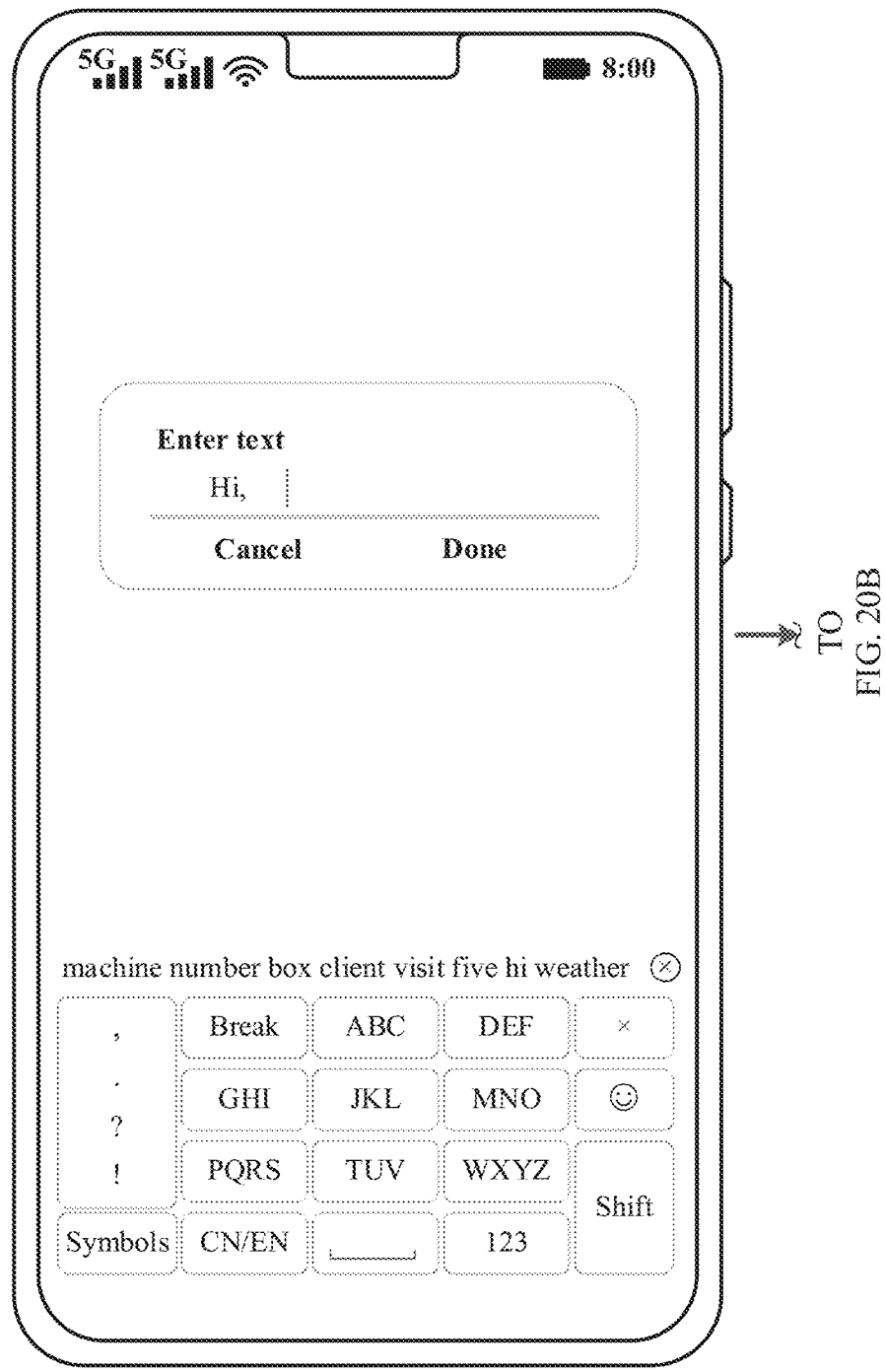
FIG. 20A and FIG. 20B are a schematic diagram of another user interface on a mobile phone according to an embodiment of this application.
Figure 20B:
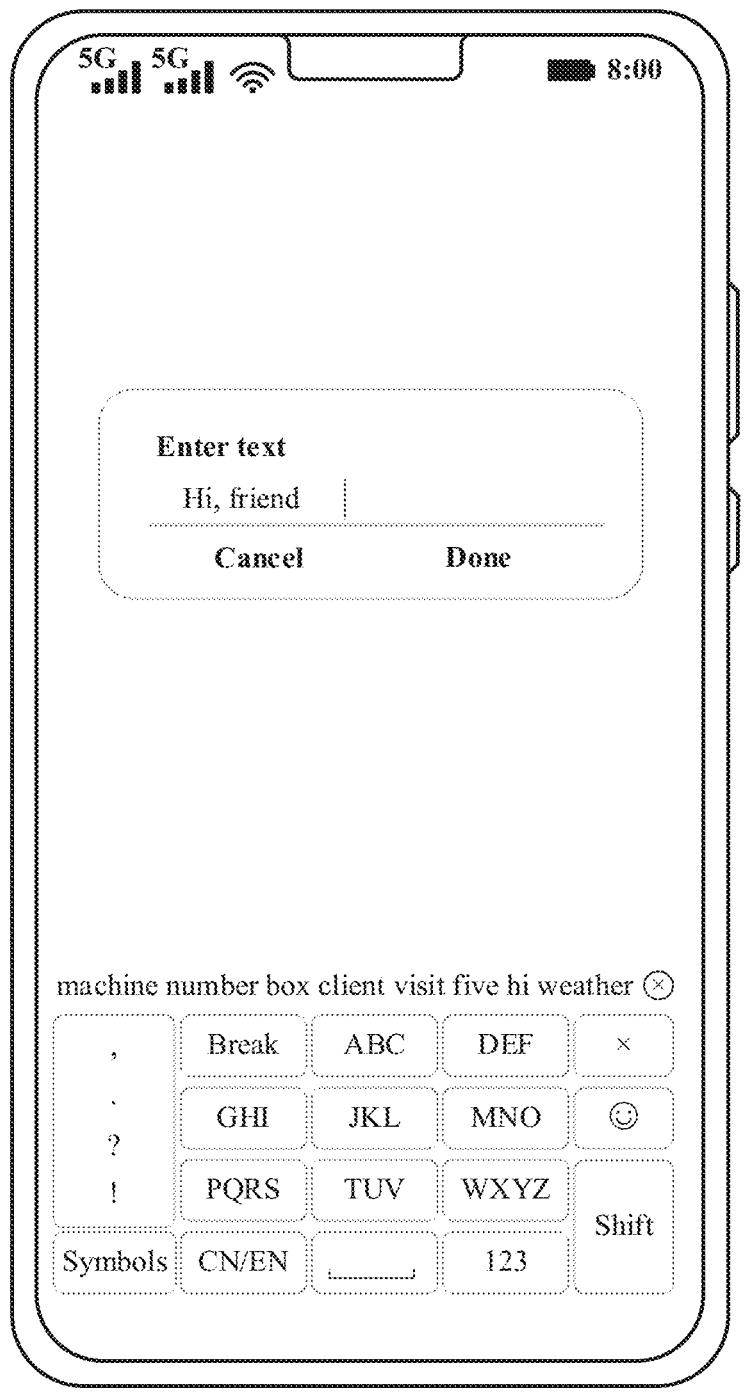

For example, FIG. 20A and FIG. 20B are a schematic diagram of a user interface on the mobile phone B. As shown in FIG. 20A, after the preemption of the mobile phone B succeeds, the content "Hi," in the edit box on the large-screen device may be synchronized to the edit box on the mobile phone B. The user may continue input in the edit box on the mobile phone B. For example, the user continues to input "friend" in the edit box on the mobile phone B. As shown in FIG. 20B. "Hi, friend" may be displayed in the edit box on the mobile phone B. Adaptively, "Hi, friend" in the edit box on the mobile phone B may be synchronously displayed in the edit box on the large-screen device.

It can be understood that in a process in which the mobile phone B assists the large-screen device with input, the mobile phone A may perform preemption again. A preemption process is similar to the foregoing process of the preemption of the mobile phone B. Details are not described herein again.

In a possible implementation, in a process in which the mobile phone A or the mobile phone B assists the large-screen device with input, the large-screen device may also perform preemption.

For example, when the mobile phone A is assisting the large-screen device with input, and "Hi," has been input in the edit box on the mobile phone A and the edit box on the large-screen device, a user wants to use the large-screen device for input.

Figure 21:
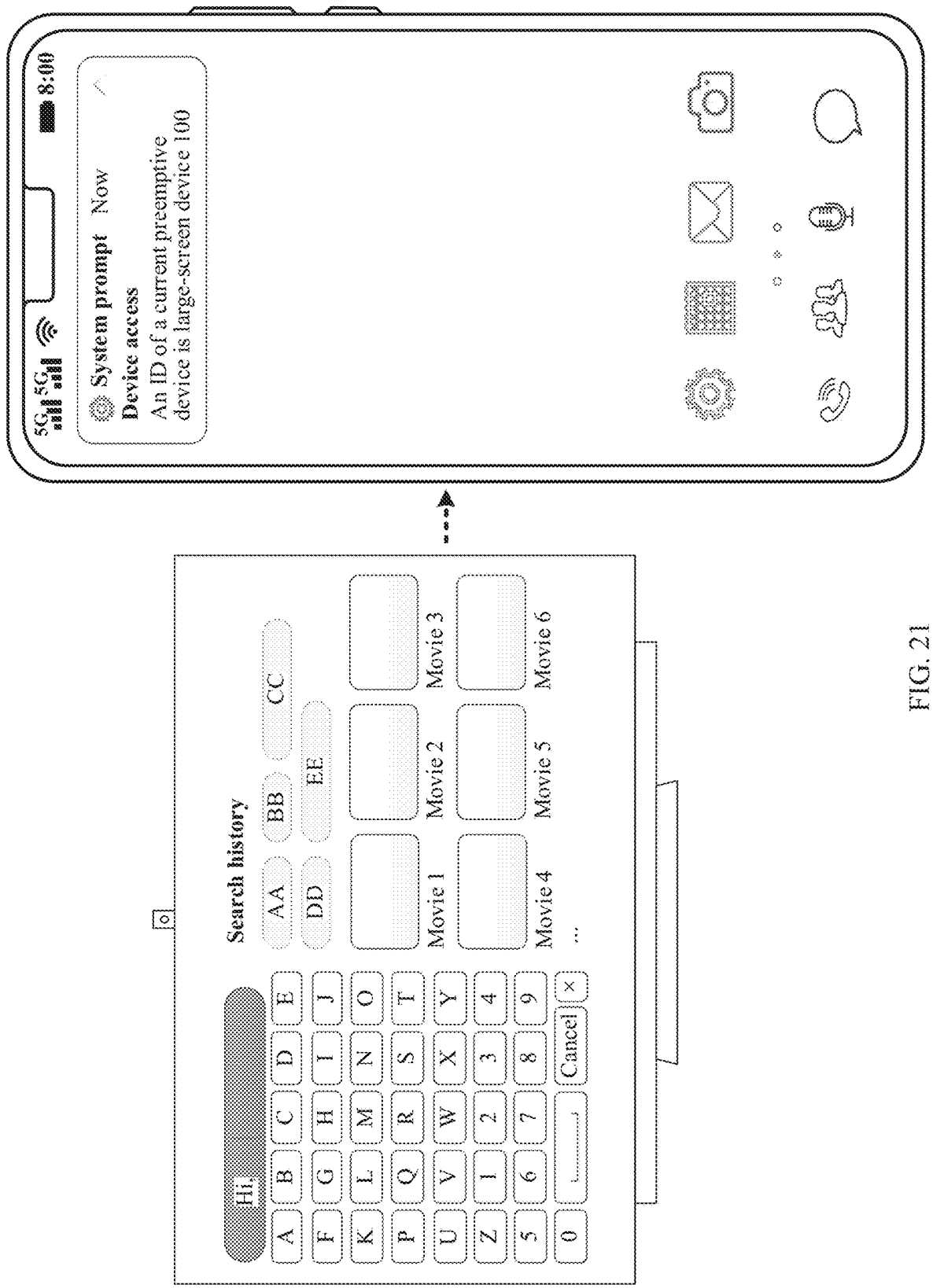
FIG. 21 is a schematic diagram of another user interface according to an embodiment of this application.

As shown in the left diagram of a user interface on the large-screen device in FIG. 21, the user may select the edit box on the large-screen device by using the remote control or the like. The large-screen device may broadcast, to the large-screen device, the mobile phone A, and the mobile phone B in the distributed network, that an ID of a current preemptive device is an ID of the large-screen device. After the mobile phone A and the mobile phone B receive the broadcast, a user interface as shown in the right diagram in FIG. 18 may be displayed on the mobile phone A or the mobile phone B. In a user interface as shown in the right diagram in FIG. 21, a prompt that the current preemptive device is the large-screen device may be displayed. In a possible implementation, a notification used to prompt that the current preemptive device is the large-screen device may alternatively not be displayed on the mobile phone A and the mobile phone B. This is not specifically limited in this embodiment of this application.

Further, the large-screen device, the mobile phone A, and the mobile phone B may determine the ID of the preemptive device. The mobile phone A and the mobile phone B each determine that the current preemptive device is not the mobile phone A or the mobile phone B, and the mobile phone A and the mobile phone B hide the local input method keyboards. The large-screen device determines that the current preemptive device is the large-screen device, and the large-screen device invokes the local input method keyboard. The user may continue input in the edit box on the large-screen device by using the remote control.

It should be noted that the user interface diagrams of auxiliary input of the mobile phone for the large-screen device are all examples for description. In a possible implementation, in an interface for auxiliary input of the mobile phone for the large-screen device, all or some of content on the large-screen device may be synchronized, so that a user using the mobile phone can learn about a status on the large-screen device based on the interface on the mobile phone.

Figure 22:
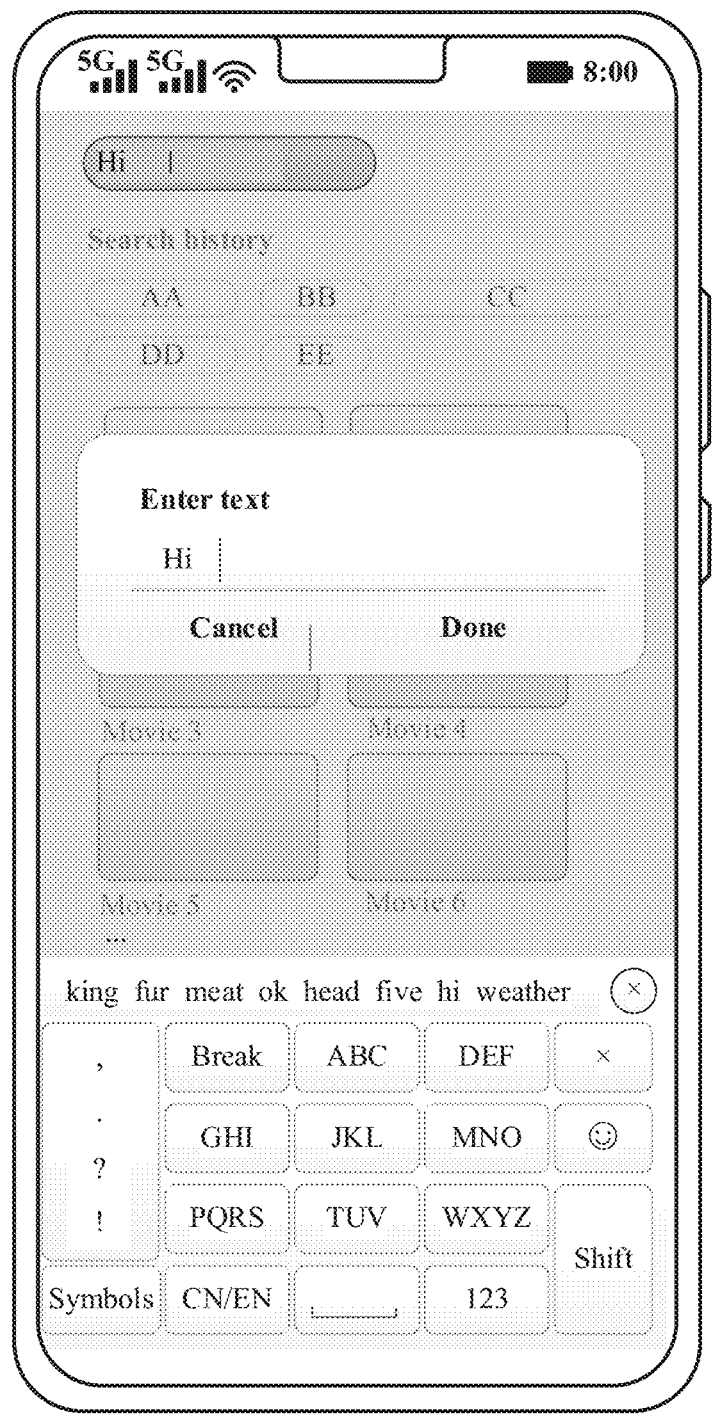
FIG. 22 is a schematic diagram of still another user interface according to an embodiment of this application.

For example, FIG. 22 shows a user interface on a mobile phone. As shown in FIG. 22, when using the mobile phone to assist the large-screen device with input, a user may project all or some of the content on the large-screen device to the mobile phone. For example, content in the edit box on the large-screen device is displayed on the mobile phone, and an edit box on the mobile phone is displayed in a layer above the content on the large-screen device. In this way, when using the edit box on the mobile phone for input, the user can synchronously see a status in the edit box on the large-screen device in the user interface, and the user does not need to look up at an input status on the large-screen device during auxiliary input.

It should be noted that in the foregoing embodiments, an example in which a user uses auxiliary input of a Chinese character for the large-screen device is used for description. In a possible implementation, a user may use auxiliary input of an English phrase or text in another form for the large-screen device. Specific content of auxiliary input is not limited in this embodiment of this application.

Figure 23:
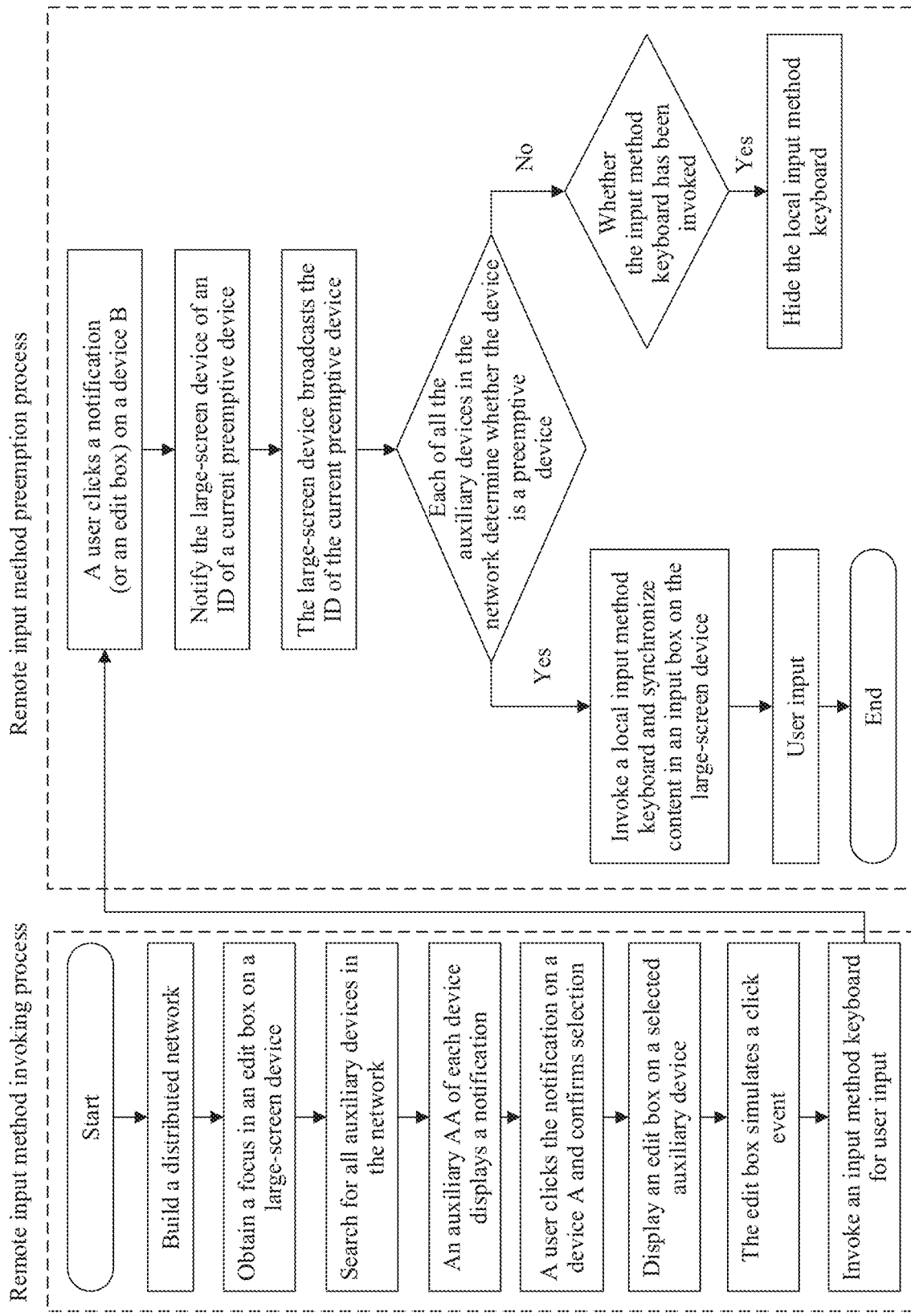
FIG. 23 is a schematic diagram of a specific procedure of communication between a mobile phone and a large-screen device according to an embodiment of this application.

Corresponding to the foregoing examples of frameworks and user interfaces, for example, FIG. 23 is a schematic diagram of a specific process in which the mobile phone assists the large-screen device with input according to an embodiment of this application.

As shown in FIG. 23, that the mobile phone assists the large-screen device with input may include: a remote input method invoking process and a remote input method preemption process.

For example, in the remote input method invoking process, a distributed network may be built. The large-screen device, two mobile phones (for example, the mobile phone A and the mobile phone B), a tablet, and the like may be connected to the distributed network.

A user may click the edit box on the large-screen device by using a device, for example, the remote control, so that a focus is obtained in the edit box on the large-screen device.

The large-screen device may search for all auxiliary devices that have an auxiliary AA in the distributed network. When an auxiliary device is found, the large-screen device is connected to the auxiliary AA of each auxiliary device and transmits a data channel interface to each auxiliary AA. The auxiliary AA of each auxiliary device displays a notification, and the notification is used to prompt a requirement of the large-screen device for auxiliary input. For example, the auxiliary device found by the large-screen device includes the mobile phone A and the mobile phone. Notifications may be displayed on the mobile phone A and the mobile phone B that wait for the user to select and confirm.

The user clicks the notification on the mobile phone A to confirm to use the mobile phone A to assist the large-screen device with input. An edit box may be displayed on the mobile phone A. and the edit box invokes an input method keyboard. The user may perform input in the edit box on the mobile phone A.

During input on the mobile phone A by the user, for some reasons, the user wants to switch to another auxiliary device, for example, the mobile phone B, for input, and enters the remote input method preemption process.

In the remote input method preemption process, the user clicks the notification (or an edit box) on the mobile phone B, and the auxiliary AA of the mobile phone B notifies the large-screen device that an ID of a current preemptive device is the ID of the mobile phone B. In addition, the large-screen device broadcasts the ID of the current preemptive device. Each of all the auxiliary devices (for example, the mobile phone A and the mobile phone B) in the distributed network determines, based on the ID of the preemptive device broadcast by the large-screen device, whether the auxiliary device is the current preemptive device.

For example, the mobile phone B determines that the current preemptive device is the mobile phone B, the mobile phone B invokes the local input method keyboard, and synchronizes the content in the edit box on the large-screen device to the edit box on the mobile phone B through the data channel interface. The user may perform input in the edit box on the mobile phone B. The mobile phone A determines that the current preemptive device is not the mobile phone A, and the mobile phone A may determine whether the input method keyboard is invoked. If the mobile phone A has invoked the input method keyboard, the mobile phone A may hide the local input method keyboard.

In this way, based on the foregoing methods in embodiments of this application, any auxiliary device in the distributed network may initiate convenient preemption at any time, and after the preemption succeeds, may assist the large-screen device with input.

Figure 24:
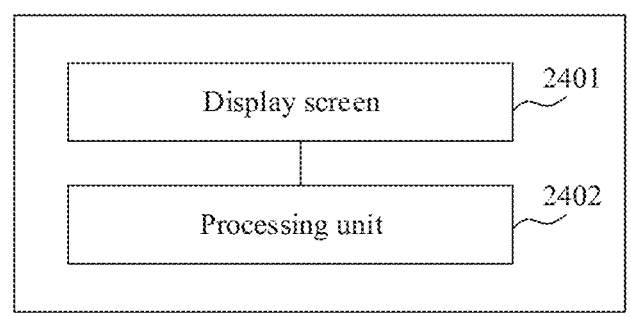
FIG. 24 is a schematic diagram of a structure of a device according to an embodiment of this application.

When each functional module is obtained by division based on each corresponding function, FIG. 24 is a schematic diagram of a possible structure of a first device, a second device, or a third device according to an embodiment of this application. The first device, the second device, or the third device includes a display screen 2401 and a processing unit 2402.

The display screen 2401 is configured to support the first device, the second device, or the third device to perform steps for display in the foregoing embodiments, or another process in the technology described in embodiments of this application. The display screen 2401 may be a touchscreen, other hardware, or a combination of hardware and software.

The processing unit 2402 is configured to support the first device, the second device, or the third device to perform steps for processing in the foregoing method embodiments, or another process in the technology described in embodiments of this application.

All related content of the steps in the foregoing method embodiments may be cited in function descriptions of the corresponding functional modules. Details are not described herein again.

Clearly, the electronic device includes but is not limited to the units and modules listed above. In addition, functions that the foregoing functional modules can specifically implement include but are not limited to the functions corresponding to the steps in the methods in the foregoing examples. For detailed descriptions of another unit of the electronic device, refer to detailed descriptions of a step corresponding to the unit in the methods. Details are not described herein again in this embodiment of this application.

When an integrated unit is used, the first device, the second device, or the third device in the foregoing embodiments may include a processing module, a storage module, and a display screen. The processing module is configured to control and manage an action of the first device, the second device, or the third device. The display screen is configured to display content based on an indication of the processing module. The storage module is configured to store program code and data on the first device, the second device, or the third device. Further, the first device, the second device, or the third device may further include an input module and a communications module. The communications module is configured to support the first device, the second device, or the third device to communicate with another network entity, to implement functions such as calling, data exchange, and Internet access of the first device, the second device, or the third device.

The processing module may be a processor or a controller. The communications module may be a transceiver, an RF circuit, a communications interface, or the like. The storage module may be a memory. The display module may be a screen or a display. The input module may be a touchscreen, a voice input apparatus, a fingerprint sensor, or the like.

The communications module may include an RF circuit, and may further include a wireless fidelity (wireless fidelity, Wi-Fi) module, a near field communication (near field communication. NFC) module, and a Bluetooth module. The communications modules such as the RF circuit, the NFC module, the Wi-Fi module, and the Bluetooth module may be collectively referred to as a communications interface. The processor, the RF circuit, the display screen, and the memory may be coupled to each other through a bus.

Figure 25:
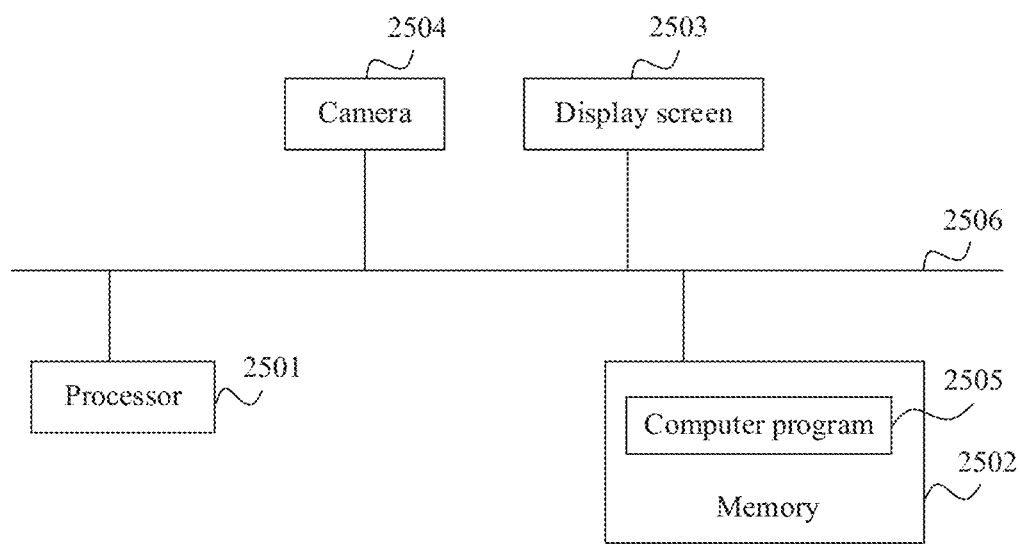
FIG. 25 is a schematic diagram of a structure of still another device according to an embodiment of this application.

FIG. 25 is a schematic diagram of still another possible structure of a first device, a second device, or a third device according to an embodiment of this application. The first device, the second device, or the third device includes one or more processors 2501, a memory 2502, a camera 2504, and a display screen 2503. The components may communicate with each other through one or more communications buses 2506.

One or more computer programs 2505 are stored in the memory 2502, and are configured to be executed by the one or more processors 2501. The one or more computer programs 2505 include instructions, and the instructions are used to perform any one of the steps in the foregoing display method. Clearly, the electronic device includes but is not limited to the components listed above. For example, the electronic device may further include a radio frequency circuit, a positioning apparatus, a sensor, and the like.

This application further provides the following embodiments. It should be noted that serial numbers of the following embodiments do not necessarily follow a sequence of serial numbers of the foregoing embodiments.

Embodiment 21: A device communication method is applied to a system including a first device, a second device, and a third device, and the method includes:

The first device displays a first interface including a first edit box, the first device determines, in response to an operation of selecting the first edit box, that the second device and the third device join a distributed network;

the first device displays a second interface, where the second interface includes a first option corresponding to the second device and a second option corresponding to the third device;

the first device sends an indication message to the second device in response to an operation of triggering the first option;

the second device displays a third interface based on the indication message, where the third interface includes a second edit box; and if there is an editing status in the second edit box, the editing status is synchronized to the first edit box.

Embodiment 22: According to the method described in Embodiment 21, the second device includes an interface service, and the interface service is used for synchronization of the editing status between the first device and the second device.

Embodiment 23: According to the method described in Embodiment 21 or 22, the editing status includes one or more of the following: textual content, a cursor, or highlighting of the textual content.

Embodiment 24: According to the method described in any one of Embodiments 21 to 23, that the second device displays the third interface based on the indication message includes:

The second device displays a notification interface in response to the indication message, where the notification interface includes a third option for confirming auxiliary input; and the second device displays the third interface in response to an operation of triggering of the third option.

Embodiment 25: According to the method described in any one of Embodiments 21 to 24, the third interface further includes all or some of content in the first interface.

Embodiment 26: According to the method described in Embodiment 25, the second edit box and all or some of the content in the first interface are displayed in layers, and the second edit box is displayed in a layer above all or some of the content in the first interface.

Embodiment 27: According to the method described in any one of Embodiments 21 to 26, after the second device displays the third interface based on the indication message, the method further includes:

The second device displays a virtual keyboard in response to triggering the second edit box; and the second device displays the editing status in the second edit box based on an input operation received on the virtual keyboard and/or in the second edit box.

Embodiment 28: According to the method described in any one of Embodiments 21 to 27, the first device includes any one of the following: a television, a large-screen device, or a wearable device; and the second device or the third device includes any one of the following; a mobile phone, a tablet, or a wearable device.

Embodiment 29: A device communication method is applied to a system including a first device, a second device, and a third device, and the method includes:

The first device displays a first interface including a first edit box;

the first device determines, in response to an operation of selecting the first edit box, that the second device and the third device join a distributed network;

the first device determines that the second device is a device for auxiliary input;

the first device sends an indication message to the second device;

the second device displays a third interface based on the indication message, where the third interface includes a second edit box; and if there is an editing status in the second edit box, the editing status is synchronized to the first edit box.

Embodiment 210: A device communication method is applied to a system including a first device, a second device, and a third device, and the method includes:

The second device displays a fourth interface including an option of the first device;

the second device sends an indication message to the first device in response to an operation of selecting the option of the first device;

the first device displays a first interface including a first edit box;

the second device displays a third interface, where the third interface includes a second edit box; and if there is an editing status in the second edit box, the editing status is synchronized to the first edit box.

Embodiment 211: A device communication method is applied to a first device, and the method includes:

The first device displays a first interface including a first edit box;

the first device determines, in response to an operation of selecting the first edit box, that a second device and a third device join a distributed network;

the first device displays a second interface, where the second interface includes a first option corresponding to the second device and a second option corresponding to the third device;

the first device sends an indication message to the second device in response to an operation of triggering the first option, where the indication message is used to indicate the second device to display a third interface, and the third interface includes a second edit box; and if there is an editing status in the second edit box, the editing status is synchronized to the first edit box.

Embodiment 212: A device communication method is applied to a second device, and the method includes:

The second device displays a fourth interface including an option of a first device;

the second device sends an indication message to the first device in response to an operation of selecting the option of the first device, where the indication message is used to indicate the first device to display a first interface including a first edit box;

the second device displays a third interface, where the third interface includes a second edit box; and if there is an editing status in the second edit box, the editing status is synchronized to the first edit box.

Embodiment 213: A device communication system includes a first device, a second device, and a third device, where the first device is configured to perform steps performed by the first device according to any one of Embodiments 21 to 29 and 210 to 212, the second device is configured to perform steps performed by the second device according to any one of Embodiments 21 to 29 and 210 to 212, and the third device is configured to perform steps performed by the third device according to any one of Embodiments 21 to 29 and 210 to 212.

Embodiment 214: A first device includes at least one memory and at least one processor, where
the memory is configured to store program instructions; and
the processor is configured to invoke the program instructions in the memory, to enable the first device to perform steps performed by the first device according to any one of Embodiments 21 to 29 and 210 to 212.

Embodiment 215: A second device includes at least one memory and at least one processor, where
the memory is configured to store program instructions; and
the processor is configured to invoke the program instructions in the memory, to enable the second device to perform steps performed by the second device according to any one of Embodiments 21 to 29 and 210 to 212.

Embodiment 216: A computer-readable storage medium stores a computer program, and when the computer program is executed by a processor of a first device, steps performed by the first device according to any one of Embodiments 21 to 29 and 210 to 212 are implemented; when the computer program is executed by a processor of a second device, steps performed by the second device according to any one of Embodiments 21 to 29 and 210 to 212 are implemented; or when the computer program is executed by a processor of a third device, steps performed by the third device according to any one of Embodiments 21 to 29 and 210 to 212 are implemented.

For specific implementations of Embodiments 21 to 29 and Embodiment 210 to Embodiment 216, refer to the descriptions of FIG. 26 to FIG. 37.

In a possible implementation of using a mobile phone to assist a large-screen device with input, when the large-screen device discovers an auxiliary device having an auxiliary input function in the distributed network, the large-screen device may send a broadcast to all auxiliary devices having the auxiliary input function in the distributed network, to notify all the auxiliary devices of a requirement of the large-screen device for auxiliary input.

However, it may be that only one or some of the auxiliary devices assists/assist the large-screen device with input, and the broadcast sent by the large-screen device to all the auxiliary devices in the distributed network causes interference on another auxiliary device in the distributed network that does not assist the large-screen device with input.

In view of this, an embodiment of this application provides a device communication method. A user may select a target auxiliary device on a large-screen device, to send a notification to the target auxiliary device and not send a notification to another auxiliary device, thereby avoiding interference on the another device. Alternatively, a user may select a target auxiliary device on a large-screen device, to establish a communication connection to the target auxiliary device and display an edit box, used for assisting the large-screen device with input, on the target auxiliary device, and in this process, the target auxiliary device may not display a notification interface, and the user does not need to trigger a notification.

Figure 26:
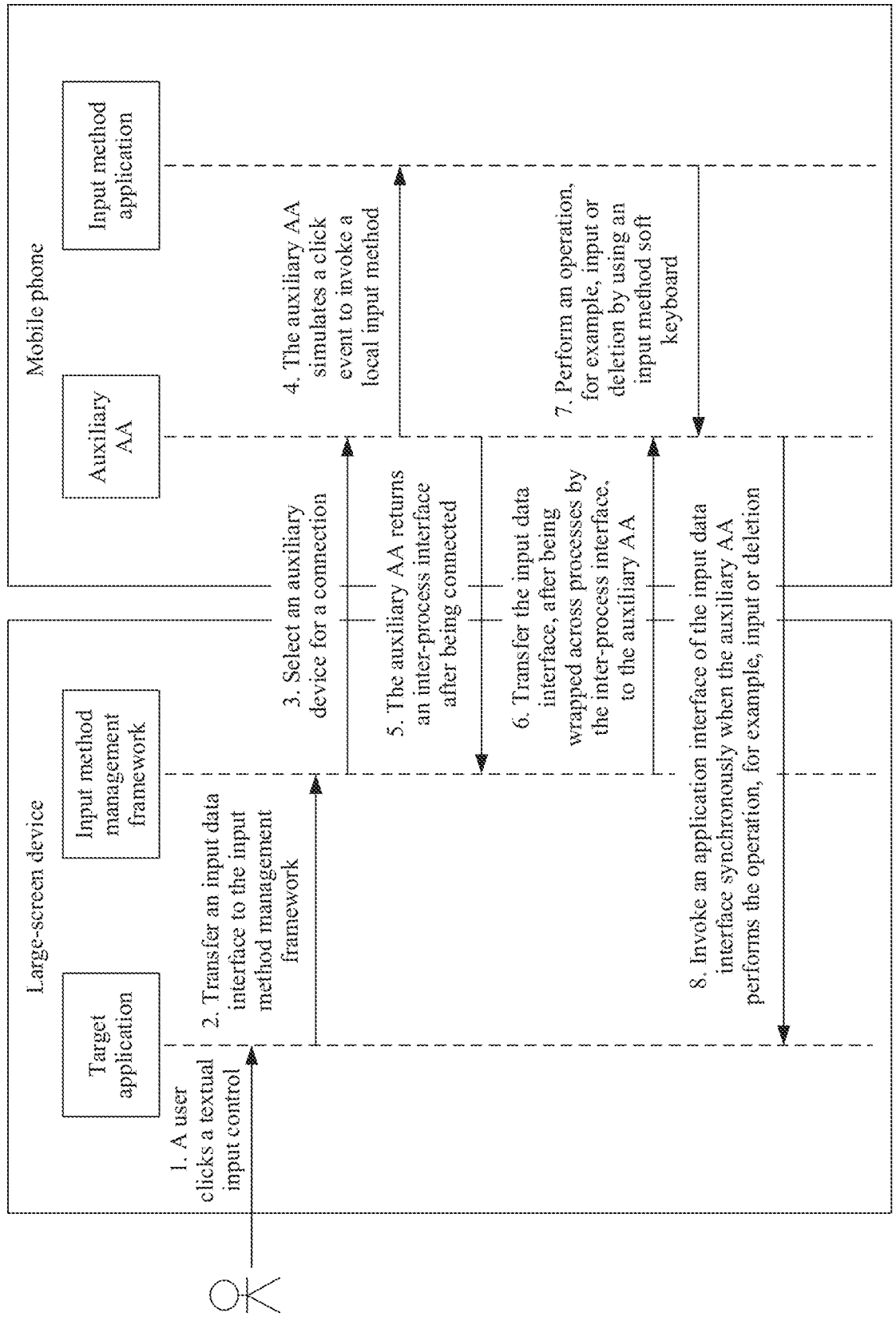
FIG. 26 is a schematic diagram of a system architecture for another device communication method according to an embodiment of this application.

For example, FIG. 26 is a schematic diagram of a specific system architecture for a device communication method according to an embodiment of this application.

A user clicks an edit box provided by an application on a large-screen device by using a remote control, and the large-screen device may search for a device (for example, a mobile phone with an auxiliary AA) having an auxiliary input capability in a distributed network. After the large-screen device discovers the device having the auxiliary input capability, an interface including an identifier of the device having the auxiliary input capability may be displayed on the large-screen device. The identifier of the device having the auxiliary input capability may be a device number, a user name, a nickname, or the like of the device having the auxiliary input capability.

If the user selects a target device in the device having the auxiliary input capability, where for example, the target device is a mobile phone, the large-screen device may transfer an input data interface to an input method management framework IMF of the large-screen device. The input method management framework of the large-screen device may establish a connection to the auxiliary AA of the mobile phone. The auxiliary AA of the mobile phone may simulate a click event to invoke a local input method on the mobile phone, and the mobile phone includes an input window of the edit box. Subsequently, the user may input content in the edit box by using the local input method on the mobile phone. The auxiliary AA of the mobile phone may return an inter-process interface to the input method management framework of the large-screen device. The input method management framework of the large-screen device may transfer the input data interface of the large-screen device, after being wrapped across processes by the inter-process interface, to the auxiliary AA of the mobile phone. Subsequently, the auxiliary AA of the mobile phone may synchronize content in the edit box on the mobile phone to the large-screen device based on the input data interface of the large-screen device.

For example, when the user performs an operation of, for example, textual input, text deletion, highlighting a selected text, or moving a cursor in the edit box on the mobile phone, the auxiliary AA of the mobile phone may invoke the input data interface of the large-screen device to synchronize the content in the edit box on the mobile phone to the edit box on the large-screen device.

It can be understood that, if the large-screen device does not have a remote input capability, or the large-screen device has not discovered an auxiliary device in the distributed network, the large-screen device may perform input by using a local input method on the large-screen device.

It should be noted that FIG. 26 is a possible implementation of this embodiment of this application. In another possible implementation, a user may select, by using the remote control, a virtual keyboard in an edit box provided by an application on the large-screen device to trigger a subsequent process of auxiliary input for the large-screen device, or a user may trigger, on a mobile phone, a process of auxiliary input for the large-screen device. This is not specifically limited in this embodiment of this application.

With reference to the descriptions above, a user interface for interaction between a large-screen device and a mobile phone is described below as an example.

Figure 27:
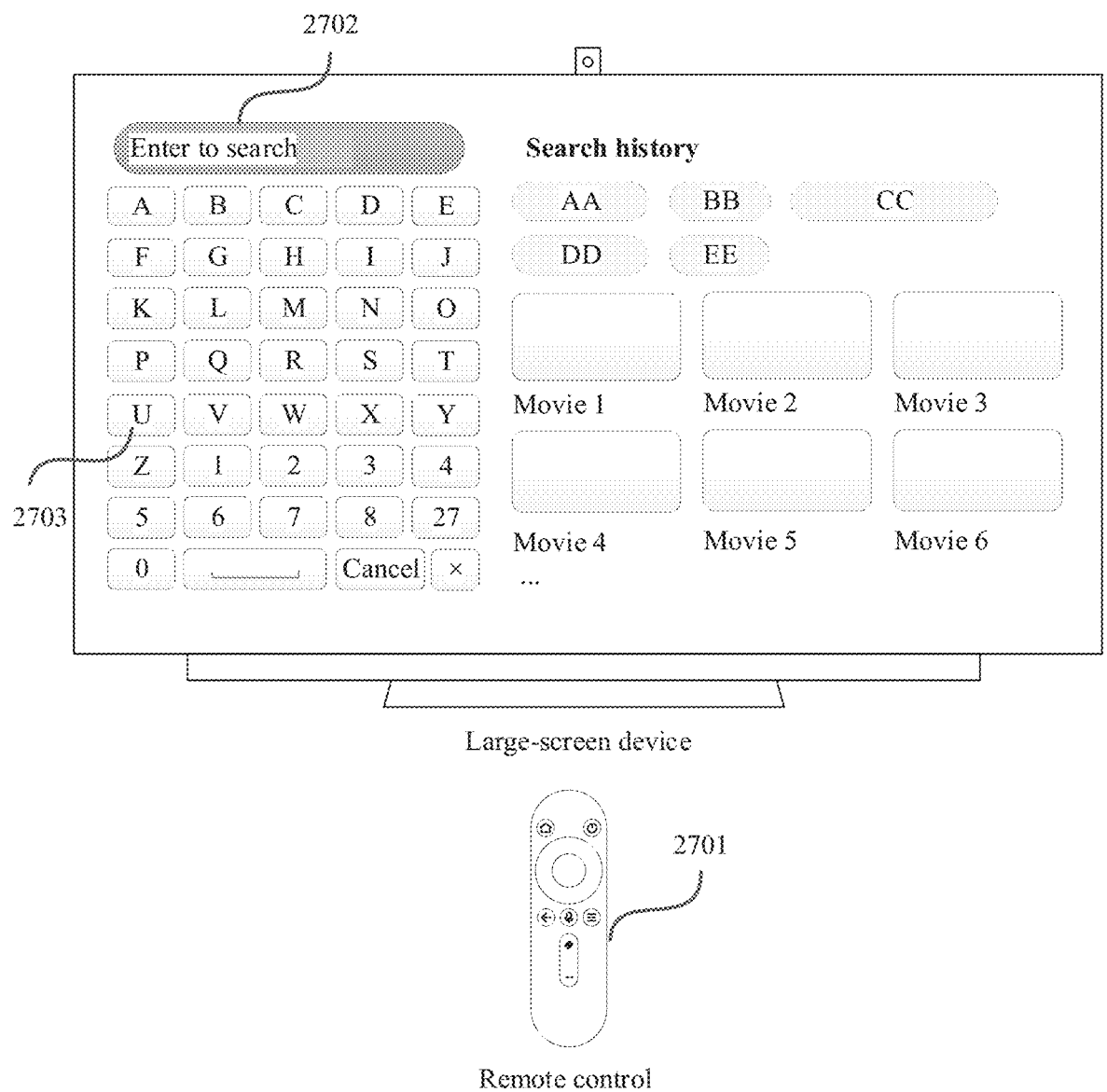
FIG. 27 is a schematic diagram of a user interface on a large-screen device according to an embodiment of this application.
Figure 28:
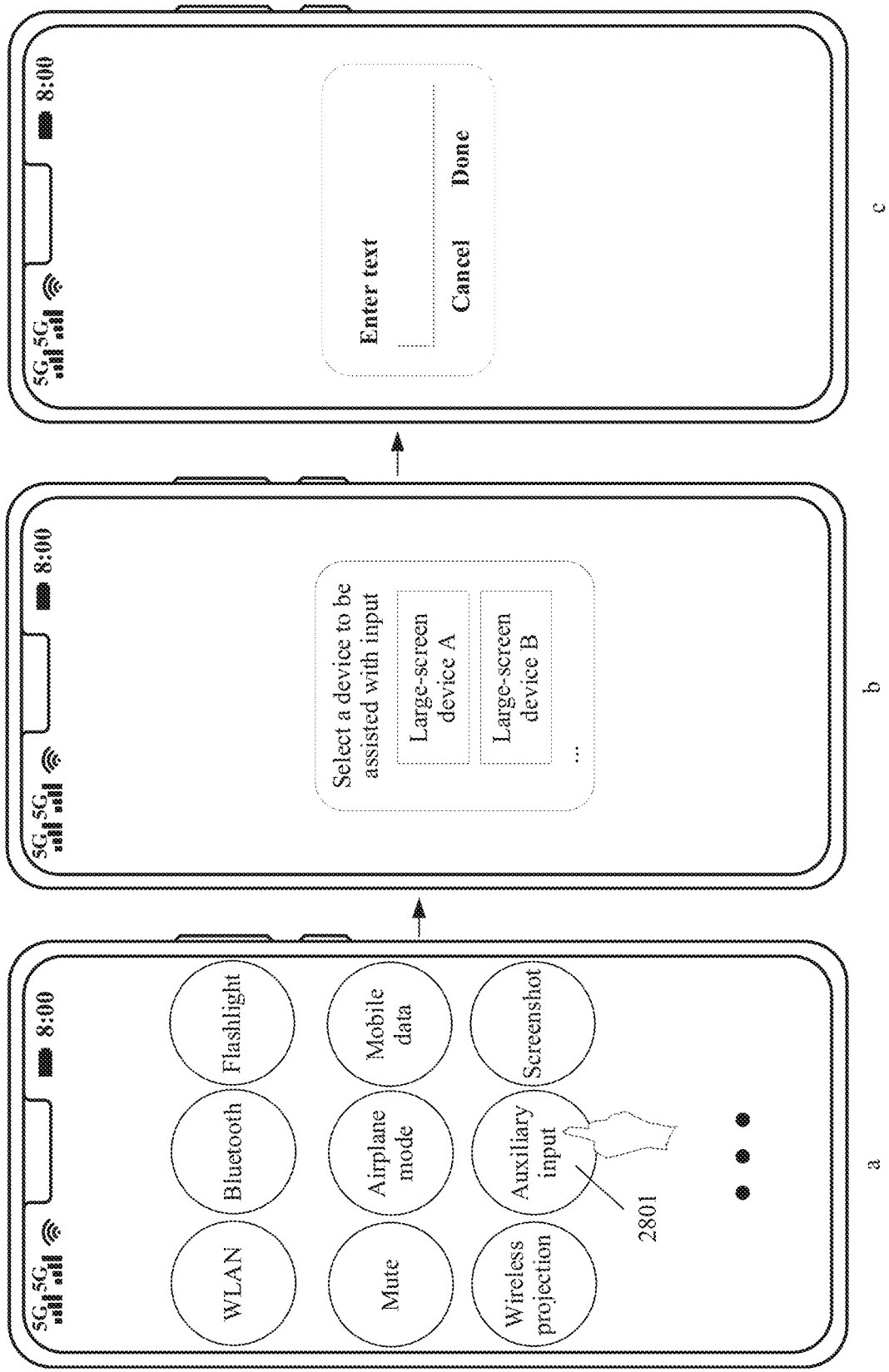
FIG. 28 is a schematic diagram of a user interface on a mobile phone according to an embodiment of this application.

For example, FIG. 27 and FIG. 28 are schematic diagrams of a user interface in which a user triggers auxiliary input.

FIG. 27 is a diagram of a user interface on a large-screen device. As shown in FIG. 27, the user may select an edit box 2702 on the large-screen device by using a remote control 2701, and may trigger a subsequent process in which a mobile phone assists the large-screen device with input in this embodiment of this application. Alternatively, the user may select any content 2702 in a virtual keyboard on the large-screen device by using a remote control 2701, and may trigger a subsequent process in which a mobile phone assists the large-screen device with input in this embodiment of this application. A specific manner of the mobile phone to assist the large-screen device with input is described in following embodiments, and details are not described herein.

It should be noted that FIG. 27 is a schematic diagram of setting an edit box in the user interface on the large-screen device. In a possible implementation, the user interface on the large-screen device may include a plurality of edit boxes, and a user may trigger any of the edit boxes to trigger a subsequent process in which the mobile phone assists the large-screen device with input in this embodiment of this application. This is not specifically limited in this embodiment of this application.

FIG. 28 is a diagram of a user interface on a mobile phone. For example, a user may display the user interface as shown in a in FIG. 28 in a manner of, for example, pulling down a home screen of the mobile phone. In the user interface as shown in a in FIG. 28, one or more of the following functions of the mobile phone may be included: WLAN, Bluetooth, a flashlight, sound off, an airplane mode, mobile data, wireless projection, taking a screenshot, or auxiliary input 2801. The auxiliary input 2801 may be a function of auxiliary input of the mobile phone for a large-screen device in this embodiment of this application.

In a possible implementation, after the user clicks the auxiliary input 2801, the mobile phone may search for a device, for example, a large-screen device in a same distributed network, obtain a search box on the large-screen device, and establish a communication connection to the large-screen device. The mobile phone may further display a user interface as shown in c in FIG. 28. In the user interface as shown in c in FIG. 28, an edit box used to assist the large-screen device with input may be displayed, and the user may assist the large-screen device with input based on the edit box.

In a possible implementation, if the mobile phone discovers that there are a plurality of devices such as large-screen devices in the same distributed network, the mobile phone may alternatively display a user interface as shown in b in FIG. 28. In the user interface as shown in b in FIG. 28, identifiers of the plurality of large-screen devices may be displayed, and the identifiers of the large-screen devices may be device numbers, user names, nicknames, or the like of the large-screen devices. The user may select, in the user interface as shown in b in FIG. 28, a large-screen device that needs auxiliary input (for example, by clicking a large-screen device A or a large-screen device B), and enter the user interface as shown in c in FIG. 28. This is not specifically limited in this embodiment of this application. After the user triggers large-screen device input in any one of the foregoing manners, for example, FIG. 29 to FIG. 34 are schematic diagrams of a user interface in which a mobile phone assists a large-screen device with input.

Figure 29:
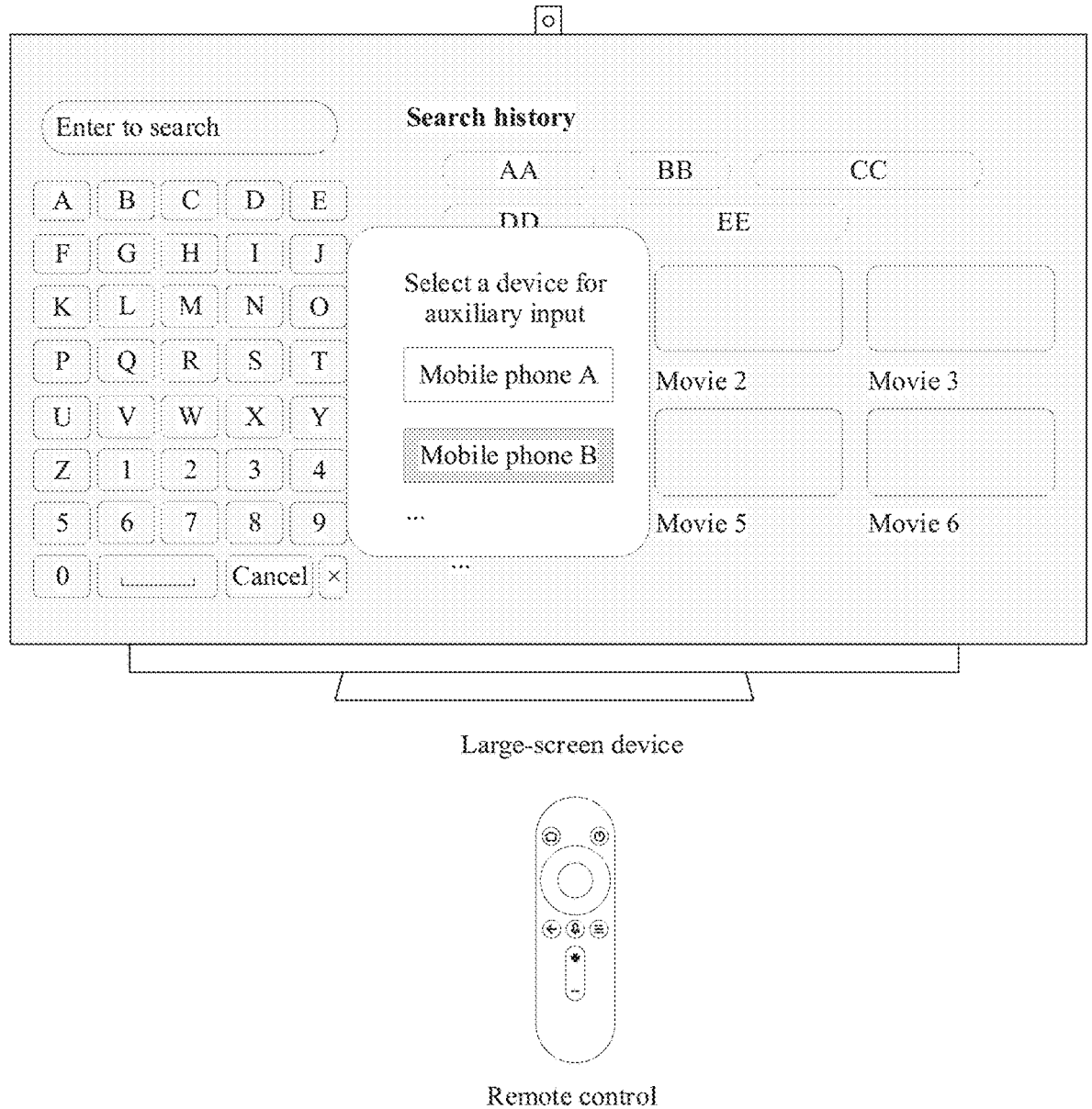
FIG. 29 is a schematic diagram of a user interface on a large-screen device according to an embodiment of this application.

FIG. 29 is a diagram of a user interface on a large-screen device. As shown in FIG. 29, a user may trigger, in a manner corresponding to FIG. 27, to enter an auxiliary input scenario. The large-screen device may search for an auxiliary device having an auxiliary input capability in a distributed network, and display discovered auxiliary devices a "mobile phone A" and a "mobile phone B" on the large-screen device. It can be understood that identifier of the auxiliary devices may be displayed on the large-screen device in any possible form, for example, using a list, a picture, or a number.

The user may select the "mobile phone B" on the large-screen device by using a device, for example, a remote control, and subsequently, the large-screen device may interact with the mobile phone B to use the mobile phone B to assist the large-screen device with input.

In a possible implementation, the large-screen device may alternatively automatically determine a device used for auxiliary input.

For example, if the large-screen device discovers that there is one mobile phone in the distributed network, the large-screen device may automatically select the mobile phone to be the device for auxiliary input and not display the user interface as shown in FIG. 29. Optionally, if the large-screen device subsequently discovers another mobile phone, other than the mobile phone, that is connected to the distributed network, the large-screen device may display the user interface as shown in FIG. 29.

For example, if the large-screen device discovers that there are a plurality of mobile phones in the distributed network, and there is a mobile phone that is set by the user to be used for auxiliary input by default in the plurality of mobile phones, the large-screen device may automatically select the mobile phone used for auxiliary input by default as the device for auxiliary input and not display the user interface as shown in FIG. 29.

For example, if the large-screen device discovers that there are a plurality of mobile phones in the distributed network, and there is a mobile phone that is selected by the user for auxiliary input in the plurality of mobile phones when the user uses auxiliary input last time, the large-screen device may automatically select the mobile phone selected by the user for auxiliary input when the user uses auxiliary input last time as the device for auxiliary input and not display the user interface as shown in FIG. 29.

For example, if the large-screen device discovers that there are a plurality of mobile phones in the distributed network, the large-screen device obtains, in the plurality of mobile phones, a mobile phone most frequently selected by the user for auxiliary input, and the large-screen device may automatically select the mobile phone most frequently selected by the user for auxiliary input as the device for auxiliary input and not display the user interface as shown in FIG. 29.

For example, if the large-screen device discovers that there are a plurality of mobile phones in the distributed network, and there is a mobile phone that has a user account the same as a user account used for logging in on the large-screen device in the plurality of mobile phones, the large-screen device may automatically select the mobile phone that has the user account the same as the user account used for logging in on the large-screen device as the device for auxiliary input and not display the user interface as shown in FIG. 29.

In other words, the user interface on the large-screen device shown in FIG. 29 is not necessary, and the user interface as shown in FIG. 29 may not be displayed. A specific form of the user interface shown in FIG. 29 and a manner of triggering display of the user interface shown in FIG. 29 are not limited in this embodiment of this application.

For example, a user selects, on the large-screen device, the "mobile phone B" as the device for auxiliary input by using a device, for example, the remote control. After the user selects the mobile phone B on the large-screen device, a notification may be displayed on the mobile phone B to prompt the user that the large-screen device requests auxiliary input.

Figure 30A:
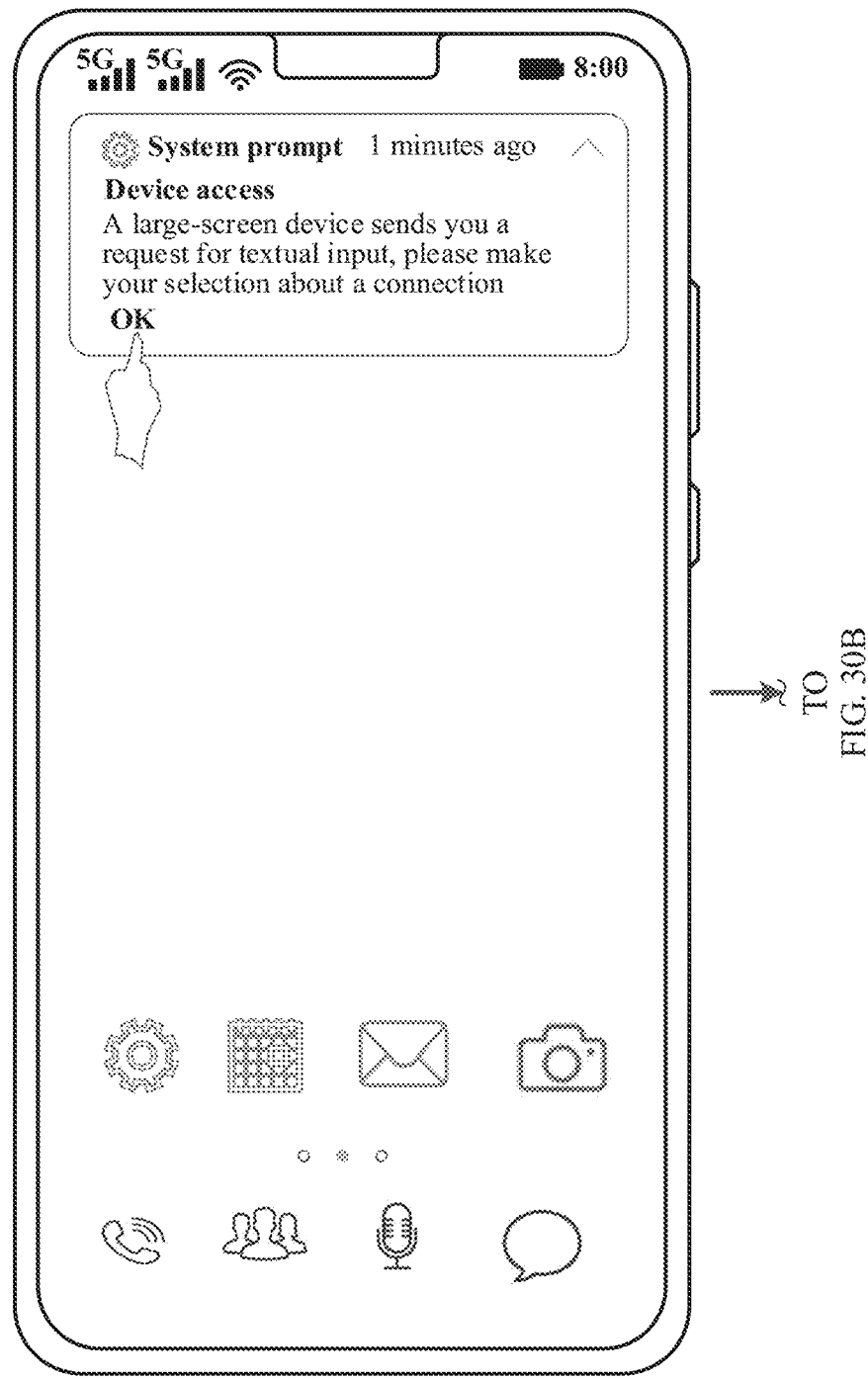
FIG. 30A to FIG. 30C are a schematic diagram of another user interface on a mobile phone according to an embodiment of this application.
Figure 30B:
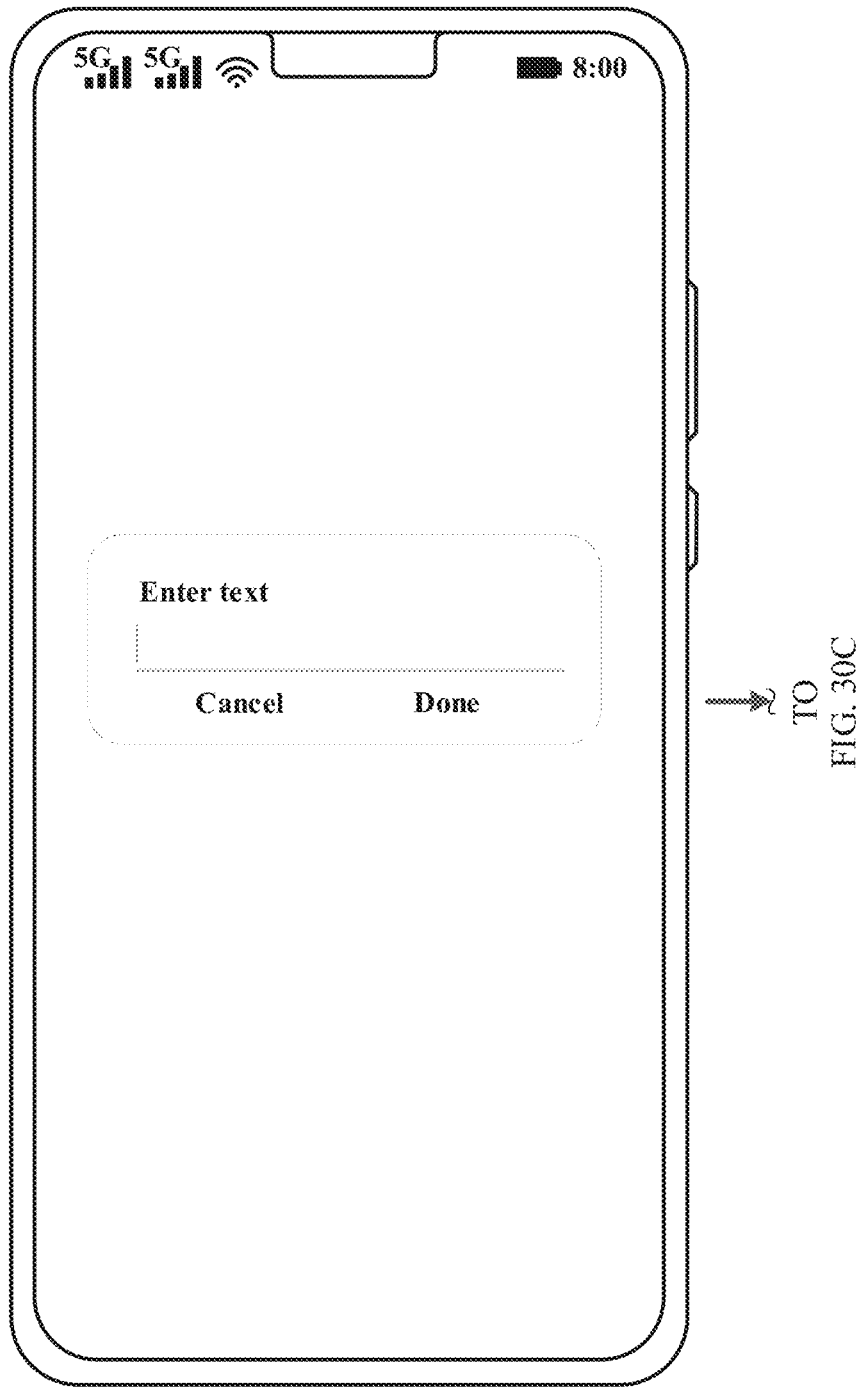
Figure 30C:
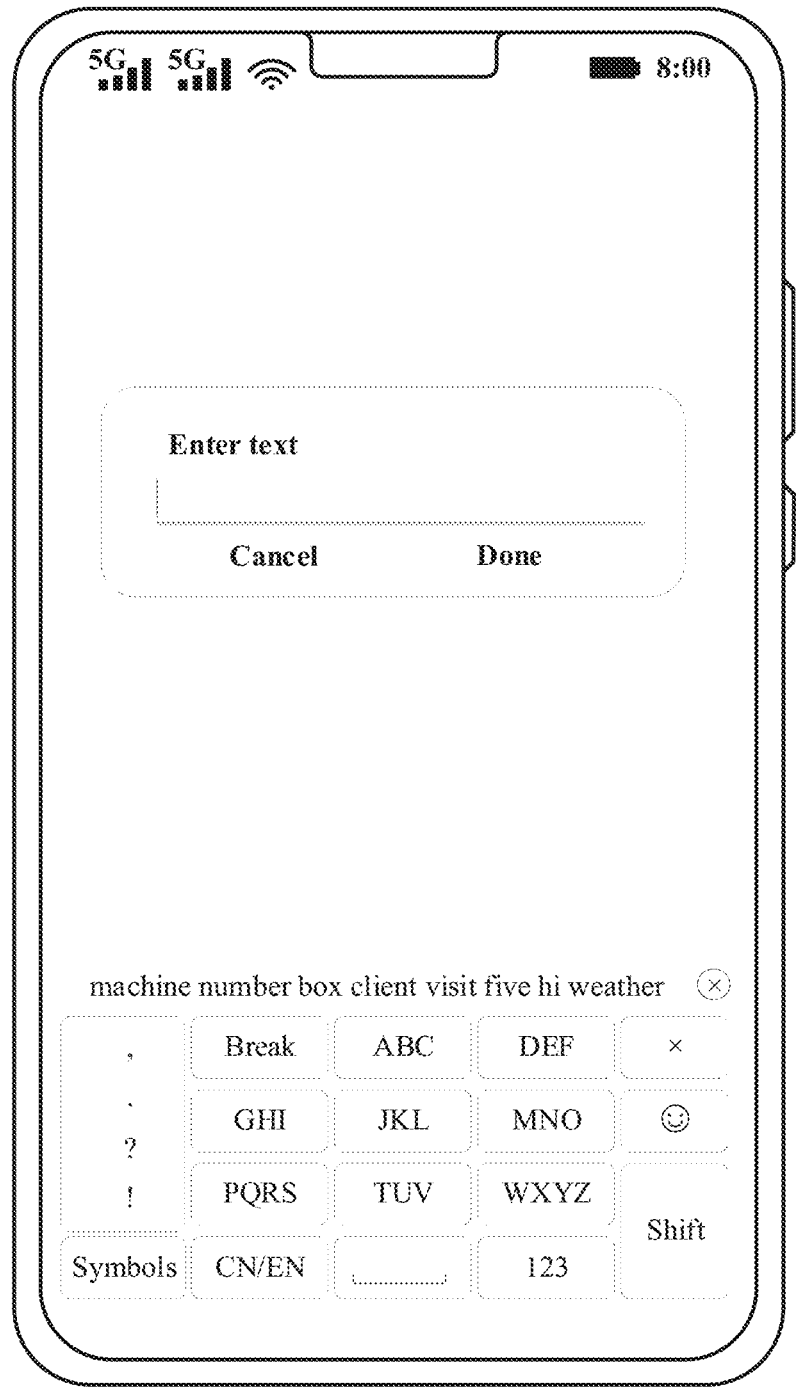

For example, as shown in a user interface in FIG. 30A, the notification used to prompt the request of the large-screen device for auxiliary input may be displayed on the mobile phone B. The user may trigger the notification on the mobile phone B to confirm to assist the large-screen device with input. Further, as shown in a user interface in FIG. 30B, an edit box used to assist the large-screen device with input may be displayed on the mobile phone B. Further, the user may trigger, for example, by clicking, the edit box as shown in FIG. 30B. The mobile phone B may display a user interface as shown in FIG. 30C, and the user interface may display a virtual keyboard (also referred to as a soft keyboard) on the mobile phone. The user may subsequently use the virtual keyboard on the mobile phone B to assist the large-screen device with input.

Figure 31:
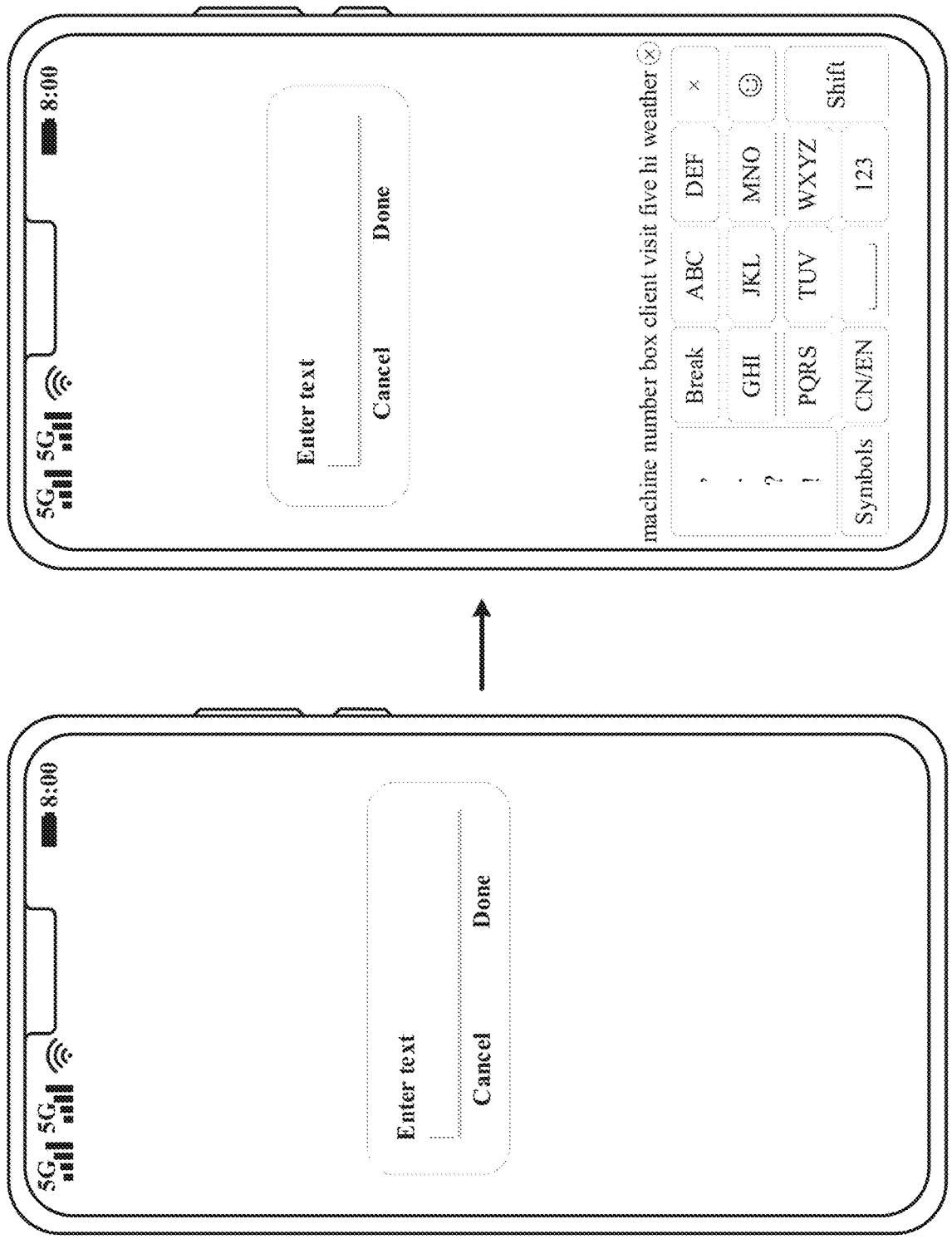
FIG. 31 is a schematic diagram of another user interface on a mobile phone according to an embodiment of this application.

In another possible implementation, after the user selects the mobile phone B on the large-screen device, the mobile phone B may not receive a notification, but an edit box as shown in the left diagram in FIG. 31 that is used to assist the large-screen device with input is displayed. Further, the user may trigger, for example, by clicking, the edit box as shown in the left diagram in FIG. 31. The mobile phone B may display a user interface as shown in the right diagram in FIG. 31, and the user interface may display a virtual keyboard (also referred to as a soft keyboard) on the mobile phone. The user may subsequently use the virtual keyboard on the mobile phone B to assist the large-screen device with input.

It can be understood that the user does not select the "mobile phone A" on the large-screen device. Therefore, the large-screen device may not interact with the mobile phone A, and does not disturb a user using the mobile phone A.

It should be noted that, in this embodiment of this application, if auxiliary input for the large-screen device is triggered in the manner corresponding to FIG. 28, the user interface diagrams as shown in FIG. 29 to FIG. 31 are omitted. In addition, during auxiliary input, another mobile phone, other than a mobile phone that triggers auxiliary input for the large-screen device, may be unaware of the input, causing no disturbance to a user using the another mobile phone.

Figure 32:
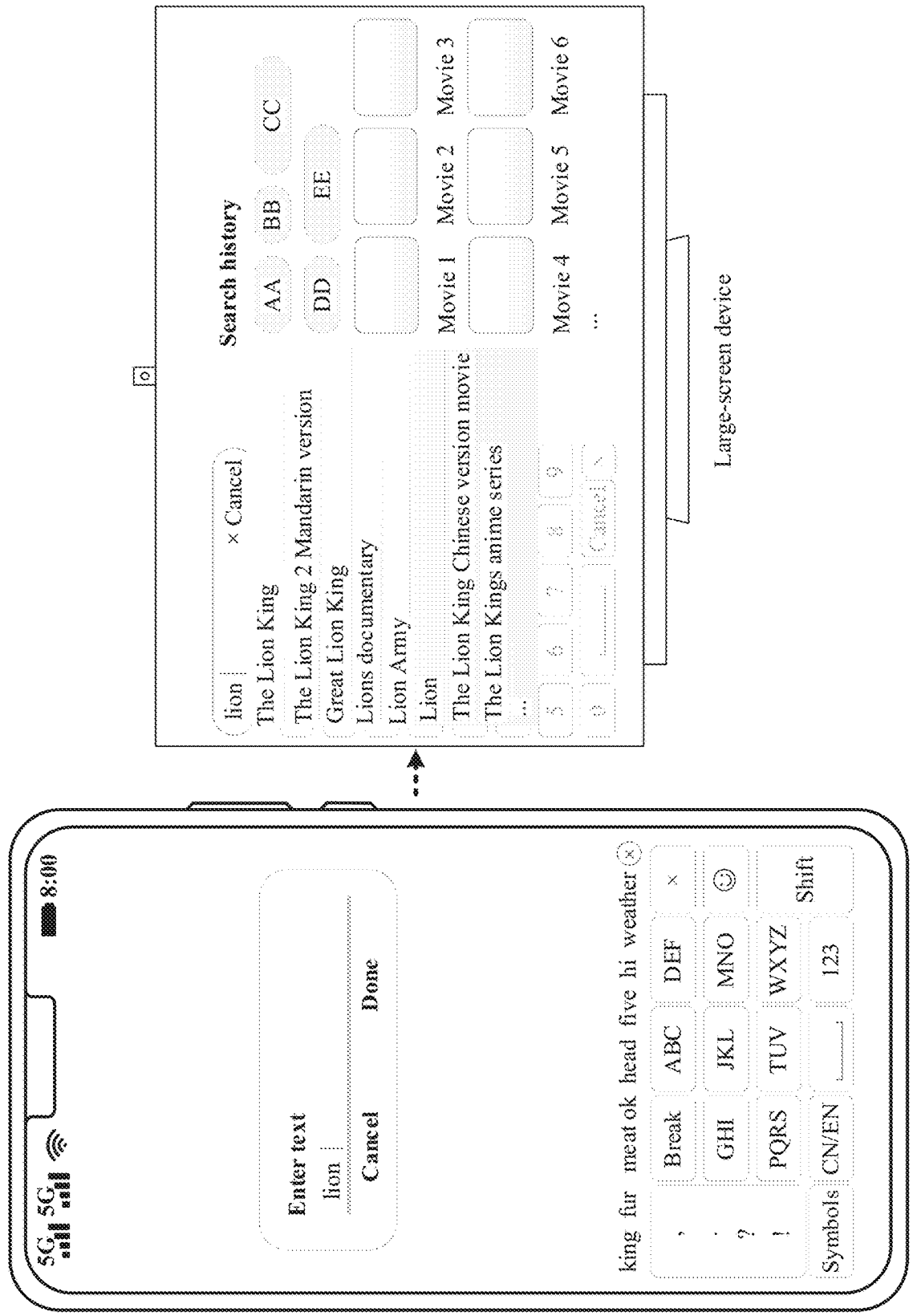
FIG. 32 is a schematic diagram of an interface showing that a mobile phone assists a large-screen device with input according to an embodiment of this application.

For example, FIG. 32 is a schematic diagram of a user interface in which a user uses the mobile phone B to assist the large-screen device with input in an edit box. For example, as shown in the left diagram of a user interface on the mobile phone B in FIG. 32, the user may enter "lion" (shī zi) in the edit box on the mobile phone B. and a cursor may be further displayed after "lion" in the edit box on the mobile phone B. As shown in the right diagram of a user interface on the large-screen device in FIG. 32, "lion" and the cursor may be synchronized to an edit box on the large-screen device.

Figure 33:
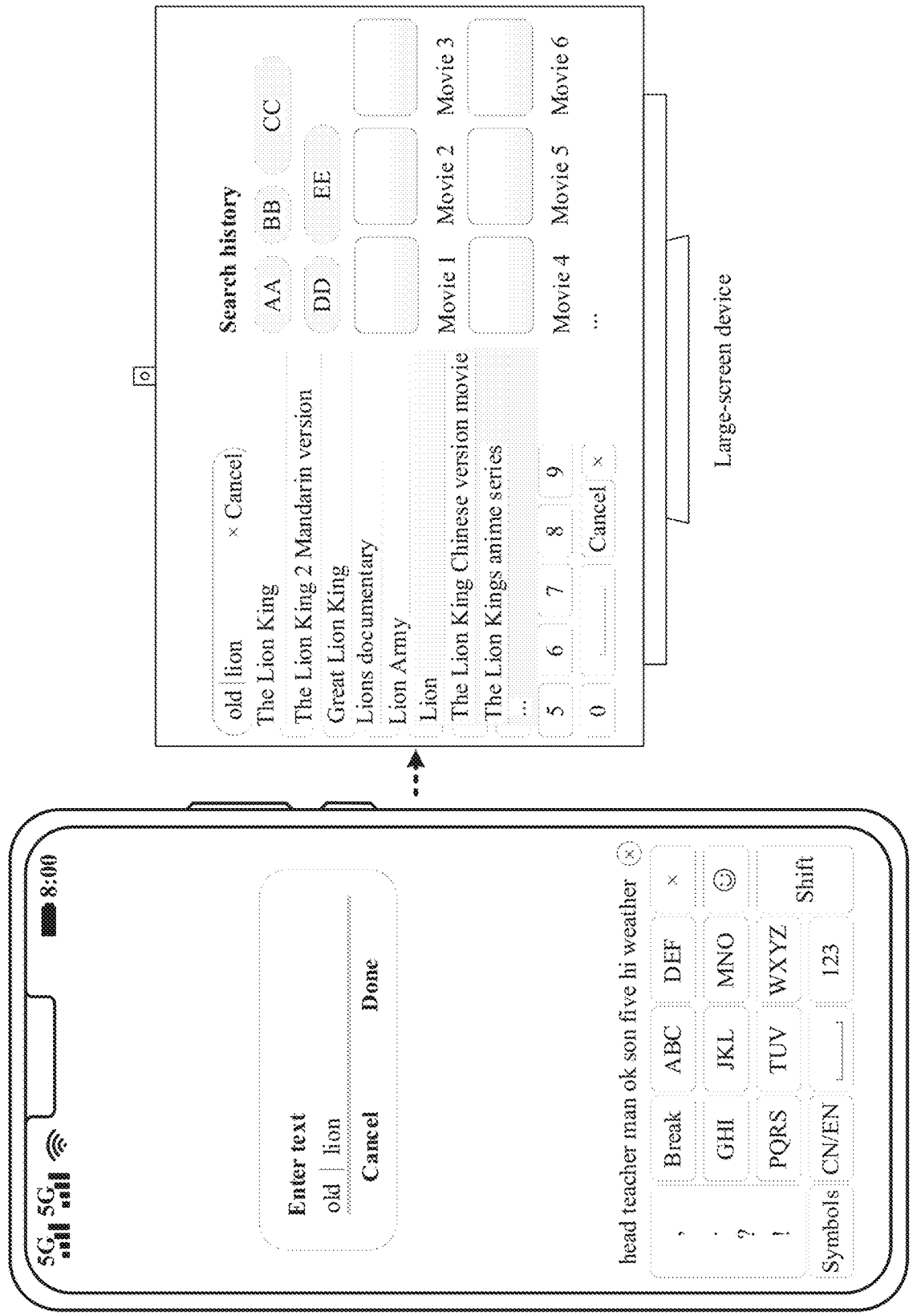
FIG. 33 is a schematic diagram of another interface showing that a mobile phone assists a large-screen device with input according to an embodiment of this application.

FIG. 33 is a schematic diagram of a user interface in which a user may move a cursor in the edit box on the mobile phone B. For example, as shown in the left diagram of a user interface on the mobile phone B in FIG. 33, the user may move the cursor to a position before "lion" in the edit box on the mobile phone B, and add "old" (lǎo) before the cursor. As shown in the right diagram of a user interface on the large-screen device in FIG. 33, the cursor before "lion" and "old" before the cursor may be synchronized to the edit box on the large-screen device.

Figure 34:
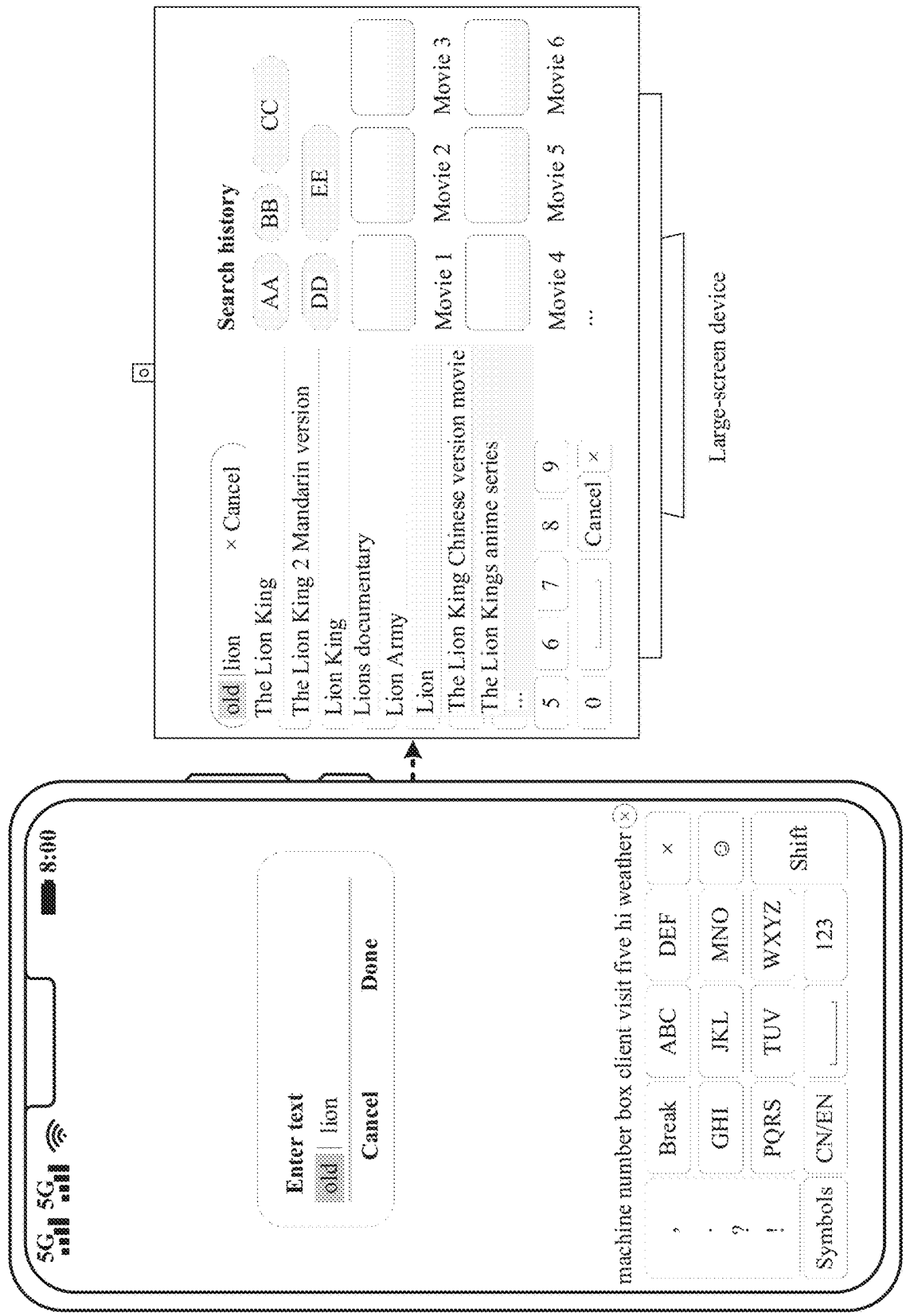
FIG. 34 is a schematic diagram of an interface showing that a mobile phone assists a large-screen device with input according to an embodiment of this application.

FIG. 34 is a schematic diagram of a user interface in which a user may highlight a selected target term in the edit box on the mobile phone B. For example, as shown in the left diagram of a user interface on the mobile phone B in FIG. 34, the user may highlight the selected "old" in the edit box on the mobile phone B. As shown in the right diagram of a user interface on the large-screen device in FIG. 34, "old" that is highlighted for display may be synchronized to the edit box on the large-screen device.

It can be understood that, if the user selects the mobile phone A on the large-screen device, in an implementation in which the user uses the mobile phone A to assist the large-screen device with input, a user interface on the mobile phone A may be similar to the user interface on the mobile phone B. Details are not described herein again.

It should be noted that the user interface diagrams of auxiliary input of the mobile phone for the large-screen device are all examples for description. In a possible implementation, in an interface for auxiliary input of the mobile phone for the large-screen device, all or some of content on the large-screen device may be synchronized, so that a user using the mobile phone can learn about a status on the large-screen device based on the interface on the mobile phone.

Figure 35:
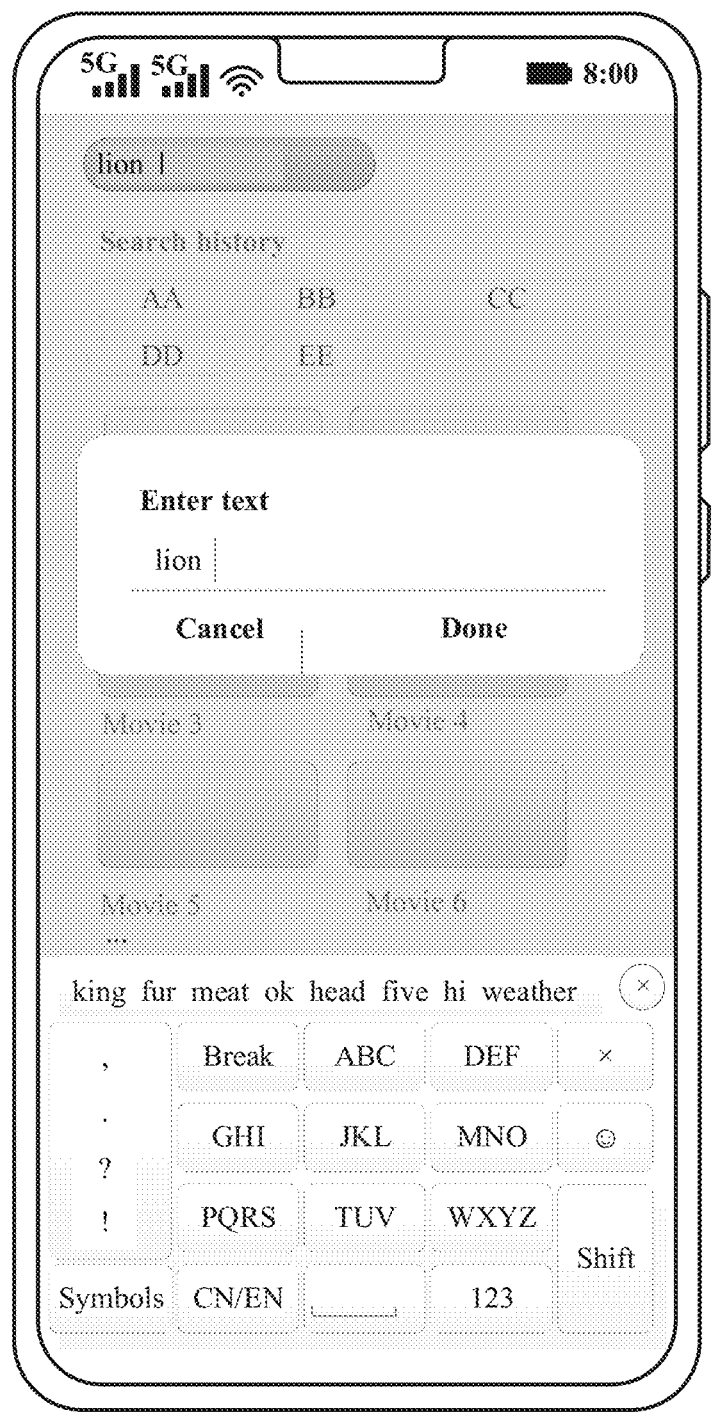
FIG. 35 is a schematic diagram of an interface on a mobile phone according to an embodiment of this application.

For example, FIG. 35 shows a user interface on a mobile phone. As shown in FIG. 35, when using the mobile phone (for example, the mobile phone A or the mobile phone B described above) to assist a large-screen device with input, a user may project all or some of content on the large-screen device to the mobile phone. For example, content in an edit box on the large-screen device is displayed on the mobile phone, and an edit box on the mobile phone is displayed in a layer above the content on the large-screen device. In this way, when using the edit box on the mobile phone for input, the user can synchronously see a status in the edit box on the large-screen device in the user interface, and the user does not need to look up at an input status on the large-screen device during auxiliary input.

It should be noted that in the foregoing embodiments, an example in which a user uses auxiliary input of a Chinese character for the large-screen device is used for description. In a possible implementation, a user may use auxiliary input of an English phrase or text in another form for the large-screen device. Specific content of auxiliary input is not limited in this embodiment of this application.

Figure 36:
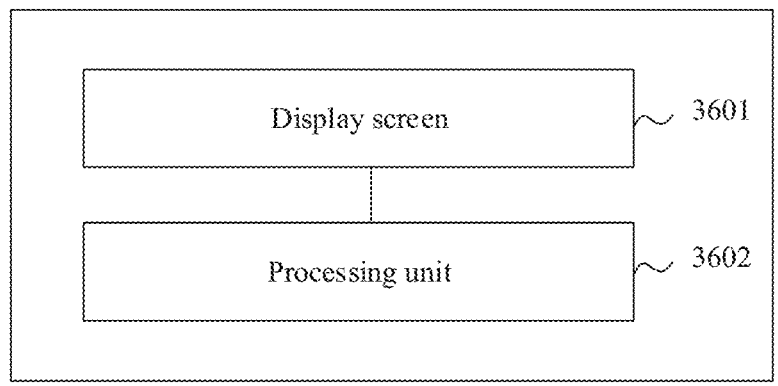
FIG. 36 is a schematic diagram of a structure of a device according to an embodiment of this application.

When each functional module is obtained by division based on each corresponding function, FIG. 36 is a schematic diagram of a possible structure of a first device, a second device, or a third device according to an embodiment of this application. The first device, the second device, or the third device includes a display screen 3601 and a processing unit 3602.

The display screen 3601 is configured to support the first device, the second device, or the third device to perform steps for display in the foregoing embodiments, or another process in the technology described in embodiments of this application. The display screen 3601 may be a touchscreen, other hardware, or a combination of hardware and software.

The processing unit 3602 is configured to support the first device, the second device, or the third device to perform steps for processing in the foregoing method embodiments, or another process in the technology described in embodiments of this application.

All related content of the steps in the foregoing method embodiments may be cited in function descriptions of the corresponding functional modules. Details are not described herein again.

Clearly, the electronic device includes but is not limited to the units and modules listed above. In addition, functions that the foregoing functional modules can specifically implement include but are not limited to the functions corresponding to the steps in the methods in the foregoing examples. For detailed descriptions of another unit of the electronic device, refer to detailed descriptions of a step corresponding to the unit in the methods. Details are not described herein again in this embodiment of this application.

When an integrated unit is used, the first device, the second device, or the third device in the foregoing embodiments may include a processing module, a storage module, and a display screen. The processing module is configured to control and manage an action of the first device, the second device, or the third device. The display screen is configured to display content based on an indication of the processing module. The storage module is configured to store program code and data on the first device, the second device, or the third device. Further, the first device, the second device, or the third device may further include an input module and a communications module. The communications module is configured to support the first device, the second device, or the third device to communicate with another network entity, to implement functions such as calling, data exchange, and Internet access of the first device, the second device, or the third device.

The processing module may be a processor or a controller. The communications module may be a transceiver, an RF circuit, a communications interface, or the like. The storage module may be a memory. The display module may be a screen or a display. The input module may be a touchscreen, a voice input apparatus, a fingerprint sensor, or the like.

The communications module may include an RF circuit, and may further include a wireless fidelity (wireless fidelity. Wi-Fi) module, a near field communication (near field communication, NFC) module, and a Bluetooth module. The communications modules such as the RF circuit, the NFC module, the Wi-Fi module, and the Bluetooth module may be collectively referred to as a communications interface. The processor, the RF circuit, the display screen, and the memory may be coupled to each other through a bus.

Figure 37:
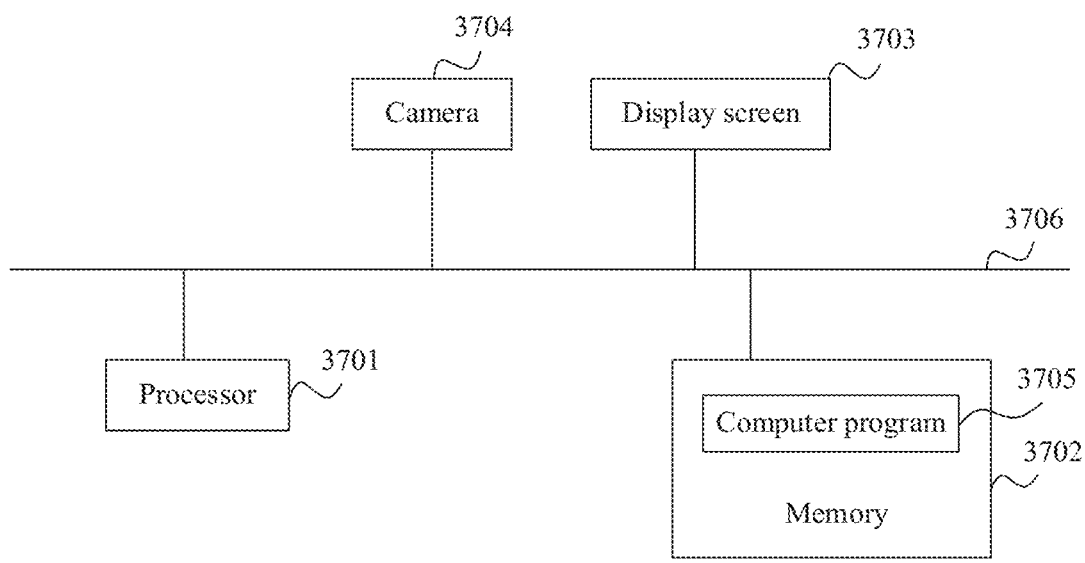
FIG. 37 is a schematic diagram of a structure of still another device according to an embodiment of this application.

FIG. 37 is a schematic diagram of still another possible structure of a first device, a second device, or a third device according to an embodiment of this application. The first device, the second device, or the third device includes one or more processors 3701, a memory 3702, a camera 3704, and a display screen 3703. The components may communicate with each other through one or more communications buses 3706.

One or more computer programs 3705 are stored in the memory 3702, and are configured to be executed by the one or more processors 3701. The one or more computer programs 3705 include instructions, and the instructions are used to perform any one of the steps in the foregoing display method. Clearly, the electronic device includes but is not limited to the components listed above. For example, the electronic device may further include a radio frequency circuit, a positioning apparatus, a sensor, and the like.

This application further provides the following embodiments. It should be noted that serial numbers of the following embodiments do not necessarily follow a sequence of serial numbers of the foregoing embodiments.

Embodiment 31: A device communication method is applied to a system including a first device and a second device, and the method includes:

The first device displays a first interface including a first edit box;

the first device sends an indication message to the second device;

the second device displays a second interface based on the indication message, where the second interface includes a second edit box;

if there is a keyword in the second edit box, the first device synchronizes the keyword to the first edit box;

the first device determines a candidate term corresponding to the keyword; and the second device obtains the candidate term, and displays a third interface, where the third interface includes the candidate term.

Embodiment 32: According to the method described in Embodiment 31, the second device includes an interface service, and the interface service is used for synchronization of the editing status between the first device and the second device.

Embodiment 33: According to the method described in Embodiment 32, the editing status includes one or more of the following: textual content, a cursor, or highlighting of the textual content.

Embodiment 34: According to the method described in any one of Embodiments 31 to 33, that the second device displays the second interface based on the indication message includes:

The second device displays a notification interface in response to the indication message, where the notification interface includes an option for confirming auxiliary input; and the second device displays the second interface in response to an operation of triggering the option.

Embodiment 35: According to the method described in any one of Embodiments 31 to 34, the second interface further includes all or some of content in the first interface.

Embodiment 36: According to the method described in Embodiment 35, the second edit box and all or some of the content in the first interface are displayed in layers, and the second edit box is displayed in a layer above all or some of the content in the first interface.

Embodiment 37: According to the method described in any one of Embodiments 31 to 36, after the second device displays the second interface based on the indication message, the method further includes:

The second device displays a virtual keyboard in response to triggering the second edit box; and the second device displays the editing status in the second edit box based on an input operation received on the virtual keyboard and/or in the second edit box.

Embodiment 38: According to the method described in any one of Embodiments 31 to 37, the first device includes any one of the following: a television, a large-screen device, or a wearable device; and the second device includes any one of the following: a mobile phone, a tablet, or a wearable device.

Embodiment 39: According to the method described in any one of Embodiments 31 to 38, the third interface further includes a local candidate term on the second device associated based on the keyword, and a manner of displaying the candidate term and the local candidate term in the third interface includes any one of the following:

The candidate term and the local candidate term are displayed in the third interface in columns;

the candidate term is displayed before the local candidate term in the third interface;

the candidate term is displayed after the local candidate term in the third interface;

the candidate term and the local candidate term are displayed in a mixed manner in the third interface; and the candidate term and the local candidate term are distinguished by using different identifiers in the third interface.

Embodiment 310: According to the method described in any one of Embodiments 31 to 39, an order of candidate terms is related to historical user behavior on the first device.

Embodiment 311: The method according to any one of Embodiments 31 to 39 and 310 further includes:

The second device displays any candidate term in the second edit box in response to a user triggering the candidate term.

Embodiment 312: A device communication method is applied to a system including a first device and a second device, and the method includes:

The second device displays a fourth interface including an option of the first device;

the second device sends an indication message to the first device in response to an operation of selecting the option of the first device;

the first device displays a first interface including a first edit box;

the second device displays a second interface, where the second interface includes a second edit box;

if there is a keyword in the second edit box, the first device synchronizes the keyword to the first edit box;

the first device determines a candidate term corresponding to the keyword; and the second device obtains the candidate term, and displays a third interface, where the third interface includes the candidate term.

Embodiment 313: A device communication method is applied to a first device, and the method includes:

The first device displays a first interface including a first edit box;

the first device sends an indication message to a second device, where the indication message is used to indicate the second device to display a second interface, and the second interface includes a second edit box;

if there is a keyword in the second edit box, the first device synchronizes the keyword to the first edit box;

the first device determines a candidate term corresponding to the keyword; and the first device synchronizes the candidate term to the second device.

Embodiment 314: A device communication method is applied to a second device, and the method includes:

The second device receives an indication message from a first device, where the first device displays a first interface including a first edit box;

the second device displays a second interface based on the indication message, where the second interface includes a second edit box;

if there is a keyword in the second edit box, the second device synchronizes the keyword to the first edit box, so that the first device determines a candidate term corresponding to the keyword; and the second device obtains the candidate term, and displays a third interface, where the third interface includes the candidate term.

Embodiment 315: A device communication method is applied to a second device, and the method includes:

The second device displays a fourth interface including an option of a first device;

the second device sends an indication message to the first device in response to an operation of selecting the option of the first device, where the indication message is used to indicate the first device to display a first interface including a first edit box;

the second device displays a second interface, where the third interface includes a second edit box;

if there is a keyword in the second edit box, the second device synchronizes the keyword to the first edit box, so that the first device determines a candidate term corresponding to the keyword; and the second device obtains the candidate term, and displays a third interface, where the third interface includes the candidate term.

Embodiment 316: A device communication system includes a first device and a second device, where the first device is configured to perform steps performed by the first device according to any one of Embodiments 31 to 39 and 310 to 315, and the second device is configured to perform steps performed by the second device according to any one of Embodiments 31 to 39 and 310 to 315.

Embodiment 317: A first device includes at least one memory and at least one processor, where the memory is configured to store program instructions; and the processor is configured to invoke the program instructions in the memory, to enable the first device to perform steps performed by the first device according to any one of Embodiments 31 to 39 and 310 to 315.

Embodiment 318: A second device includes at least one memory and at least one processor, where the memory is configured to store program instructions; and the processor is configured to invoke the program instructions in the memory, to enable the second device to perform steps performed by the second device according to any one of Embodiments 31 to 39 and 310 to 315.

Embodiment 319: A computer-readable storage medium stores a computer program, and when the computer program is executed by a processor of a first device, steps performed by the first device according to any one of Embodiments 31 to 39 and 310 to 315 are implemented;

or when the computer program is executed by a processor of a second device, steps performed by the second device according to any one of Embodiments 31 to 39 and 310 to 315 are implemented.

For specific implementations of Embodiment 31 to Embodiment 39 and Embodiment 310 to Embodiment 319, refer to descriptions of FIG. 38 to FIG. 53.

In a process of using a mobile phone to assist a large-screen device with input, after a keyword or a key term is entered on the mobile phone, textual content in an edit box on the mobile phone may be synchronized to the large-screen device side in real time to implement quick input, thereby improving efficiency of input by a user.

However, in a general implementation, the textual content in the edit box on the mobile phone can be synchronized to the large-screen device, but content on the large-screen device cannot be synchronized to the mobile phone. For example, after a user enters a keyword (for example, a part of a movie title, a part of a music title, or a part of a contact) in the edit box on the mobile phone, the keyword may be synchronized in the edit box on the large-screen device. The large-screen device may obtain a target entry (for example, a complete movie title, a complete music title, or a complete contact) by using the keyword. In this case, because the target entry on the large-screen device cannot be synchronized to the mobile phone, and a local candidate term thesaurus on the mobile phone is usually not related to content of a program on the large-screen device, when the candidate term thesaurus on the mobile phone is used for association with the keyword, the content related to the program on the large-screen device is not associable. Alternatively, for a same keyword, a candidate term usually on the mobile phone for a user to select is different from a candidate term usually on the large-screen device for a user to select. For example, for a keyword "west" (xī), a candidate term usually on the large-screen device for selection may be a noun related to a movie or television series associated with west, and a candidate term usually on the mobile phone for selection may be a general term, for example, "the west" (xī fāng). As a result, a user needs to enter the complete target entry on the mobile phone, or a user needs to manually select the target entry on the large-screen device by using another hardware device (for example, a remote control), to search for the target entry. Input efficiency is relatively low.

Figure 38:
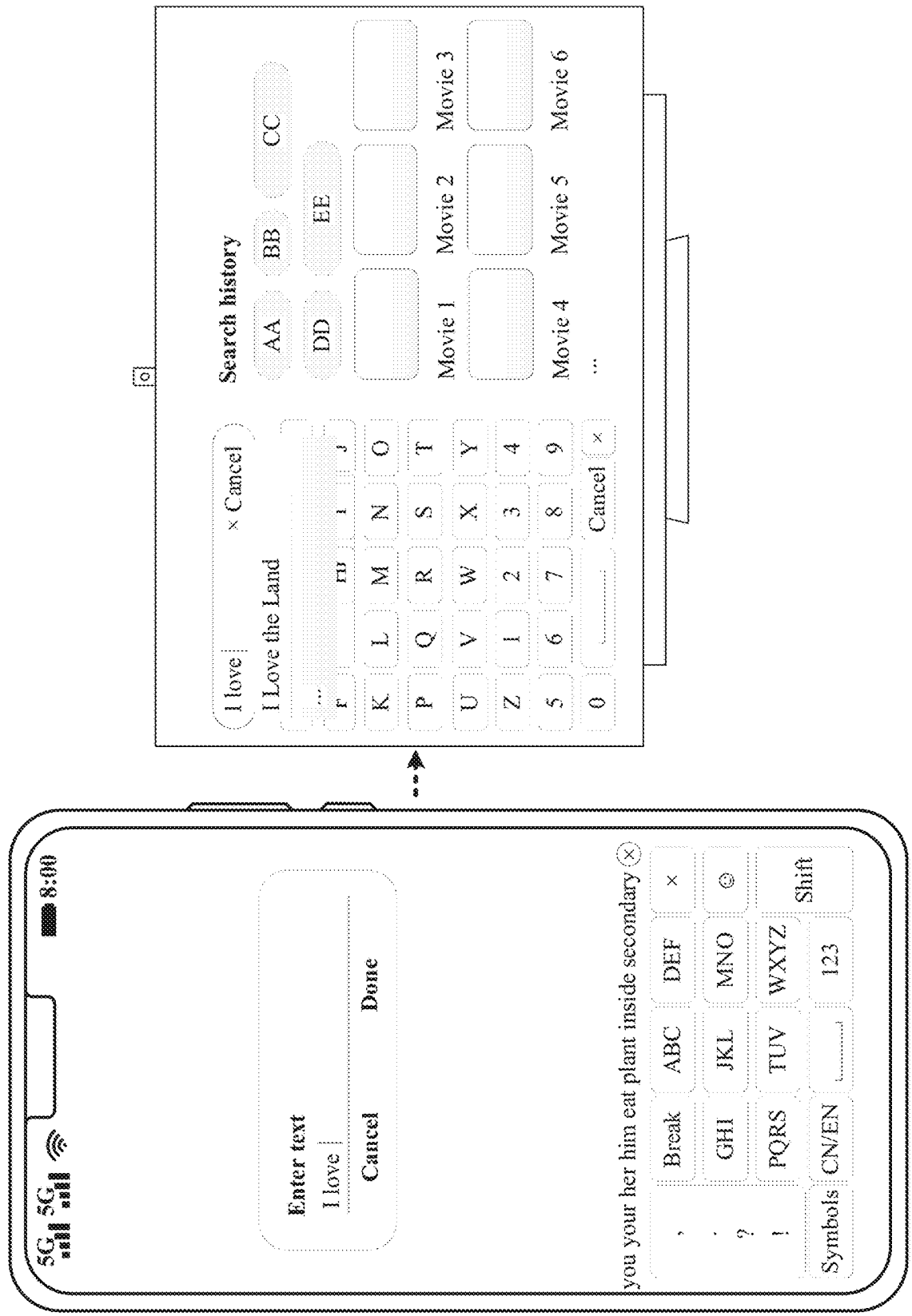
FIG. 38 is a schematic diagram of a user interface showing communication between a mobile phone and a large-screen device according to an embodiment of this application.

For example, FIG. 38 is a schematic diagram of a user interface in which a mobile phone assists a large-screen device with input. As shown in the schematic diagram of an interface on the mobile phone on the left of FIG. 38, when a user wants to search for a television series "I Love the Land" (wǒ ài zhè piàn tǔ di) on the large-screen device, the user enters a keyword "I love" (wǒ ài) in an edit box on the mobile phone. In an edit box on the large-screen device as shown in the right diagram in FIG. 38, the keyword "I love" in the edit box on the mobile phone may be synchronously displayed. The large-screen device associates a candidate term "I Love the Land" with the keyword "I love", but the mobile phone cannot synchronize the candidate term "I Love the Land". The user still needs to enter the complete text "I Love the Land" on the mobile phone and click Done. Alternatively, the user selects the candidate term "I Love the Land" on the large-screen device by using the remote control, to search for "I Love the Land". Input efficiency is relatively low.

Therefore, in a process in which the mobile phone assists the large-screen device with input, synchronizing a matched candidate term on the large-screen device to the mobile phone is a feasible manner to improve efficiency of input by the user.

In view of this, an embodiment of this application provides a device communication method. When a user uses a mobile phone to assist a large-screen device with input and the user enters text in an input edit box (for example, a search edit box, a pull-down box, or a combo box) on the mobile phone, the large-screen device may synchronize the text, associate a candidate term with the text based on a specific input scenario in conjunction with user habits collected by the large-screen device and a candidate term thesaurus or a dictionary on the large-screen device, and synchronize the associated candidate term on the large-screen device based on the text to the mobile phone. In this way, the user can select, on the mobile phone, the associated candidate term on the large-screen device, to implement convenient input.

Figure 39A:
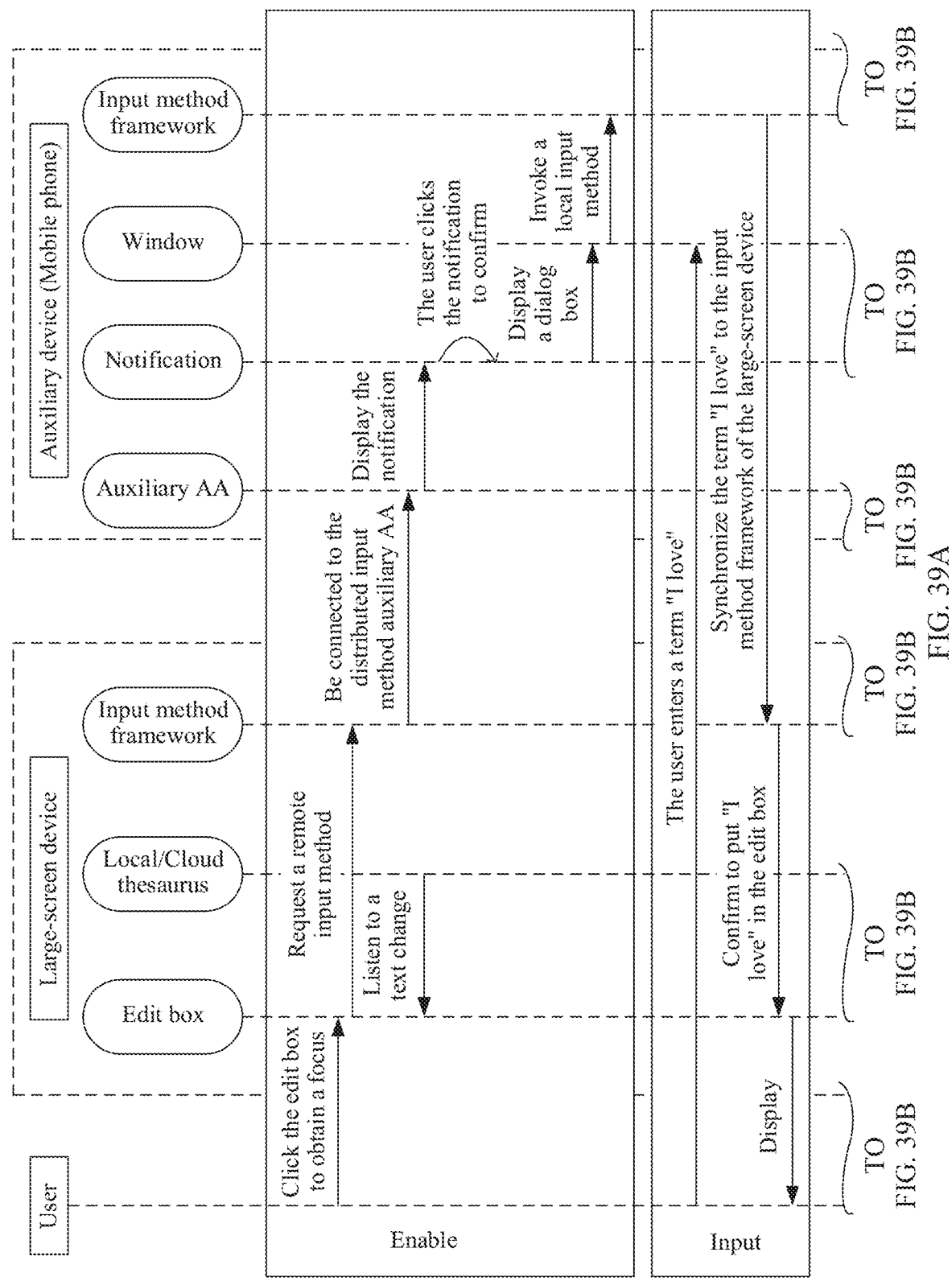
FIG. 39A and FIG. 39B are a schematic diagram of a specific system architecture for a device communication method according to an embodiment of this application.
Figure 39B:
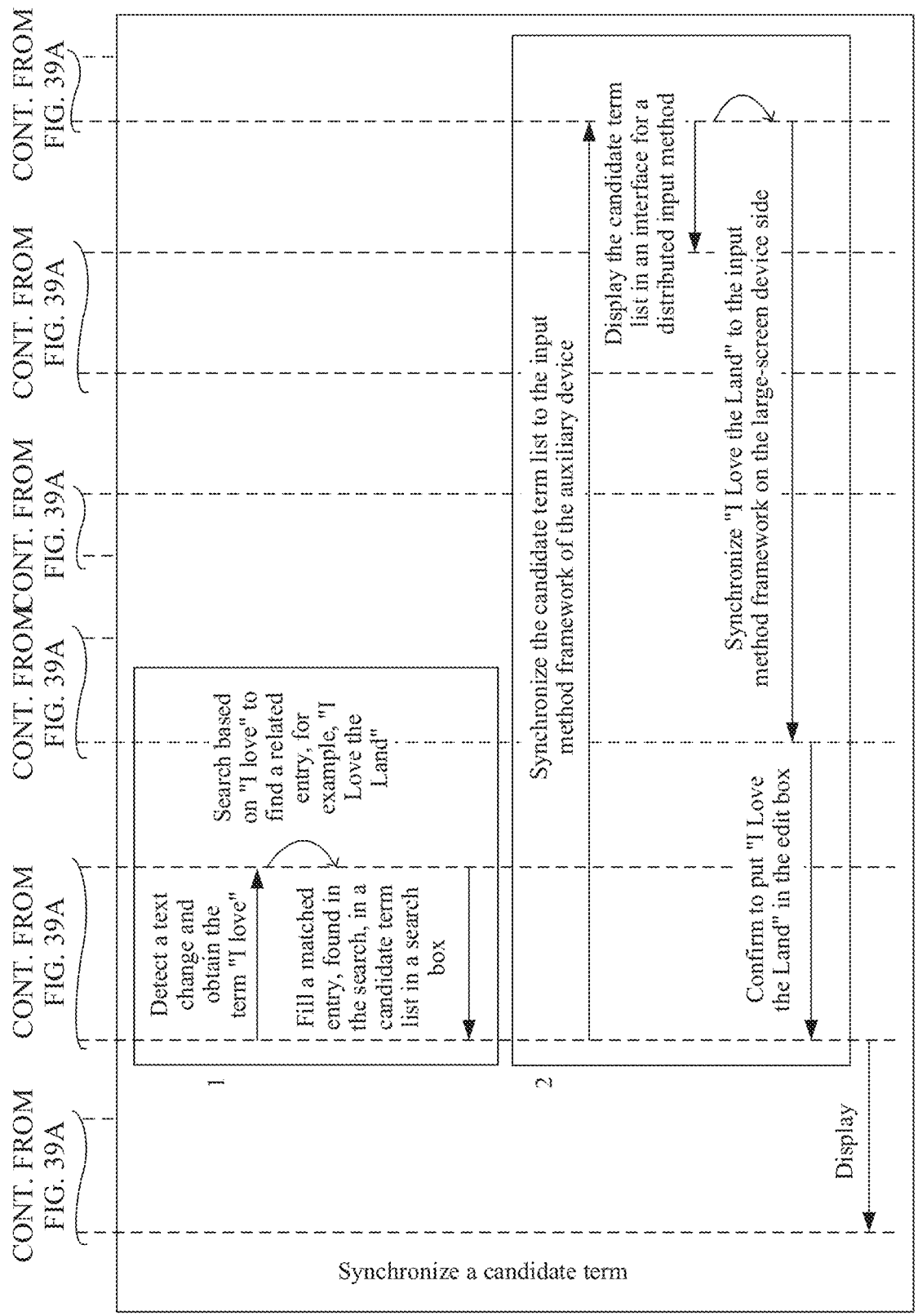

For example, FIG. 39A and FIG. 39B are a schematic diagram of a specific system architecture for a device communication method according to an embodiment of this application.

As shown in FIG. 39A and FIG. 39B, in this embodiment of this application, an example in which a distributed network includes a large-screen device (also referred to as a large screen device) and a mobile phone (also referred to as an auxiliary device) is used to describe a process in which the mobile phone assists the large-screen device with input. A local or cloud thesaurus, an edit box, and an input method framework may be set on the large-screen device. On the auxiliary device (the mobile phone), an auxiliary AA, a notification manager, a window manager, and an input method framework may be set.

The edit box on the large-screen device may be used to trigger auxiliary input, receive textual input by using a remote control, receive auxiliary input of the mobile phone, or the like. The local or cloud thesaurus on the large-screen device may store a candidate term, and the candidate term may include, for example, a program title and/or an application name on the large-screen device. For the input method framework of the large-screen device, the auxiliary AA of the mobile phone, a notification on the mobile phone, a window on the mobile phone, and the input method framework of the mobile phone, refer to the foregoing descriptions. Details are not described herein again.

As shown in FIG. 39A and FIG. 39B, after the large-screen device and the mobile phone are connected to a same distributed network, a user may select the edit box on the large-screen device by using a device, for example, a remote control. The large-screen device may request the input method framework to be connected to the auxiliary AA of the mobile phone. The auxiliary AA of the mobile phone may indicate the notification manager to display a notification. When the mobile phone receives confirmation of auxiliary input from the user by clicking the notification, an edit box may be further displayed in a window on the mobile phone, to invoke the input method framework of the mobile phone. The user may enter data in the edit box provided by the input method framework of the mobile phone. For example, the user may enter a term "I love" on the mobile phone. The term "I love" may be synchronized to the input method framework of the large-screen device, and "I love" is synchronously displayed in the edit box on the large-screen device.

The large-screen device listens to a text change in the edit box on the large-screen device, and may obtain the term "I love" in the edit box, match a related entry in the thesaurus on the large-screen device based on "I love", and fill the related entry in a candidate term list in a search box. For example, the related entry may include "I Love the Land". The rule of matching may be determined based on an actual application scenario. For example, the rule of matching includes but is not limited to string matching using regular expressions, similar word matching, synonym matching, exact matching, or fuzzy matching.

Further, the large-screen device may synchronize content in the candidate term list on the large-screen device to the input method framework of the mobile phone. The input method framework of the mobile phone may display the content in the candidate term list on the large-screen device in an interface on the mobile phone. For example, the mobile phone may display "I Love the Land" as a candidate term in the interface on the mobile phone. The user may click the candidate term "I Love the Land" in the interface on the mobile phone, and fill "I Love the Land" in the edit box on the mobile phone, and "I Love the Land" can be synchronized to the edit box on the large-screen device, to implement convenient and efficient input.

Figure 40:
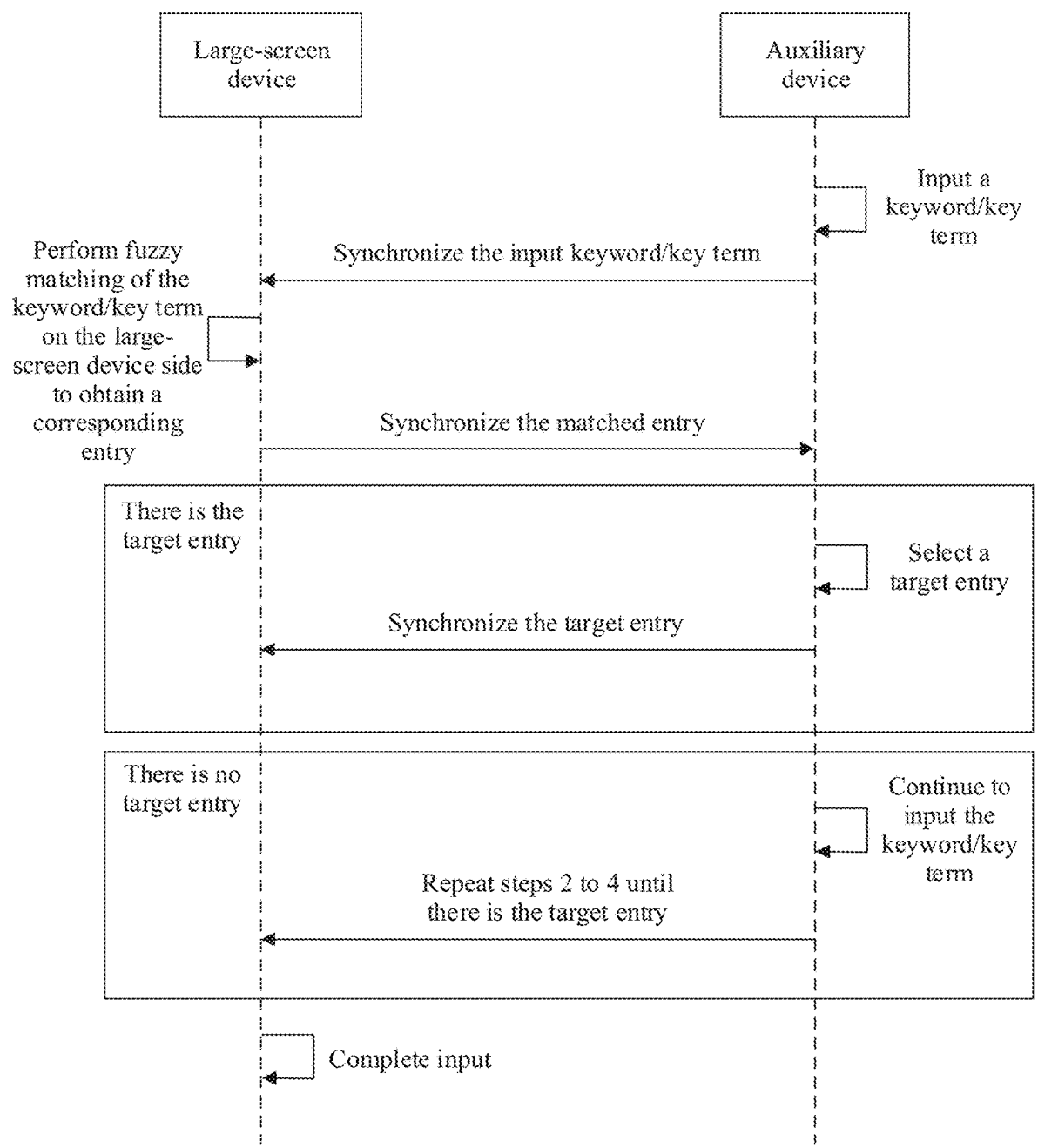
FIG. 40 is a schematic diagram of a procedure of communication between a mobile phone and a large-screen device according to an embodiment of this application.

To describe the foregoing steps more clearly. FIG. 40 is a flowchart of synchronizing a matched candidate term during interaction between the large-screen device and the mobile phone.

As shown in FIG. 40, a user may enter a keyword or a key term in an edit box that is of an auxiliary device (for example, the mobile phone) and that is used to assist the large-screen device with input. The keyword or the key term may be synchronized to the large-screen device. The large-screen device obtains, based on the keyword or the key term, a candidate term that matches the keyword or the key term, and synchronizes the candidate term to the mobile phone.

In a possible implementation, the candidate term synchronized by the large-screen device to the mobile phone includes a target entry that the user wants to select. The user may select the target entry by clicking or the like, and the mobile phone synchronizes the target entry to the large-screen device, to complete auxiliary input.

In a possible implementation, the candidate term synchronized by the large-screen device to the mobile phone does not include a target entry that the user wants to select. The user may continue to enter a keyword or a key term on the mobile phone, and repeat the foregoing steps until a candidate term synchronized by the large-screen device includes the target entry that the user wants to select. The user may select the target entry by clicking or the like, and the mobile phone synchronizes the target entry to the large-screen device, to complete auxiliary input.

It should be noted that FIG. 39A and FIG. 39B or FIG. 40 is a possible implementation of this embodiment of this application. In another possible implementation, a user may select, by using the remote control, a virtual keyboard in an edit box provided by an application on the large-screen device to trigger a subsequent process of auxiliary input for the large-screen device, or a user may trigger, on a mobile phone, a process of auxiliary input for the large-screen device. This is not specifically limited in this embodiment of this application.

With reference to the descriptions above, a user interface for interaction between a large-screen device and a mobile phone is described below as an example.

Figure 41:
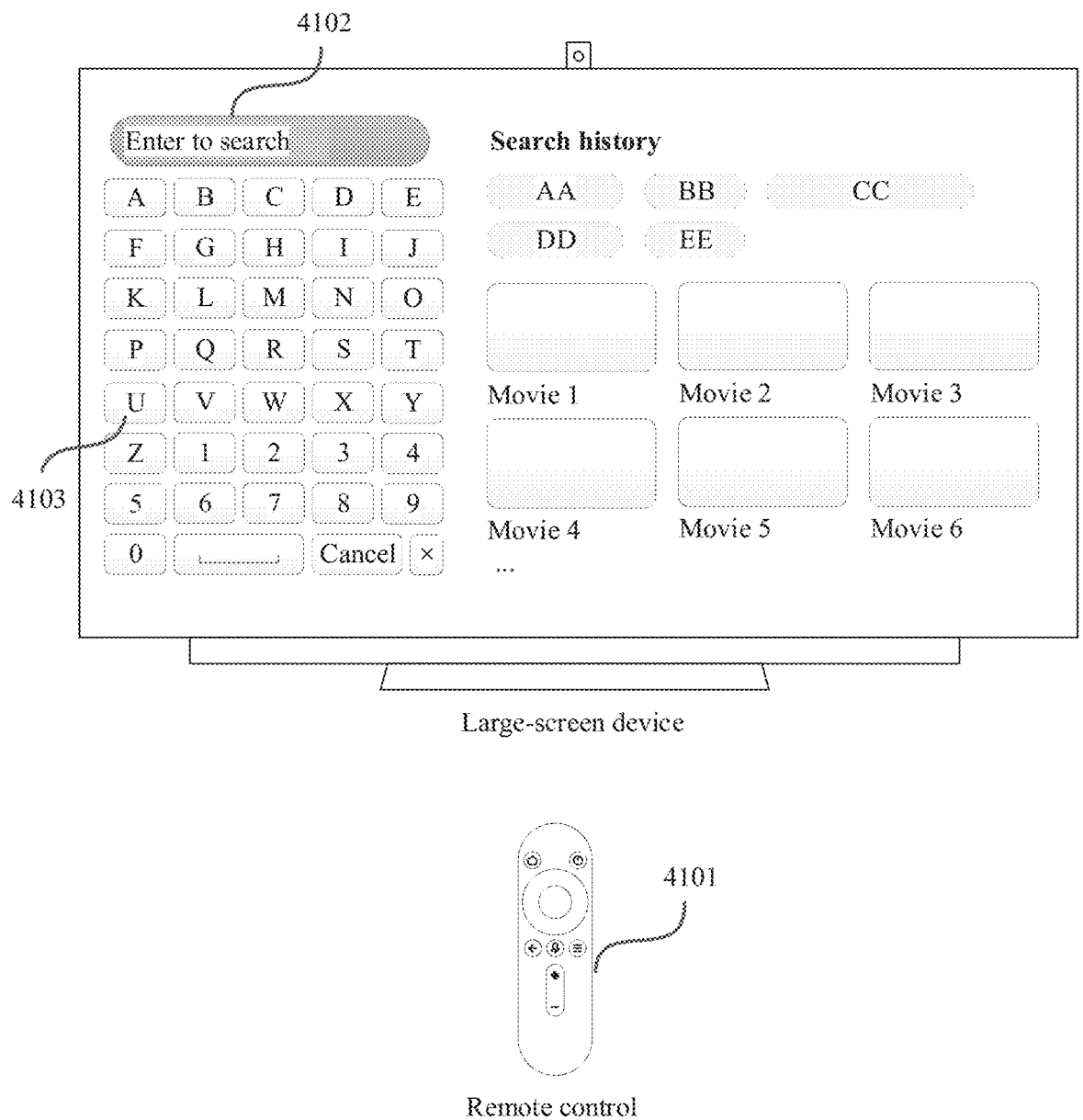
FIG. 41 is a schematic diagram of a user interface on a large-screen device according to an embodiment of this application.
Figure 42:
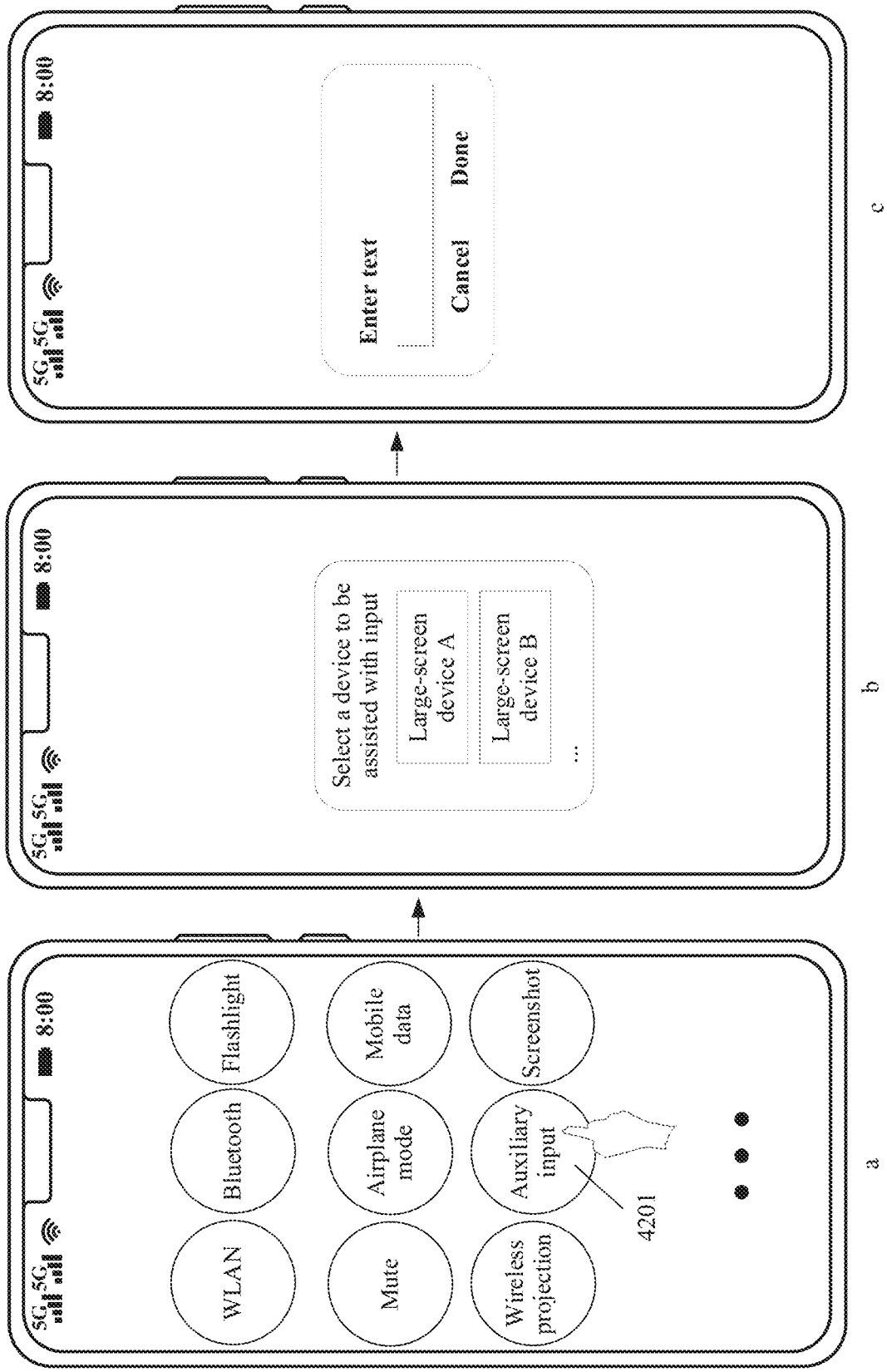
FIG. 42 is a schematic diagram of a user interface on a mobile phone according to an embodiment of this application.

For example, FIG. 41 and FIG. 42 are schematic diagrams of a user interface in which a user triggers auxiliary input.

FIG. 41 is a diagram of a user interface on a large-screen device. As shown in FIG. 41, the user may select an edit box 4102 on the large-screen device by using a remote control 4101, and may trigger a subsequent process in which a mobile phone assists the large-screen device with input in this embodiment of this application. Alternatively, the user may select any content 4102 in a virtual keyboard on the large-screen device by using a remote control 4101, and may trigger a subsequent process in which a mobile phone assists the large-screen device with input in this embodiment of this application. A specific manner of the mobile phone to assist the large-screen device with input is described in following embodiments, and details are not described herein.

It should be noted that FIG. 41 is a schematic diagram of setting an edit box in the user interface on the large-screen device. In a possible implementation, the user interface on the large-screen device may include a plurality of edit boxes, and a user may trigger any of the edit boxes to trigger a subsequent process in which the mobile phone assists the large-screen device with input in this embodiment of this application. This is not specifically limited in this embodiment of this application.

FIG. 42 is a diagram of a user interface on a mobile phone. For example, a user may display the user interface as shown in a in FIG. 42 in a manner of, for example, pulling down a home screen of the mobile phone. In the user interface as shown in a in FIG. 42, one or more of the following functions of the mobile phone may be included: WLAN, Bluetooth, a flashlight, sound off an airplane mode, mobile data, wireless projection, taking a screenshot, or auxiliary input 4201. The auxiliary input 4201 may be a function of auxiliary input of the mobile phone for a large-screen device in this embodiment of this application.

In a possible implementation, after the user clicks the auxiliary input 4201, the mobile phone may search for a device, for example, a large-screen device in a same distributed network, obtain a search box on the large-screen device, and establish a communication connection to the large-screen device. The mobile phone may further display a user interface as shown in c in FIG. 42. In the user interface as shown in c in FIG. 42, an edit box used to assist the large-screen device with input may be displayed, and the user may assist the large-screen device with input based on the edit box.

In a possible implementation, if the mobile phone discovers that there are a plurality of devices such as large-screen devices in the same distributed network, the mobile phone may alternatively display a user interface as shown in b in FIG. 42. In the user interface as shown in b in FIG. 42, identifiers of the plurality of large-screen devices may be displayed, and the identifiers of the large-screen devices may be device numbers, user names, nicknames, or the like of the large-screen devices. The user may select, in the user interface as shown in b in FIG. 42, a large-screen device that needs auxiliary input (for example, by clicking a large-screen device A or a large-screen device B), and enter the user interface as shown in c in FIG. 42. This is not specifically limited in this embodiment of this application. After the user triggers large-screen input in any one of the foregoing manners, for example, the large-screen device may search for an auxiliary device (for example, a mobile phone) having an auxiliary input capability in the distributed network, and automatically determine a mobile phone used for auxiliary input, or send a notification to all mobile phones discovered in the distributed network.

For example, if the large-screen device discovers that there is one mobile phone in the distributed network, the large-screen device may automatically select the mobile phone to be a device for auxiliary input.

For example, if the large-screen device discovers that there are a plurality of mobile phones in the distributed network, and there is a mobile phone that is set by the user to be used for auxiliary input by default in the plurality of mobile phones, the large-screen device may automatically select the mobile phone used for auxiliary input by default as the device for auxiliary input.

For example, if the large-screen device discovers that there are a plurality of mobile phones in the distributed network, and there is a mobile phone that is selected by the user for auxiliary input in the plurality of mobile phones when the user uses auxiliary input last time, the large-screen device may automatically select the mobile phone selected by the user for auxiliary input when the user uses auxiliary input last time as the device for auxiliary input.

For example, if the large-screen device discovers that there are a plurality of mobile phones in the distributed network, the large-screen device obtains, in the plurality of mobile phones, a mobile phone most frequently selected by the user for auxiliary input, and the large-screen device may automatically select the mobile phone most frequently selected by the user for auxiliary input as the device for auxiliary input.

For example, if the large-screen device discovers that there are a plurality of mobile phones in the distributed network, and there is a mobile phone that has a user account the same as a user account used for logging in on the large-screen device in the plurality of mobile phones, the large-screen device may automatically select the mobile phone that has the user account the same as the user account used for logging in on the large-screen device as the device for auxiliary input.

For example, the large-screen device sends a notification to the mobile phone in the distributed network. FIG. 43A to FIG. 43C to FIG. 49 show a process in which the mobile phone assists the large-screen device with input by using a candidate term synchronized by the large-screen device.

Figure 43A:
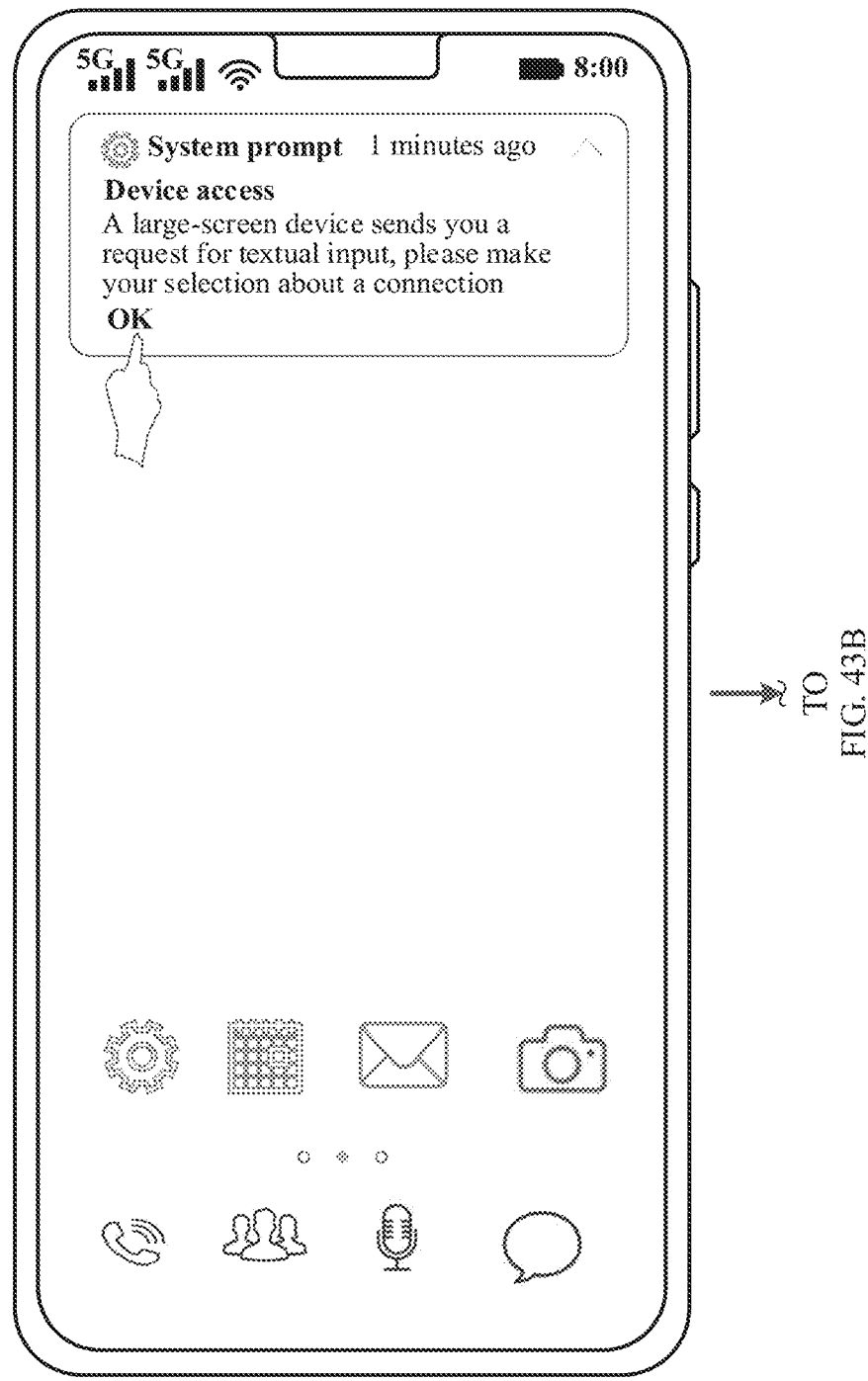
FIG. 43A to FIG. 43C are a schematic diagram of another user interface on a mobile phone according to an embodiment of this application.
Figure 43B:
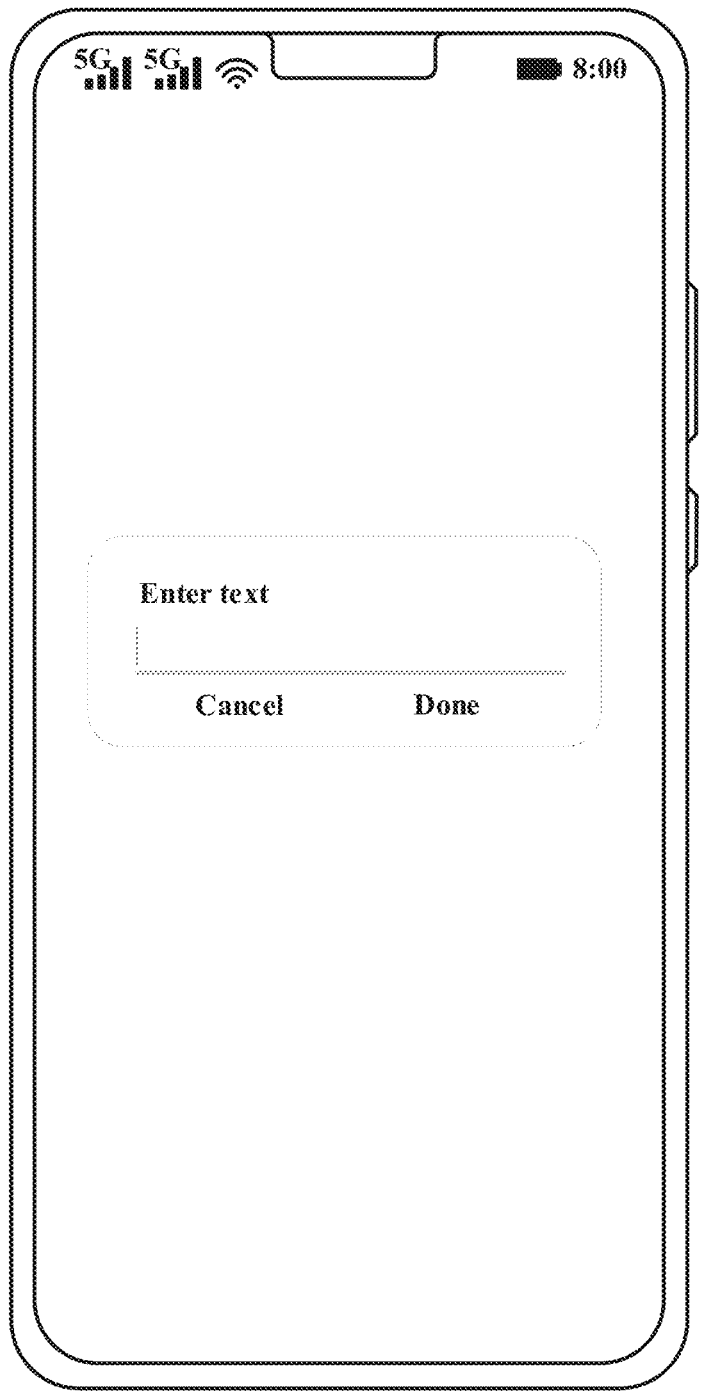
Figure 43C:
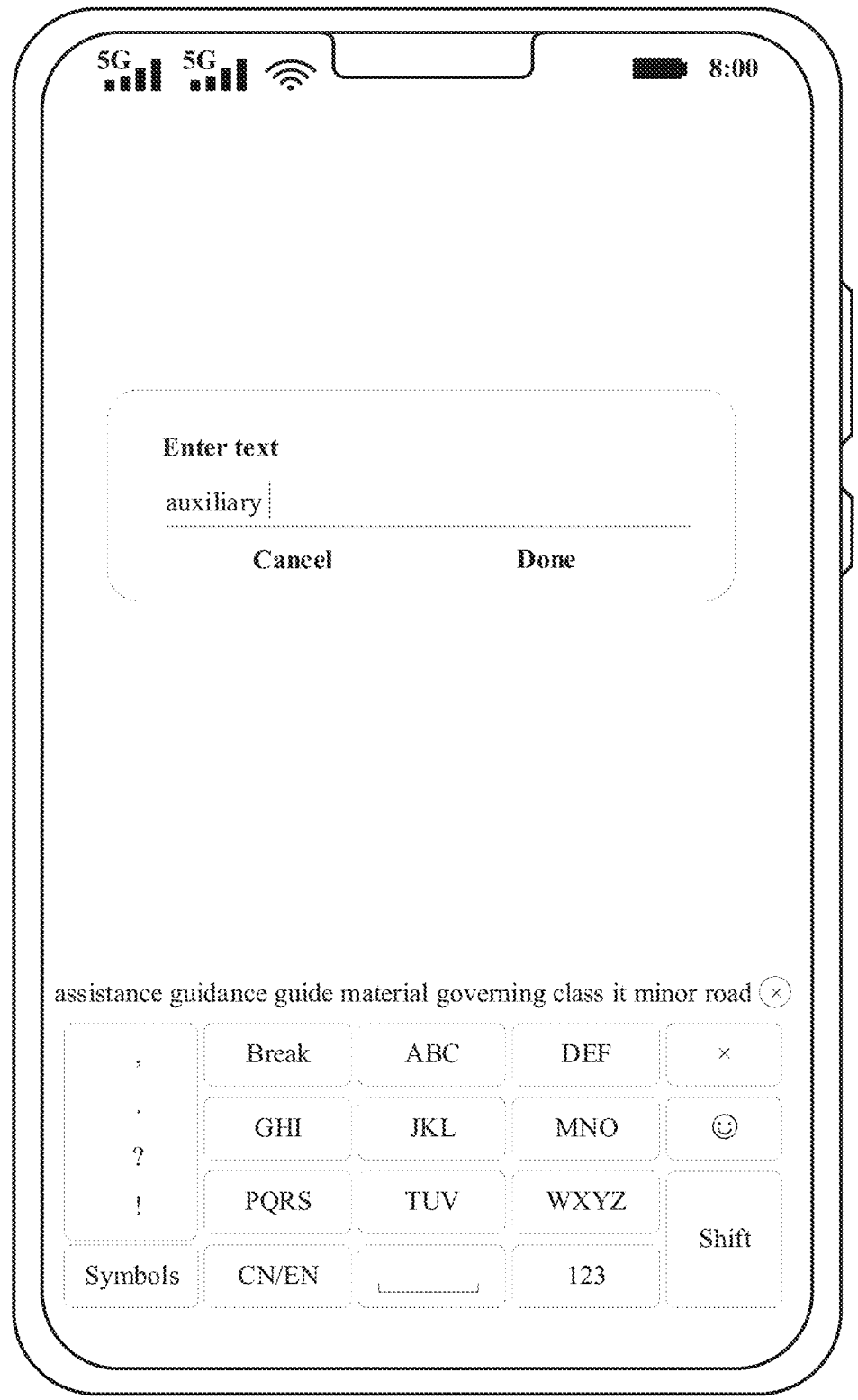

For example, FIG. 43A to FIG. 43C are a schematic diagram of a user interface in which a mobile phone determines to assist a large-screen device with input. As shown in a user interface in FIG. 43A, when the mobile phone receives a notification from the large-screen device, the notification may be displayed on the mobile phone to prompt a request of the large-screen device for auxiliary input. A user may trigger the notification on the mobile phone to confirm to assist the large-screen device with input. Further, as shown in a user interface in FIG. 43B, an edit box used to assist the large-screen device with input may be displayed on the mobile phone. Further, the user may trigger, for example, by clicking, the edit box as shown in FIG. 43B. The mobile phone may display a user interface as shown in FIG. 43C, and the user interface may display a virtual keyboard (also referred to as a soft keyboard) on the mobile phone. The user may subsequently use the virtual keyboard on the mobile phone to assist the large-screen device with input.

For example, if the user wants to change settings of an auxiliary application on the large-screen device, but a search is difficult because there are many options in the application in a settings page on the large-screen device, the user may enter a keyword "auxiliary" (fŭ) in an edit box on the mobile phone as shown in FIG. 43C.

Figure 44:
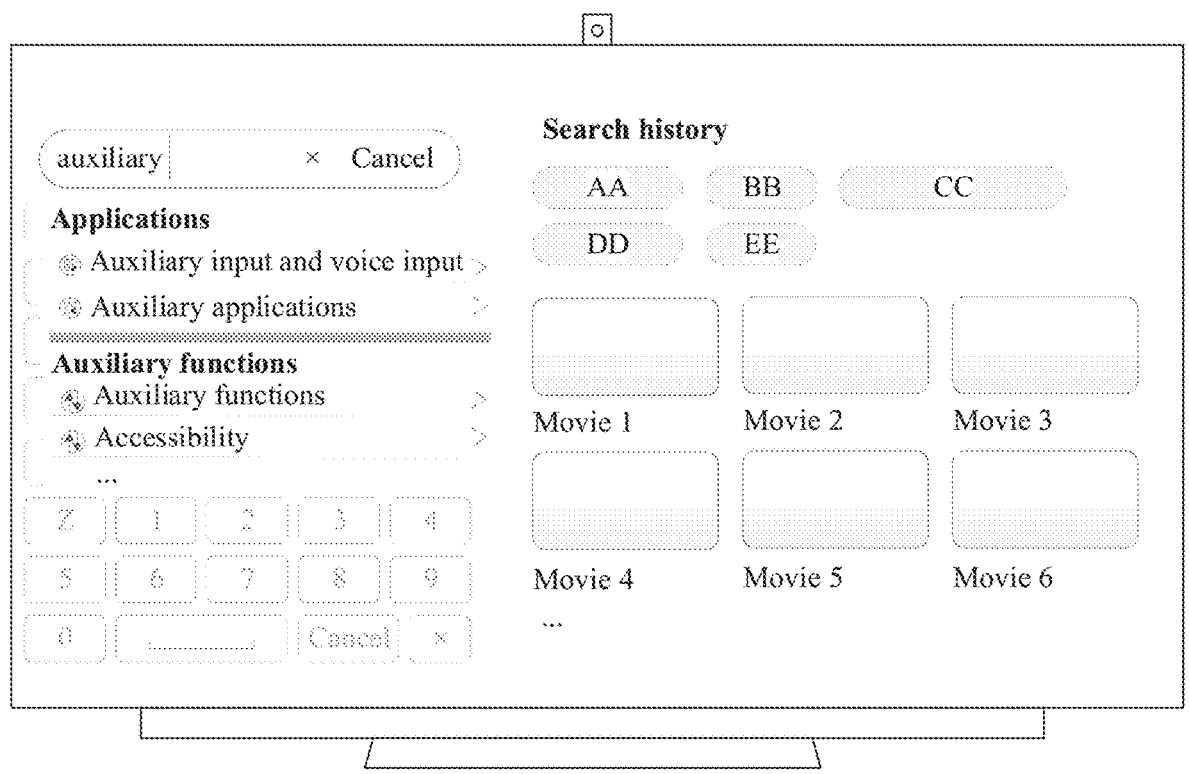
FIG. 44 is a schematic diagram of another user interface on a large-screen device according to an embodiment of this application.

In a user interface on the large-screen device as shown in FIG. 44, the keyword "auxiliary" in the edit box on the mobile phone may be synchronized to the edit box on the large-screen device side. The large-screen device searches for, based on a local or cloud thesaurus on the large-screen device, a candidate term matching "auxiliary", and displays the term in the candidate term list. For example, the candidate term list on the large-screen device may include content related to "auxiliary" in a plurality of categories. For example, a category of applications may include "auxiliary application and voice input" (fŭ zhù yìng yòng hé yǔ yīn shū rù), "auxiliary application" (fŭ zhù yìng yòng), and the like. A category of auxiliary functions may include "auxiliary functions and accessibility" (fŭ zhù gōng néng hé wú zhàng ài), and the like.

It should be noted that, when the large-screen device matches the keyword in the edit box on the large-screen device to the candidate term, a function (also referred to as a scenario) to be implemented by the large-screen device may be related. Alternatively, it can be understood that when the user enters a same keyword in edit boxes, candidate terms on the large-screen device associated based on the keyword in the edit boxes may be the same or different because the edit boxes are in different interfaces with different functions to implement.

For example, if the mobile phone is currently used to assist the large-screen device with searching for a movie, the large-screen device may match a movie title related to a keyword with a movie thesaurus.

For example, if the mobile phone is currently used to assist the large-screen device with searching for a television series, the large-screen device may match a television series title related to a keyword with a television series thesaurus.

For example, if the mobile phone is currently used to assist the large-screen device with searching for music, the large-screen device may match a music title related to a keyword with a music thesaurus.

For example, if the mobile phone is currently used to assist the large-screen device with searching for a function of the large-screen device, the large-screen device may match a function name related to a keyword with a function thesaurus.

In a possible implementation, an order of candidate terms displayed on the large-screen device is related to historical user behavior. Alternatively, it can be understood that when the user enters a same keyword in an edit box, an order of candidate terms corresponding to the keyword on the large-screen device may change because the user had different selection of a candidate term corresponding to the keyword before.

For example, for a keyword, if a candidate term selected by the user on the large-screen device last time by using the keyword is a candidate term A, the candidate term A may be displayed at a top position on the large-screen device.

For example, for a keyword, if a candidate term most frequently or frequently selected by the user on the large-screen device by using the keyword is a candidate term B, the candidate term B may be displayed at a top position on the large-screen device. A candidate term in the candidate term list on the large-screen device may be further synchronized to an input interface on the mobile phone. A manner of displaying the candidate term, in the candidate term list on the large-screen device, on the mobile phone may be specified based on an actual application scenario. For example, an order of candidate terms on the large-screen device may be further synchronized to a display interface on the mobile phone, to recommend, on the mobile phone, a candidate term in accordance with a habit of the user of using the large-screen device to the user. This is not specifically limited in this embodiment of this application.

It should be noted that a candidate term on the mobile phone associated by a local input method on the mobile phone based on a keyword may be the same as or different from a candidate term on the large-screen device associated by the large-screen device based on the keyword. In a possible implementation, the candidate term on the mobile phone associated by the local input method on the mobile phone based on the keyword is the same as the candidate term on the large-screen device associated by the large-screen device based on the keyword. However, an order of candidate terms on the mobile phone associated by the local input method on the mobile phone based on the keyword may be the same as an order of candidate terms on the large-screen device associated by the large-screen device based on the keyword.

For example, FIG. 45 to FIG. 48 are schematic diagrams of several interfaces, on a mobile phone, in which a candidate term in a candidate term list on a large-screen device is synchronized to the mobile phone.

Figure 45:
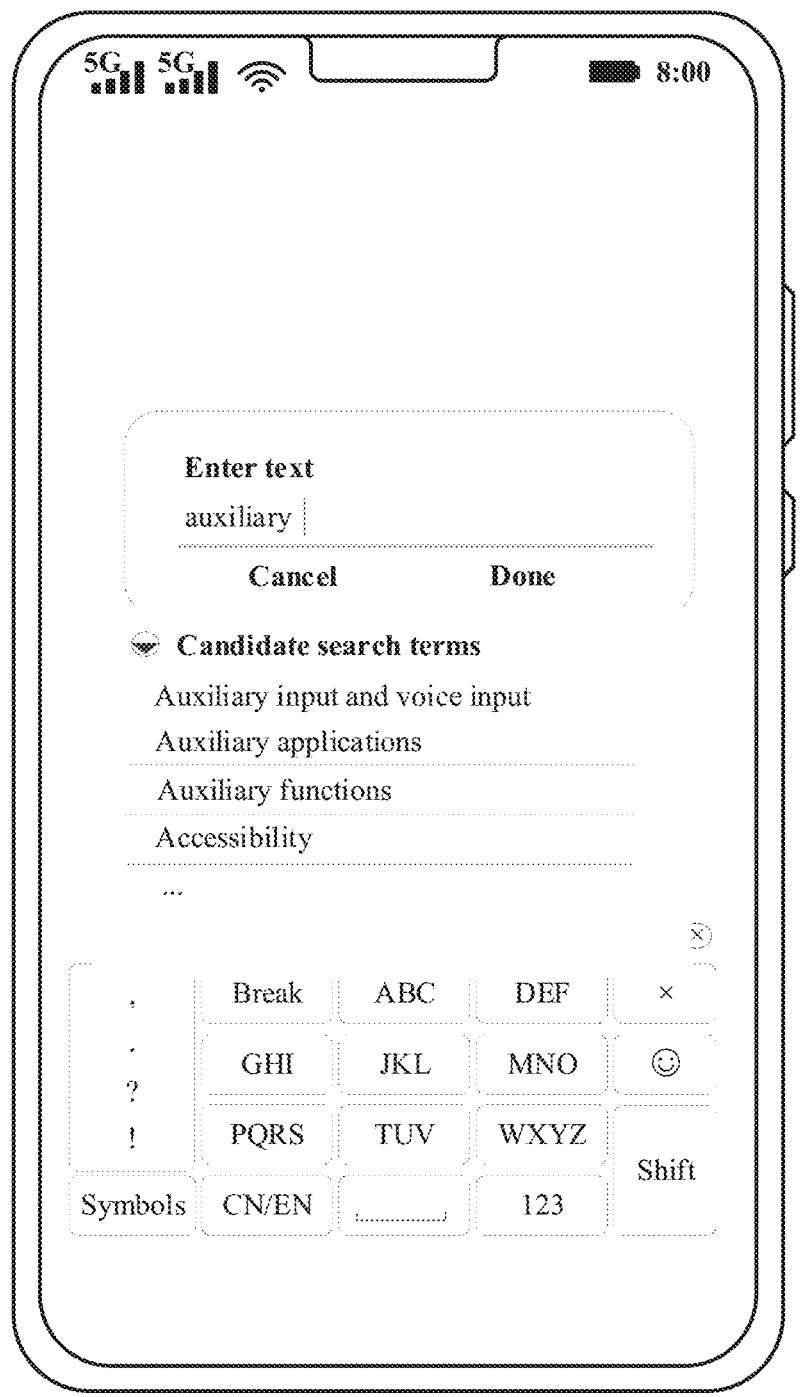
FIG. 45 is a schematic diagram of a user interface on a mobile phone according to an embodiment of this application.

In a display interface on the mobile phone as shown in FIG. 45, when a user enters "auxiliary" in an edit box on the mobile phone, a candidate term obtained by the mobile phone through synchronization with the large-screen device may be displayed in a manner similar to that of a candidate term in a local input method on the mobile phone. For example, the candidate term obtained through synchronization with the large-screen device may be displayed in a form of a list in an input interface on the mobile phone. In a possible manner of understanding, in the display interface on the mobile phone as shown in FIG. 45, the user may be unaware of whether the candidate term provided on the mobile phone is specifically local on the mobile phone or synchronized by the large-screen device. However, in this embodiment of this application, the candidate term obtained through synchronization with the large-screen device is provided in the candidate term provided on the mobile phone, so that the candidate term provided on the mobile phone for the user is more similar to content on the large-screen device, thereby offering more help to the user to implement quick input.

Figure 46:
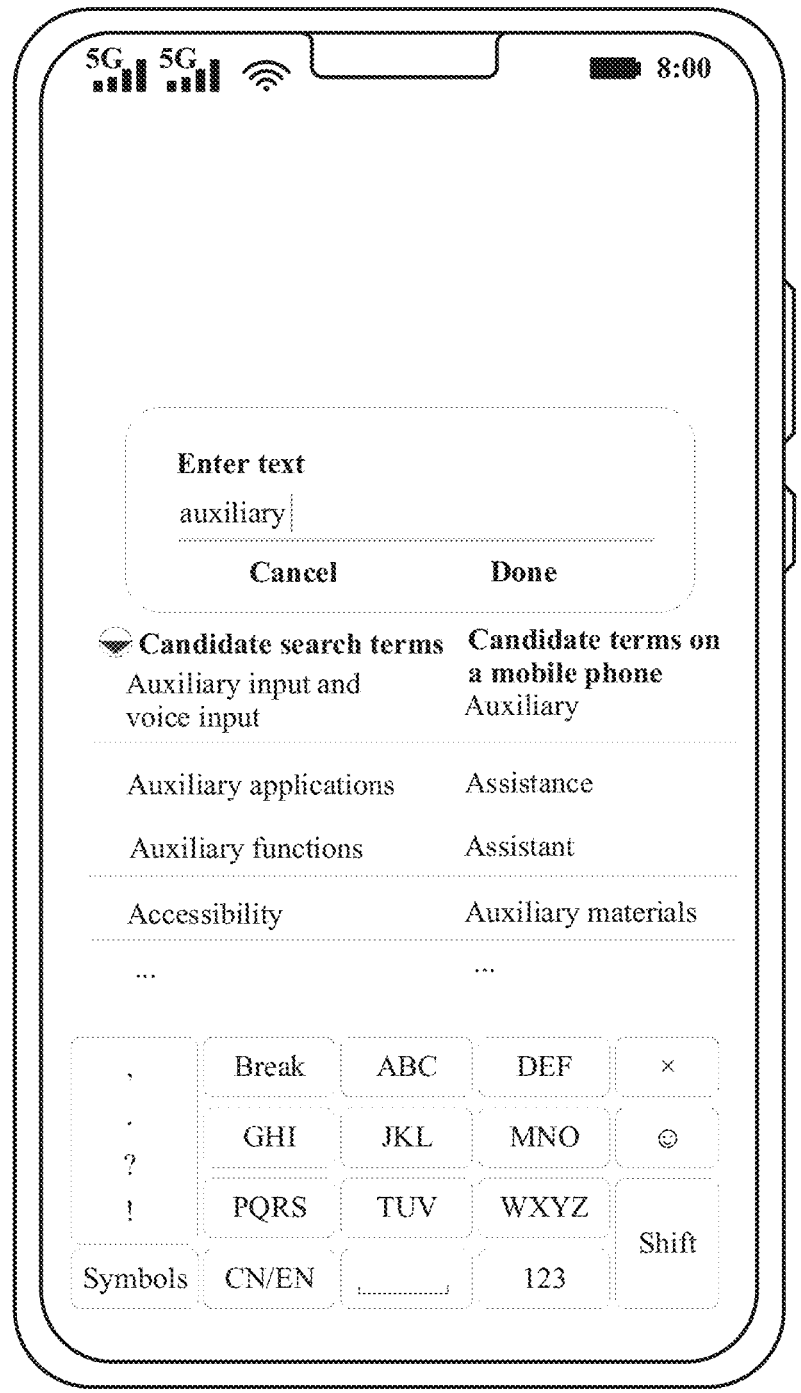
FIG. 46 is a schematic diagram of another user interface on a mobile phone according to an embodiment of this application.

In a user interface on the mobile phone as shown in FIG. 46, the candidate term in the candidate term list on the large-screen device and the candidate term in the local input method on the mobile phone may be displayed in columns. For example, as shown in FIG. 46, when a user enters "auxiliary" in the edit box on the mobile phone, in the user interface on the mobile phone, a candidate term that matches "auxiliary" and that is obtained through synchronization with the large-screen device may be displayed in a column (for example, a column of candidate search terms on the large-screen device), and a candidate term that is obtained through association by using "auxiliary" in the local input method on the mobile phone may be displayed in another column (for example, a column of candidate terms on the mobile phone).

Figure 47:
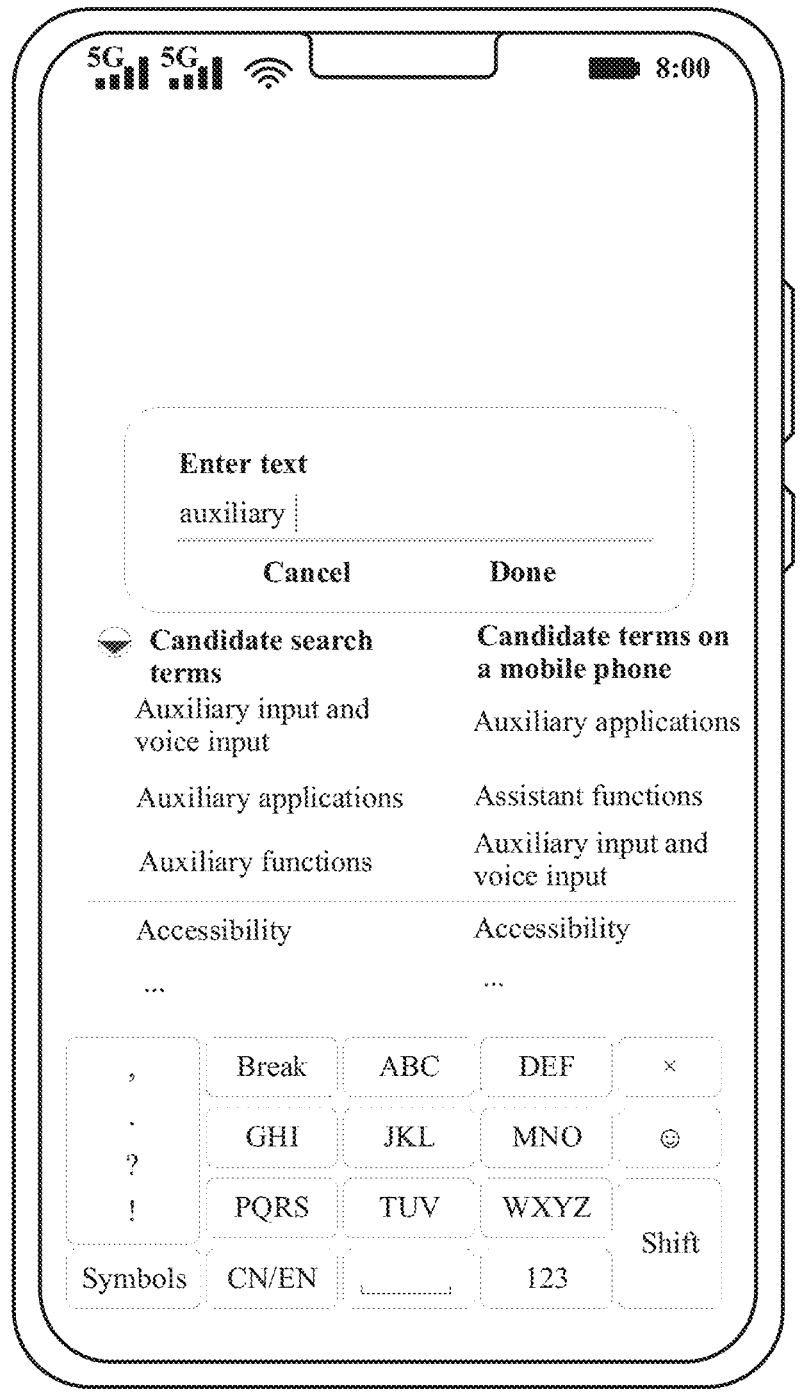
FIG. 47 is a schematic diagram of another user interface on a mobile phone according to an embodiment of this application.

In a possible implementation, as shown in FIG. 47, candidate terms m the candidate term list on the large-screen device and candidate term in the local input method on the mobile phone are displayed in columns. Although the candidate terms in the candidate term list on the large-screen device are the same as the candidate terms in the local input method on the mobile phone, an order of the candidate terms in the candidate term list on the large-screen device and that of the candidate terms in the local input method on the mobile phone may be different.

Figure 48:
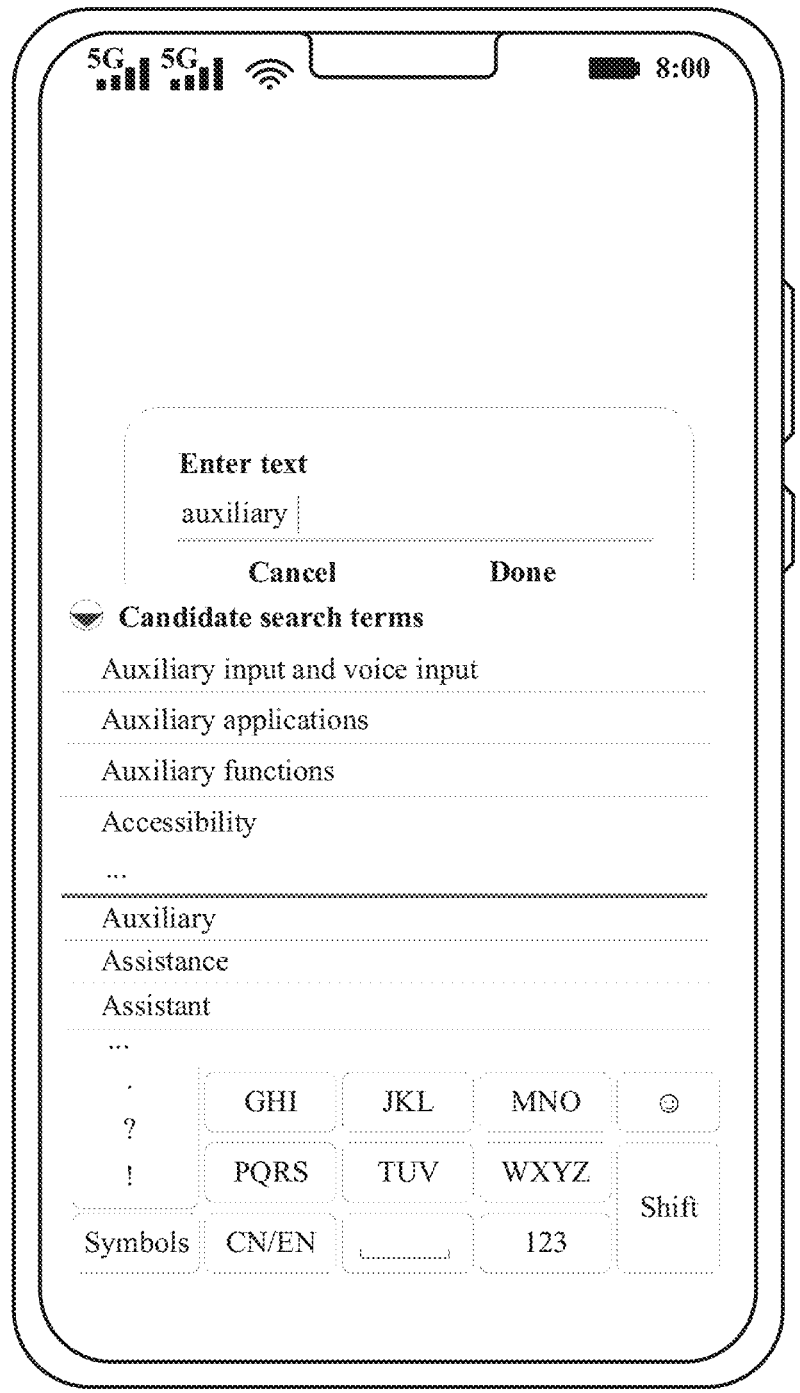
FIG. 48 is a schematic diagram of another user interface on a mobile phone according to an embodiment of this application.

In a user interface on the mobile phone as shown in FIG. 48, the candidate terms in the candidate term list on the large-screen device may be put before the candidate terms in the local input method on the mobile phone. The candidate terms in the candidate term list on the large-screen device and the candidate terms in the local input method on the mobile phone are separated by using a marker, for example, a horizontal line. Alternatively, the candidate terms in the candidate term list on the large-screen device may be put after the candidate terms in the local input method on the mobile phone (not shown in FIG. 48). The candidate terms in the candidate term list on the large-screen device and the candidate terms in the local input method on the mobile phone are separated by using a marker, for example, a horizontal line.

Figure 49:
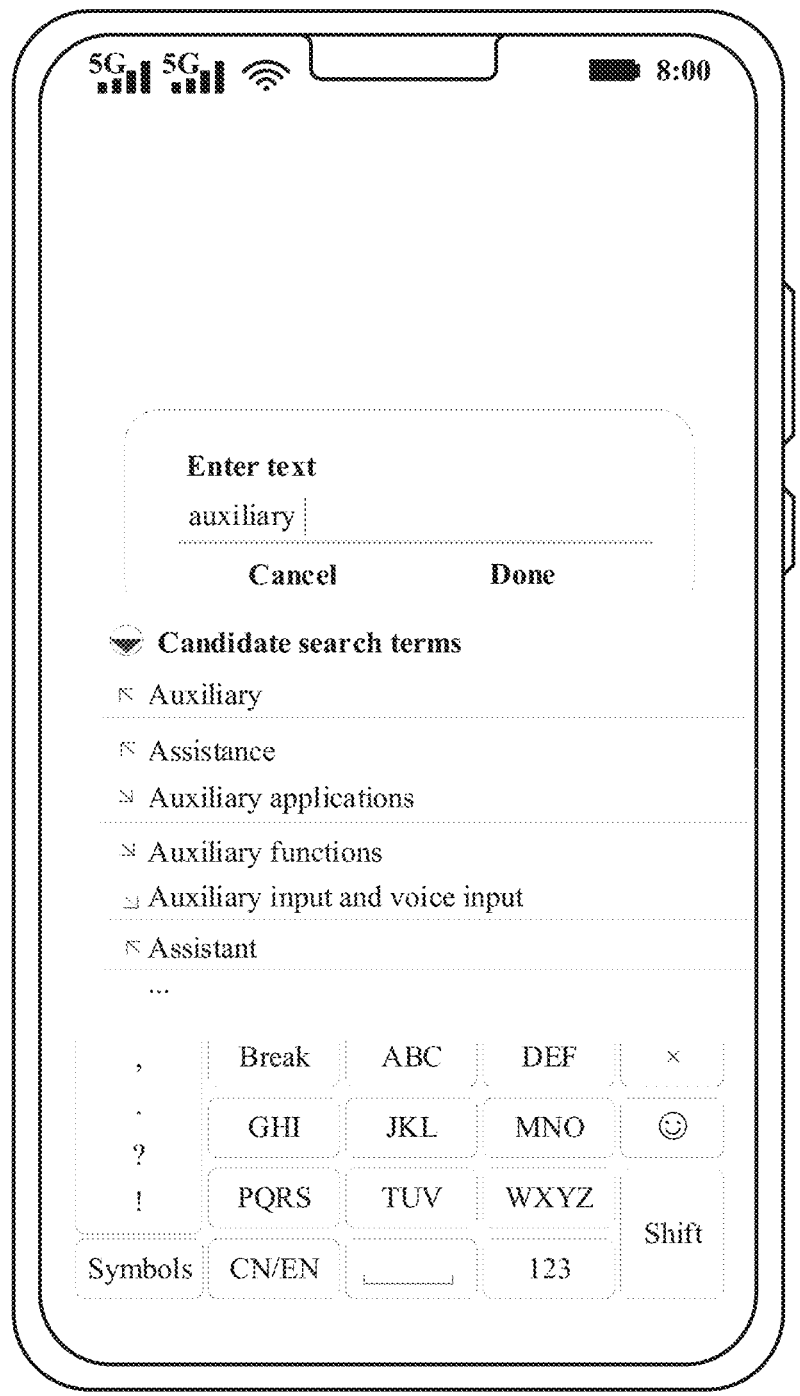
FIG. 49 is a schematic diagram of still another user interface on a mobile phone according to an embodiment of this application.

In a user interface on the mobile phone as shown in FIG. 49, the candidate term in the candidate term list on the large-screen device and the candidate term in the local input method on the mobile phone may be distinguished by using identifiers. An identifier of the candidate term in the candidate term list on the large-screen device is different from that of the candidate term in the local input method on the mobile phone. A specific form of the identifiers may include a color, text, and/or an image. This is not limited in this embodiment of this application.

For example, as shown in FIG. 49, when a user enters "auxiliary" in the edit box on the mobile phone, in the user interface on the mobile phone, an arrow pointing lower right may be added as an identifier of a candidate term that matches "auxiliary" and that is obtained through synchronization with the large-screen device, and an arrow pointing upper left may be added as an identifier of a candidate term that is obtained through association by using "auxiliary" in the local input method on the mobile phone, so that the user can know sources of the candidate terms based on the identifier of each candidate term.

In this embodiment of this application, a specific display order of the candidate term in the candidate term list on the large-screen device and the candidate term in the local input method on the mobile phone is not limited. In a possible implementation, with reference to historical searches of the user, the candidate term in the candidate term list on the large-screen device and the candidate term in the local input method on the mobile phone may be sorted in descending order based on historical times of use. In a possible implementation, with reference to popularity, the candidate term in the candidate term list on the large-screen device and the candidate term in the local input method on the mobile phone may be sorted in descending order based on the popularity. In a possible implementation, the candidate term in the candidate term list on the large-screen device may be put before the candidate term in the local input method on the mobile phone. In a possible implementation, the candidate term in the candidate term list on the large-screen device and the candidate term in the local input method on the mobile phone may be sorted alternately. In a possible implementation, the candidate term in the candidate term list on the large-screen device and the candidate term in the local input method on the mobile phone may be sorted randomly.

In this way, in the user interface on the mobile phone as shown in any one of FIG. 45 to FIG. 49, a user may click a required target candidate term, and fill the target candidate term in the edit box on the mobile phone, to implement search on the large-screen device based on the target candidate term.

In a possible implementation, a technical implementation of synchronizing the candidate term in the candidate term list on the large-screen device to the mobile phone may include: The candidate term in the candidate term list on the large-screen device is read based on an input method framework of the large-screen device, and the candidate term in the candidate term list on the large-screen device is sent to an input method framework of the mobile phone through a distributed network. A technical implementation of synchronizing the candidate term in the candidate term list on the large-screen device to the mobile phone is not limited in this embodiment of this application.

It should be noted that the user interface diagrams of auxiliary input of the mobile phone for the large-screen device are all examples for description. In a possible implementation, in an interface for auxiliary input of the mobile phone for the large-screen device, all or some of content on the large-screen device may be synchronized, so that a user using the mobile phone can learn about a status on the large-screen device based on the interface on the mobile phone.

Figure 50:
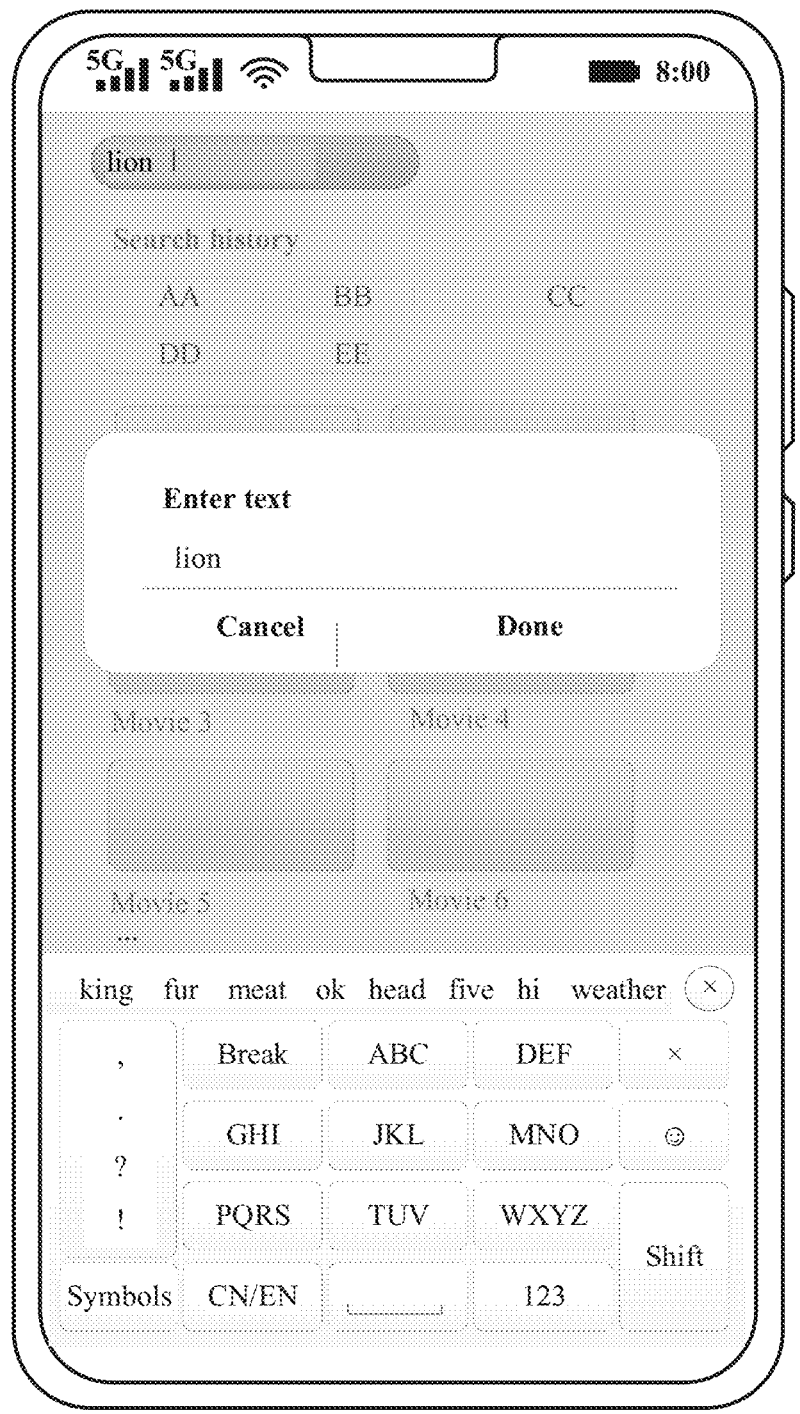
FIG. 50 is a schematic diagram of still another user interface on a mobile phone according to an embodiment of this application.

For example, FIG. 50 shows a user interface on a mobile phone. As shown in FIG. 50, when using the mobile phone to assist the large-screen device with input, a user may project all or some of the content on the large-screen device to the mobile phone. For example, content in the edit box on the large-screen device is displayed on the mobile phone, and an edit box on the mobile phone is displayed in a layer above the content on the large-screen device. In this way, when using the edit box on the mobile phone for input, the user can synchronously see a status in the edit box on the large-screen device in the user interface, and the user does not need to look up at an input status on the large-screen device during auxiliary input.

It should be noted that in the foregoing embodiments, an example in which a user uses auxiliary input of a Chinese character for the large-screen device is used for description. In a possible implementation, a user may use auxiliary input of an English phrase or text in another form for the large-screen device. Specific content of auxiliary input is not limited in this embodiment of this application.

Figure 51:
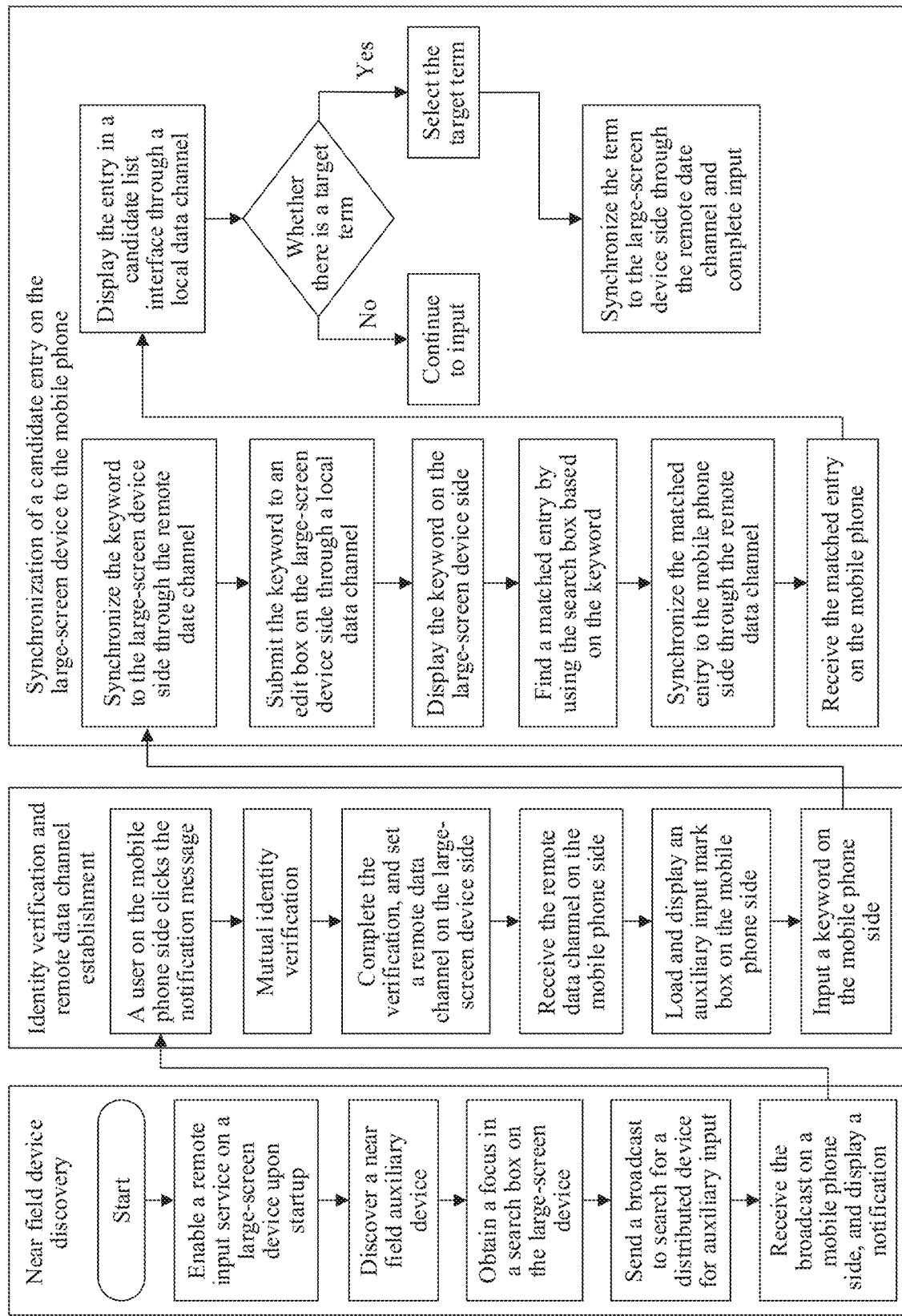
FIG. 51 is a schematic diagram of a specific procedure of communication between a mobile phone and a large-screen device according to an embodiment of this application.

For example, FIG. 51 is a schematic diagram of a specific process in which a mobile phone assists a large-screen device with input.

As shown in FIG. 51, that the mobile phone assists the large-screen device with input may include: near field device discovery, identity verification and remote data channel establishment, and synchronization of a candidate entry on the large-screen device to the mobile phone.

For example, during the near field device discovery, a remote input service on the large-screen device is enabled upon startup, and the large-screen device may enable a function of near field auxiliary device discovery. When a focus is obtained in a search box (for example, a search box selected by a user by using a remote control) on the large-screen device, the large-screen device may send a broadcast to search for a distributed device for auxiliary input (for example, the mobile phone) having an auxiliary input capability. After the distributed device for auxiliary input receives the broadcast from the large-screen device, a notification may be displayed on the distributed device for auxiliary input, and the notification is used to prompt a request of the large-screen device for auxiliary input.

In a possible implementation, during the near field device discovery, the large-screen device may search a near field device by using Bluetooth, a local area network broadcast, or the like, and all distributed devices for auxiliary input that have the auxiliary input capability receive a notification.

During the identity verification and the remote data channel establishment, after a distributed device for auxiliary input receives the notification, a user may click the notification message on the distributed device for auxiliary input, to trigger identity verification between the large-screen device and the distributed device for auxiliary input (an example in which the distributed device for auxiliary input is the mobile phone is used for description below), for example, validation of identities between the devices. After the authentication is completed, a remote data channel may be established between the large-screen device side and the mobile phone side. Subsequently, data transmission between the large-screen device and the mobile phone may be implemented based on the remote data channel. For example, after receiving the remote data channel, the mobile phone side may load and display an auxiliary input mark box (also referred to as an edit box), and a user may enter a keyword in the input mark box.

It can be understood that the step for identity verification may be adaptively selected based on an actual application scenario. For example, in some scenarios (for example, a scenario with a low security requirement), the identity verification may not be performed between the large-screen device and the mobile phone. After a user on the mobile phone side triggers the notification, the remote data channel may be established between the large-screen device side and the mobile phone side.

During the synchronization of the candidate term list on the large-screen device side to the mobile phone, the mobile phone may synchronize an entered keyword or key term to the large-screen device side through the remote data channel. The large-screen device side submits the keyword or key term to an edit box through a local data channel. The large-screen device side may display the keyword or key term entered on the mobile phone side. The search box on the large-screen device side finds a matched candidate term based on the keyword or key term, and the matched candidate term is filled in the candidate term list in the search box on the large-screen device. The large-screen device synchronizes the candidate term list to the mobile phone side through the remote data channel. After the mobile phone receives the candidate term list, the mobile phone displays the candidate term list in an interface for a candidate term list on the mobile phone through a local data channel. If the candidate term list does not include a target term that the user wants, the user may continue to enter a keyword or key term on the mobile phone. If the candidate term list includes a target term that the user wants, the user clicks the target term, and the mobile phone synchronizes the target term to the input box on the large-screen device side through the remote data channel, to implement auxiliary input.

It should be noted that the user interface diagrams of auxiliary input of the mobile phone for the large-screen device are all examples for description. In a possible implementation, in an interface for auxiliary input of the mobile phone for the large-screen device, all or some of content on the large-screen device may be synchronized, so that a user using the mobile phone can learn about a status on the large-screen device based on the interface on the mobile phone.

Figure 52:
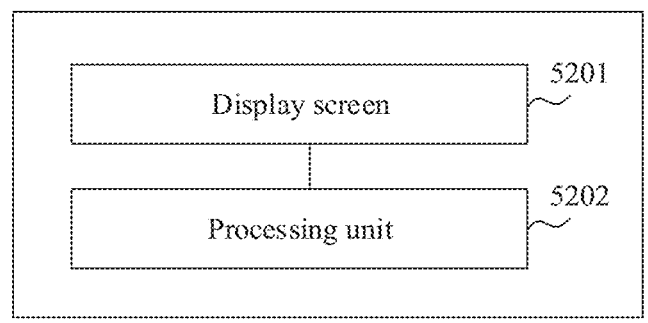
FIG. 52 is a schematic diagram of a structure of a device according to an embodiment of this application.

When each functional module is obtained by division based on each corresponding function, FIG. 52 is a schematic diagram of a possible structure of a first device or a second device according to an embodiment of this application. The first device or the second device includes a display screen 5201 and a processing unit 5202.

The display screen 5201 is configured to support the first device or the second device to perform steps for display in the foregoing embodiments, or another process in the technology described in embodiments of this application. The display screen 5201 may be a touchscreen, other hardware, or a combination of hardware and software.

The processing unit 5202 is configured to support the first device or the second device to perform steps for processing in the foregoing method embodiments, or another process in the technology described in embodiments of this application.

All related content of the steps in the foregoing method embodiments may be cited in function descriptions of the corresponding functional modules. Details are not described herein again.

Clearly, the electronic device includes but is not limited to the units and modules listed above. In addition, functions that the foregoing functional modules can specifically implement include but are not limited to the functions corresponding to the steps in the methods in the foregoing examples. For detailed descriptions of another unit of the electronic device, refer to detailed descriptions of a step corresponding to the unit in the methods. Details are not described herein again in this embodiment of this application.

When an integrated unit is used, the first device or the second device in the foregoing embodiments may include a processing module, a storage module, and a display screen. The processing module is configured to control and manage an action of the first device or the second device. The display screen is configured to display content based on an indication of the processing module. The storage module is configured to store program code and data on the first device or the second device. Further, the first device or the second device may further include an input module and a communications module. The communications module is configured to support the first device or the second device to communicate with another network entity, to implement functions such as calling, data exchange, and Internet access of the first device or the second device.

The processing module may be a processor or a controller. The communications module may be a transceiver, an RF circuit, a communications interface, or the like. The storage module may be a memory. The display module may be a screen or a display. The input module may be a touchscreen, a voice input apparatus, a fingerprint sensor, or the like.

The communications module may include an RF circuit, and may further include a wireless fidelity (wireless fidelity. Wi-Fi) module, a near field communication (near field communication, NFC) module, and a Bluetooth module. The communications modules such as the RF circuit, the NFC module, the Wi-Fi module, and the Bluetooth module may be collectively referred to as a communications interface. The processor, the RF circuit, the display screen, and the memory may be coupled to each other through a bus.

Figure 53:
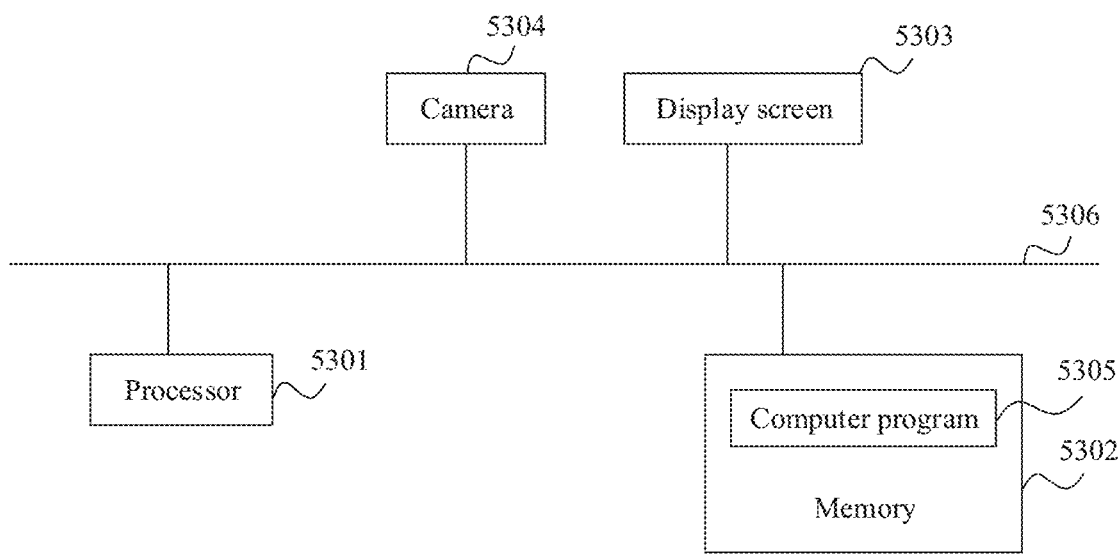
FIG. 53 is a schematic diagram of a structure of still another device according to an embodiment of this application.

FIG. 53 is a schematic diagram of still another possible structure of a first device, or a second device according to an embodiment of this application. The first device or the second device includes one or more processors 5301, a memory 5302, a camera 5304, and a display screen 5303. The components may communicate with each other through one or more communications buses 5306.

One or more computer programs 5305 are stored in the memory 5302, and are configured to be executed by the one or more processors 5301. The one or more computer programs 5305 include instructions, and the instructions are used to perform any one of the steps in the foregoing display method. Clearly, the electronic device includes but is not limited to the components listed above. For example, the electronic device may further include a radio frequency circuit, a positioning apparatus, a sensor, and the like.

This application further provides the following embodiments. It should be noted that serial numbers of the following embodiments do not necessarily follow a sequence of serial numbers of the foregoing embodiments.

Embodiment 41: A device communication method is applied to a system including a first device, a second device, and a third device, and the method includes:

The first device, the second device, and the third device are connected to a distributed network;

the second device obtains a target candidate term, where the target candidate term does not belong to a candidate term thesaurus on the first device, and the target candidate term does not belong to a candidate term thesaurus on the third device;

the first device receives a keyword that is entered by a user and that is related to the target candidate term, and the first device displays the target candidate term; and/or the third device receives a keyword that is entered by a user and that is related to the target candidate term, and the third device displays the target candidate term.

Embodiment 42: The method according to Embodiment 41 further includes:

The first device, the second device, and the third device synchronize a candidate term thesaurus on each of the devices with each other.

Embodiment 43: The method according to Embodiment 41 or 42 further includes:

When the first device, the second device, or the third device exits the distributed network, the first device, the second device, or the third device displays a prompt interface showing whether to delete a synchronized candidate term thesaurus, where the prompt interface includes an option used to represent deletion and an option used to represent no deletion; and the first device, the second device, or the third device deletes, in response to an operation of triggering the option representing deletion, the candidate term thesaurus synchronized by another device; or the first device, the second device, or the third device retains, in response to an operation of triggering the option representing no deletion, the candidate term thesaurus synchronized through the distributed network.

Embodiment 44: The method according to Embodiment 41 or 42 further includes:

The first device, the second device, or the third device determines an access type of the device separately; and when the first device, the second device, or the third device exits the distributed network, the first device, the second device, or the third device determines, based on the access type of the device, whether to delete the candidate term thesaurus synchronized through the distributed network.

Embodiment 45: The method according to any one of Embodiments 41 to 44 further includes:

The first device displays a first interface including a first edit box;

the first device sends an indication message to the second device;

the second device displays a second interface based on the indication message, where the second interface includes a second edit box; and if there is an editing status in the second edit box, the editing status is synchronized to the first edit box.

Embodiment 46: According to the method described in Embodiment 45, the second device includes an interface service, and the interface service is used for synchronization of the editing status between the first device and the second device.

Embodiment 47: According to the method described in Embodiment 45 or 46, the editing status includes one or more of the following: textual content, a cursor, or highlighting of the textual content.

Embodiment 48: According to the method described in any one of Embodiments 45 to 47, that the second device displays the second interface based on the indication message includes:

The second device displays a notification interface in response to the indication message, where the notification interface includes a third option for confirming auxiliary input; and the second device displays the second interface in response to an operation of triggering the third option.

Embodiment 49: According to the method described in any one of Embodiments 45 to 48, the second interface further includes all or some of content in the first interface.

Embodiment 410: According to the method described in Embodiment 49, the second edit box and all or some of the content in the first interface are displayed in layers, and the second edit box is displayed in a layer above all or some of the content in the first interface.

Embodiment 411: According to the method described in any one of Embodiments 45 to 49 and 410, after the second device displays the second interface based on the indication message, the method further includes:

The second device displays a virtual keyboard in response to triggering the second edit box; and the second device displays the editing status in the second edit box based on an input operation received on the virtual keyboard and/or in the second edit box.

Embodiment 412: According to the method described in any one of Embodiments 41 to 49 and 410 to 411, the first device includes any one of the following: a television, a large-screen device, or a wearable device; and the second device or the third device includes any one of the following: a mobile phone, a tablet, or a wearable device.

Embodiment 413: The method according to any one of Embodiments 41 to 49 and 410 to 412 further includes:

The second device displays a fourth interface including an option of the first device;

the second device sends an indication message to the first device in response to an operation of selecting the option of the first device;

the first device displays a first interface including a first edit box;

the second device displays a second interface, where the second interface includes a second edit box; and if there is an editing status in the second edit box, the editing status is synchronized to the first edit box.

Embodiment 414: A device communication method is applied to a system including a first device, a second device, and a third device, and the method includes:

The first device, the second device, and the third device are connected to a distributed network;

the first device, the second device, and the third device synchronize a candidate term thesaurus on each of the devices to each other to obtain a candidate term thesaurus set; and when text editing is performed on the first device, the second device, or the third device, the first device, the second device, or the third device displays a candidate term based on the candidate term thesaurus set.

Embodiment 415: A device communication method is applied to a first device and includes:

The first device is connected to a distributed network, where there is another device further connected to the distributed network;

the first device synchronizes a candidate term thesaurus on the another device based on the distributed network to obtain a candidate term thesaurus set; and when text editing is performed on the first device, the first device displays a candidate term based on the candidate term thesaurus set.

Embodiment 416: A device communication system includes a first device, a second device, and a third device, where the first device is configured to perform steps performed by the first device according to any one of Embodiments 41 to 415, the second device is configured to perform steps performed by the second device according to any one of Embodiments 41 to 49 and 410 to 415, and the third device is configured to perform steps performed by the third device according to any one of Embodiments 41 to 49 and 410 to 415.

Embodiment 417: A first device includes at least one memory and at least one processor, where the memory is configured to store program instructions; and the processor is configured to invoke the program instructions in the memory, to enable the first device to perform steps performed by the first device according to any one of Embodiments 41 to 49 and 410 to 415.

Embodiment 418: A second device includes at least one memory and at least one processor, where the memory is configured to store program instructions; and the processor is configured to invoke the program instructions in the memory, to enable the second device to perform steps performed by the second device according to any one of Embodiments 41 to 49 and 410 to 415.

Embodiment 419: A computer-readable storage medium stores a computer program, and when the computer program is executed by a processor of a first device, steps performed by the first device according to any one of Embodiments 41 to 49 and 410 to 415 are implemented; when the computer program is executed by a processor of a second device, steps performed by the second device according to any one of Embodiments 41 to 49 and 410 to 415 are implemented; or when the computer program is executed by a processor of a third device, steps performed by the third device according to any one of Embodiments 41 to 49 and 410 to 415 are implemented.

For specific implementations of Embodiment 41 to Embodiment 49 and Embodiment 410 to Embodiment 419, refer to descriptions of FIG. 54 to FIG. 67.

In a possible implementation of using the mobile phone to assist the large-screen device with input, after a keyword is entered on the mobile phone, association with the keyword may be performed based on content of a local candidate term thesaurus on the mobile phone (or may be understood as an input method candidate term thesaurus corresponding to an input method used by a user), and a recommended candidate term is displayed. The user may implement quick input by clicking the candidate term, and efficiency of input by the user is improved.

However, the local candidate term thesaurus on the mobile phone is usually not related to content of a program or the like on the large-screen device. When the candidate term thesaurus on the mobile phone is used for association with the keyword, the content related to the program on the large-screen device is not associable. As a result, the user still has to select words one by one, and input efficiency is relatively low.

Therefore, enriching a candidate term thesaurus on the mobile phone with more content is a feasible manner to improve efficiency of input by the user.

In a possible implementation, on some products, a candidate term thesaurus may be synchronized between a plurality of devices (for example, a mobile phone and a large-screen device) of a user based on a user account. For example, after the user creates a user account on an input method, regardless of a device on which the user logs in to the user account, a specific candidate term (for example, a term obtained after the user selects words one by one) generated during use of the input method by the user for input may be stored in a candidate term thesaurus corresponding to the user account. Subsequently, if the user logs in to the user account on the large-screen device, a candidate term thesaurus on the large-screen device may also include the candidate term thesaurus on the mobile phone. If the user logs in to the user account on the mobile phone, the candidate term thesaurus on the mobile phone may also include the candidate term thesaurus on the large-screen device.

However, in this implementation, synchronization of the candidate term thesaurus completely relies on the user account on the input method. If the user does not log in to the user account on a device, the candidate term thesaurus cannot be synchronized. Alternatively, because a user account is usually specific to an input method developed by a company, if a device does not support the input method developed by the company, or the user changes this type of input method, a candidate term thesaurus cannot be synchronized. In addition, if the user changes a device or the like, the user needs to change or log in to a user account, and operations are relatively complicated. In addition, during actual use, there are just a few users who create an account on an input method, and it is even rarer to log in to the user account when the input method is used for input. Consequently, the implementation cannot fully come into play.

In view of this, an embodiment of this application provides a device communication method. After a device joins a distributed network, a candidate term thesaurus in the distributed network can be synchronized to the device, so that a plurality of devices can share a candidate term thesaurus conveniently without relying on a user account on an input method, to provide a better input service for a user.

Figure 54:
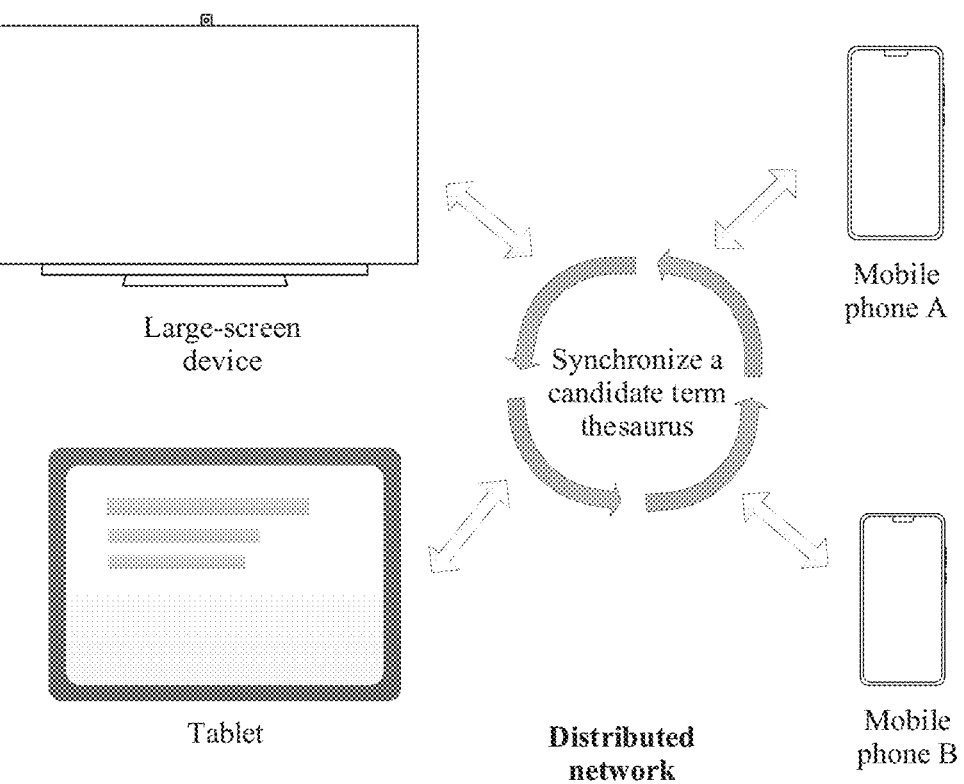
FIG. 54 is a schematic diagram of a specific application scenario according to an embodiment of this application.

For example, FIG. 54 is a schematic diagram of a specific application scenario according to an embodiment of this application.

As shown in FIG. 54, a large-screen device, a tablet, a mobile phone A, and a mobile phone B are connected to a distributed network. The large-screen device, the tablet, the mobile phone A, and the mobile phone B may each synchronize a candidate term thesaurus on another device based on the distributed network, so that the large-screen device, the tablet, the mobile phone A, and the mobile phone B can all obtain a candidate term thesaurus set. The candidate term thesaurus set may be understood as a union of a candidate term thesaurus on the large-screen device, a candidate term thesaurus on the tablet, a candidate term thesaurus on the mobile phone A, and a candidate term thesaurus on the mobile phone B. In this case, subsequently, the large-screen device, the tablet, the mobile phone A, and the mobile phone B can all use the candidate term thesaurus set to implement convenient recommendation of candidate terms, thereby improving efficiency of input by a user.

For example, the large-screen device, the tablet, the mobile phone A, and the mobile phone B may be connected to a same Wi-Fi to build up the distributed network. The large-screen device, the tablet, the mobile phone A, and the mobile phone B may join the distributed network in any possible form. This is not specifically limited in this embodiment of this application.

It can be understood that a specific type and quantity of devices that are connected to the distributed network may be determined based on an actual application scenario. The device that is connected to the distributed network is not specifically limited in this embodiment of this application.

When each device joins the distributed network, each device may push, based on a distributed database synchronization capability provided by the FWK layer of each device, content of a candidate term thesaurus on each device to a candidate term thesaurus path on another device in the distributed network, to synchronize the candidate term thesaurus on each device. It can be understood that, if each device in the distributed network performs an input step and generates a new candidate term after joining the distributed network, the new candidate term may be further adaptively synchronized to the candidate term thesaurus on each device.

In a possible implementation, candidate term thesaurus paths on the devices in the distributed network may be the same. For example, the candidate term thesaurus path on each device may be set to a distributed candidate term thesaurus system path "data/inputmethod/candidateWords". In this case, each device in the distributed network may conveniently push the candidate term thesaurus according to the same path.

In a possible implementation, when synchronizing the candidate term thesaurus to another device, each device in the distributed network may add device information of the device to a candidate term in the candidate term thesaurus, so that candidate terms can be managed flexibly subsequently based on the device information added to the candidate term. For example, when a device exits the distributed network, a candidate term with device information of the device may be deleted from a candidate term thesaurus on another device in the distributed network.

In a possible implementation, when a device joins the distributed network for the first time, a user may set an access type (or may be understood as a permission to) of the device, or each device may automatically determine an access type of the device, and an adaptive step is performed based on the access type of the device. When the device joins the distributed network again (or it may be understood that the device is not joining the distributed network for the first time), the previously set access type of the device may be automatically identified, and an adaptive step is performed based on the access type of the device. For example, the access type of the device may include a common device, a temporary visitor, a blacklisted device, or the like.

For example, the common device may mean that a security level of the device is relatively high. When the common device joins the distributed network, the common device may be allowed to synchronize a candidate term thesaurus on another device in the distributed network, and synchronize a local candidate term thesaurus on the common device to the another device in the distributed network. When the common device exits the distributed network, the candidate term thesaurus synchronized to the common device through the distributed network may be retained, so that the common device can continue to use, after exiting the distributed network, the candidate term thesaurus synchronized through the distributed network for a lot of candidate term recommendations. When the common device exits the distributed network, the candidate term thesaurus synchronized by the common device to the distributed network may also be retained in the distributed network, so that the another device in the distributed network may subsequently continue to use the candidate term thesaurus on the common device for a lot of candidate term recommendations. It can be understood that a specific permission to the common device may be further specified based on an actual application scenario. This is not specifically limited in this embodiment of this application.

For example, the temporary visitor may mean that a security level of the device is general. When the temporary visitor joins the distributed network, the temporary visitor may be allowed to synchronize a candidate term thesaurus on another device in the distributed network, and synchronize a local candidate term thesaurus on the temporary visitor to the another device in the distributed network. When the temporary visitor exits the distributed network, the candidate term thesaurus synchronized to the temporary visitor through the distributed network may be deleted, and the candidate term thesaurus synchronized by the temporary visitor to the distributed network can also be deleted from the distributed network. It can be understood that a specific permission to the temporary visitor may be further specified based on an actual application scenario. This is not specifically limited in this embodiment of this application.

For example, the blacklisted device may mean that a security level of the device is relatively low. When the blacklisted device joins the distributed network, the blacklisted device may be banned from synchronizing a candidate term thesaurus on another device in the distributed network, and banned from synchronizing a local candidate term thesaurus on the blacklisted device to the another device in the distributed network. It can be understood that a specific permission to the blacklisted device may be further specified based on an actual application scenario. This is not specifically limited in this embodiment of this application.

In this way, by distinguishing an access type of a device, data can be protected while user input is facilitated.

For example, a possible implementation of setting the access type of the device is as follows: An administrator device (for example, one or more devices that play an administrator role in the distributed network) is set in the distributed network, and an FWK layer of the administrator device may listen on a status of the distributed network, and obtain information about the distributed network and information about a device in the distributed network. When the administrator device detects an access device (for example, the large-screen device, the tablet, the mobile phone A, or the mobile phone B) joins the distributed network, the administrator device may set an access type of the access device.

It can be understood that, subsequently, the administrator device may further modify an access type of each device in the distributed network based on a requirement. For example, a modification interface for modifying the access type of the device may be provided on the administrator device, and the administrator may adaptively modify the access type of each device in the distributed network in the modification interface. Alternatively, for example, each device may send a request for modifying the access type to the administrator device, and the administrator device may modify the access type of the device according to the request. A specific manner of modifying the access type of the device is not limited in this embodiment of this application.

For example, a possible implementation of setting the access type of the device is as follows: Any device that is connected to the distributed network, when being connected to the distributed network, provides a function for setting the access type of the device, and a user may set the access type of the device based on a requirement.

In a possible implementation, if a new device (for example, a mobile phone C) subsequently is connected to the distributed network, the mobile phone C may further synchronize a candidate term thesaurus with the large-screen device, the tablet, the mobile phone A. and the mobile phone B. This is similar to the foregoing descriptions of synchronizing a candidate term thesaurus between the large-screen device, the tablet, the mobile phone A. and the mobile phone B. Details are not described herein again.

In a possible implementation, if a device (for example, the large-screen device, the tablet, the mobile phone A, the mobile phone B, or the mobile phone C) that has joined the distributed network exits the distributed network, based on an access type of the device that exits, a candidate term synchronized through the distributed network to the device that exits may be deleted from a candidate term thesaurus on the device that exits, or a candidate term synchronized through the distributed network to the device that exits may be retained in a candidate term thesaurus on the device that exits. This is not specifically limited in this embodiment of this application.

Figure 55A:
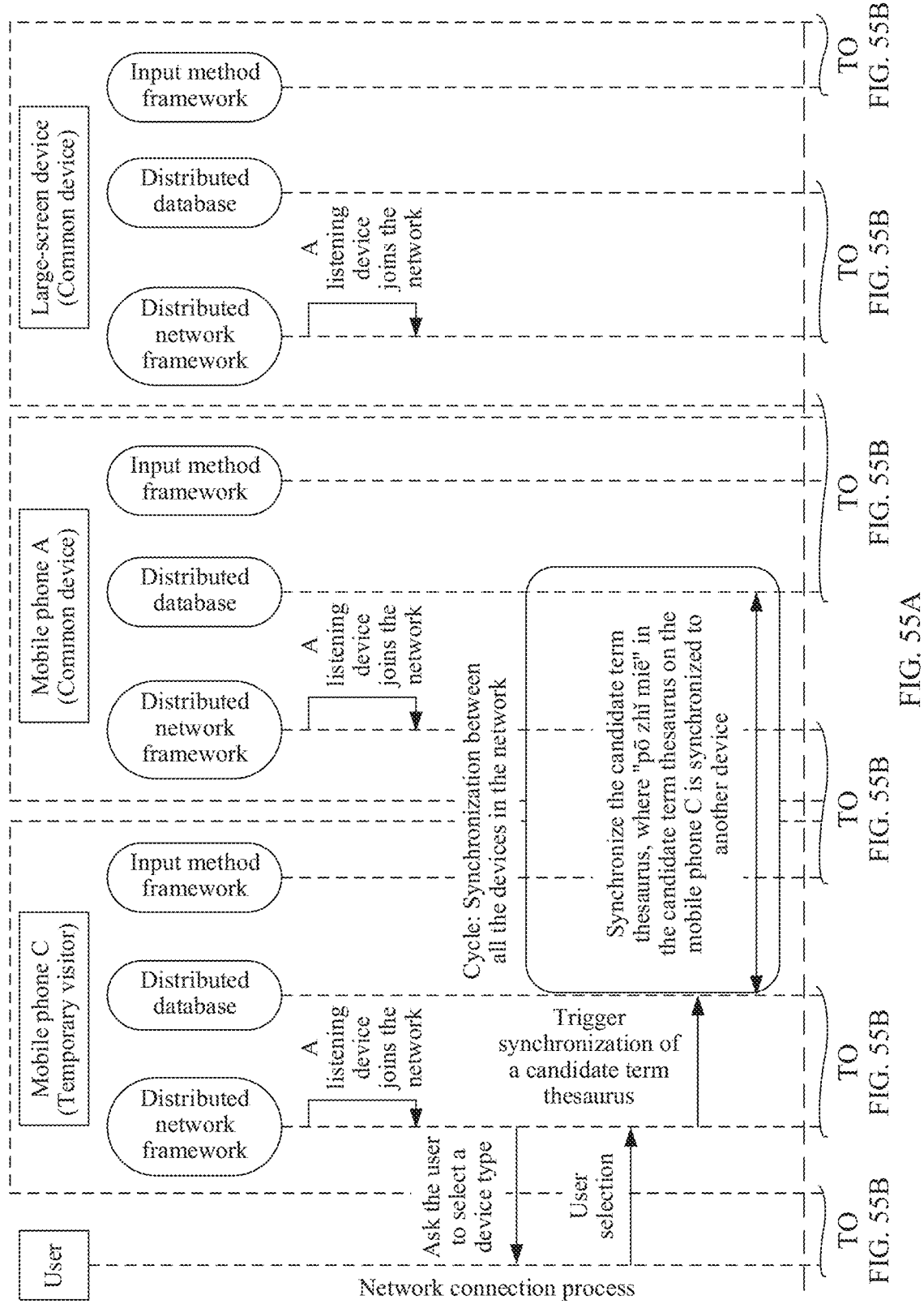
FIG. 55A and FIG. 55B are a schematic diagram of a specific system architecture for a device communication method according to an embodiment of this application.
Figure 55B:
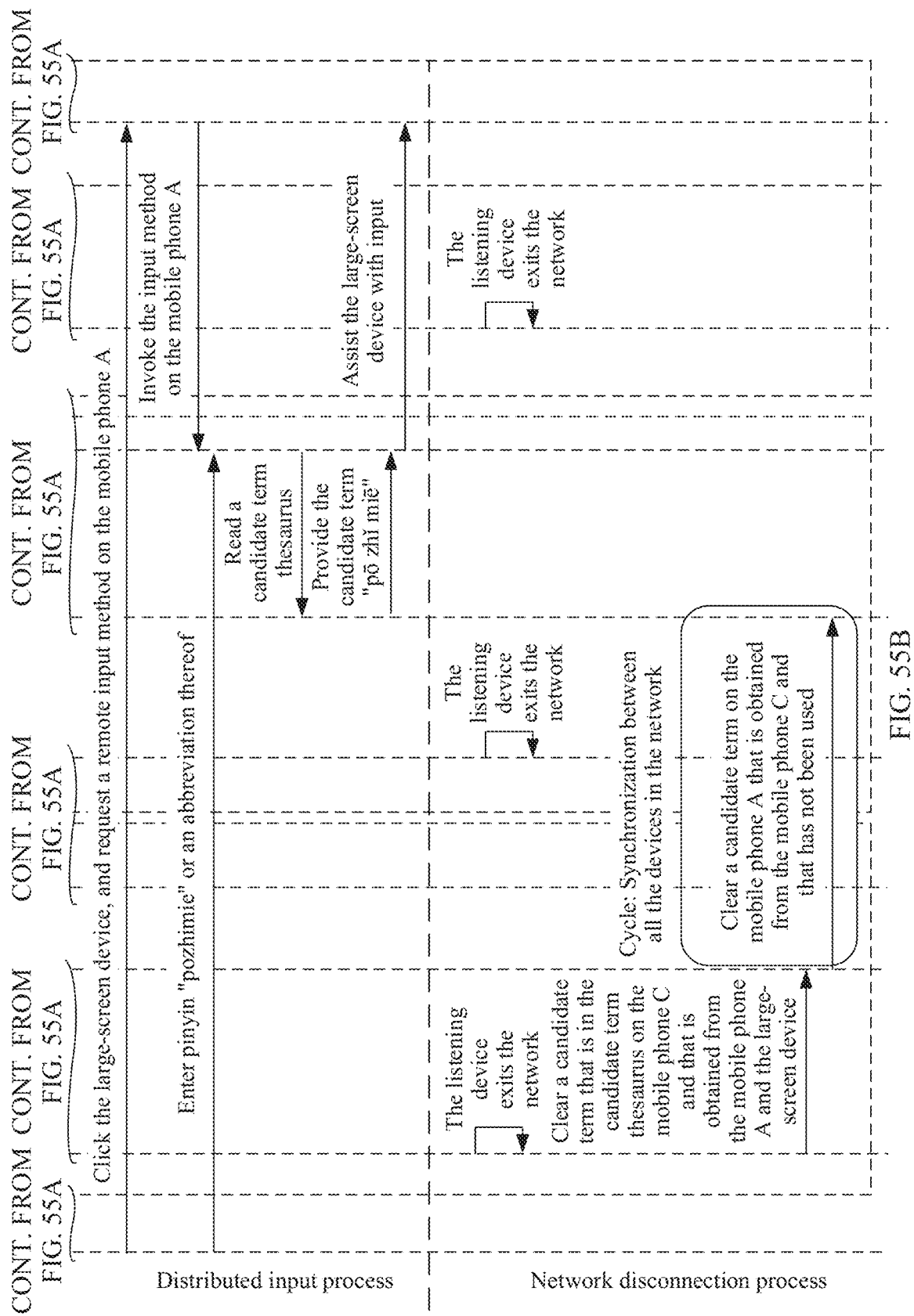

For example, FIG. 55A and FIG. 55B are a schematic diagram of a specific system architecture for a device communication method according to an embodiment of this application.

As shown in FIG. 55A and FIG. 55B, in this embodiment of this application, an example in which a distributed network includes a large-screen device, a mobile phone A, and a mobile phone C is used to describe processes in which the large-screen device, the mobile phone A, and the mobile phone C are connected to the distributed network, the large-screen device, the mobile phone A, and the mobile phone C synchronize a candidate term thesaurus, the mobile phone A assists the large-screen device with input by using the synchronized candidate term thesaurus, and the large-screen device, the mobile phone A, or the mobile phone C leaves the distributed network.

The large-screen device and the mobile phone A are common devices, and the mobile phone C is a temporary visitor. A distributed network framework, a distributed database (that may also be a database), and an input method framework (that may also be referred to as a remote input method framework service) may be set on the large-screen device, the mobile phone A. and the mobile phone C.

In the process in which the large-screen device, the mobile phone A, and the mobile phone C are connected to the distributed network, for example, a distributed network framework of the mobile phone C detects a connection of the mobile phone C to the distributed network, the mobile phone C may query, by using a display interface, a voice prompt, or the like, an access type (that may also be referred to as a device type) selected by a user operating the mobile phone C. After selecting an appropriate access type, the user may trigger the mobile phone C to synchronize a candidate term thesaurus on another device in the distributed network. The steps for connecting the large-screen device and the mobile phone A to the distributed network and synchronizing a candidate term thesaurus is similar to those on mobile phone C. Details are not described again. For example, if there is a candidate term "pō zhǐ miē" in a candidate term thesaurus on the mobile phone C, both the large-screen device and the mobile phone A may synchronize the candidate term "pō zhǐ miē".

In the process in which the mobile phone A assists the large-screen device B with input, a user may click an input method edit box on the large-screen device, and the large-screen device may invoke an input method on the mobile phone A. For example, an input box is displayed on the mobile phone A. and the user may enter content in the input box on the mobile phone A, to achieve an effect of assisting the large-screen device with input. For example, if the user enters "pozhimie", "PZM", or the like in the input box, the candidate term "pō zhǐ miē" may be displayed in an interface on the mobile phone A based on a candidate term thesaurus that includes the candidate term "pō zhǐ miē" and that is synchronized by the mobile phone C to the mobile phone A. The user may trigger the candidate term "pō zhǐ miē" by clicking or the like, to display the candidate term "pō zhǐ mi ē" in the input box on the large-screen device. In this embodiment of this application, for the user using the mobile phone A, because the candidate term "pō zhǐ miē" is synchronized by the mobile phone C, when entering "pozhimie", "PZM", or the like, the user A may not have to select, one by one, words that the user wants to enter, and input efficiency can be improved.

In the process in which the large-screen device, the mobile phone A, and the mobile phone C exit (or are disconnected from) the distributed network, for example, the distributed network framework of the mobile phone C detects a disconnection of the mobile phone C from the distributed network, because the mobile phone C is a temporary visitor, a candidate term synchronized by the large-screen device and the mobile phone A may be deleted from the candidate term thesaurus on the mobile phone C. Adaptively, a candidate term obtained by the mobile phone A from the mobile phone C (or a candidate term obtained from the mobile phone C but never used by the mobile phone A) may be deleted. Because the mobile phone A and the large-screen device are common devices, if the mobile phone A or the large-screen device is disconnected from the distributed network, a candidate term synchronized by another device in the distributed network to the mobile phone A or the large-screen device may be retained, and a candidate term synchronized by the mobile phone A or the large-screen device may be retained on the another device in the distributed network.

For example, the large-screen device, the mobile phone A, and the mobile phone C are all disconnected from the distributed network. After being disconnected from the distributed network, the mobile phone C may restore a candidate term thesaurus before a connection to the distributed network. The candidate term thesaurus on the mobile phone A may include a candidate term thesaurus before the mobile phone A is connected to the distributed network and a candidate term thesaurus before the large-screen device is connected to the distributed network. The candidate term thesaurus on the large-screen device may include the candidate term thesaurus before the mobile phone A is connected to the distributed network and the candidate term thesaurus before the large-screen device is connected to the distributed network.

It can be understood that, when the large-screen device, the mobile phone A. and the mobile phone C are connected to the distributed network, if a new candidate term is generated because of an input action on the large-screen device, the mobile phone A, the mobile phone C. or the like, a manner of handling the new candidate term may be further adaptively adjusted based on the access types of the large-screen device, the mobile phone A, and the mobile phone C. For example, if the new candidate term is generated because of an input action on the mobile phone C, the new candidate term may be deleted from the candidate term thesauruses on the mobile phone A and the large-screen device when the mobile phone C is disconnected from the distributed network. If the new candidate term is generated because of an input action on the mobile phone A or the large-screen device, after the mobile phone A or the large-screen device is disconnected from distributed network, the new candidate term may be retained in the candidate term thesauruses on the mobile phone A and the large-screen device.

In a possible implementation, if the candidate term in the candidate term thesaurus on the mobile phone C is used when the large-screen device, the mobile phone A, and the mobile phone C are connected to the distributed network, for example, the candidate term "pō zhǐ miē" on the mobile phone C is used when the mobile phone A assists the large-screen device with input, after the mobile phone C is disconnected from the distributed network, the used candidate term "pō zhǐ miē" may be retained in the candidate term thesauruses on the mobile phone A and the large-screen device.

It should be noted that, in the foregoing embodiments of this application, the synchronization of a candidate term thesaurus is used as an example for description. In a possible implementation, the method in this embodiment of this application is also applicable to any scenario of data sharing. For example, a file, music, a video, and/or a picture may be synchronized between a plurality of devices through the distributed network in a manner similar to that of synchronizing a candidate term thesaurus described above. It can be understood that a candidate term thesaurus usually includes text, and usually occupies relatively small space. In an implementation of synchronizing a candidate term thesaurus, selection of a storage control may not be paid attention to. If synchronized data is relatively large, in actual application, appropriate storage space may be selected, with reference to space occupied by a control for the data that needs to be synchronized, for the data that needs to be synchronized.

Corresponding to the processes described in FIG. 55A and FIG. 55B, an example in which the large-screen device, the mobile phone A. and the mobile phone C synchronize a candidate term thesaurus with each other, the mobile phone A uses the synchronized candidate term thesaurus to assist the large-screen device with input, and a user interface in which the large-screen device, the mobile phone A, or the mobile phone C leaves the distributed network is used for description below.

Figure 56:
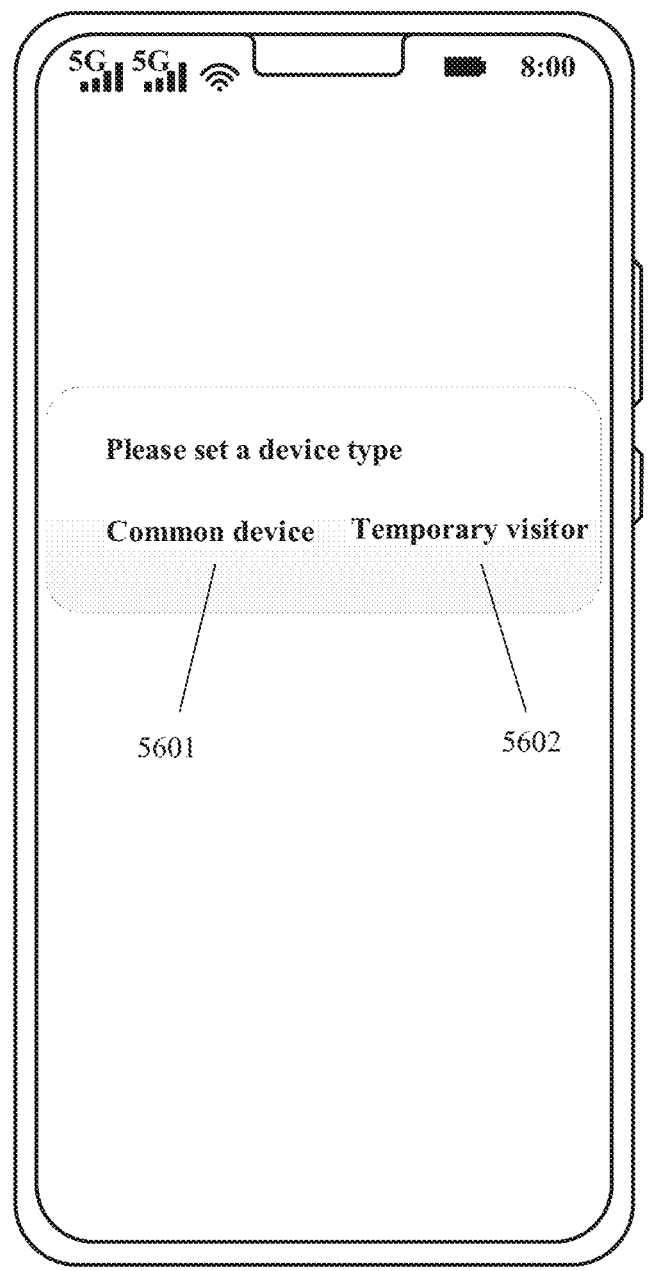
FIG. 56 is a schematic diagram of a user interface on a mobile phone according to an embodiment of this application.

For example, FIG. 56 is a schematic diagram of a user interface for selecting a device type. For example, a distributed network framework of the mobile phone C detects a connection of the mobile phone C to the distributed network, and the mobile phone C may display the user interface as shown in FIG. 56.

As shown in FIG. 56, the user interface may include a common device control 5601 and a temporary visitor control 5602 that are used to set the access type of the mobile phone C. A user may set the mobile phone C to a temporary visitor by clicking a button of the temporary visitor control 5602. In a similar manner, the user may set the mobile phone A and the large-screen device to common devices. Details are not described herein again.

In a possible implementation, if the access type of the large-screen device, the mobile phone A. or the mobile phone C has been set before in the distributed network, when the large-screen device, the mobile phone A, or the mobile phone C joins the distributed network again, the previously set access type may be retained, and a prompt of the user interface as shown in FIG. 56 is not given.

In a possible implementation, the large-screen device, the mobile phone A, or the mobile phone C may alternatively determine the access type of the large-screen device, the mobile phone A, or the mobile phone C based on a frequency, duration, and/or a quantity of times of the large-screen device, the mobile phone A. or the mobile phone C of joining the distributed network.

For example, for any one of the large-screen device, the mobile phone A, or the mobile phone C, if the frequency of joining the distributed network is greater than a specific threshold, it may be determined that the device is a common device; or if the frequency of joining the distributed network is less than a specific threshold, it may be determined that the device is a temporary visitor. Alternatively, if the duration after joining the distributed network is greater than a specific threshold, it may be determined that the device is a common device; or if the duration after joining the distributed network is less than a specific threshold, it may be determined that the device is a temporary visitor. Alternatively, if the quantity of times of joining the distributed network is greater than a specific threshold, it may be determined that the device is a common device; or if the quantity of times of joining the distributed network is less than a specific threshold, it may be determined that the device is a temporary visitor. Alternatively, if the quantity of times of joining the distributed network is greater than a specific threshold and the duration is greater than a specific threshold, it may be determined that the device is a common device; or if the quantity of times of joining the distributed network is less than a specific threshold and the duration is less than a specific threshold, it may be determined that the device is a temporary visitor; or the like. This is not specifically limited in this embodiment of this application. In this manner, a prompt of the user interface as shown in FIG. 56 may not be given either.

In a possible implementation, if a user has set an access type of a device last time, the access type of the device that is set by the user last time may be automatically used as the access type of the device, and the user interface as shown in FIG. 56 is not displayed.

In a possible implementation, if there are more than one of a plurality of devices that use a same login user account, it may be automatically determined that the devices that are more than one and that use the same login user account are common devices, and the user interface as shown in FIG. 56 is not displayed.

In a possible implementation, the access type of the large-screen device, the mobile phone A. or the mobile phone C may not be set, and the large-screen device, the mobile phone A, or the mobile phone C has a common permission. This is not specifically limited in this embodiment of this application. In this manner, a prompt of the user interface as shown in FIG. 56 may not be given either.

It can be understood that if the access type of the large-screen device, the mobile phone A, or the mobile phone C has been specified before, a step of adding or deleting a corresponding candidate term thesaurus may be subsequently performed based on the access type. If the access type of the large-screen device, the mobile phone A, or the mobile phone C has not been specified, a step of adding or deleting a candidate term thesaurus corresponding to any one of the foregoing access types may be subsequently performed. This is not limited in this embodiment of this application.

Figure 57:
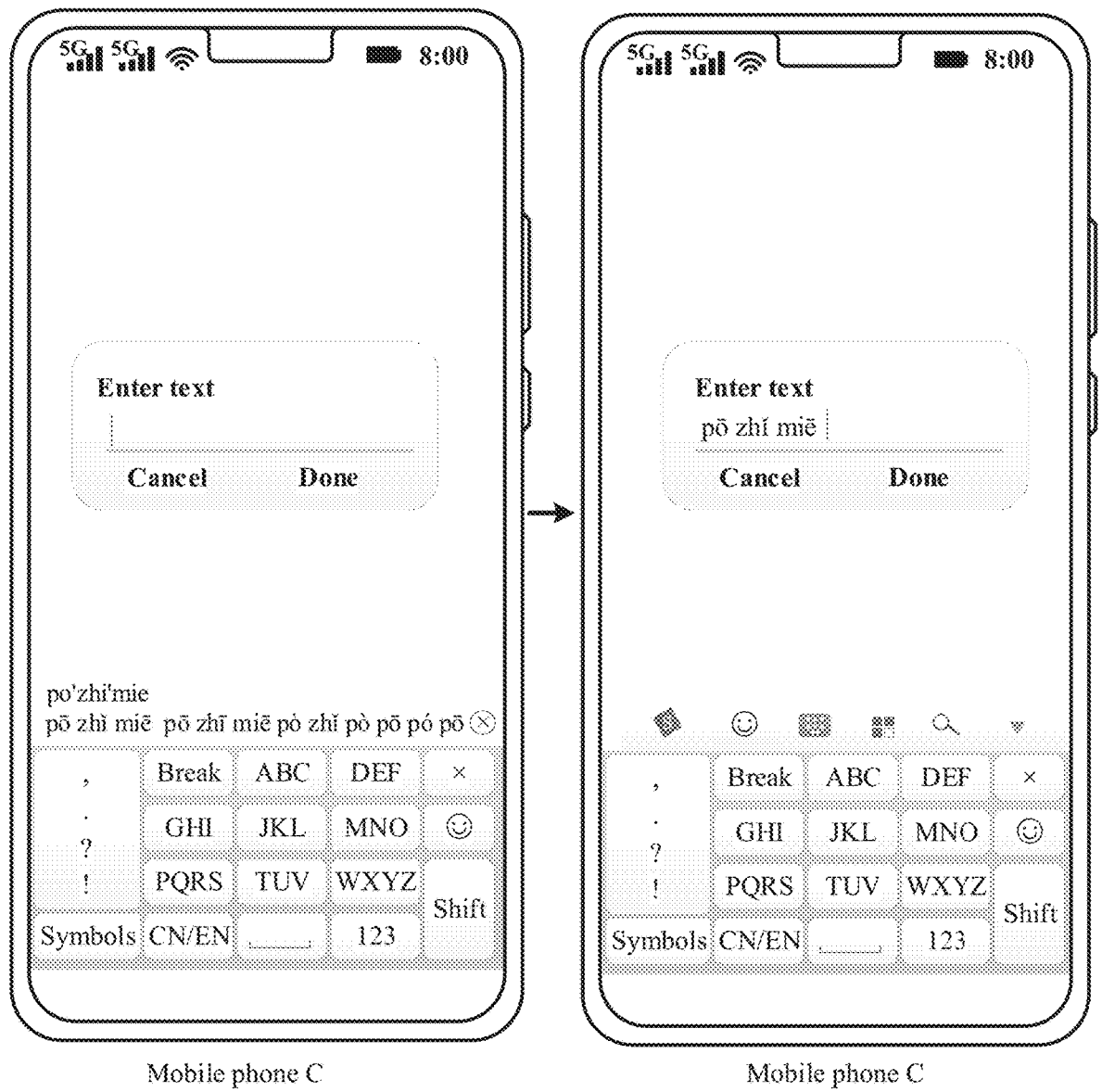
FIG. 57 is a schematic diagram of another user interface on a mobile phone according to an embodiment of this application.

FIG. 57 is a schematic diagram of an interface in which a candidate term is generated on the mobile phone C. As shown in FIG. 57, after entering "pozhimie" in an input box, a user may select candidate terms one by one, to obtain "p ō zhǐ miē". "pō zhǐ miē" may be stored in the candidate term thesaurus on the mobile phone C as a candidate term.

Alternatively, a user may enter English words "apple", "banana", and "meat" in an edit box on the mobile phone C, and select the foregoing words one by one, to obtain a candidate English term "apple banana meat". "apple banana meat" may be stored in the candidate term thesaurus on the mobile phone C as a candidate term.

Then, the mobile phone C is connected to the distributed network, and the large-screen device and the mobile phone A may synchronize the candidate term "pō zhǐ miē" and the like. It can be understood that there may be no user interface in the process of synchronizing the candidate term thesaurus, and a user may be unaware of the process of synchronizing the candidate term thesaurus. When the mobile phone A assists the large-screen device with input subsequently, quick input may be implemented based on the candidate term "pō zhǐ miē". When input is performed locally on the large-screen device, quick input may be implemented based on the candidate term "pō zhǐ miē". When input is performed locally on the mobile phone, quick input may be implemented based on the candidate term "pō zhǐ miē".

Figure 58:
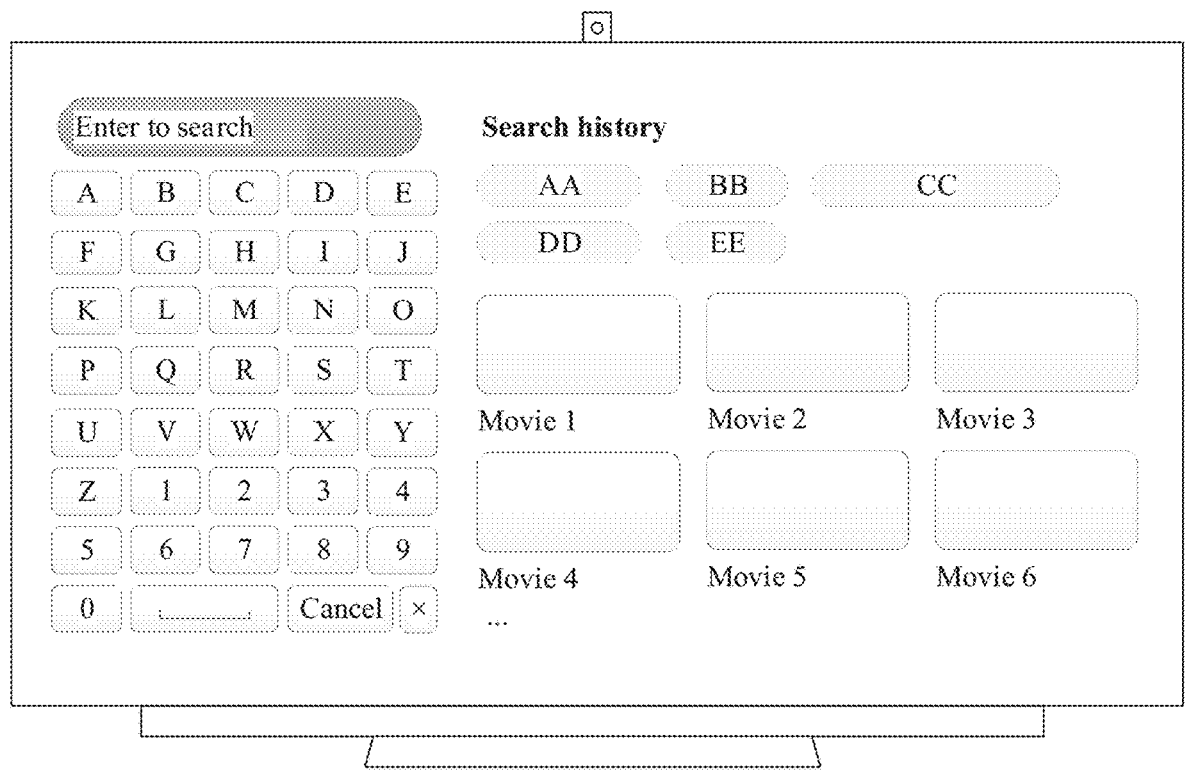
FIG. 58 is a schematic diagram of a user interface on a large-screen device according to an embodiment of this application.
Figure 59A:
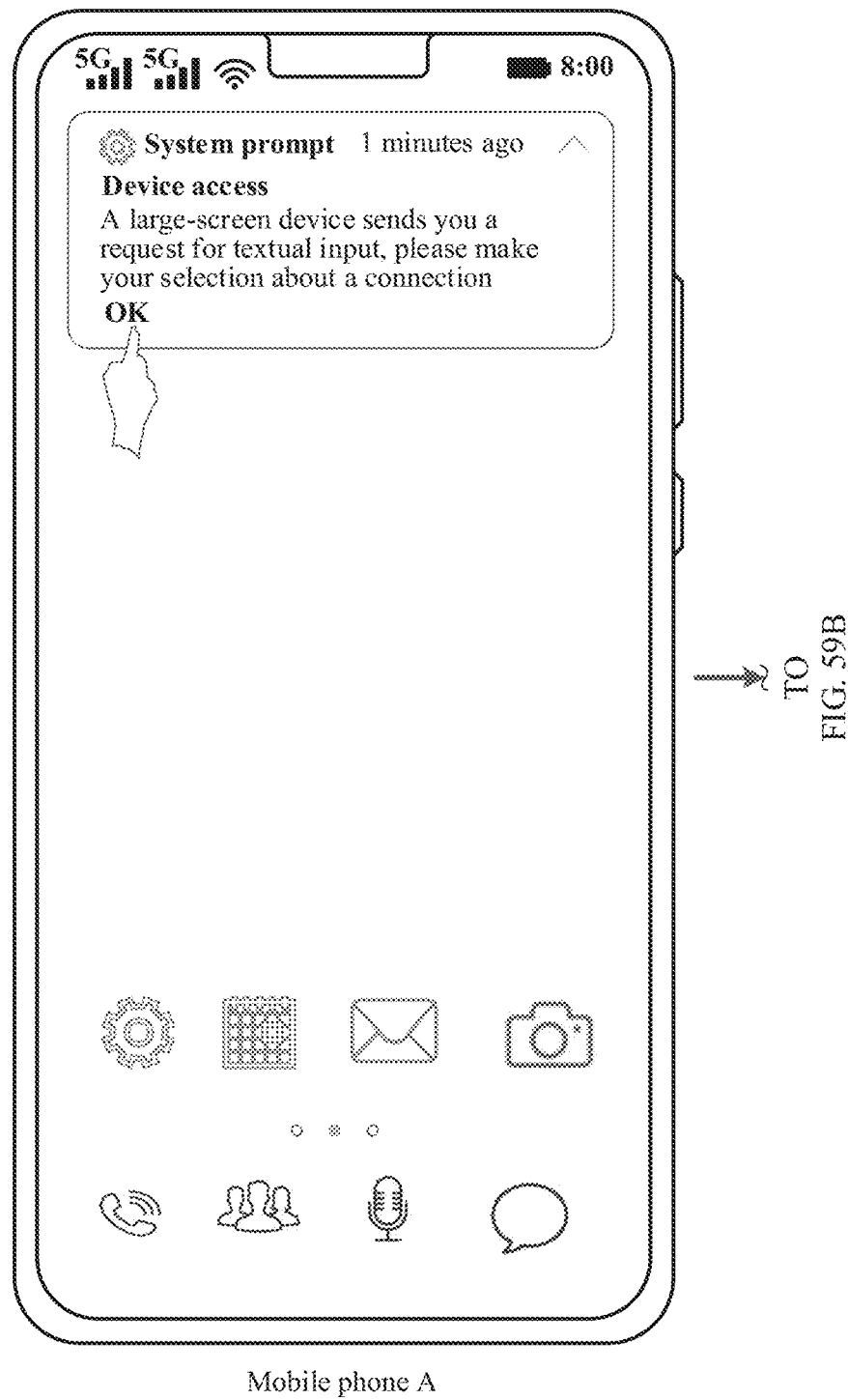
FIG. 59A to FIG. 59C are a schematic diagram of another user interface on a mobile phone according to an embodiment of this application.
Figure 59B:
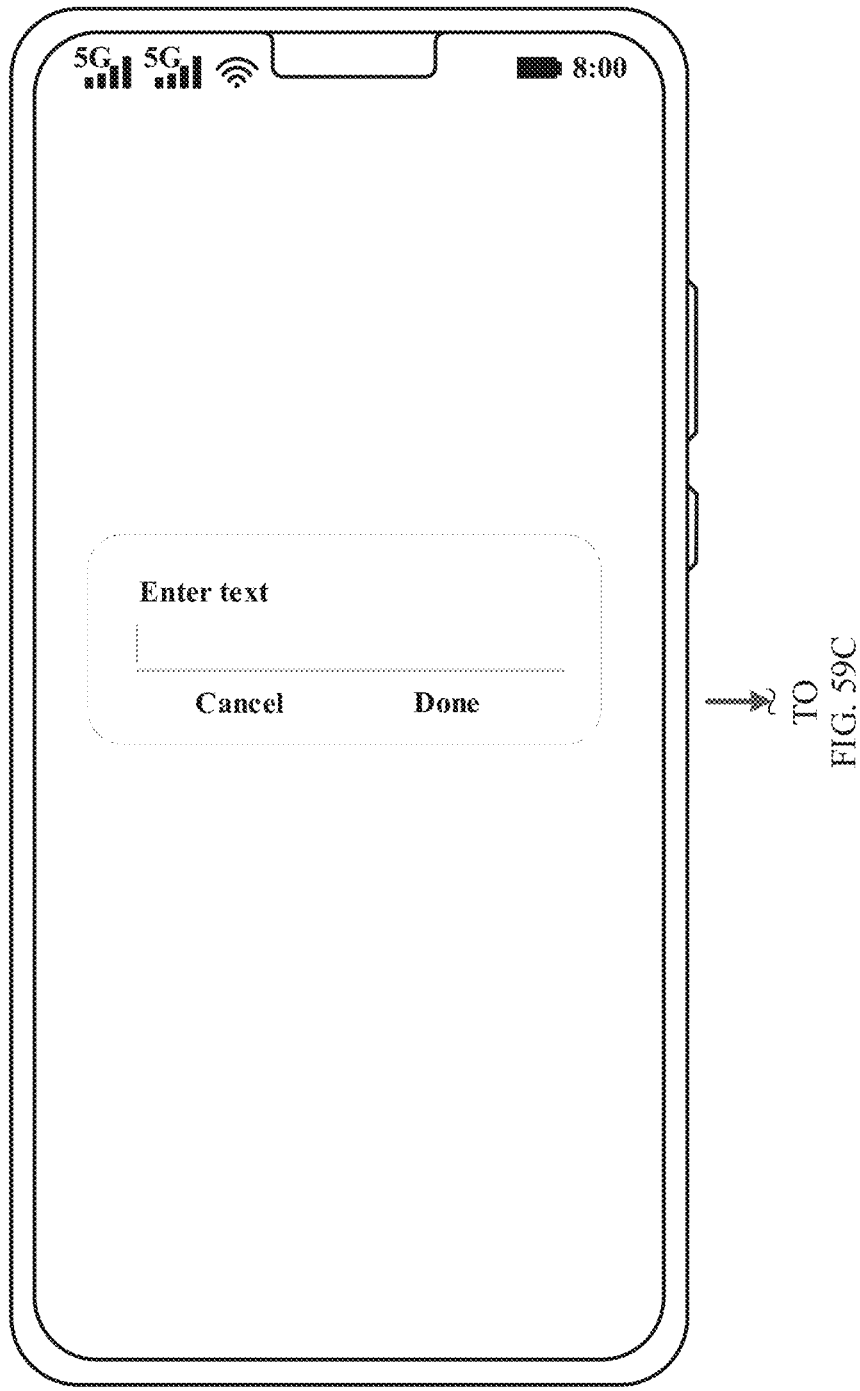
Figure 59C:
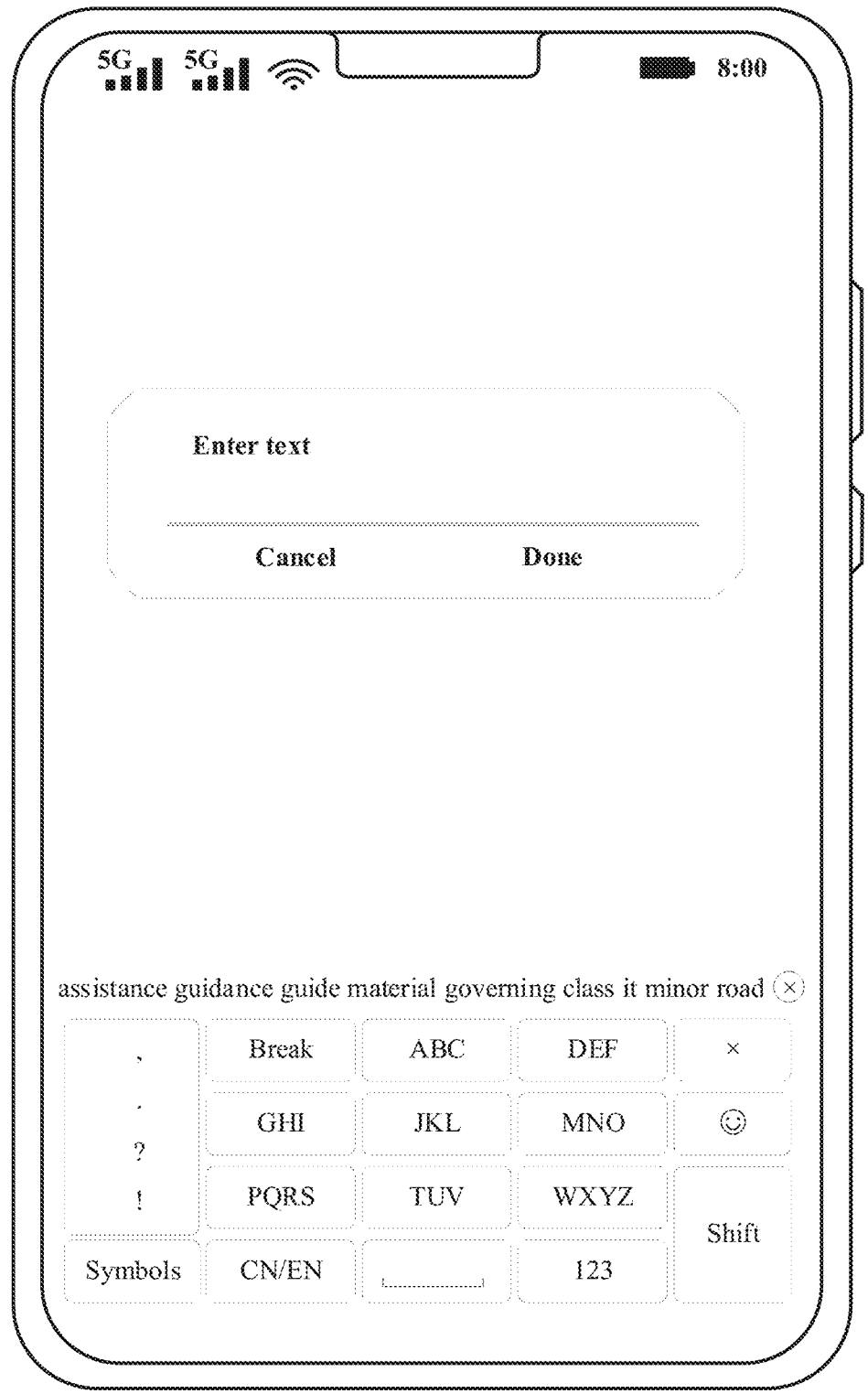
Figure 60:
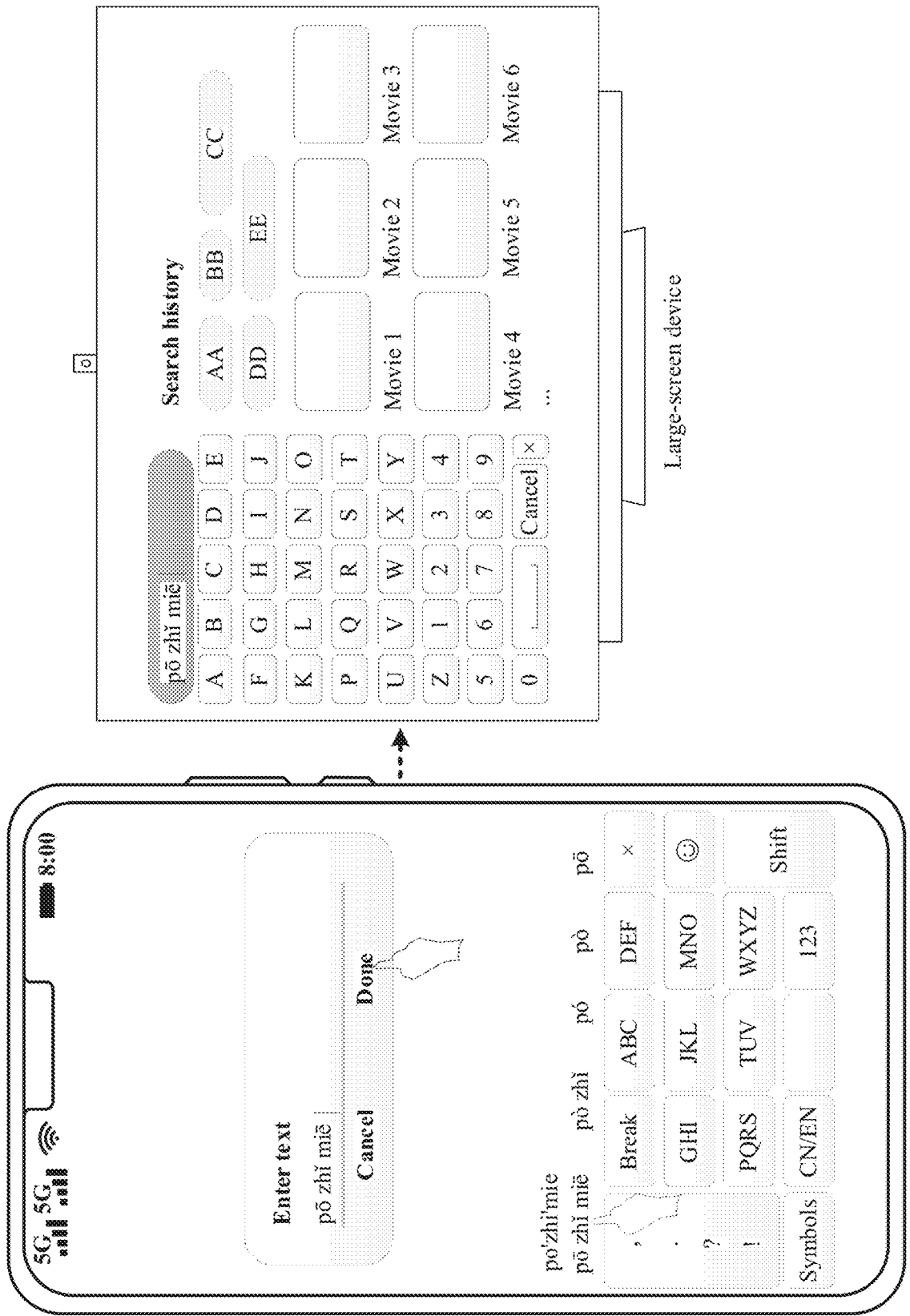
FIG. 60 is a schematic diagram of a user interface showing communication between a mobile phone and a large-screen device according to an embodiment of this application.

For example, FIG. 58 to FIG. 60 show a process in which the mobile phone A assists the large-screen device with input by using the candidate term "pō zhǐ miē".

FIG. 58 is a schematic diagram of a user interface on the large-screen device. As shown in FIG. 58, a user may select an input method edit box on the large-screen device by using a device, for example, a remote control. An input method edit box control on the large-screen device may request an input method framework (input method framework, IMF) on the large-screen device to enable a local input method, and transmit a data channel to the IMF. The IMF searches, through the distributed network, for a server having a distributed capability. For example, the server may include the mobile phone A. and the large-screen device may be connected to an auxiliary AA of the mobile phone A, to request the mobile phone A for auxiliary input or display an input box on the mobile phone A, or the like.

FIG. 59A to FIG. 59C are a schematic diagram of a user interface in which the mobile phone A determines to assist the large-screen device with input. As shown in a user interface in FIG. 59A, a notification used to prompt the request of the large-screen device for auxiliary input may be displayed on the mobile phone B. A user may trigger the notification on the mobile phone B to confirm to assist the large-screen device with input. Further, as shown in a user interface in FIG. 59B, an edit box used to assist the large-screen device with input may be displayed on the mobile phone A. Further, the user may trigger, for example, by clicking, the edit box as shown in FIG. 59B. The mobile phone A may display a user interface as shown in FIG. 59C, and the user interface may display a virtual keyboard (also referred to as a soft keyboard) on the mobile phone. The user may subsequently use the virtual keyboard on the mobile phone A to assist the large-screen device with input.

FIG. 60 is a schematic diagram of a user interface in which the mobile phone A assists the large-screen device with input by using the candidate term "pō zhǐ miē" synchronized by the mobile phone C. As shown in the left diagram of a user interface on the mobile phone A in FIG. 60. After a user enters "pozhimie" in the input box on the mobile phone A, the input method on the mobile phone A may display the candidate term "pō zhǐ miē" based on a synchronized candidate term thesaurus. The user clicks the candidate term "pō zhǐ miē", and then "pō zhǐ miē" may be displayed in the input box on the mobile phone A. The user clicks Done to enter a user interface on the large-screen device as shown in the right diagram in FIG. 60, "pō zhǐ mi ē" in the input box on the mobile phone A may be synchronously displayed in an edit box on the large-screen device.

In a possible implementation, when the user performs input in the input box on the mobile phone A as shown in the left diagram in FIG. 60, content in the input box may be synchronously displayed in the edit box on the large-screen device as shown in the right diagram in FIG. 60. For example, when the user performs an operation of, for example, deletion, highlighting selected content, or moving a cursor in the input box on the mobile phone A as shown in the left diagram in FIG. 60, the edit box on the large-screen device as shown in the right diagram in FIG. 60 may synchronously display a state of, for example, deletion, highlighting the selected content, or moving the cursor in the input box on the mobile phone A.

Figure 61:
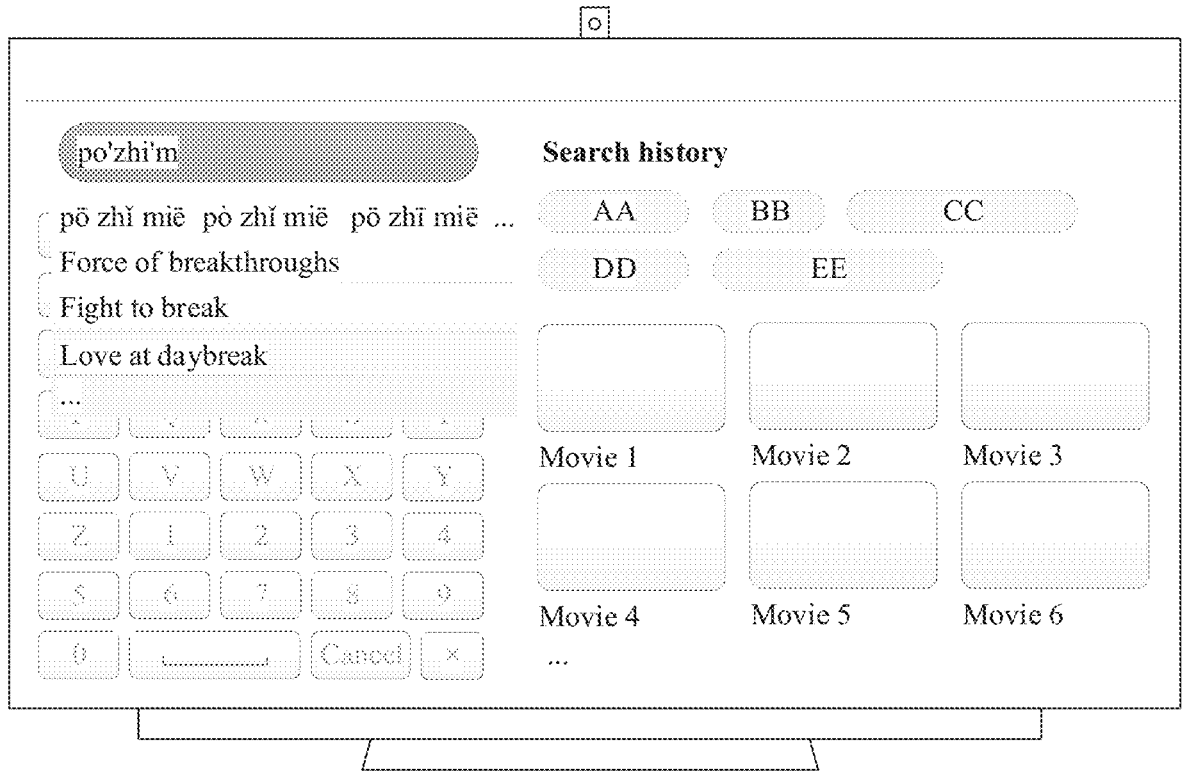
FIG. 61 is a schematic diagram of another user interface on a large-screen device according to an embodiment of this application.

For example, FIG. 61 is a schematic diagram of a user interface in which quick input is implemented on the large-screen device by using the candidate term "pō zhǐ miē". As shown in FIG. 61, when a user enters "pozhimie" or an abbreviation thereof by using a device, for example, the remote control in the edit box on the large-screen device, the large-screen device may display the candidate term "pō hi miē" in the user interface based on the candidate term "pō hi miē" synchronized by the mobile phone C. and the user may select the candidate term "pō zhǐ miē", to implement convenient input.

Figure 62:
FIG. 62 is a schematic diagram of a user interface on a mobile phone according to an embodiment of this application.

For example, FIG. 62 is a schematic diagram of a user interface in which quick input is implemented on the mobile phone A by using the candidate term "p̄ zhǐ miē". As shown in FIG. 62, when a user enters "pozhimie" or an abbreviation thereof in the input box of the local input method on the mobile phone A, the mobile phone A may display the candidate term "p̄ō zhǐ miē" in the user interface based on the candidate term "p̄ō zhǐ miē" synchronized by the mobile phone C, and the user may select the candidate term "p̄ō zhǐ miē", to implement convenient input.

It can be understood that, when the large-screen device, the mobile phone A, and the mobile phone C are connected to the distributed network, the large-screen device, the mobile phone A, and the mobile phone C all may implement convenient input by using the candidate term thesaurus synchronized between each other. Details are not described herein again.

After the large-screen device and the mobile phone A are disconnected from the distributed network, because the large-screen device and the mobile phone A are common devices, as shown in the descriptions corresponding to FIG. 56, the large-screen device and the mobile phone A may further retain the candidate term thesaurus synchronized by each other, to implement convenient input.

The mobile phone C is a temporary visitor. In a possible implementation, when the mobile phone C is disconnected from the distributed network, content, in the candidate term thesaurus on the mobile phone C, synchronized to the mobile phone C through the distributed network may be deleted, and content, in a candidate term thesaurus before the mobile phone C is connected to the distributed network, may be deleted on another device in the distributed network.

Figure 63:
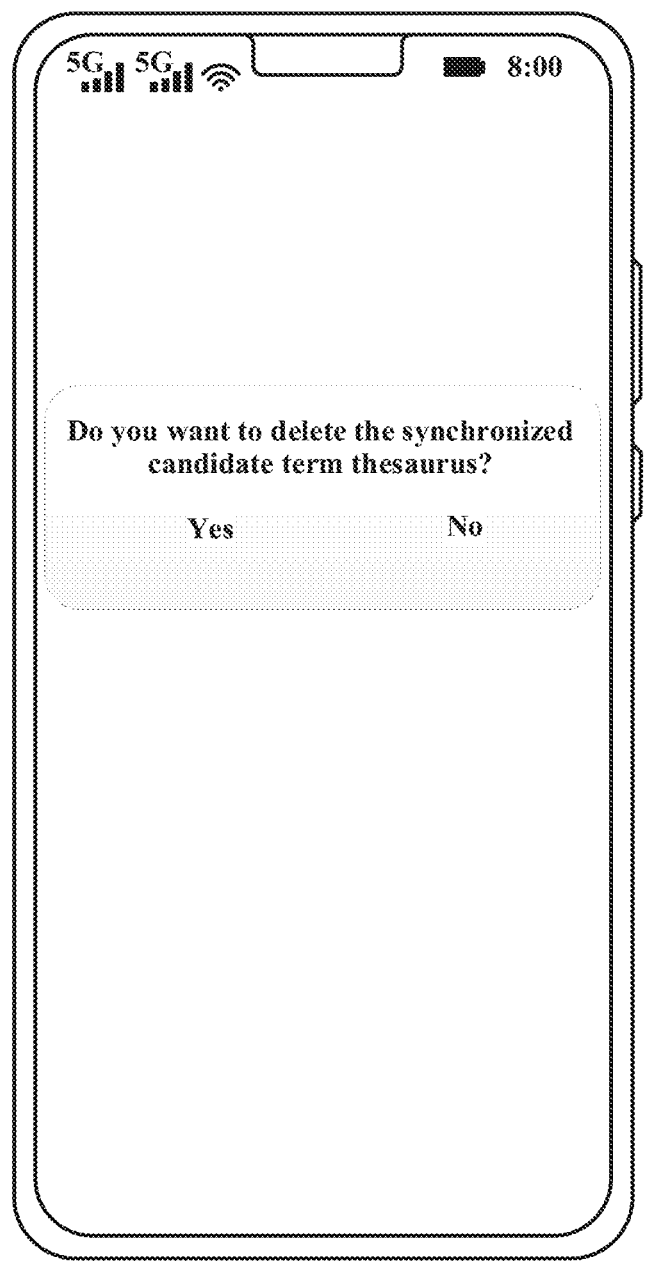
FIG. 63 is a schematic diagram of a user interface on a mobile phone according to an embodiment of this application.

In a possible implementation, when any one of the foregoing devices exits the distributed network, a prompt about whether to delete the synchronized candidate term thesaurus may be given on the device, so that a user may select to delete or retain the synchronized candidate term thesaurus flexibly. For example, FIG. 63 is a diagram of a possible user interface on the mobile phone C. As shown in FIG. 63, a prompt about whether to delete the synchronized candidate term thesaurus may be given to a user, and options "Yes" and "No" are provided. The user may select an appropriate option based on a requirement, to delete or retain the synchronized candidate term thesaurus.

Figure 64:
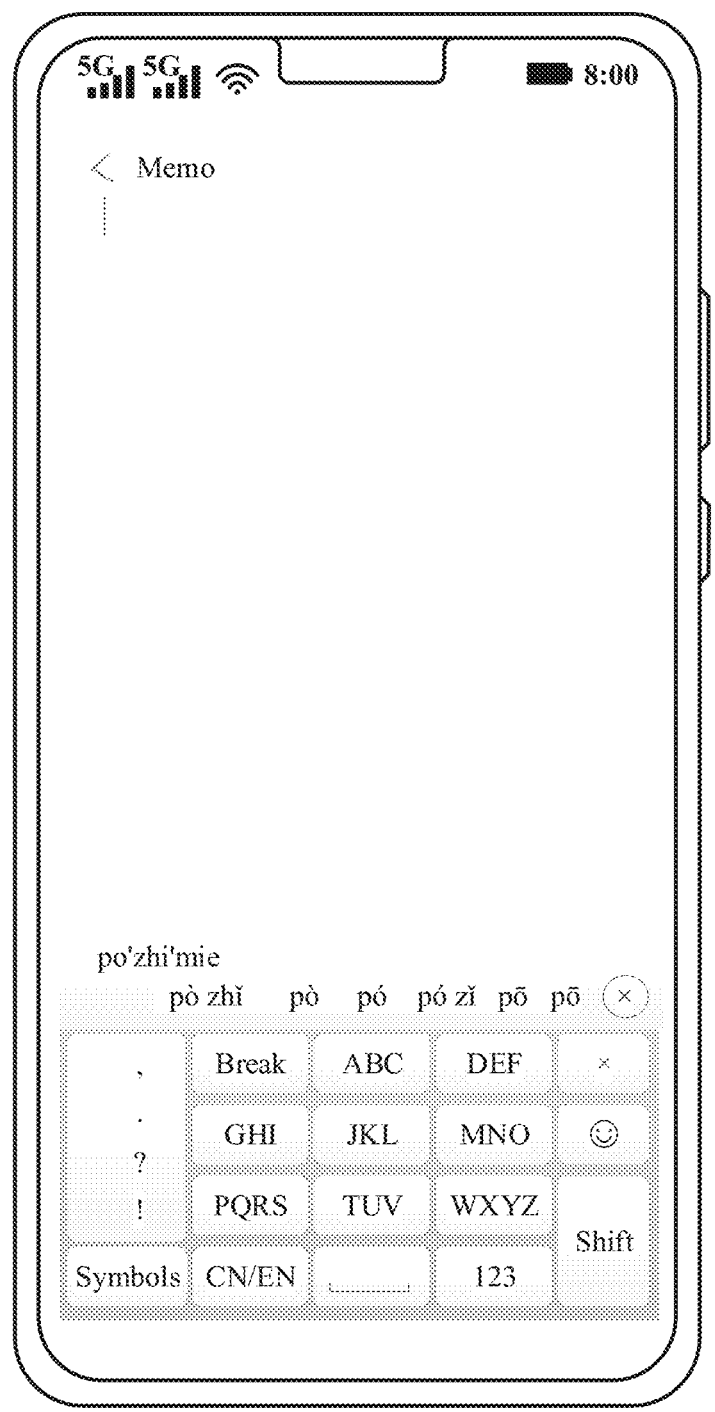
FIG. 64 is a schematic diagram of another user interface on a mobile phone according to an embodiment of this application.

For example, FIG. 64 shows a user interface on the mobile phone A when the mobile phone C is disconnected from the distributed network, and the local candidate term thesaurus on the mobile phone C that is synchronized by the mobile phone C through the distributed network is deleted. As shown in FIG. 64, because the candidate term "p̄ō zhǐ miē" is deleted from the candidate term thesaurus on the mobile phone A, when "pozhimie" is entered on the mobile phone A, there is no recommendation of "p̄ō zhǐ miē" in candidate terms recommended on the mobile phone A.

In another possible implementation, if some candidate terms in the candidate term thesaurus before the mobile phone C is connected to the distributed network are used after the mobile phone C is connected to the distributed network, the used candidate terms may continue to be used by the another device in the distributed network after the mobile phone C is disconnected from the distributed network. After the mobile phone C is disconnected from the distributed network, the mobile phone C may delete the content, in the candidate term thesaurus on the mobile phone C, synchronized to the mobile phone C through the distributed network, and delete, on the another device in the distributed network, a candidate term, exiting before the mobile phone C is connected to the distributed network, that has not been used.

For example, the candidate term thesaurus on the mobile phone C further includes "fēi lǐ hóng" in addition to "p̄ō hi miē" mentioned above. Because "p̄ō zhǐ miē" is used on the mobile phone A during auxiliary input for the large-screen device, after the mobile phone C is disconnected from the distributed network, "p̄ō zhǐ miē" may continue to be used on the mobile phone A and the large-screen device as a candidate term on the mobile phone A. However, "fēi lǐ hóng" has not been used, is cleared when the mobile phone C is disconnected from the distributed network, and cannot continue to be used on the mobile phone A and the large-screen device.

It should be noted that the user interface diagrams of auxiliary input of the mobile phone for the large-screen device are all examples for description. In a possible implementation, in an interface for auxiliary input of the mobile phone for the large-screen device, all or some of content on the large-screen device may be synchronized, so that a user using the mobile phone can learn about a status on the large-screen device based on the interface on the mobile phone.

Figure 65:
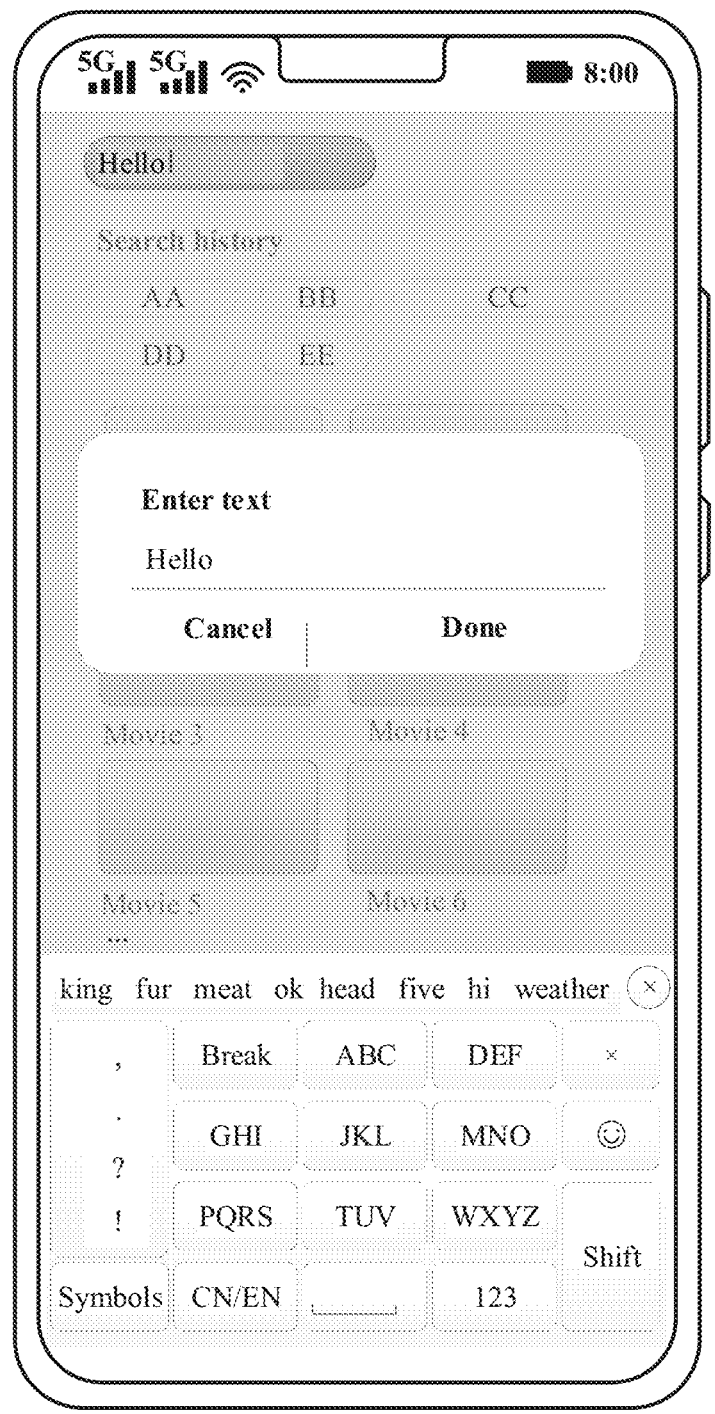
FIG. 65 is a schematic diagram of still another user interface on a mobile phone according to an embodiment of this application.

For example, FIG. 65 shows a user interface on a mobile phone. As shown in FIG. 65, when using the mobile phone to assist the large-screen device with input, a user may project all or some of the content on the large-screen device to the mobile phone. For example, content in the edit box on the large-screen device is displayed on the mobile phone, and an edit box on the mobile phone is displayed in a layer above the content on the large-screen device. In this way, when using the edit box on the mobile phone for input, the user can synchronously see a status in the edit box on the large-screen device in the user interface, and the user does not need to look up at an input status on the large-screen device during auxiliary input.

It should be noted that in the foregoing embodiments, an example in which a user uses auxiliary input of a Chinese character for the large-screen device is used for description. In a possible implementation, a user may use auxiliary input of an English phrase or text in another form for the large-screen device. Specific content of auxiliary input is not limited in this embodiment of this application.

Figure 66:
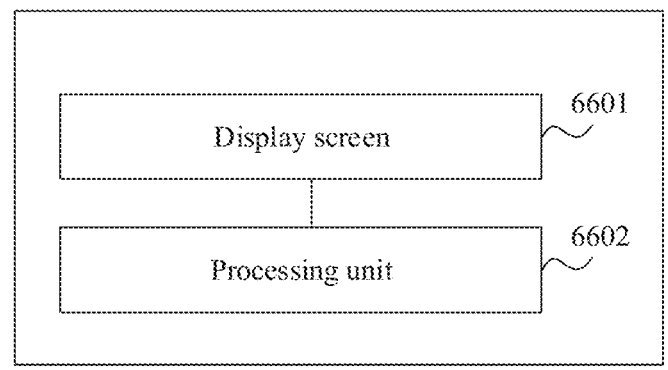
FIG. 66 is a schematic diagram of a structure of a device according to an embodiment of this application.

When each functional module is obtained by division based on each corresponding function, FIG. 66 is a schematic diagram of a possible structure of a first device, a second device, or a third device according to an embodiment of this application. The first device, the second device, or the third device includes a display screen 6601 and a processing unit 6602.

The display screen 6601 is configured to support the first device, the second device, or the third device to perform steps for display in the foregoing embodiments, or another process in the technology described in embodiments of this application. The display screen 6601 may be a touchscreen, other hardware, or a combination of hardware and software.

The processing unit 6602 is configured to support the first device, the second device, or the third device to perform steps for processing in the foregoing method embodiments, or another process in the technology described in embodiments of this application.

All related content of the steps in the foregoing method embodiments may be cited in function descriptions of the corresponding functional modules. Details are not described herein again.

Clearly, the electronic device includes but is not limited to the units and modules listed above. In addition, functions that the foregoing functional modules can specifically implement include but are not limited to the functions corresponding to the steps in the methods in the foregoing examples. For detailed descriptions of another unit of the electronic device, refer to detailed descriptions of a step corresponding to the unit in the methods. Details are not described herein again in this embodiment of this application.

When an integrated unit is used, the first device, the second device, or the third device in the foregoing embodiments may include a processing module, a storage module, and a display screen. The processing module is configured to control and manage an action of the first device, the second device, or the third device. The display screen is configured to display content based on an indication of the processing module. The storage module is configured to store program code and data on the first device, the second device, or the third device. Further, the first device, the second device, or the third device may further include an input module and a communications module. The communications module is configured to support the first device, the second device, or the third device to communicate with another network entity, to implement functions such as calling, data exchange, and Internet access of the first device, the second device, or the third device.

The processing module may be a processor or a controller. The communications module may be a transceiver, an RF circuit, a communications interface, or the like. The storage module may be a memory. The display module may be a screen or a display. The input module may be a touchscreen, a voice input apparatus, a fingerprint sensor, or the like.

The communications module may include an RF circuit, and may further include a wireless fidelity (wireless fidelity, Wi-Fi) module, a near field communication (near field communication, NFC) module, and a Bluetooth module. The communications modules such as the RF circuit, the NFC module, the Wi-Fi module, and the Bluetooth module may be collectively referred to as a communications interface. The processor, the RF circuit, the display screen, and the memory may be coupled to each other through a bus.

Figure 67:
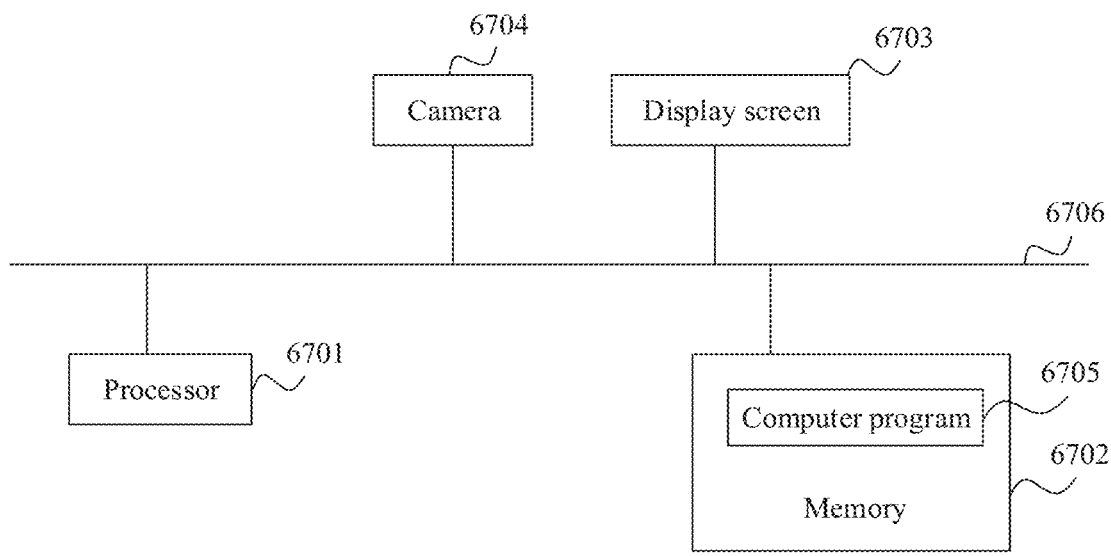
FIG. 67 is a schematic diagram of a structure of still another device according to an embodiment of this application.

FIG. 67 is a schematic diagram of still another possible structure of a first device, a second device, or a third device according to an embodiment of this application. The first device, the second device, or the third device includes one or more processors 6701, a memory 6702, a camera 6704, and a display screen 6703. The components may communicate with each other through one or more communications buses 6706.

One or more computer programs 6705 are stored in the memory 6702, and are configured to be executed by the one or more processors 6701. The one or more computer programs 6705 include instructions, and the instructions are used to perform any one of the steps in the foregoing display method. Clearly, the electronic device includes but is not limited to the components listed above. For example, the electronic device may further include a radio frequency circuit, a positioning apparatus, a sensor, and the like.

This application further provides the following embodiments. It should be noted that serial numbers of the following embodiments do not necessarily follow a sequence of serial numbers of the foregoing embodiments.

Embodiment 51: A device communication method is applied to a system including a first device, a second device, and a third device, and the method includes:

The first device displays a first interface including a first edit box;

the first device sends an indication message to the second device and the third device;

the second device displays a second interface based on the indication message, where the second interface includes a second edit box;

the third device displays a third interface based on the indication message, where the third interface includes a third edit box; and if there is an editing status in the second edit box, the first device synchronizes the editing status to the first edit box, and the third device synchronizes the editing status to the third edit box;

if there is an editing status in the third edit box, the first device synchronizes the editing status to the first edit box, and the second device synchronizes the editing status to the second edit box; or if there is an editing status in the first edit box, the second device synchronizes the editing status to the second edit box, and the third device synchronizes the editing status to the third edit box.

Embodiment 52: According to the method described in Embodiment 51, the second device includes an interface service, and the interface service is used for synchronization of the editing status between the first device and the second device.

Embodiment 53: According to the method described in Embodiment 51 or 52, the editing status includes one or more of the following: textual content, a cursor, or highlighting of the textual content.

Embodiment 54: According to the method described in any one of Embodiments 51 to 53, that the second device displays the second interface based on the indication message includes:

The second device displays a notification interface in response to the indication message, where the notification interface includes an option for confirming auxiliary input; and the second device displays the second interface in response to an operation of triggering the option.

Embodiment 55: According to the method described in any one of Embodiments 51 to 54, the second interface further includes all or some of content in the first interface.

Embodiment 56: According to the method described in Embodiment 55, the second edit box and all or some of the content in the first interface are displayed in layers, and the second edit box is displayed in a layer above all or some of the content in the first interface.

Embodiment 57: According to the method described in any one of Embodiments 51 to 56, after the second device displays the second interface based on the indication message, the method further includes:

The second device displays a virtual keyboard in response to triggering the second edit box; and the second device displays the editing status in the second edit box based on an input operation received on the virtual keyboard and/or in the second edit box.

Embodiment 58: According to the method described in any one of Embodiments 51 to 57, the first device includes any one of the following: a television, a large-screen device, or a wearable device; and the second device or the third device includes any one of the following: a mobile phone, a tablet, or a wearable device.

Embodiment 59: According to the method described in any one of Embodiments 51 to 58, the editing status in the first edit box includes an identifier of the first device, the editing status in the second edit box includes an identifier of the second device, and/or the editing status in the third edit box includes an identifier of the first device.

Embodiment 510: According to the method described in any one of Embodiments 51 to 59, when input content is received simultaneously in the second edit box and the third edit box, the first device decides upon input content in the second edit box and a manner of displaying the third edit box.

Embodiment 511: A device communication method is applied to a system including a first device, a second device, and a third device, and the method includes:
The first device displays a first interface including a first edit box;
the first device sends an indication message to the second device;
the second device displays a second interface based on the indication message, where the second interface includes a second edit box;
the second device sends an auxiliary input request to the third device;
the third device displays a third interface according to the auxiliary input request, where the third interface includes a third edit box; and
if there is an editing status in the second edit box, the first device synchronizes the editing status to the first edit box, and the third device synchronizes the editing status to the third edit box;
if there is an editing status in the third edit box, the first device synchronizes the editing status to the first edit box, and the second device synchronizes the editing status to the second edit box; or
if there is an editing status in the first edit box, the second device synchronizes the editing status to the second edit box, and the third device synchronizes the editing status to the third edit box.

Embodiment 512: A device communication method is applied to a system including a first device, a second device, and a third device, and the method includes:
The second device displays a fourth interface including an option of the first device;
the second device sends an indication message to the first device in response to an operation of selecting the option of the first device;
the first device displays a first interface including a first edit box;
the second device displays a second interface, where the second interface includes a second edit box;
the second device sends an auxiliary input request to the third device;
the third device displays a third interface according to the auxiliary input request, where the third interface includes a third edit box; and
if there is an editing status in the second edit box, the first device synchronizes the editing status to the first edit box, and the third device synchronizes the editing status to the third edit box;
if there is an editing status in the third edit box, the first device synchronizes the editing status to the first edit box, and the second device synchronizes the editing status to the second edit box; or
if there is an editing status in the first edit box, the second device synchronizes the editing status to the second edit box, and the third device synchronizes the editing status to the third edit box.

Embodiment 513: A device communication method is applied to a first device, and the method includes:
The first device displays a first interface including a first edit box;
the first device sends an indication message to a second device and a third device; the second device displays a second interface based on the indication message, where the second interface includes a second edit box, and the third device displays a third interface based on the indication message, where the third interface includes a third edit box; and
if there is an editing status in the second edit box, the first device synchronizes the editing status to the first edit box; or
if there is an editing status in the third edit box, the first device synchronizes the editing status to the first edit box.

Embodiment 514: A device communication system is applied to a second device, and the method includes:
The second device displays a fourth interface including an option of a first device;
the second device sends an indication message to the first device in response to an operation of selecting the option of the first device, so that the first device displays a first interface including a first edit box;
the second device displays a second interface, where the second interface includes a second edit box;
the second device sends an auxiliary input request to a third device; and the third device displays a third interface according to the auxiliary input request, where the third interface includes a third edit box; and
if there is an editing status in the third edit box, the second device synchronizes the editing status to the second edit box; or
if there is an editing status in the first edit box, the second device synchronizes the editing status to the second edit box.

Embodiment 515: A device communication system includes a first device, a second device, and a third device, where the first device is configured to perform steps performed by the first device according to any one of Embodiments 51 to 59 and 510 to 514, the second device is configured to perform steps performed by the second device according to any one of Embodiments 51 to 59 and 510 to 514, and the third device is configured to perform steps performed by the third device according to any one of Embodiments 51 to 59 and 510 to 514.

Embodiment 516: A first device includes at least one memory and at least one processor, where
the memory is configured to store program instructions; and
the processor is configured to invoke the program instructions in the memory, to enable the first device to perform steps performed by the first device according to any one of Embodiments 51 to 59 and 510 to 514.

Embodiment 517: A second device includes at least one memory and at least one processor, where
the memory is configured to store program instructions, and
the processor is configured to invoke the program instructions in the memory, to enable the second device to perform steps performed by the second device according to any one of Embodiments 51 to 59 and 510 to 514.

Embodiment 518: A computer-readable storage medium stores a computer program, and when the computer program is executed by a processor of a first device, steps performed by the first device according to any one of Embodiments 51 to 59 and 510 to 514 are implemented;

when the computer program is executed by a processor of a second device, steps performed by the second device according to any one of Embodiments 51 to 59 and 510 to 514 are implemented; or when the computer program is executed by a processor of a third device, steps performed by the third device according to any one of Embodiments 51 to 59 and 510 to 514 are implemented.

For specific implementations of Embodiment 51 to Embodiment 59 and Embodiment 510 to Embodiment 519, refer to descriptions of FIG. 68A and FIG. 68B to FIG. 87.

In a possible implementation of using a mobile phone to assist a large-screen device with input, after a user enters a keyword in an edit box on the mobile phone, usually, only textual content in the edit box on the mobile phone can be synchronized to the large-screen device.

The reason is that in a usual implementation of using a mobile phone to assist a large-screen device with input, merely a text copy interface is defined between the large-screen device and the mobile phone. Therefore, only textual content in an edit box on the mobile phone can be copied to an edit box on the large-screen device.

In this way, when a user performs an operation of, for example, deleting or inserting text in the edit box on the mobile phone, a cursor on the mobile phone side moves, but a cursor on the large-screen device side is not displayed, or is displayed but does not move. Consequently, a process of deleting or inserting text in the edit box on the large-screen device does not conform to a usual process of editing and display, and user viewing experience is affected.

In view of this, an embodiment of this application provides the system framework described correspondingly in FIG. 7. There is a possibility that the framework invokes any process between a mobile phone and a large-screen device side. Therefore, display of a cursor position or display of a highlighted area may be implemented by using the framework in this embodiment of this application.

It can be understood that this embodiment of this application may be applied to any application scenario in FIG. 1 to FIG. 3, so that any editing status in an edit box on the mobile phone can be synchronized to an edit box on the large-screen device when the mobile phone assists the large-screen device with input. The editing status may refer to a status that may change during editing in the edit box on the mobile phone, and include, for example, textual content in the edit box, a cursor position in the edit box, and/or a highlighted area in the edit box.

Figure 68A:
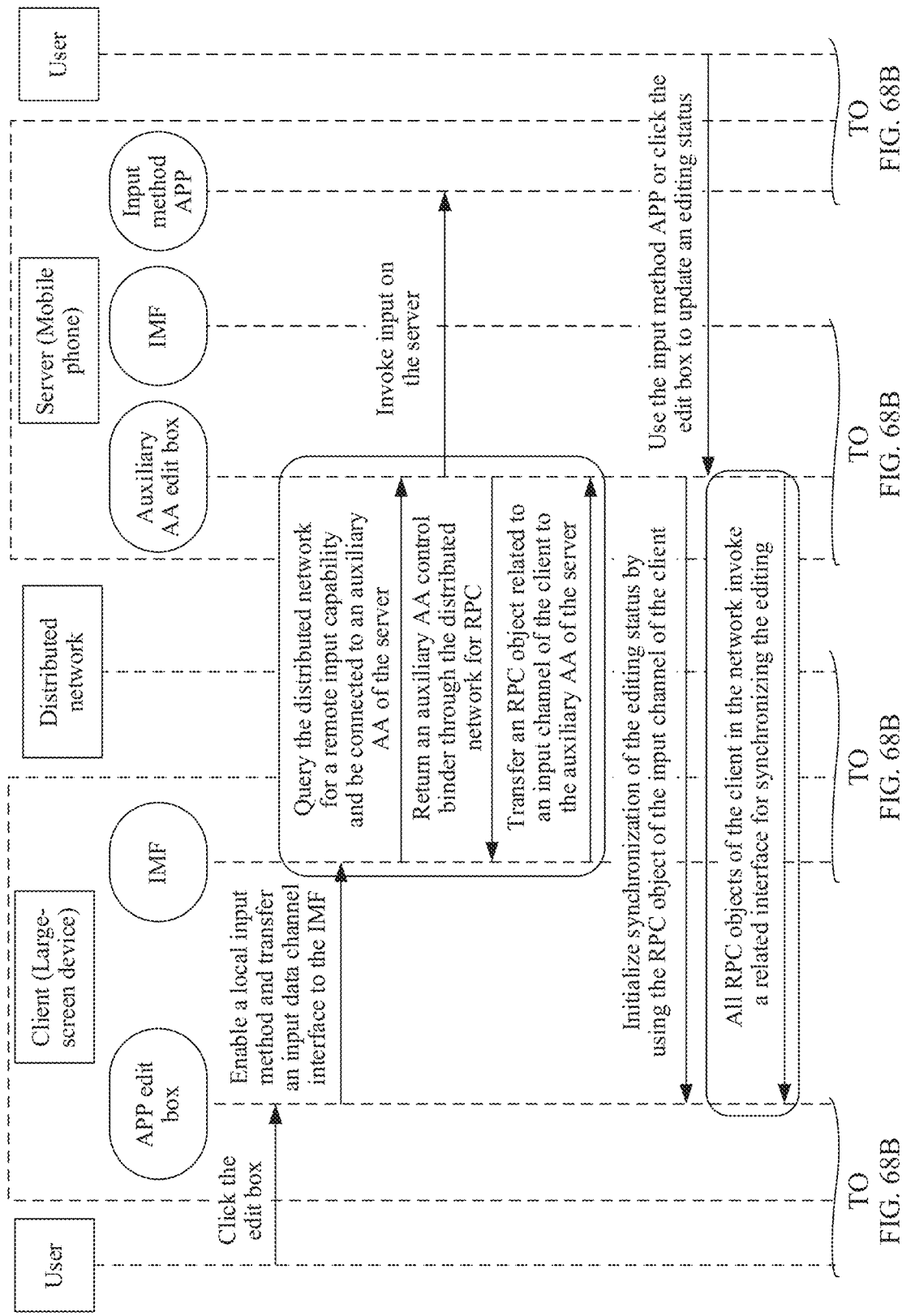

For example, FIG. 68A and FIG. 68B are a schematic diagram of a specific system architecture according to an embodiment of this application.

As shown in FIG. 68A and FIG. 68B, in this embodiment of this application, an example in which a large-screen device (a client) and a mobile phone (a server) are included in a distributed network is used to describe a process in which editing statuses in edit boxes on the large-screen device and the mobile phone are synchronized to each other.

A user may click an edit box provided by an application (application, APP) on the large-screen device by using a remote control or the like. The large-screen device may start a local input method on the large-screen device, and transmit a data channel interface to an IMF of the large-screen device. The IMF of the large-screen device may search in the distributed network for a device having a remote auxiliary input capability and be connected to an auxiliary AA of the mobile phone having the remote auxiliary input capability.

The auxiliary AA of the mobile phone may invoke a local input method application on the mobile phone. For example, an edit box used to assist the large-screen device with input is displayed on the mobile phone. In addition, the auxiliary AA of the mobile phone may return an RPC object of the auxiliary AA to the large-screen device through the distributed network, and the large-screen device may send an RPC object related to an input channel of the large-screen device to the mobile phone. In this case, subsequently, the mobile phone may synchronize the editing status in the edit box on the large-screen device based on the RPC object related to the input channel of the large-screen device, and the large-screen device may obtain the editing status in the edit box on the mobile phone from the mobile phone based on the RPC object of the auxiliary AA of the mobile phone.

For example, on the mobile phone, when a user changes the editing status based on an input method APP on the mobile phone or clicks the edit box on the mobile phone that is invoked based on the auxiliary AA, the RPC object, related to the input channel of the large-screen device, that is the auxiliary AA holds may be traversed, and an update of the editing status may be synchronized to the large-screen device by using the RPC object related to the input channel of the large-screen device. The update of the editing status on the mobile phone may include one or more of the following: textual content addition or deletion in the edit box on the mobile phone, movement of a cursor in the edit box on the mobile phone, highlighting of a textual passage in the edit box on the mobile phone, and the like.

After the updated editing status on the mobile phone is synchronized to the large-screen device, a local interface on the large-screen device can be invoked to update an editing status in an edit box on the large-screen device.

In a possible implementation, if there is another device connected to the large-screen device in the distributed network, and the large-screen device and the another device also hold an RPC object of each other, the large-screen device may synchronize an update of an editing status on the another device to the large-screen device in the foregoing manner of synchronizing the update of the editing status between the large-screen device and the mobile phone; or the mobile phone may synchronize an update of an editing status on the another device to the mobile phone in the foregoing manner of synchronizing the update of the editing status between the large-screen device and the mobile phone.

In a possible implementation, if the editing status in the edit box on the large-screen device changes, for example, a user performs an editing operation in the edit box on the large-screen device by using the remote control in a process in which the mobile phone and/or the another device assist/assists the large-screen device with input, the change of the editing status in the edit box on the large-screen device may be further synchronized to the mobile phone and/or the another device through the distributed network and the RPC object/objects of the mobile phone and/or the another device. After the editing status on the large-screen device is synchronized to the mobile phone and/or the another device, a local interface of the mobile phone and/or the another device may be invoked to update the editing status on the mobile phone and/or the another device.

It should be noted that the embodiment corresponding to FIG. 68A and FIG. 68B is a possible implementation of this embodiment of this application. In another possible implementation, a user may select, by using the remote control, a virtual keyboard in an edit box provided by an application on the large-screen device to trigger a subsequent process of auxiliary input for the large-screen device, or a user may trigger, on a mobile phone, a process of auxiliary input for the large-screen device. This is not specifically limited in this embodiment of this application.

With reference to the descriptions above, a user interface for interaction between a large-screen device and a mobile phone is described below as an example.

Figure 69:
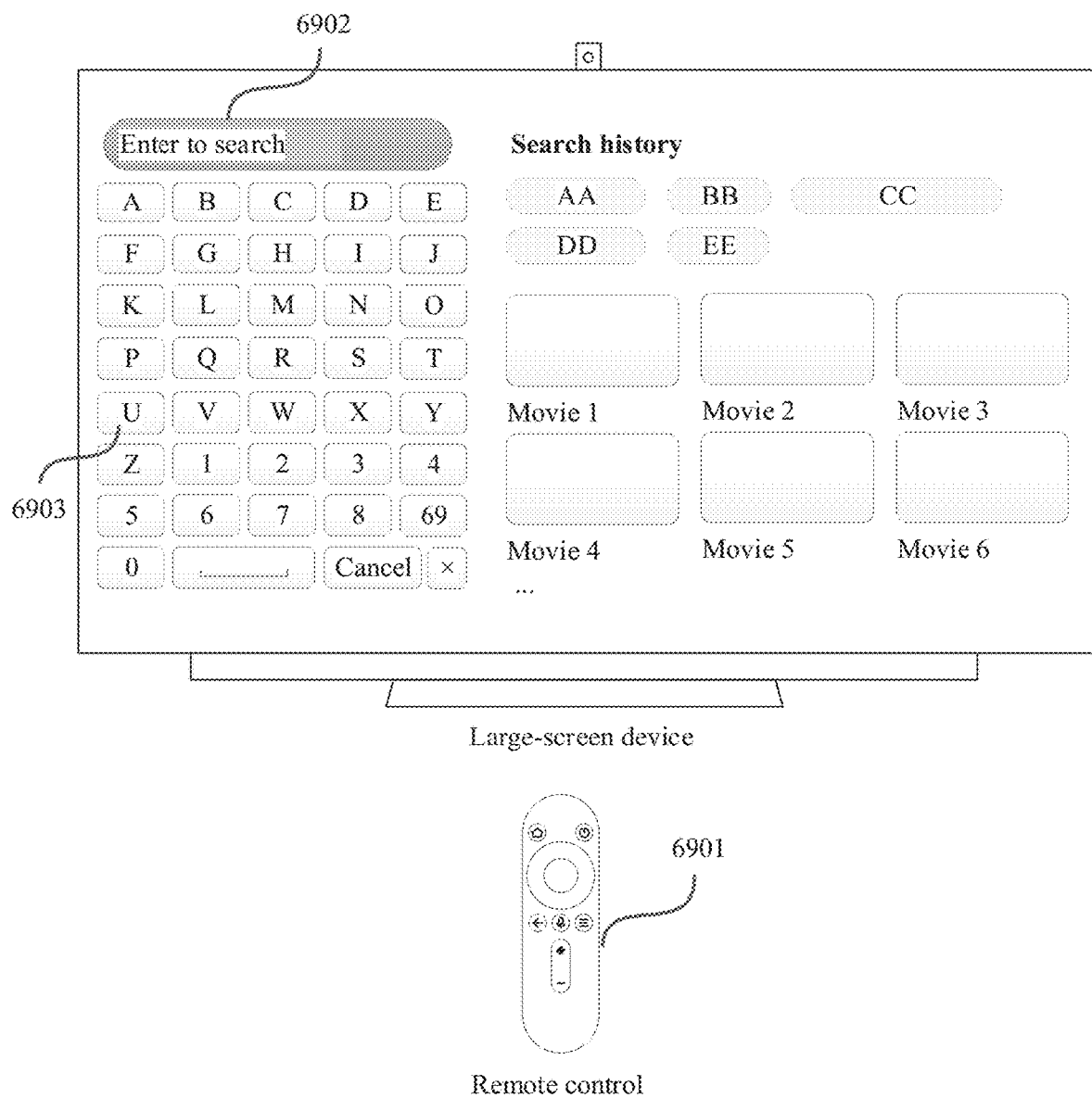
FIG. 69 is a schematic diagram of an interface on a large-screen device according to an embodiment of this application.
Figure 70:
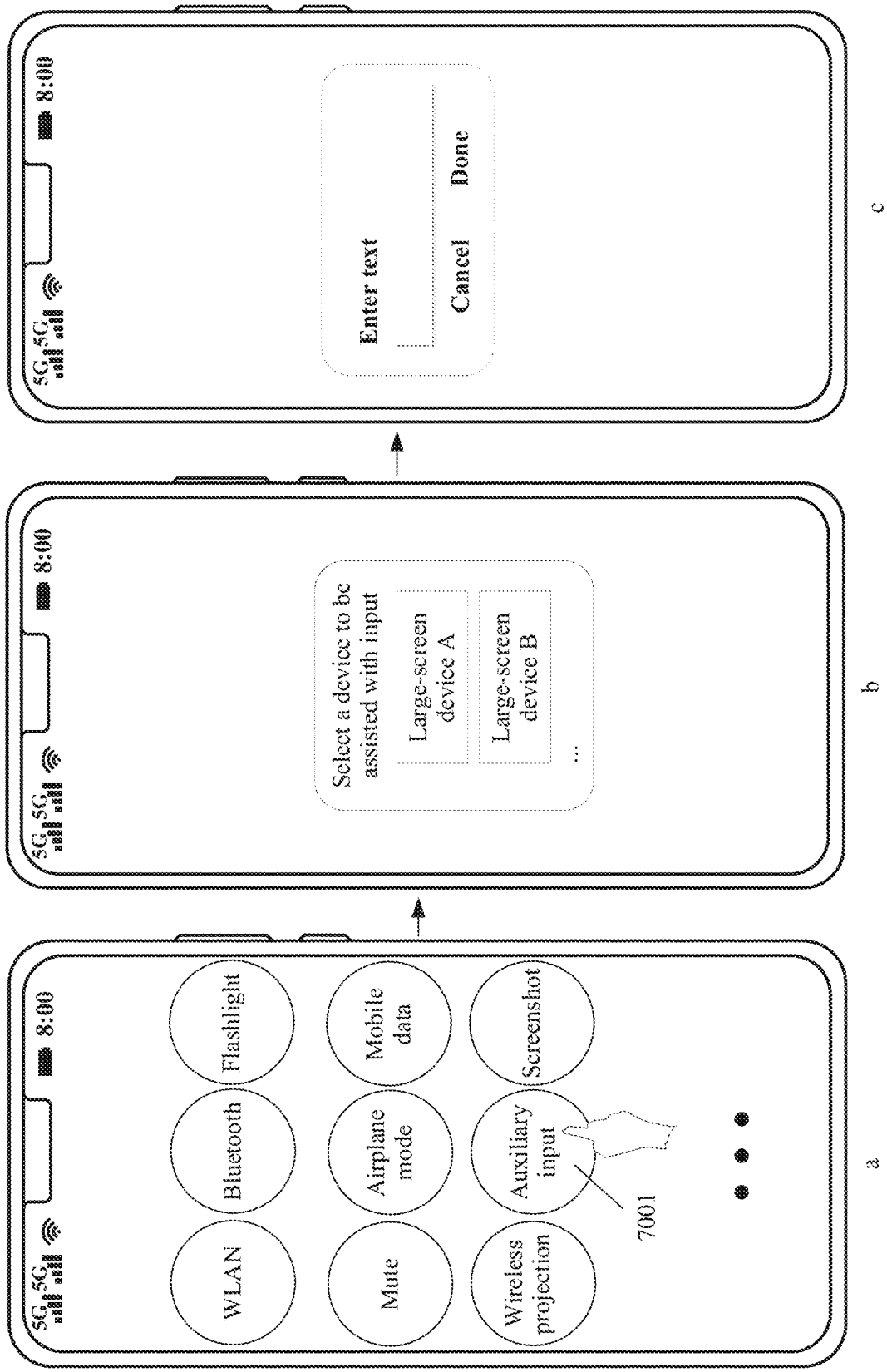
FIG. 70 is a schematic diagram of an interface on a mobile phone according to an embodiment of this application.

For example, FIG. 69 and FIG. 70 are schematic diagrams of a user interface in which a user triggers auxiliary input.

FIG. 69 is a diagram of a user interface on a large-screen device. As shown in FIG. 69, the user may select an edit box 6902 on the large-screen device by using a remote control 6901, and may trigger a subsequent process in which a mobile phone assists the large-screen device with input in this embodiment of this application. Alternatively, the user may select any content 6902 in a virtual keyboard on the large-screen device by using a remote control 6901, and may trigger a subsequent process in which a mobile phone assists the large-screen device with input in this embodiment of this application. A specific manner of the mobile phone to assist the large-screen device with input is described in following embodiments, and details are not described herein.

It should be noted that FIG. 69 is a schematic diagram of setting an edit box in the user interface on the large-screen device. In a possible implementation, the user interface on the large-screen device may include a plurality of edit boxes, and a user may trigger any of the edit boxes to trigger a subsequent process in which the mobile phone assists the large-screen device with input in this embodiment of this application. This is not specifically limited in this embodiment of this application.

FIG. 70 is a diagram of a user interface on a mobile phone. For example, a user may display the user interface as shown in a in FIG. 70 in a manner of, for example, pulling down a home screen of the mobile phone. In the user interface as shown in a in FIG. 70, one or more of the following functions of the mobile phone may be included: WLAN, Bluetooth, a flashlight, sound off, an airplane mode, mobile data, wireless projection, taking a screenshot, or auxiliary input 7001. The auxiliary input 7001 may be a function of auxiliary input of the mobile phone for a large-screen device in this embodiment of this application.

In a possible implementation, after the user clicks the auxiliary input 7001, the mobile phone may search for a device, for example, a large-screen device in a same distributed network, obtain a search box on the large-screen device, and establish a communication connection to the large-screen device. The mobile phone may further display a user interface as shown in c in FIG. 70. In the user interface as shown in c in FIG. 70, an edit box used to assist the large-screen device with input may be displayed, and the user may assist the large-screen device with input based on the edit box.

In a possible implementation, if the mobile phone discovers that there are a plurality of devices such as large-screen devices in the same distributed network, the mobile phone may alternatively display a user interface as shown in b in FIG. 70. In the user interface as shown in b in FIG. 70, identifiers of the plurality of large-screen devices may be displayed, and the identifiers of the large-screen devices may be device numbers, user names, nicknames, or the like of the large-screen devices. The user may select, in the user interface as shown in b in FIG. 70, a large-screen device that needs auxiliary input (for example, by clicking a large-screen device A or a large-screen device B), and enter the user interface as shown in c in FIG. 70. This is not specifically limited in this embodiment of this application.

After the user triggers large-screen input in any one of the foregoing manners, for example, the large-screen device may search for an auxiliary device (for example, a mobile phone) having an auxiliary input capability in the distributed network, and automatically determine a mobile phone used for auxiliary input, or send a notification to all mobile phones discovered in the distributed network.

For example, if the large-screen device discovers that there is one mobile phone in the distributed network, the large-screen device may automatically select the mobile phone to be a device for auxiliary input.

For example, if the large-screen device discovers that there are a plurality of mobile phones in the distributed network, and there is a mobile phone that is set by the user to be used for auxiliary input by default in the plurality of mobile phones, the large-screen device may automatically select the mobile phone used for auxiliary input by default as the device for auxiliary input.

For example, if the large-screen device discovers that there are a plurality of mobile phones in the distributed network, and there is a mobile phone that is selected by the user for auxiliary input in the plurality of mobile phones when the user uses auxiliary input last time, the large-screen device may automatically select the mobile phone selected by the user for auxiliary input when the user uses auxiliary input last time as the device for auxiliary input.

For example, if the large-screen device discovers that there are a plurality of mobile phones in the distributed network, the large-screen device obtains, in the plurality of mobile phones, a mobile phone most frequently selected by the user for auxiliary input, and the large-screen device may automatically select the mobile phone most frequently selected by the user for auxiliary input as the device for auxiliary input.

For example, if the large-screen device discovers that there are a plurality of mobile phones in the distributed network, and there is a mobile phone that has a user account the same as a user account used for logging in on the large-screen device in the plurality of mobile phones, the large-screen device may automatically select the mobile phone that has the user account the same as the user account used for logging in on the large-screen device as the device for auxiliary input.

For example, the large-screen device sends a notification to the mobile phone in the distributed network. A user interface in which the mobile phone and the large-screen device synchronizes the editing status with each other is described below as an example.

One or more mobile phones may be connected to the distributed network. If one mobile phone is connected to the distributed network, the mobile phone may assist the large-screen device with input. If another mobile phone is further connected to the distributed network subsequently, the distributed network may include the plurality of mobile phones, and the plurality of mobile phones may assist the large-screen device with input together. If a plurality of mobile phones are connected to the distributed network, the plurality of mobile phones may assist the large-screen device with input together.

For example, in a home life, an aged person holds a mobile phone A to assist the large-screen device with input, but the aged person may be slow at input. In this case, a young person holding a mobile phone B may further use the mobile phone A to assist the large-screen device with input. The mobile phone A, the mobile phone B, and the large-screen device may synchronize content in edit boxes to each other. The aged person may further learn about, by using the mobile phone A, a status of input by the young person on the mobile phone B. Alternatively, an aged person holds a mobile phone A to assist the large-screen device with input, but the aged person may be slow at input, and the aged person may request a young person holding a mobile phone B for auxiliary input for the large-screen device together. In this case, the mobile phone A may send a request to the mobile phone B, to request the mobile phone B to help with auxiliary input, and the mobile phone B may also assist the large-screen device with input according to the request from the mobile phone A.

For example, an example in which a distributed network includes a large-screen device, a mobile phone A, and a mobile phone B is used below to describe how the mobile phone A and the mobile phone B synchronize an initial editing status on the large-screen device, and the large-screen device and the mobile phone B synchronously update an editing status on the mobile phone A.

In a possible implementation, the large-screen device, the mobile phone A, and the mobile phone B have been connected to the distributed network. The large-screen device may be connected to an auxiliary AA of the mobile phone A and an auxiliary AA of the mobile phone B, to request the mobile phone A for auxiliary input or display an input box on the mobile phone A, and request the mobile phone B for auxiliary input or display an input box on the mobile phone B. or the like.

Figure 71A:
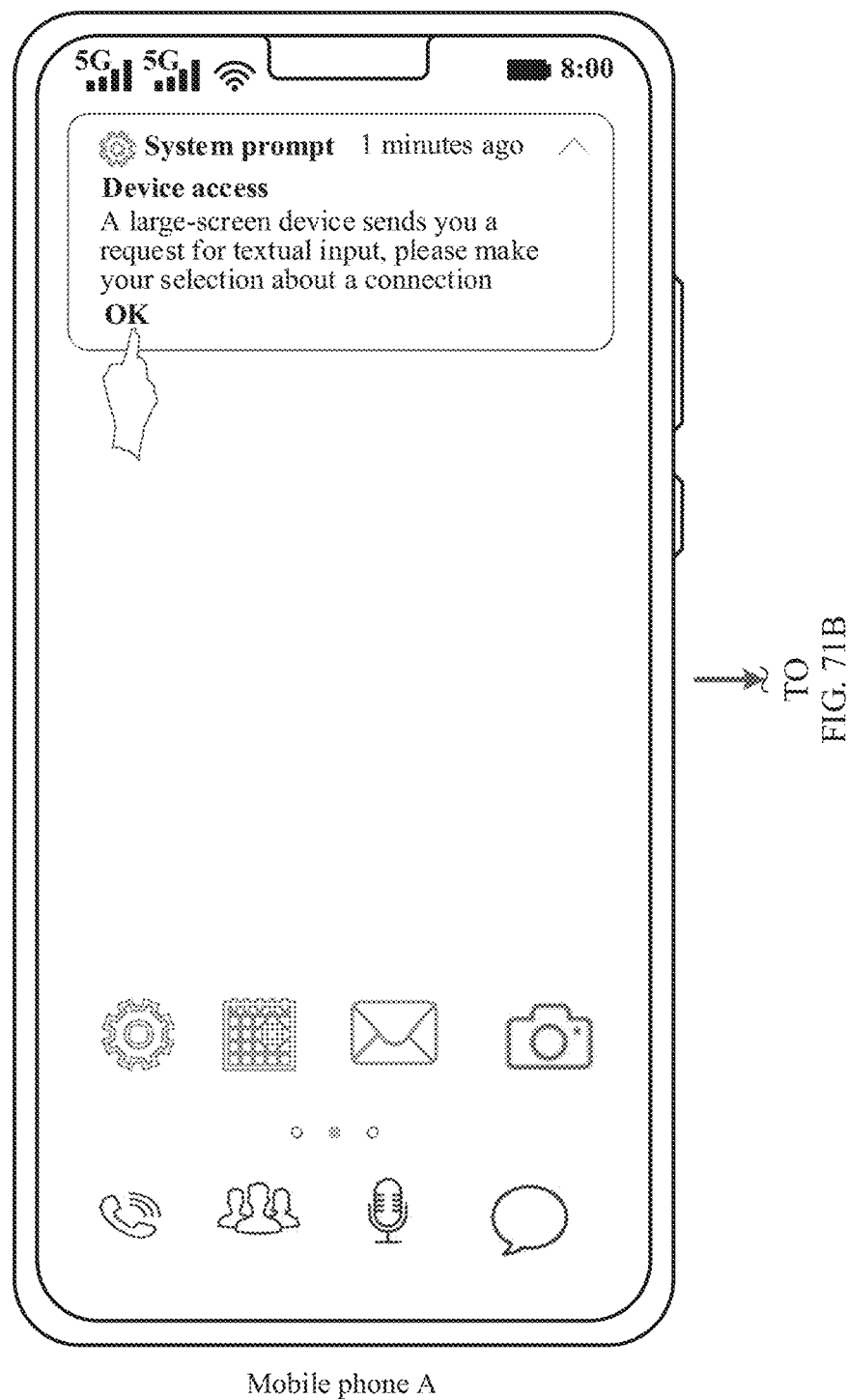
FIG. 71A to FIG. 71C are a schematic diagram of another structure on a mobile phone according to an embodiment of this application.
Figure 71B:
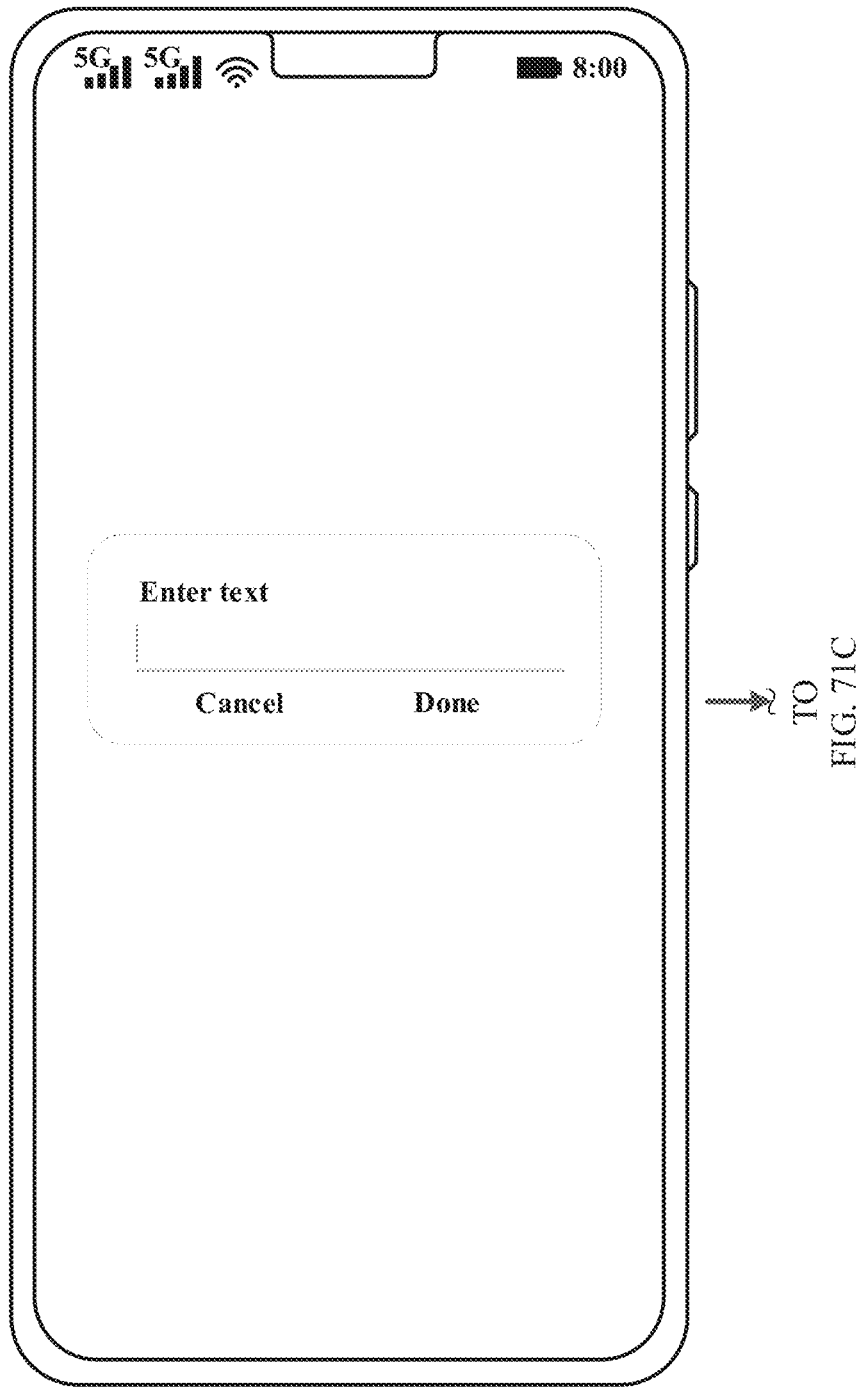
Figure 71C:
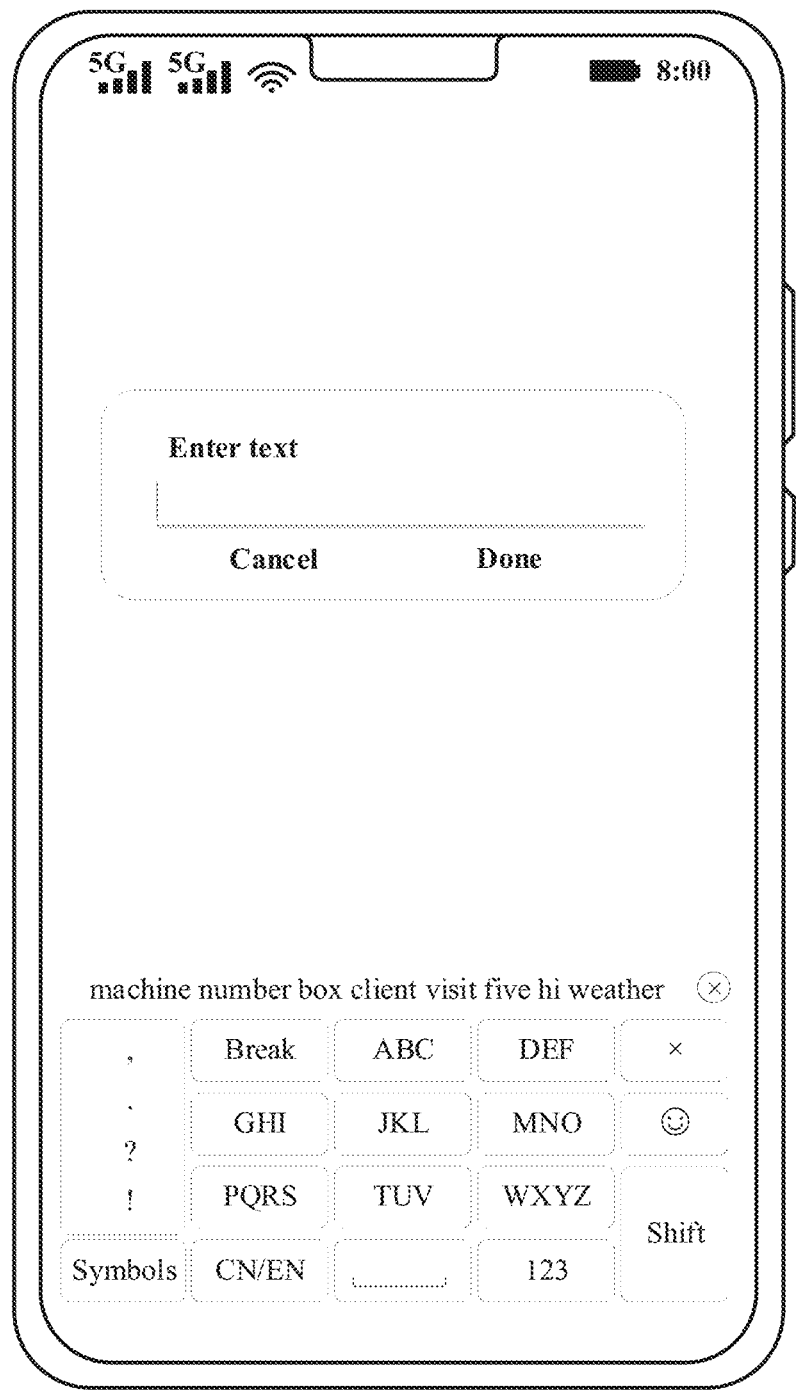

For example, FIG. 71A to FIG. 71C are a schematic diagram of a user interface in which the mobile phone AA determines to assist the large-screen device with input. As shown in a user interface in FIG. 71A, a notification used to prompt the request of the large-screen device for auxiliary input may be displayed on the mobile phone A. A user may trigger the notification on the mobile phone A to confirm to assist the large-screen device with input. Further, as shown in a user interface in FIG. 71B, an edit box used to assist the large-screen device with input may be displayed on the mobile phone A. Further, the user may trigger, for example, by clicking, the edit box as shown in FIG. 71B. The mobile phone A may display a user interface as shown in FIG. 71C, and the user interface may display a virtual keyboard (also referred to as a soft keyboard) on the mobile phone. The user may subsequently use the virtual keyboard on the mobile phone A to assist the large-screen device with input.

Figure 72A:
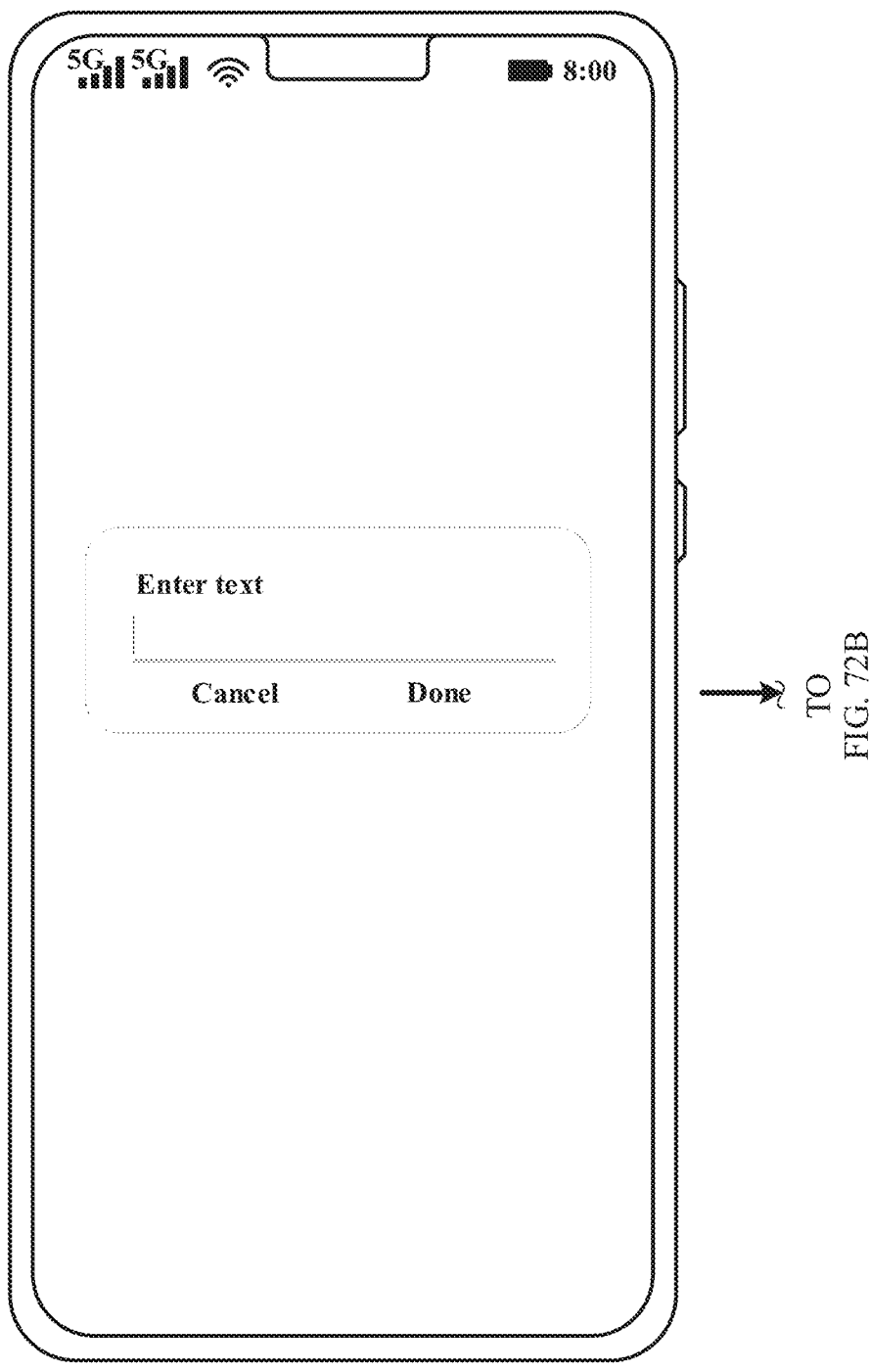
FIG. 72A and FIG. 72B are a schematic diagram of an interface on a mobile phone according to an embodiment of this application.
Figure 72B:
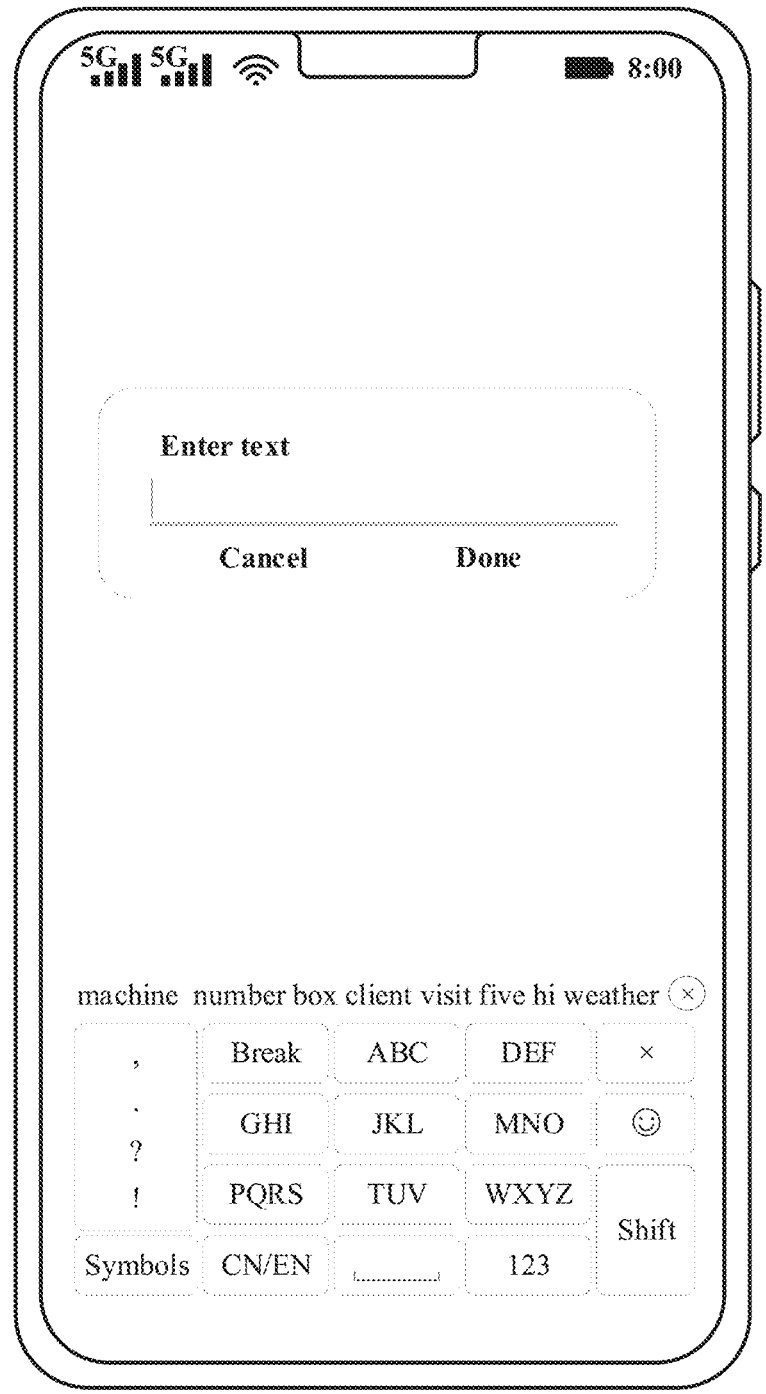

Alternatively, after the user selects the mobile phone A on the large-screen device, the mobile phone A may not receive a notification, but an edit box as shown in FIG. 72A that is used to assist the large-screen device with input is displayed. Further, the user may trigger, for example, by clicking, the edit box as shown in FIG. 72A. The mobile phone A may display a user interface as shown in FIG. 72B, and the user interface may display a virtual keyboard (also referred to as a soft keyboard) on the mobile phone. The user may subsequently use the virtual keyboard on the mobile phone A to assist the large-screen device with input.

A schematic diagram of a user interface in which the mobile phone B determines to assist the large-screen device with input is similar to that on the mobile phone A. Details are not described herein again.

It should be noted that, in this embodiment of this application, if the mobile phone A and the mobile phone B trigger auxiliary input for the large-screen device in the manner corresponding to FIG. 70, the user interface diagrams as shown in FIG. 71A to FIG. 71C, FIG. 72A, and FIG. 72B are omitted.

In another possible implementation, the large-screen device, the mobile phone A, and the mobile phone B have been connected to the distributed network. The large-screen device may be connected to an auxiliary AA of the mobile phone A, to request the mobile phone A for auxiliary input or display an input box on the mobile phone A; and then the mobile phone A requests the mobile phone B to assist the large-screen device with input together.

Figure 73:
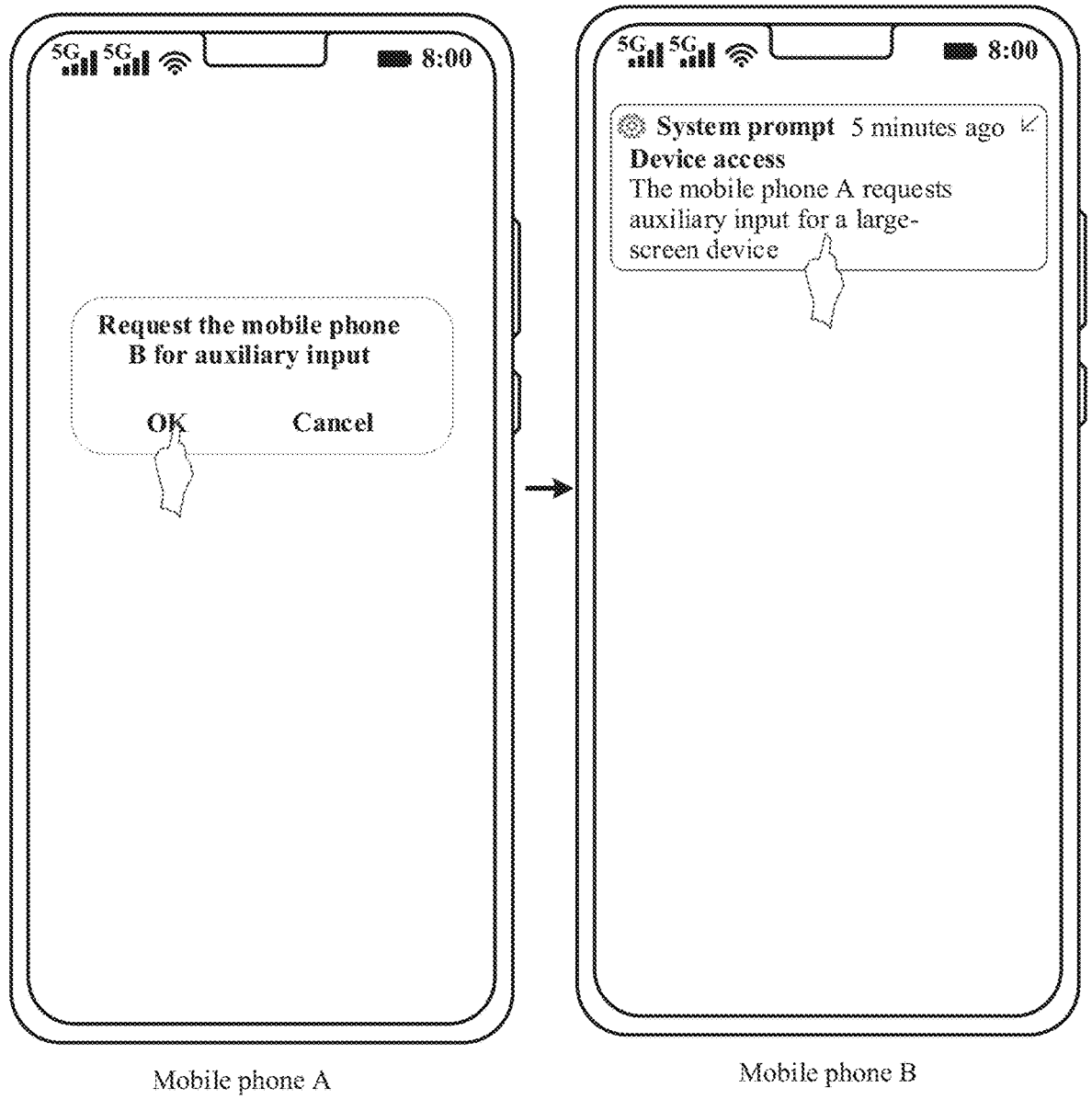
FIG. 73 is a schematic diagram of another structure on a mobile phone according to an embodiment of this application.

For example, as shown in FIG. 73, the mobile phone A in FIG. 73 may display an interface for requesting auxiliary input of the mobile phone B, and a user may click an option for confirmation on the mobile phone A to request the mobile phone B to assist the large-screen device with input. In FIG. 73, the mobile phone B may be notified of the request from the mobile phone A for auxiliary input for the large-screen device, and a user may accept the request from the mobile phone A on the mobile phone B, and an interface for an edit box as shown in FIG. 72B is displayed on the mobile phone B, to implement preemption of auxiliary input for the large-screen device.

Figure 74:
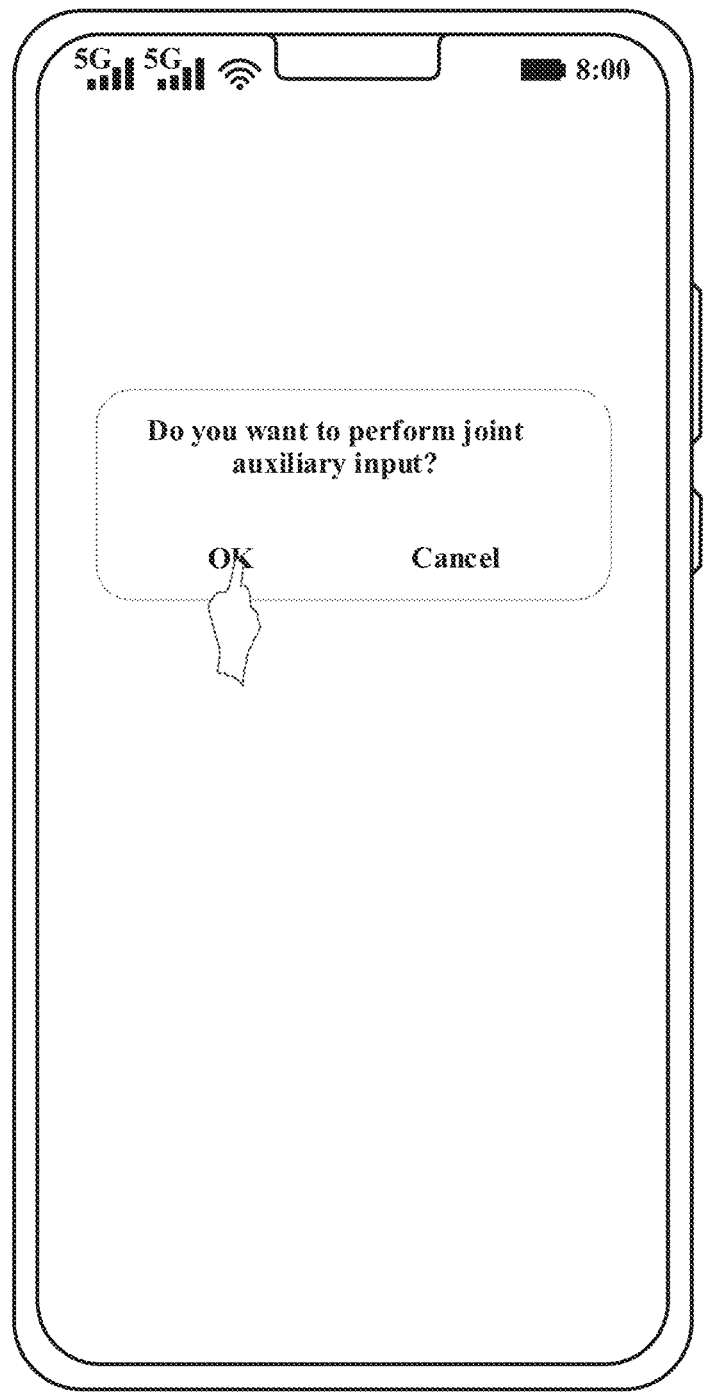
FIG. 74 is a schematic diagram of another structure on a mobile phone according to an embodiment of this application.

In still another possible implementation, initially, the large-screen device and the mobile phone A are connected to the distributed network, and the mobile phone A assists the large-screen device with input. Then, the mobile phone B is connected to the distributed network, and the mobile phone B may display an interface for prompting a user whether to perform joint auxiliary input. For example, as shown in FIG. 74, the mobile phone B displays an interface for prompting a user whether to perform joint auxiliary input. The user may click an option for confirmation on the mobile phone B, and an interface for an edit box as shown in FIG. 72B is displayed on the mobile phone B, to implement joint auxiliary input for the large-screen device with the mobile phone A.

It can be understood that a manner of joint auxiliary input of the mobile phone B together with the mobile phone A for the large-screen device may be further specified based on an actual application scenario. This is not specifically limited in this embodiment of this application.

In a possible implementation, when the mobile phone A or the mobile phone B determines to assist the large-screen device with input, a step of, for example, identity verification or authentication may be further performed between the mobile phone A, the mobile phone B, and the large-screen device, to enhance communication security. This is not specifically limited in this embodiment of this application.

In a possible implementation, if there already is input content in the edit box on the large-screen device when the large-screen device is connected to the mobile phone A or the mobile phone B, the input content in the edit box on the large-screen device may be synchronized to an edit box on the mobile phone A or an edit box on the mobile phone B.

Figure 75:
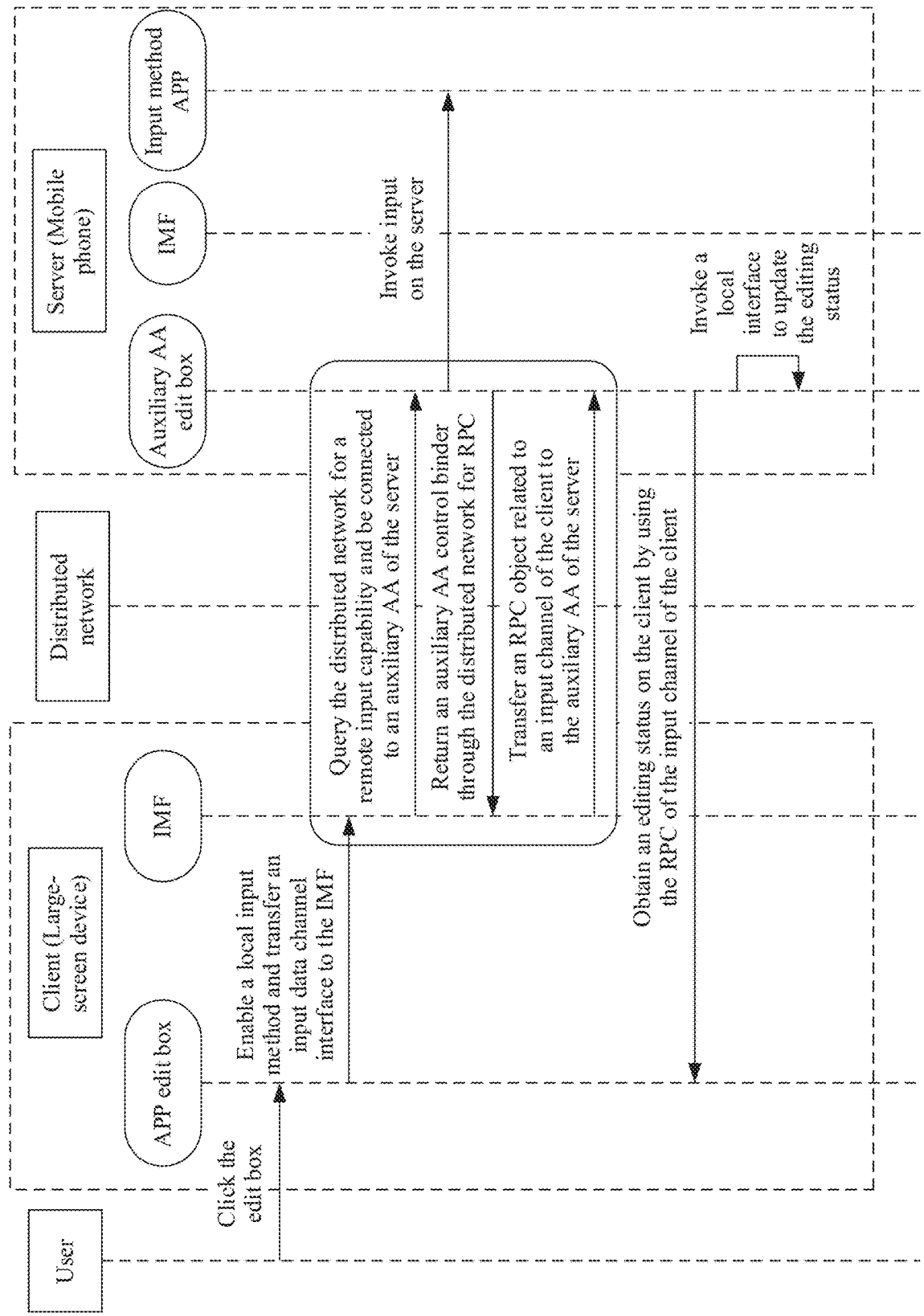
FIG. 75 is a schematic diagram of a system architecture for another device communication method according to an embodiment of this application.

For example, FIG. 75 is a schematic diagram of a framework for synchronizing the input content in the edit box on the large-screen device to the edit box on the mobile phone A or the edit box on the mobile phone B.

When a user presses an edit box of an application on the large-screen device by using a remote control, an edit box control requests an IMF to enable a local input method and transfer an input data channel to the IMF. The IMF searches for a server having a distributed input capability through the distributed network, discovers that the mobile phone A and the mobile phone B can provide an auxiliary input capability for the large-screen device, and therefore is connected to distributed input auxiliary AAs of the mobile phone A and the mobile phone B. After the connection is established, some pre-processing operations may be performed (for example, notifying a user to confirm or enter some authentication codes). Dialog edit boxes for helping the AAs with auxiliary input are displayed on the mobile phone A and the mobile phone B, and an input method soft keyboard on each of the devices is displayed (as shown in FIG. 71A to FIG. 71C). The large-screen device holds RPC objects of the auxiliary AAs of the mobile phone A and the mobile phone B during callback after the connection is established. An RPC object that the input data channel of the large-screen device wraps is transferred to the auxiliary AAs of the mobile phone A and the mobile phone B. The mobile phone A and the mobile phone B may obtain the initial editing status from the large-screen device side by using the RPC object related to the input data channel transferred from the large-screen device. Then, the mobile phone A and the mobile phone B invoke local interfaces to update the initial editing status. In this way, a complete editing status on the large-screen device may be synchronized to the mobile phone, so that a user does not need to repeatedly enter, on the mobile phone, initial input content in the edit box on the large-screen device.

It can be understood that FIG. 71A to FIG. 71C and FIG. 12 are schematic diagrams of a user interface on the mobile phone A or the mobile phone B when there is no initial input content in the edit box on the large-screen device. If there is the initial input content in the edit box on the large-screen device, the initial input content on the large-screen device is synchronized to the edit box on the mobile phone A or the mobile phone B. For ease of description, an example in which there is no initial input content in the edit box on the large-screen device is used below to describe a process in which a mobile phone assists the large-screen device with input.

Figure 76:
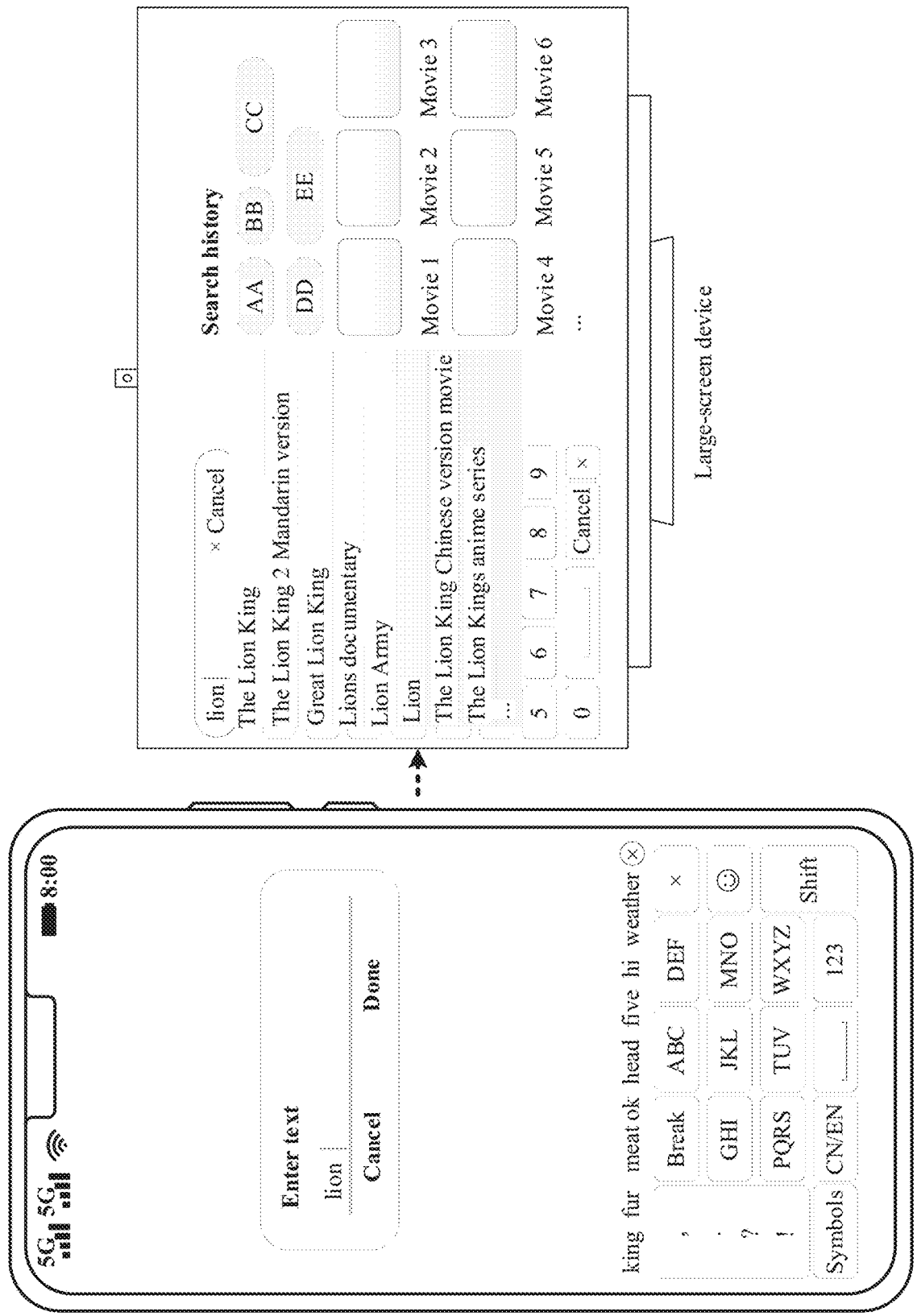
FIG. 76 is a schematic diagram of an interface showing that a mobile phone assists a large-screen device with input according to an embodiment of this application.

For example, FIG. 76 is a schematic diagram of a user interface in which a user uses the mobile phone B to assist the large-screen device with input in the edit box. For example, as shown in the left diagram of a user interface on the mobile phone B in FIG. 76, the user may enter "lion" (sh ī zi) in the edit box on the mobile phone B. and a cursor may be further displayed after "lion" in the edit box on the mobile phone B. As shown in the right diagram of a user interface on the large-screen device in FIG. 76, "lion" and the cursor may be synchronized to the edit box on the large-screen device.

Figure 77:
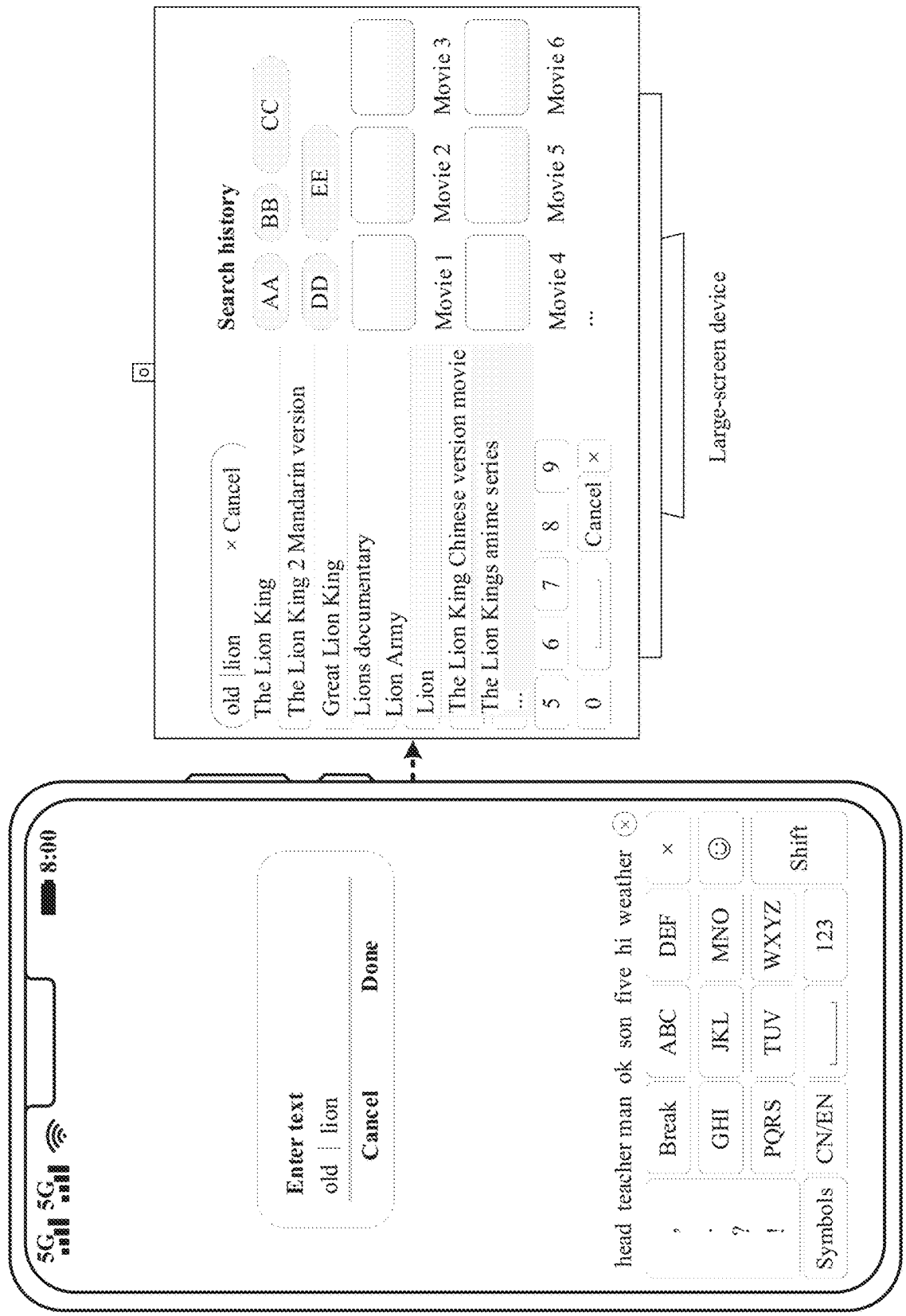
FIG. 77 is a schematic diagram of another interface showing that a mobile phone assists a large-screen device with input according to an embodiment of this application.

FIG. 77 is a schematic diagram of a user interface in which a user may move a cursor in the edit box on the mobile phone B. For example, as shown in the left diagram of a user interface on the mobile phone B in FIG. 77, the user may move the cursor to a position before "lion" in the edit box on the mobile phone B, and add "old" before the cursor. As shown in the right diagram of a user interface on the large-screen device in FIG. 77, the cursor before "lion" and "old" before the cursor may be synchronized to the edit box on the large-screen device.

Figure 78:
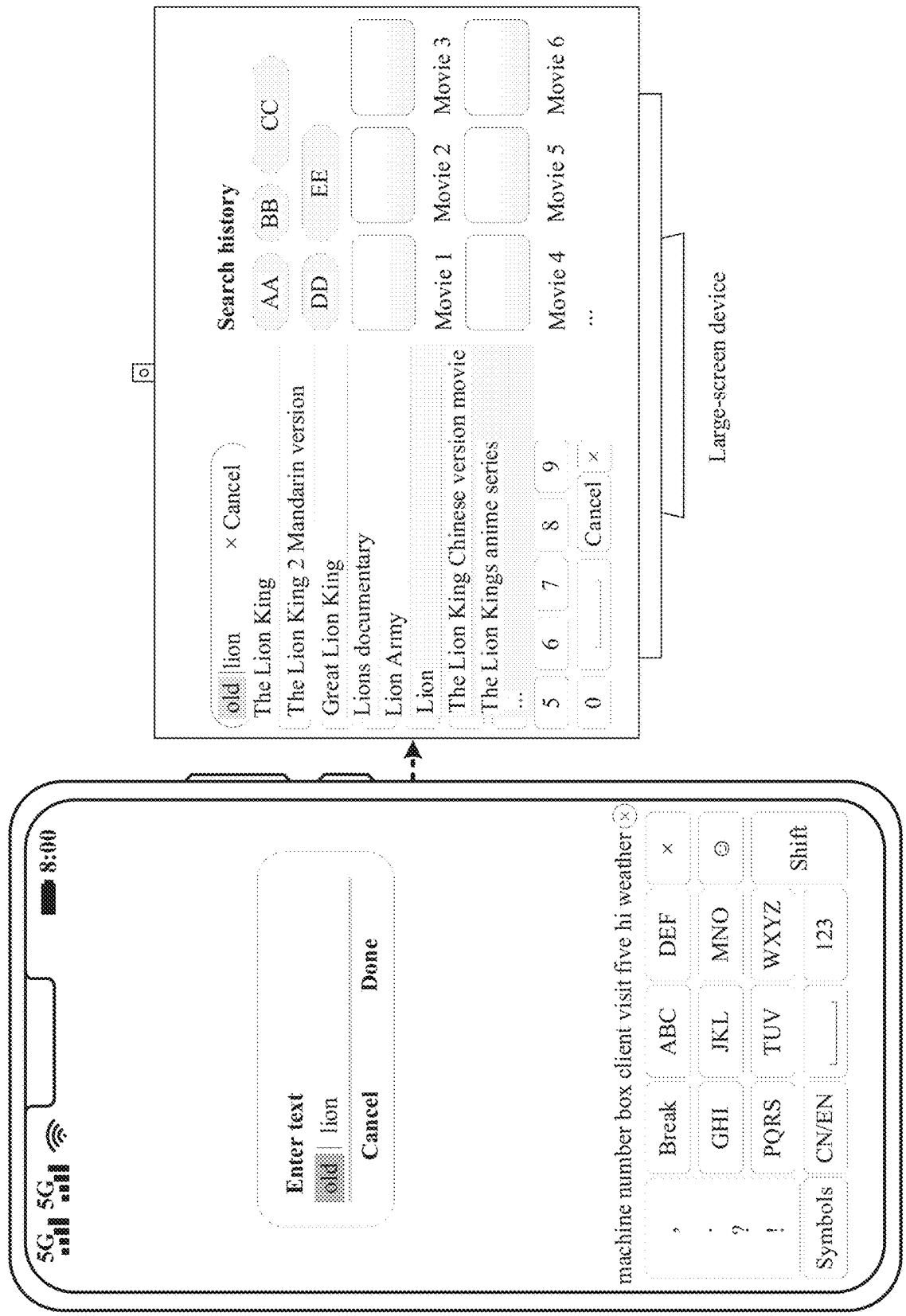
FIG. 78 is a schematic diagram of an interface showing that a mobile phone assists a large-screen device with input according to an embodiment of this application.

FIG. 78 is a schematic diagram of a user interface in which a user may highlight a selected target term in the edit box on the mobile phone B. For example, as shown in the left diagram of a user interface on the mobile phone B in FIG. 78, the user may highlight the selected "old" in the edit box on the mobile phone B. As shown in the right diagram of a user interface on the large-screen device in FIG. 78, "old" that is highlighted for display may be synchronized to the edit box on the large-screen device and the edit box on the mobile phone A.

It can be understood that, in an implementation in which the user uses the mobile phone A to assist the large-screen device with input, a user interface on the mobile phone A may be similar to the user interface on the mobile phone B. Details are not described herein again.

In a possible implementation, when both the mobile phone A and the mobile phone B receive a request of the large-screen device for auxiliary input, a user using the mobile phone A may determine to assist the large-screen device with input by, for example, clicking a control for approving auxiliary input, and a user using the mobile phone B may also determine to assist the large-screen device with input by, for example, clicking a control for approving auxiliary input. In this case, subsequently, an editing status in the edit box on the mobile phone A may be synchronized to the edit box on the large-screen device and the edit box on the mobile phone B, an editing status in the edit box on the mobile phone B may be synchronized to the edit box on the large-screen device and the edit box on the mobile phone A, and an editing status in the edit box on the large-screen device may be synchronized to the edit box on the mobile phone A and the edit box on the mobile phone B.

Figure 79A:
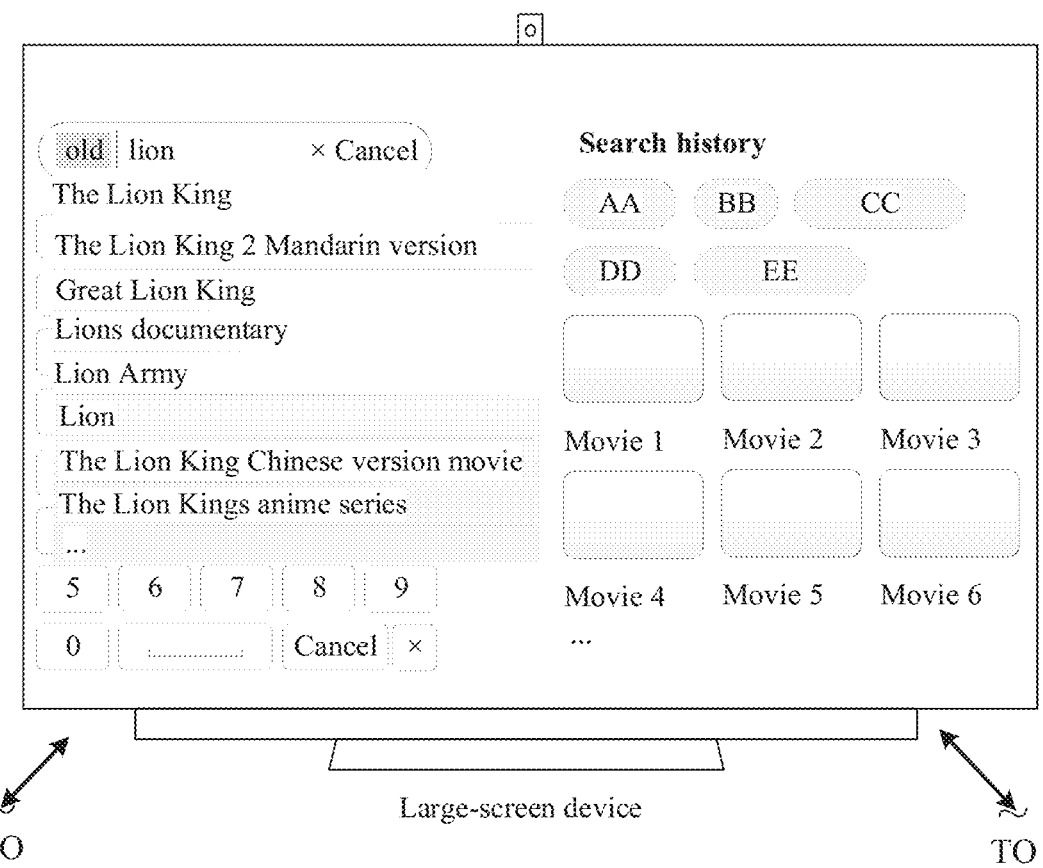
FIG. 79A to FIG. 79C are a schematic diagram of an interface showing that a mobile phone assists a large-screen device with input according to an embodiment of this application.
Figure 79B:
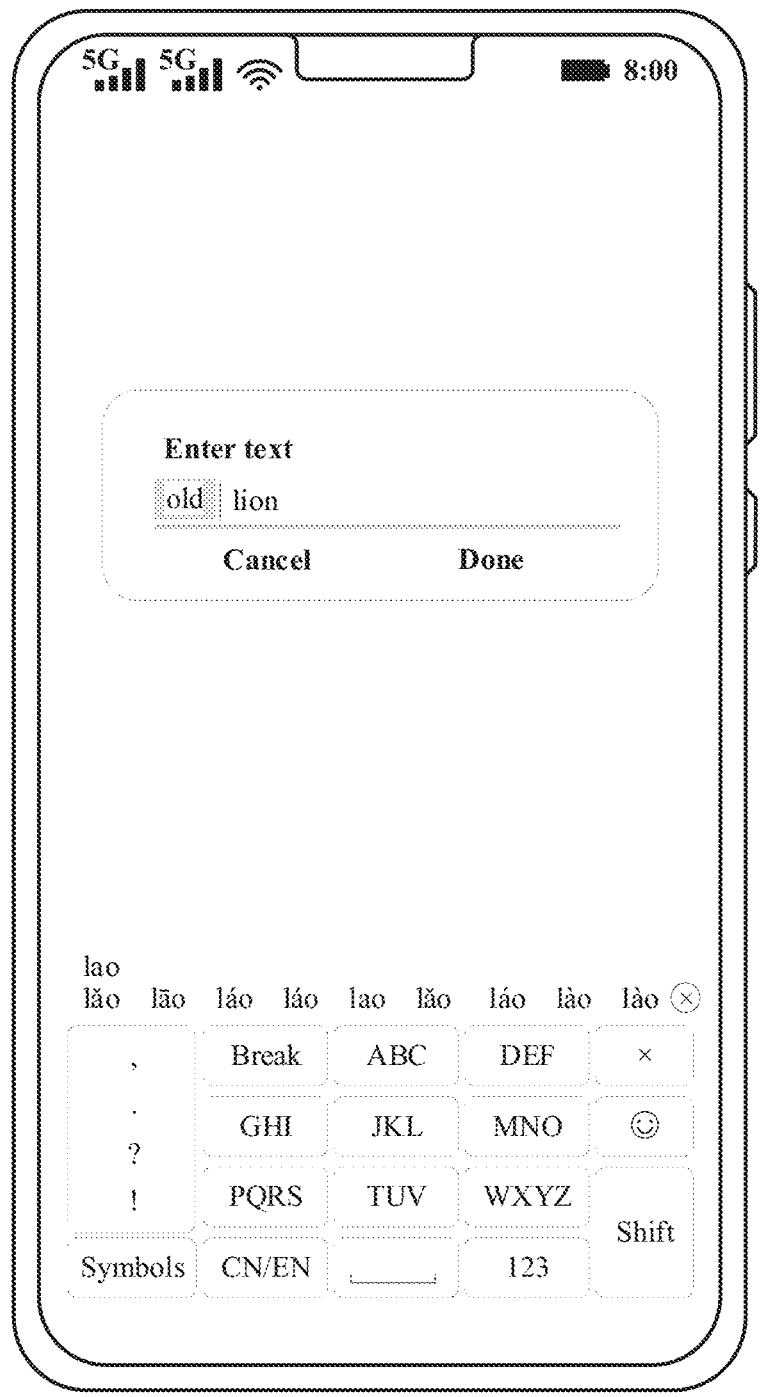
Figure 79C:
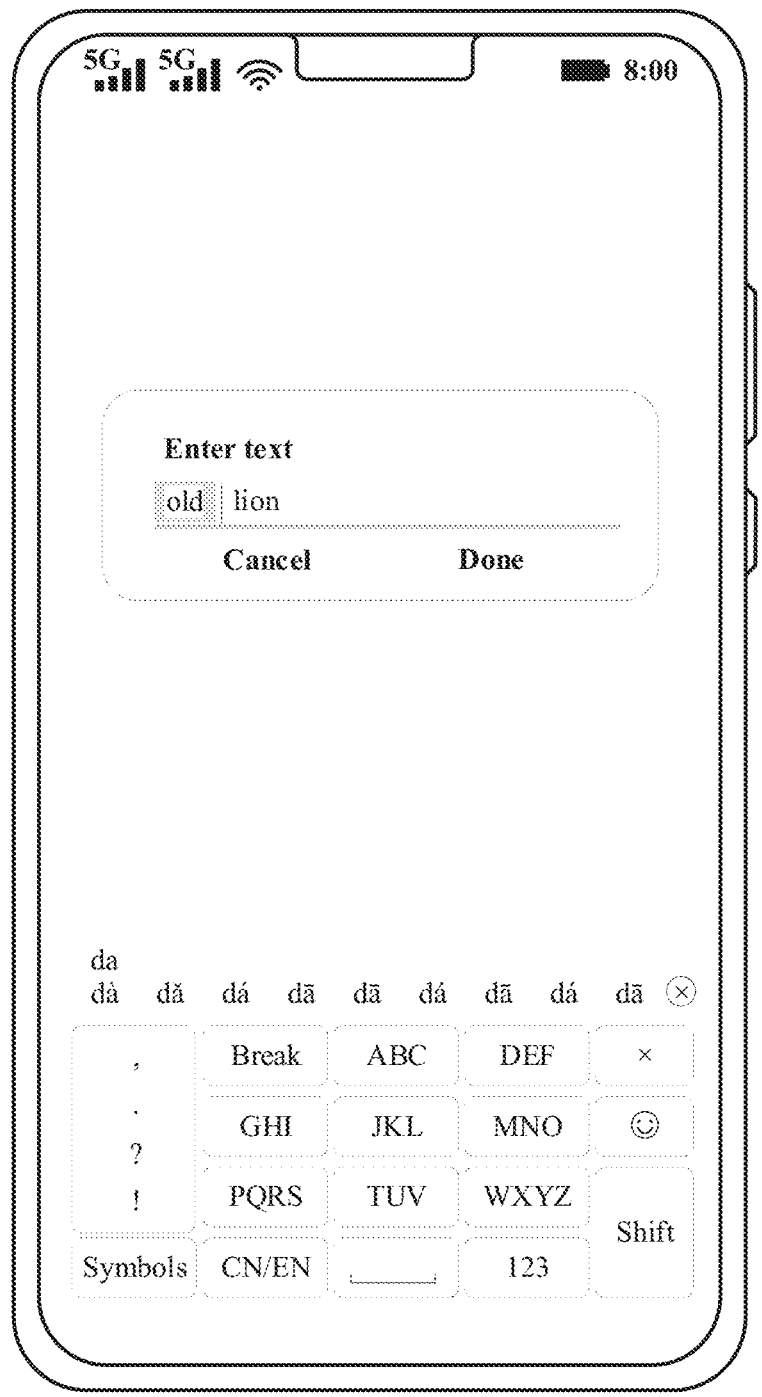

FIG. 79A to FIG. 79C are a schematic diagram of a user interface in which a user uses the mobile phone A and the mobile phone B to assist the large-screen device with input. For example, as shown in a diagram of a user interface on the mobile phone A in FIG. 79B, the user may enter "old lion" (lǎo shī zi) in the edit box on the mobile phone A, move a cursor between "old" and "lion", and select and highlight "old". As shown in a diagram of a user interface on the large-screen device in FIG. 79A, an editing status displayed in the edit box on the large-screen device is the same as that displayed in the edit box on the mobile phone A. As shown in a diagram of a user interface on the mobile phone B in FIG. 79C, an editing status displayed in the edit box on the mobile phone B is the same as that displayed in the edit box on the mobile phone A.

In a possible implementation, as shown in the diagrams of interfaces on the mobile phone A and the mobile phone B in FIG. 79C, "old" may be entered and selected by using a virtual keyboard on the mobile phone A. Therefore, "old" may be displayed in the edit boxes of the mobile phone A and the mobile phone B. In addition, "big" (da) may be entered on the mobile phone B, but "big" is not selected by using the virtual keyboard on the mobile phone B. Therefore. "big" is not displayed in the edit boxes of the mobile phone A and the mobile phone B. Alternatively, it may be understood that, when the mobile phone A and the mobile phone B assist the large-screen device with input together, content in the edit boxes on the mobile phone A and the mobile phone B is the same. Content other than that in the edit boxes on the mobile phone A and the mobile phone B may be displayed as the same or may be displayed differently.

In a possible implementation, if "old" is entered and "old" is selected by using the virtual keyboard on the mobile phone A. and "big" is entered and "big" is selected by using the virtual keyboard on the mobile phone B, the large-screen device may determine whether to display "old" before "big", or to display "big" before "old". A basis of the decision may be a time at which "old" on the mobile phone A or "big" on the mobile phone B is received, may be frequencies of auxiliary input of the mobile phone A and the mobile phone B, or may be random. This is not specifically limited in this embodiment of this application.

Figure 80A:
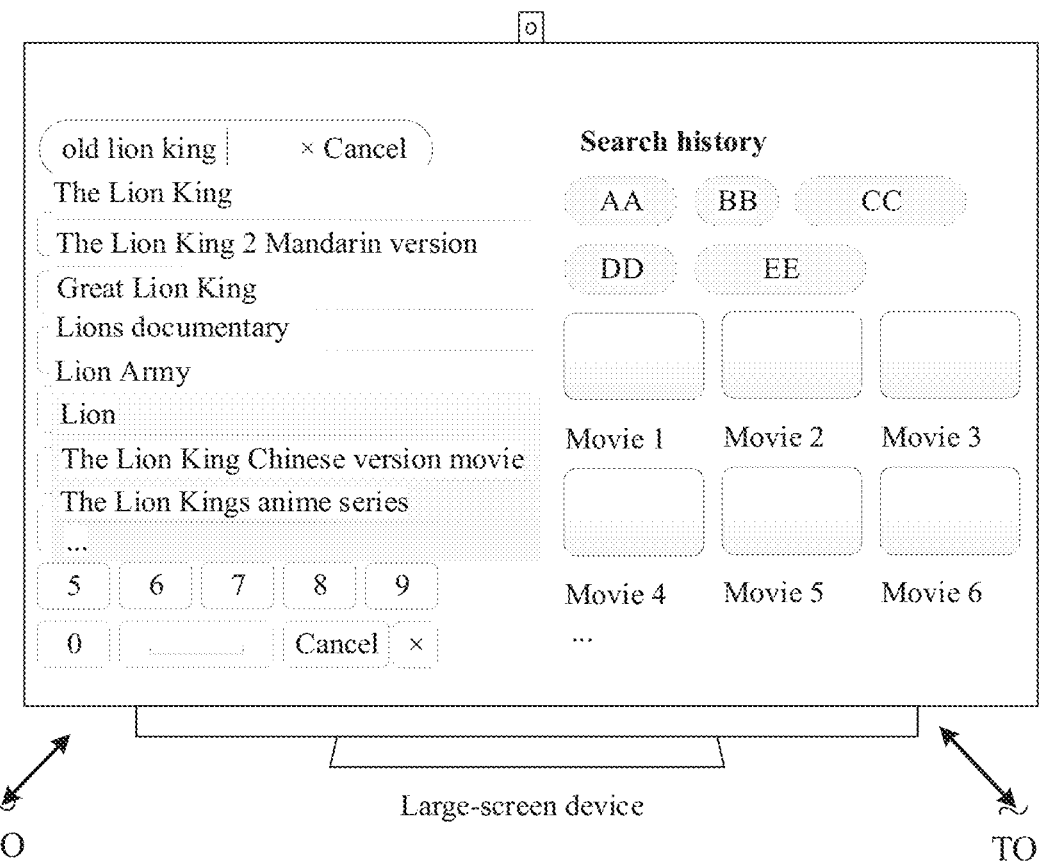
FIG. 80A to FIG. 80C are a schematic diagram of an interface showing that a mobile phone assists a large-screen device with input according to an embodiment of this application.
Figure 80B:
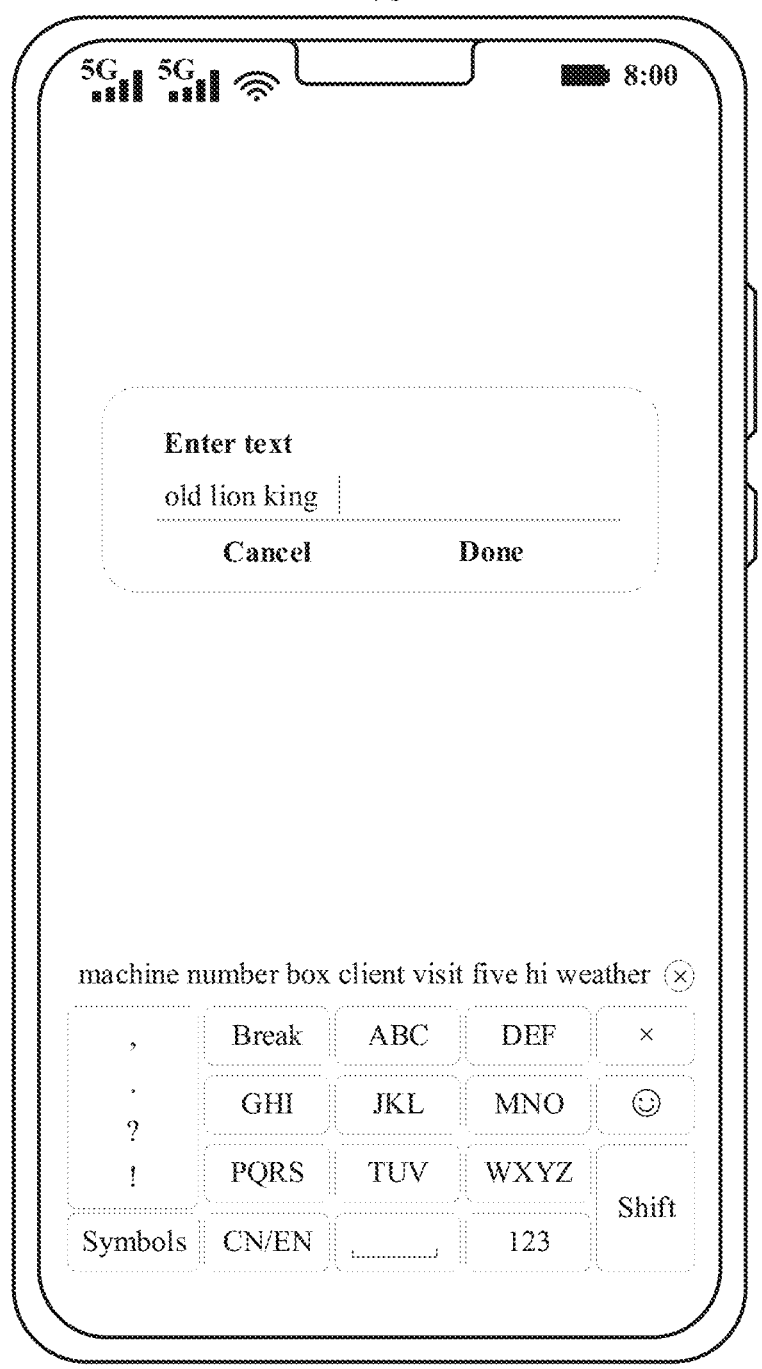
Figure 80C:
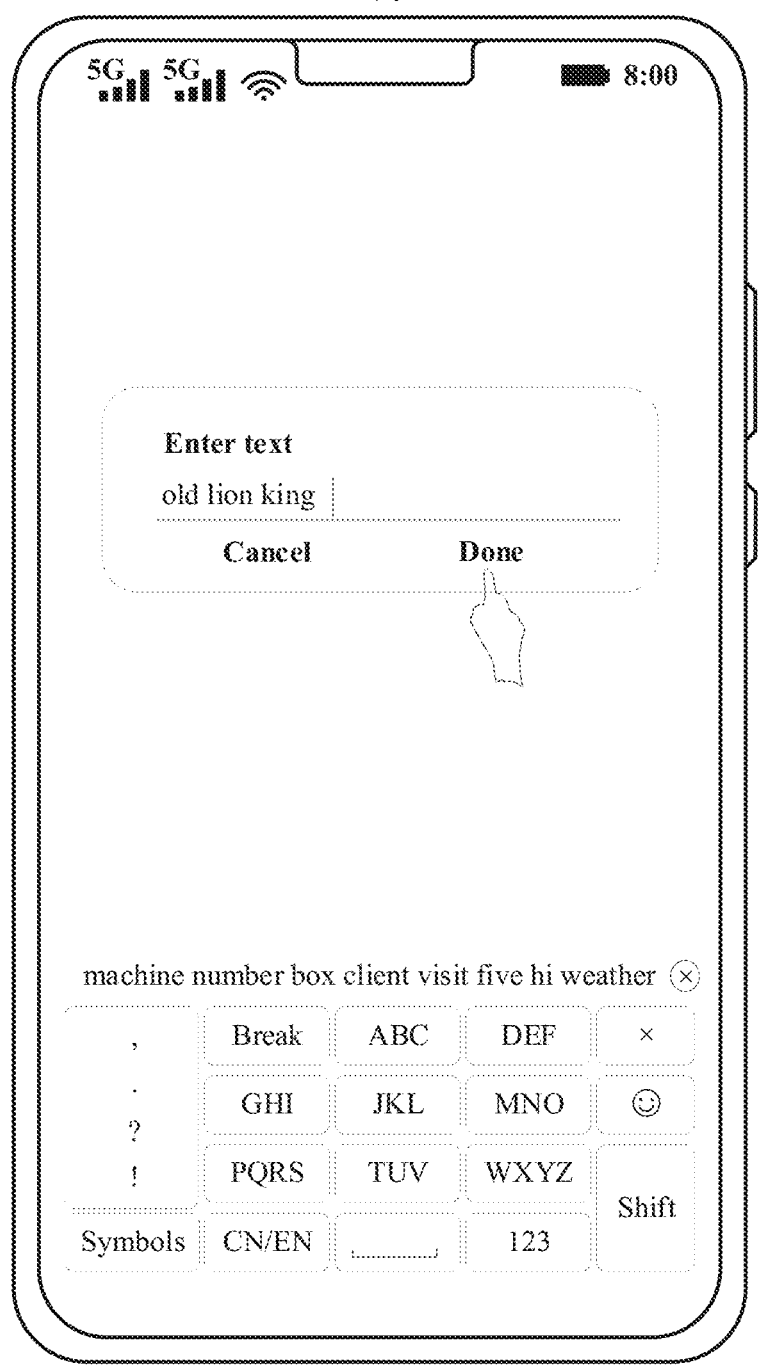

FIG. 80A to FIG. 80C are a schematic diagram of another user interface in which a user uses the mobile phone A and the mobile phone B to assist the large-screen device with input.

In an example, in a user interface on the mobile phone B as shown in FIG. 80C, based on FIG. 79A to FIG. 79C, the user moves the cursor to a position after "old lion" in the edit box on the mobile phone B, and then enters "king" (wáng) after "old lion". As shown in a diagram of a user interface on the large-screen device in FIG. 80A, an editing status displayed in the edit box on the large-screen device is the same as that displayed in the edit box on the mobile phone B. As shown in a diagram of a user interface on the mobile phone A in FIG. 80B, an editing status displayed in the edit box on the mobile phone A is the same as that displayed in the edit box on the mobile phone B.

In another example, in the user interface on the large-screen device as shown in FIG. 80A, based on FIG. 79A to FIG. 79C, the user moves the cursor to a position after "old lion" in the edit box on the large-screen device, and then enters "king" after "old lion". As shown in the diagram of the user interface on the mobile phone A in FIG. 80B, the editing status displayed in the edit box on the mobile phone A is the same as that displayed in the edit box on the large-screen device. As shown in the diagram of the user interface on the mobile phone B in FIG. 80C, the editing status displayed in the edit box on the mobile phone B is the same as that displayed in the edit box on the large-screen device.

Figure 81:
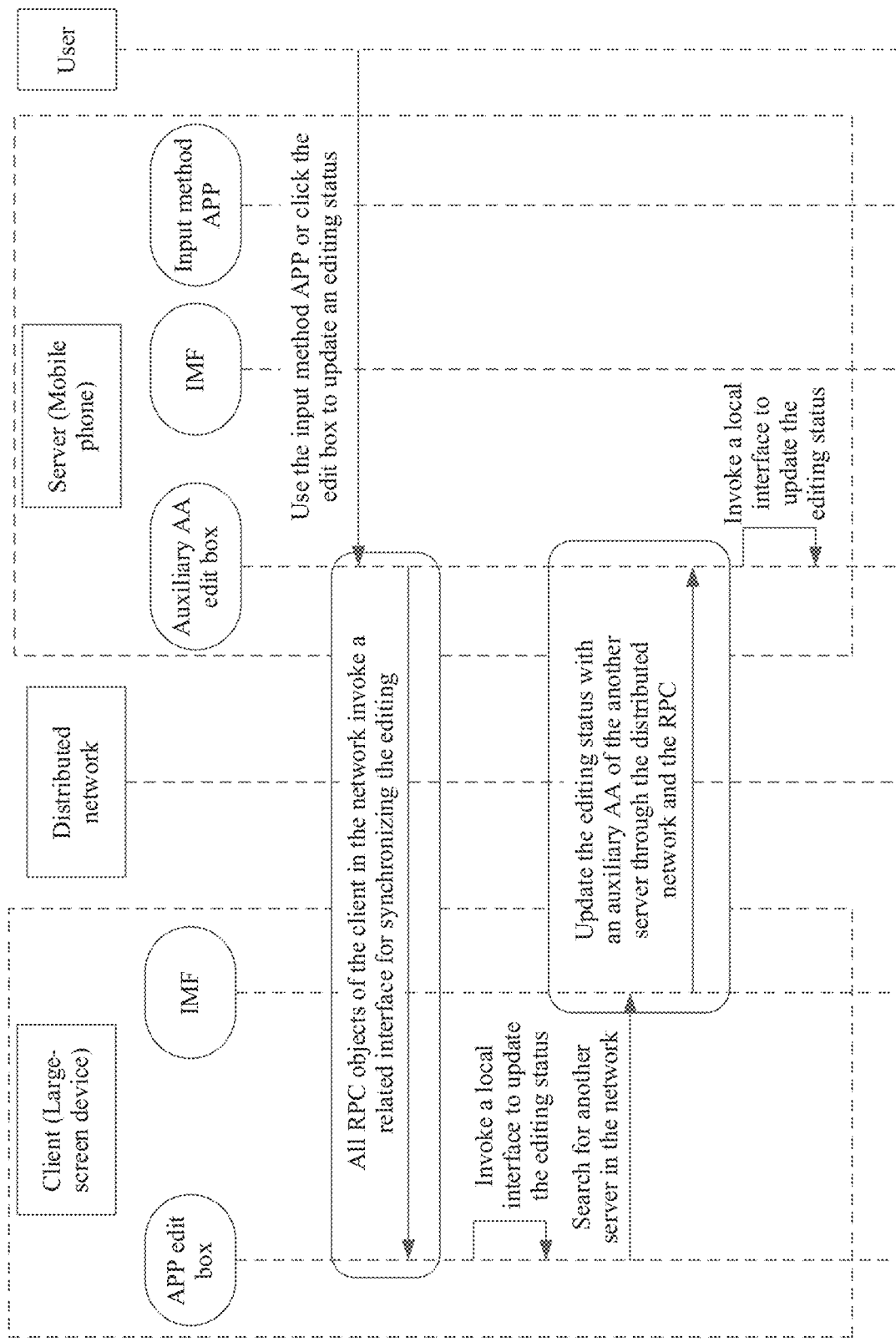
FIG. 81 is a schematic diagram of a system architecture for another device communication method according to an embodiment of this application.
Figure 82A:
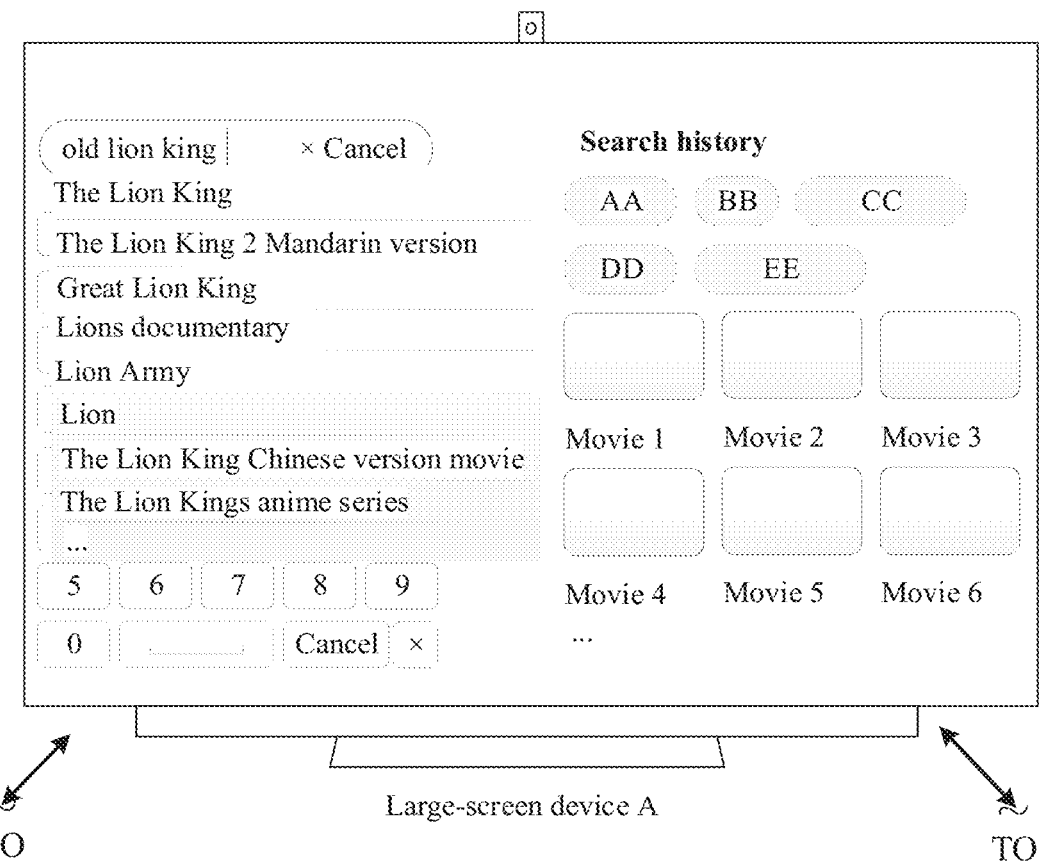
FIG. 82A to FIG. 82D are a schematic diagram of an interface showing that a mobile phone assists a large-screen device with input according to an embodiment of this application.
Figure 82B:
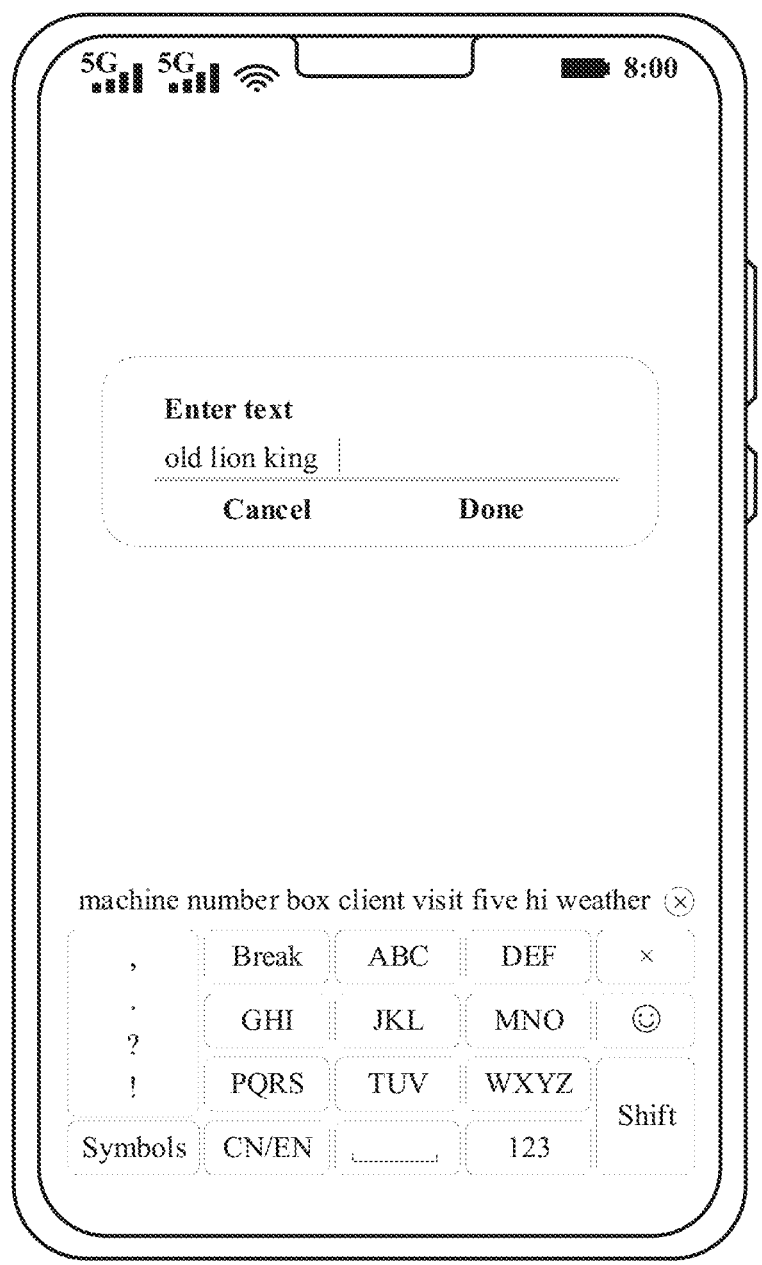
Figure 82C:
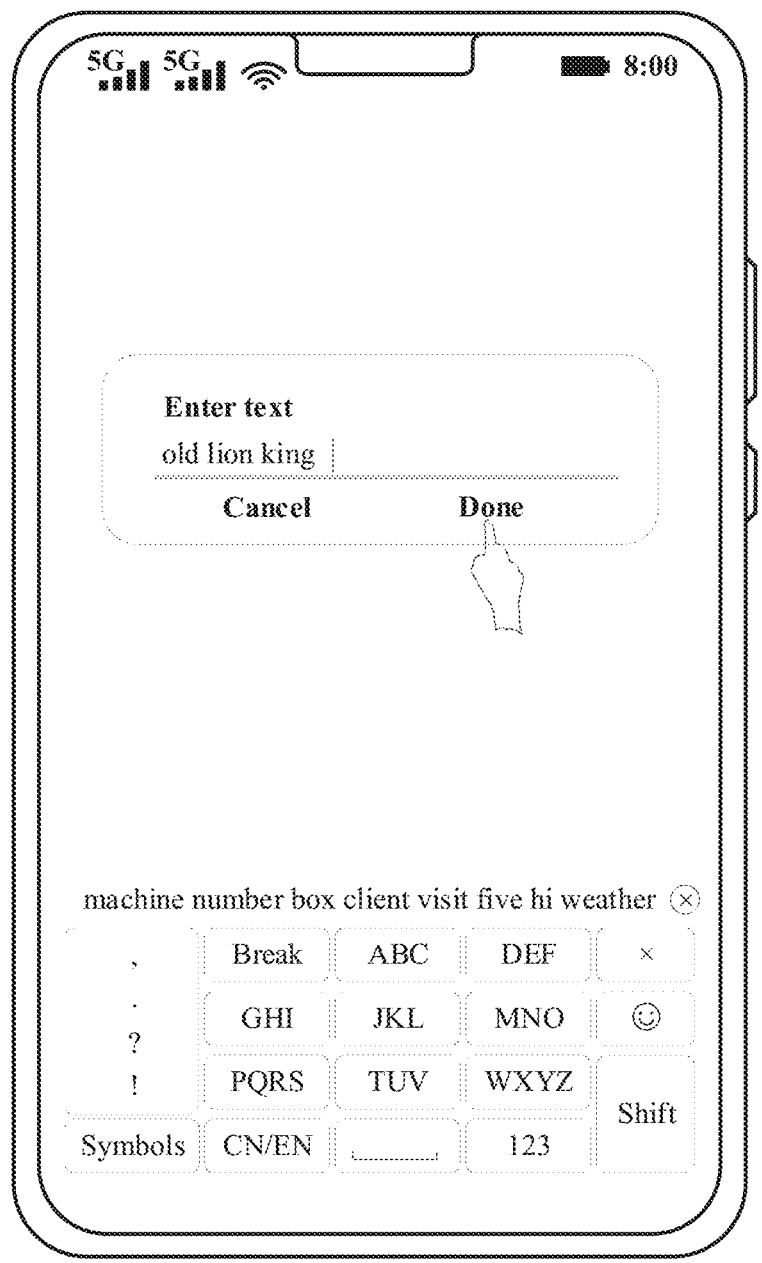
Figure 82D:
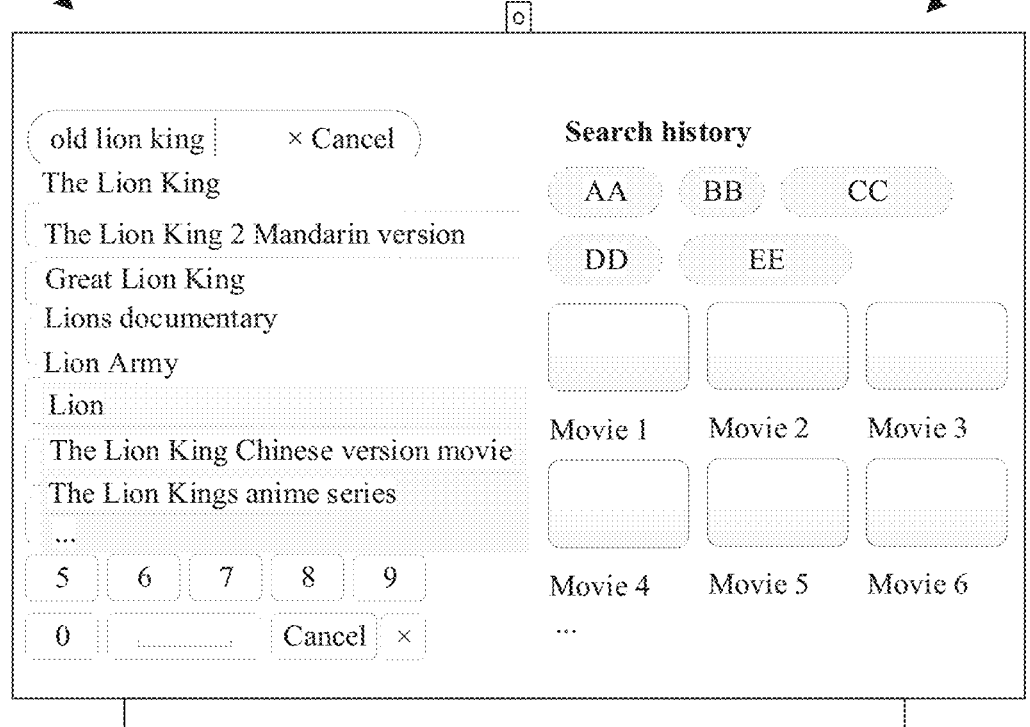

For example, FIG. 81 is a schematic diagram of a processing logic w % ben a mobile phone assists a large-screen device with input.

As shown in FIG. 81, when a user updates an editing status by operating an auxiliary AA of a mobile phone A (the update of the editing status may include: The user enters or deletes text by using an input method on the mobile phone A, moves a cursor in a text edit box, selects and highlights a textual passage in the edit box, or the like), the auxiliary AA of the mobile phone A captures a change of the editing status, discovers that the auxiliary AA already holds an RPC object of an input data channel of the large-screen device, and synchronizes the editing status to the large-screen device side by using a proxy that wraps the RPC object. The large-screen device side invokes a related local interface for changing an editing status to synchronize the updated editing status on the mobile phone A.

In a possible implementation, when updating the editing status, the large-screen device queries the IMF whether the large-screen device holds an RPC object of an auxiliary AA of another server. Herein, it is discovered that the large-screen device holds an RPC object of an auxiliary AA of a mobile phone B, and the RPC object is used to notify the mobile phone B to synchronize the editing status and transfer a synchronization factor. The mobile phone B invokes a related local interface for changing an editing status to synchronize the editing status transferred from the large-screen device side. By checking the synchronization factor, it is discovered that a source of the update is the mobile phone A that is also a distributed input server in a same network. Therefore, the update is not further performed on a client in the network. The update is complete at once.

In this way, when a user operates a device in the distributed network to update an editing status on the device, all other devices in the distributed network can synchronize the updated editing status.

In a possible implementation, a plurality of large-screen devices may be alternatively included in the distributed network. For example, FIG. 79A to FIG. 79C is a schematic diagram of a user interface in which a plurality of devices assist each other with input when a distributed network includes a large-screen device A, a large-screen device B, a mobile phone A. and a mobile phone B.

As shown in FIG. 82A to FIG. 82D, a user may edit "old lion king" (lǎo shī zi wáng) by using the mobile phone A, the mobile phone B, and/or the large-screen device A. and the large-screen device B may further synchronize "old lion king" to an edit box on the large-screen device B.

Figure 83:
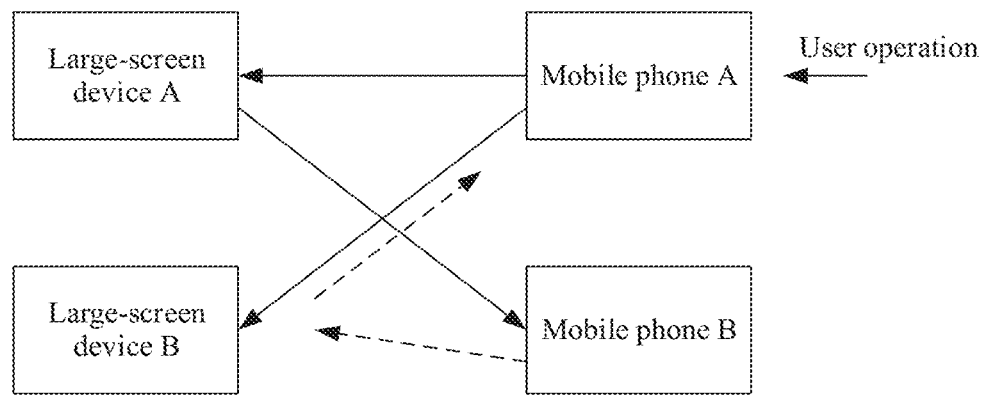
FIG. 83 is a schematic diagram of cycle chain generation according to an embodiment of this application.

It should be noted that, when a plurality of large-screen devices are included in the distributed network, there may be a cycle chain of synchronization. For example, FIG. 83 is a schematic diagram of a cycle chain of synchronization. As shown in FIG. 83, when a user operates the mobile phone A to update an editing status, the mobile phone A synchronizes with the large-screen device A and the large-screen device B. The large-screen device A detects that the mobile phone B is still in the current distributed network, and therefore synchronizes with the mobile phone B. The mobile phone B discovers that the large-screen device B is still in the distributed network, and therefore synchronizes with the large-screen device B. Further, the large-screen device B synchronizes with the mobile phone A. Therefore, a cycle chain of synchronization is generated.

Based on this, in this embodiment of this application, to suppress generation of the cyclic chain of synchronization, a synchronization factor is introduced into a technology for synchronizing input in a distributed network. The synchronization factor records an element that initiates each update. For example, the synchronization factor may include information, for example, a device ID and/or a terminal category (a server or a client) of a party who initiates the update. Each time an editing status is updated, the synchronization factor is transferred. The synchronization factor is detected when a device updates the editing status. If an update is initiated by a server, the synchronization factor records that a source of the update operation is the server, and the update is performed only on another server and will not continue.

Figure 84:
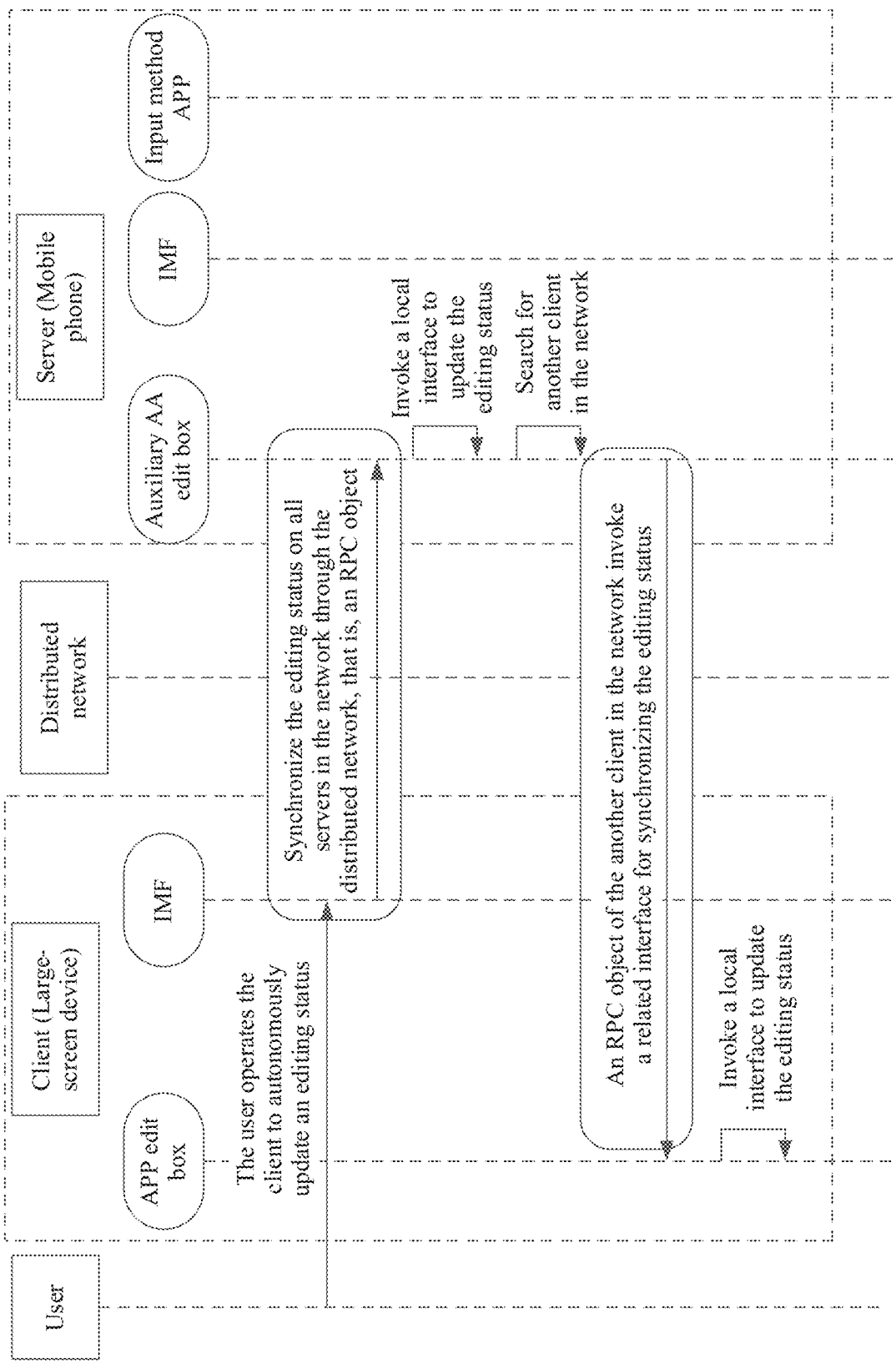
FIG. 84 is a schematic diagram of a system architecture for another device communication method according to an embodiment of this application.

For example, FIG. 84 is a schematic diagram of a processing logic w % ben a mobile phone assists a large-screen device with input as shown in FIG. 82A to FIG. 82D.

As shown in FIG. 84, when a user autonomously updates an editing status on the large-screen device A by operating the large-screen device A (the update of the editing status may include: The user enters or deletes text by using an input method on the large-screen device A, moves a cursor in a text edit box of an APP, selects and highlights a textual passage in the edit box, or the like), the edit box of the APP on the large-screen device A captures a change of the editing status, queries an IMF and discovers that the large-screen device A already holds RPC objects returned by auxiliary AAs of the mobile phone A and the mobile phone B, synchronizes the editing status to the mobile phone A and the mobile phone B by using a proxy that wraps the RPC objects, and transfers the synchronization factor. The auxiliary AAs of the mobile phone A side and the mobile phone B side invoke related local interfaces capable of changing an editing status to synchronize the updated editing status on the large-screen device A. When synchronizing the editing status, the mobile phone A or the mobile phone B queries the IMF whether the mobile phone A or the mobile phone B holds an RPC object of a data channel transferred from another client. Herein, it is discovered that the mobile phone A or the mobile phone B holds an RPC object of an input data channel of the large-screen device B, and the RPC object is used to notify the large-screen device B to synchronize the editing status and transfer the synchronization factor. The large-screen device B invokes a related local interface capable of changing an editing status to synchronize the editing status transferred from the mobile phone A. By checking the synchronization factor, it is discovered that a source of the update is the large-screen device A that is also a distributed input client in the same network. Therefore, the update is not further performed on a server in the network. The update is complete at once.

In this way, when a user operates a device in the distributed network to update an editing status on the device, all other devices in the distributed network can synchronize the updated editing status. In addition, because the device in the distributed network can transfer the synchronization factor synchronously when updating the editing status, generation of a cycle chain is avoided.

It should be noted that the user interface diagrams of auxiliary input of the mobile phone for the large-screen device are all examples for description. In a possible implementation, in an interface for auxiliary input of the mobile phone for the large-screen device, all or some of content on the large-screen device may be synchronized, so that a user using the mobile phone can learn about a status on the large-screen device based on the interface on the mobile phone.

Figure 85:
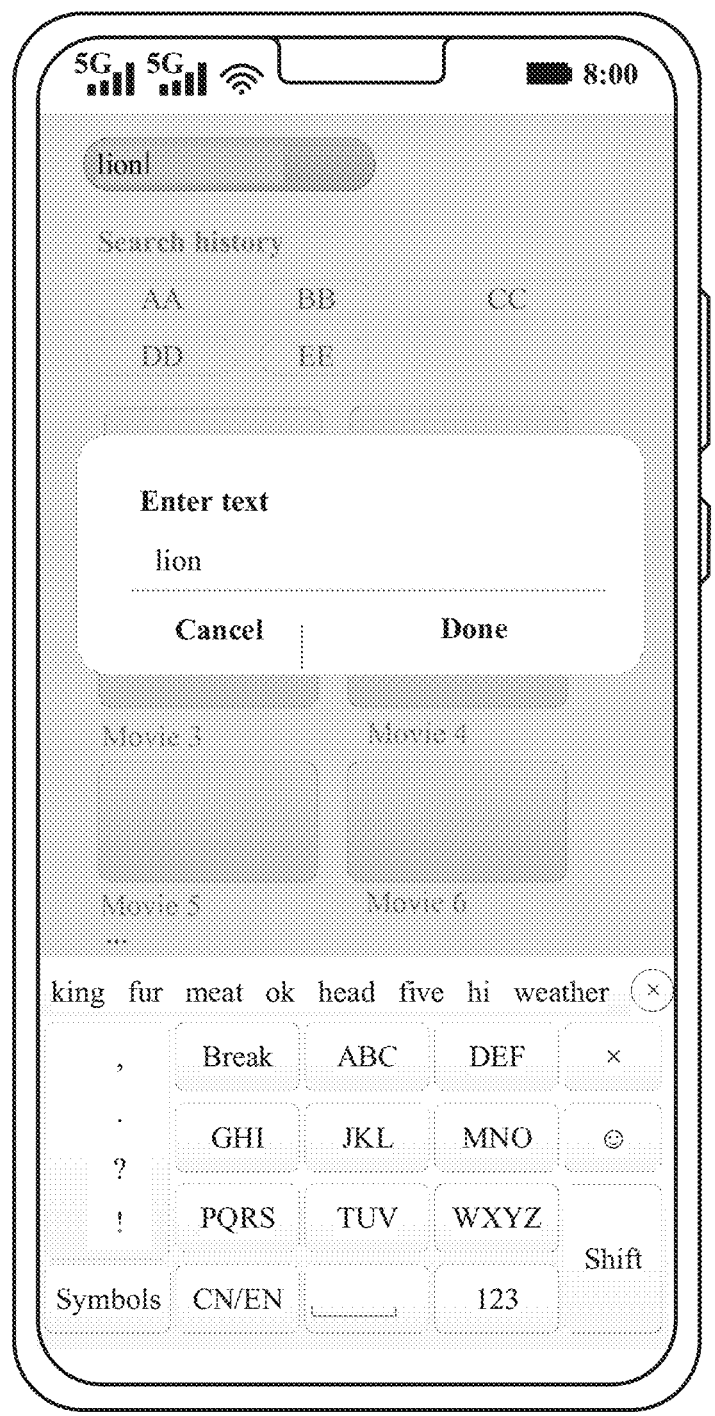
FIG. 85 is a schematic diagram of an interface on a mobile phone according to an embodiment of this application.

For example, FIG. 85 shows a user interface on a mobile phone. As shown in FIG. 85, when using the mobile phone to assist the large-screen device with input, a user may project all or some of the content on the large-screen device to the mobile phone. For example, content in the edit box on the large-screen device is displayed on the mobile phone, and an edit box on the mobile phone is displayed in a layer above the content on the large-screen device. In this way, when using the edit box on the mobile phone for input, the user can synchronously see a status in the edit box on the large-screen device in the user interface, and the user does not need to look up at an input status on the large-screen device during auxiliary input.

It should be noted that in the foregoing embodiments, an example in which a user uses auxiliary input of a Chinese character for the large-screen device is used for description. In a possible implementation, a user may use auxiliary input of an English phrase or text in another form for the large-screen device. Specific content of auxiliary input is not limited in this embodiment of this application.

Figure 86:
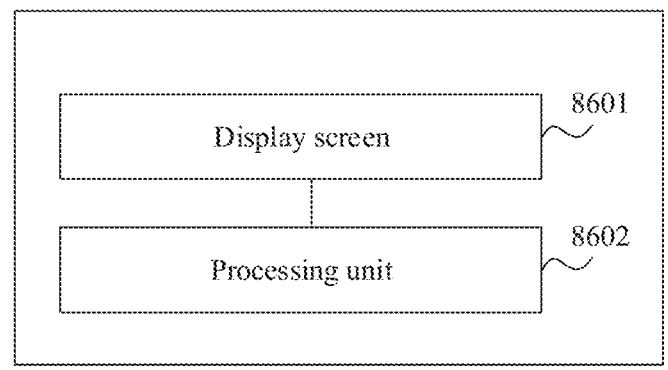
FIG. 86 is a schematic diagram of a structure of a device according to an embodiment of this application.

When each functional module is obtained by division based on each corresponding function, FIG. 86 is a schematic diagram of a possible structure of a first device, a second device, or a third device according to an embodiment of this application. The first device, the second device, or the third device includes a display screen 8601 and a processing unit 8602.

The display screen 8601 is configured to support the first device, the second device, or the third device to perform steps for display in the foregoing embodiments, or another process in the technology described in embodiments of this application. The display screen 8601 may be a touchscreen, other hardware, or a combination of hardware and software.

The processing unit 8602 is configured to support the first device, the second device, or the third device to perform steps for processing in the foregoing method embodiments, or another process in the technology described in embodiments of this application.

All related content of the steps in the foregoing method embodiments may be cited in function descriptions of the corresponding functional modules. Details are not described herein again.

Clearly, the electronic device includes but is not limited to the units and modules listed above. In addition, functions that the foregoing functional modules can specifically implement include but are not limited to the functions corresponding to the steps in the methods in the foregoing examples. For detailed descriptions of another unit of the electronic device, refer to detailed descriptions of a step corresponding to the unit in the methods. Details are not described herein again in this embodiment of this application.

When an integrated unit is used, the first device, the second device, or the third device in the foregoing embodiments may include a processing module, a storage module, and a display screen. The processing module is configured to control and manage an action of the first device, the second device, or the third device. The display screen is configured to display content based on an indication of the processing module. The storage module is configured to store program code and data on the first device, the second device, or the third device. Further, the first device, the second device, or the third device may further include an input module and a communications module. The communications module is configured to support the first device, the second device, or the third device to communicate with another network entity, to implement functions such as calling, data exchange, and Internet access of the first device, the second device, or the third device.

The processing module may be a processor or a controller. The communications module may be a transceiver, an RF circuit, a communications interface, or the like. The storage module may be a memory. The display module may be a screen or a display. The input module may be a touchscreen, a voice input apparatus, a fingerprint sensor, or the like.

The communications module may include an RF circuit, and may further include a wireless fidelity (wireless fidelity, Wi-Fi) module, a near field communication (near field communication, NFC) module, and a Bluetooth module. The communications modules such as the RF circuit, the NFC module, the Wi-Fi module, and the Bluetooth module may be collectively referred to as a communications interface. The processor, the RF circuit, the display screen, and the memory may be coupled to each other through a bus.

Figure 87:
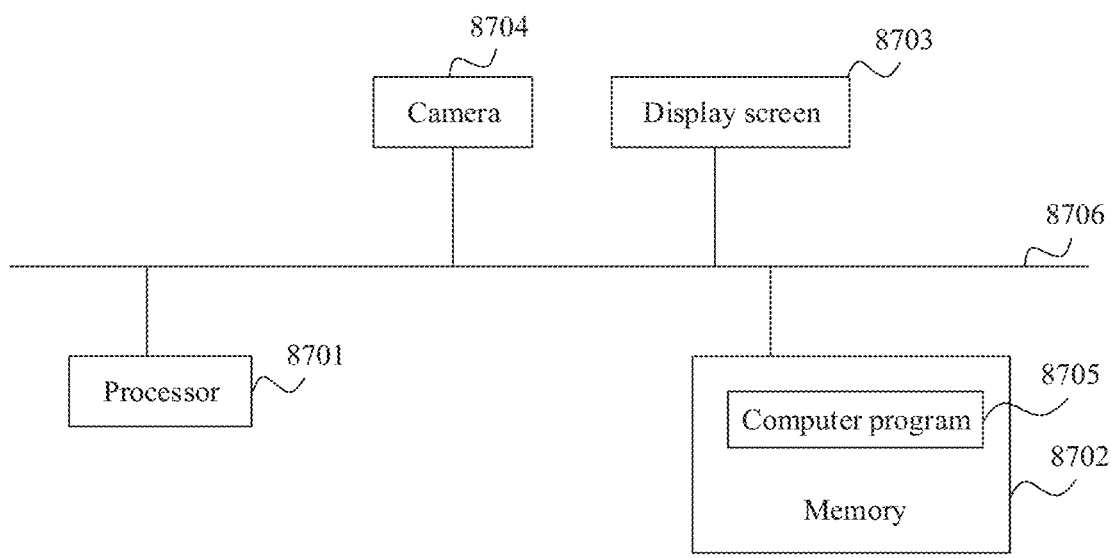
FIG. 87 is a schematic diagram of a structure of still another device according to an embodiment of this application.

FIG. 87 is a schematic diagram of still another possible structure of a first device, a second device, or a third device according to an embodiment of this application. The first device, the second device, or the third device includes one or more processors 8701, a memory 8702, a camera 8704, and a display screen 8703. The components may communicate with each other through one or more communications buses 8706.

One or more computer programs 8705 are stored in the memory 8702, and are configured to be executed by the one or more processors 8701. The one or more computer programs 8705 include instructions, and the instructions are used to perform any one of the steps in the foregoing display method. Clearly, the electronic device includes but is not limited to the components listed above. For example, the electronic device may further include a radio frequency circuit, a positioning apparatus, a sensor, and the like.

An embodiment of this application further provides a computer storage medium, including computer instructions. When the computer instructions are run on an electronic device, the electronic device is enabled to perform any one of the steps in the foregoing display method.

An embodiment of this application further provides a computer program product. When the computer program product runs on a computer, the computer is enabled to perform any one of the steps in the foregoing display method.

An embodiment of this application further provides an apparatus. The apparatus has a function of implementing actions of an electronic device in the foregoing display methods. The function may be implemented by hardware, or may be implemented by hardware executing corresponding software. The hardware or the software includes one or more modules corresponding to the foregoing function.

The electronic device, the computer storage medium, the computer program product, or the apparatus provided in embodiments of this application is configured to perform the corresponding method provided above. Therefore, for beneficial effects that can be achieved, refer to beneficial effects of the corresponding method provided above. Details are not described herein again.

The foregoing descriptions about the implementations allow a person skilled in the art to understand that, for the purpose of convenient and brief description, division into the foregoing functional modules is merely used as an example for description. In actual application, the foregoing functions can be allocated to different functional modules and implemented according to a requirement. In other words, an inner structure of an apparatus is divided into different functional modules to implement all or some of the functions described above. For a detailed working process of the foregoing system, apparatus, and unit, refer to a corresponding process in the foregoing method embodiments. Details are not described herein again.

In several of the embodiments provided in this application, it should be understood that the disclosed system, apparatus, and method may be implemented in other manners. For example, the described apparatus embodiment is merely an example. For example, division into the modules or units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. All or some of the units may be selected based on an actual requirement, to achieve the objectives of the solutions of the embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When implemented in the form of the software functional unit and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in embodiments of this application. The foregoing storage medium includes any medium that can store program code, for example, a flash memory, a removable hard disk, a read-only memory, a random access memory, a magnetic disk, or an optical disc.

The foregoing descriptions are merely specific implementations of embodiments of this application, but are not intended to limit the protection scope of embodiments of this application. Any variation or replacement within the technical scope disclosed in embodiments of this application shall fall within the protection scope of embodiments of this application. Therefore, the protection scope of embodiments of this application shall be subject to the protection scope of the claims.

What is claimed is:

1. A method implemented by a system, wherein the method comprises:
    displaying, by a first device of the system, a first interface comprising a first edit box;
    sending, by the first device to the to a second device of the system and a third device of the system, an indication message;
    displaying, by the second device and based on the indication message, a second interface comprising a second edit box;
    synchronizing, by the first device when obtaining an editing status in the second edit box, the editing status to the first edit box;
    sending, by the third device, to the first device, and based on the indication message, a preemption message to signal assistance of the third device in providing input to the first device;
    displaying, by the third device and based on the preemption message, a third interface comprising a third edit box; and
    synchronizing the editing status in the first edit box to the third edit box.

2. The method of claim 1, further comprising synchronizing, by the first device using an interface service of the second device, the editing status to the first edit box.

3. The method of claim 1, wherein the editing status comprises one or more of textual content, a cursor, or highlighting of the textual content.

4. The method of claim 1, wherein displaying the second interface comprises:
    displaying, by the second device and in response to the indication message, a notification interface comprising an option for confirming auxiliary input;
    obtaining, by the second device, an operation of triggering the option; and
    further displaying, by the second device and in response to the operation, the second interface.

5. The method of claim 1, wherein the second interface further comprises all or some of content in the first interface.

6. The method of claim 5, further comprising further displaying, by the second device in the second interface, the second edit box and all or some of the content in the first interface in layers, wherein the second edit box is displayed in a respective layer above all or some of the content in the first interface.

7. The method of claim 1, wherein after displaying the second interface, the method further comprises:
    obtaining, by the second device, an operation of triggering the second edit box;
    displaying, by the second device and in response to the operation of triggering the second edit box, a virtual keyboard;
    receiving, by the second device, an input operation on the virtual keyboard or in the second edit box; and
    displaying, by the second device based on the input operation, the editing status in the second edit box.

8. The method of claim 1, wherein the first device comprises any one of a television, a large-screen device, or a first wearable device, and wherein the second device or the third device comprises any one of a mobile phone, a tablet, or a second wearable device.

9. The method of claim 1, further comprising:
receiving, by the first device and in the third edit box, input content; and
synchronizing, by the first device and in response to receiving the input content in the third edit box, the input content to the first edit box.

10. The method of claim 1, wherein sending the preemption message comprises:
receiving, by the third device from the second device, a preemption request; and
further sending, by the third device, to the first device, and according to the preemption request, the preemption message.

11. The method of claim 1, further comprising:
displaying, by the third device based on a user operation, a notification interface comprising an option for confirming preemption;
obtaining, by the third device, an operation of triggering the option; and
further sending, by the third device, to the first device, and in response to the operation, the preemption message.

12. A device communication method implemented by a first device, wherein the device communication method comprises:
displaying a first interface comprising a first edit box;
sending, to a second device and a third device, an indication message signaling the second device or the third device to input first input content;
receiving, from the second device and based on the indication message, second input content;
synchronizing, based on the second input content, an editing status to the first edit box; and
receiving, from the third device and based on the indication message, a first preemption message to signal assistance of the third device in providing the first input content.

13. The device communication method of claim 12, further comprising:
receiving, from the third device, third input content; and
further synchronizing, based on the third input content, the editing status to the first edit box.

14. The device communication method of claim 12, further comprising sending, to the second device and in response to the first preemption message, a second preemption message.

15. A device communication method implemented by a second device, wherein the device communication method comprises:
displaying a first interface comprising a first option of a first device;
obtaining a first operation of selecting the first option;
sending, to the first device and in response to the first operation, an indication message to signal providing input to the first device;
displaying a second interface comprising a second edit box;
synchronizing, when obtaining an editing status in the second edit box, the editing status to a first edit box of the first device; and
receiving, from a third device, a preemption message to signal assistance of the third device in providing the input to the first device.

16. The device communication method of claim 15, further comprising synchronizing, using an interface service of the second device, the editing status between the first device and the second device.

17. The device communication method of claim 15, further comprising:
displaying, in response to the indication message, a notification interface comprising a second option for confirming auxiliary input;
obtaining a second operation of triggering the second option; and
further displaying, in response to the second operation, the second interface.

18. The device communication method of claim 15, wherein after displaying the second interface, the device communication method further comprises:
obtaining an operation of triggering the second edit box;
displaying, in response to obtaining the operation of triggering the second edit box, a virtual keyboard;
receiving, on the virtual keyboard and in the second edit box, an input operation; and
displaying, in response to receiving the input operation, the editing status in the second edit box based on an input operation received on the virtual keyboard.

19. The device communication method of claim 15, wherein after displaying the second interface, the device communication method further comprises:
obtaining an operation of triggering the second edit box;
displaying, in response to obtaining the operation of triggering the second edit box, a virtual keyboard;
receiving, on the virtual keyboard or in the second edit box, an input operation; and
displaying, in response to receiving the input operation, the editing status in the second edit box.

20. The device communication method of claim 15, wherein before receiving the preemption message, the device communication method further comprises sending, to the third device, a preemption request.

* * * * *